US012585502B2

(12) United States Patent
Currid et al.

(10) Patent No.: US 12,585,502 B2
(45) Date of Patent: Mar. 24, 2026

(54) VIRTUAL MACHINE MANAGEMENT IN DATA CENTERS

(71) Applicant: NVIDIA Corporation, Santa Clara, CA (US)

(72) Inventors: Andrew Currid, Alameda, CA (US); Anshul Fadnavis, San Jose, CA (US); Chenghuan Jia, Fremont, CA (US); Ankit Agrawal, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 525 days.

(21) Appl. No.: 17/978,885

(22) Filed: Nov. 1, 2022

(65) Prior Publication Data

US 2024/0143408 A1 May 2, 2024

Related U.S. Application Data

(63) Continuation of application No. 17/977,942, filed on Oct. 31, 2022.

(51) Int. Cl.
*G06F 9/50* (2006.01)

(52) U.S. Cl.
CPC ............ *G06F 9/505* (2013.01); *G06F 9/5044* (2013.01); *G06F 2209/5019* (2013.01); *G06F 2209/505* (2013.01)

(58) Field of Classification Search
None
See application file for complete search history.

(56) References Cited

U.S. PATENT DOCUMENTS

| | | | | |
|---|---|---|---|---|
| 8,613,085 B2 * | 12/2013 | Diab | .................. | H04L 63/1441 |
| | | | | 718/104 |
| 10,026,143 B2 * | 7/2018 | Shu | ........................... | G06T 1/60 |
| 10,621,001 B1 * | 4/2020 | Braverman | ........... | G06F 9/4881 |
| 11,169,883 B1 * | 11/2021 | Burgin | .................. | G06F 9/4418 |
| 2003/0204770 A1 * | 10/2003 | Bergsten | ............ | G06F 11/2071 |
| | | | | 714/5.11 |
| 2006/0045092 A1 * | 3/2006 | Kubsch | ............... | H04L 67/1068 |
| | | | | 370/395.3 |
| 2010/0257269 A1 * | 10/2010 | Clark | .................... | G06F 9/4856 |
| | | | | 718/1 |
| 2011/0066786 A1 * | 3/2011 | Colbert | .............. | G06F 9/45558 |
| | | | | 711/6 |
| 2012/0144391 A1 * | 6/2012 | Ueda | .................. | G06F 9/45558 |
| | | | | 718/1 |
| 2012/0216183 A1 * | 8/2012 | Mahajan | .................. | G06F 8/65 |
| | | | | 717/172 |

(Continued)

OTHER PUBLICATIONS

IEEE, "IEEE Standard 754-2008 (Revision of IEEE Standard 754-1985): IEEE Standard for Floating-Point Arithmetic," Aug. 29, 2008, 70 pages.

(Continued)

*Primary Examiner* — Adam Lee
(74) *Attorney, Agent, or Firm* — Davis Wright Tremaine LLP

(57) ABSTRACT

Apparatuses, systems, and techniques to determine metrics for paths connecting hardware components, select a plurality of groups of the hardware components based at least in part on the metrics, and perform at least a portion of a workload using a selected group of the plurality of groups.

24 Claims, 59 Drawing Sheets

(56) References Cited

U.S. PATENT DOCUMENTS

| | | | | |
|---|---|---|---|---|
| 2012/0243795 A1* | 9/2012 | Head | ................... | G06T 11/003 |
| | | | | 382/218 |
| 2012/0297236 A1* | 11/2012 | Ziskind | .................. | G06F 9/455 |
| | | | | 714/E11.132 |
| 2012/0300669 A1* | 11/2012 | Zahavi | ................. | H04L 49/111 |
| | | | | 370/254 |
| 2012/0324071 A1* | 12/2012 | Gulati | ................... | G06F 9/5033 |
| | | | | 709/223 |
| 2013/0070515 A1* | 3/2013 | Mayhew | ............... | G11C 5/005 |
| | | | | 365/148 |
| 2015/0100957 A1* | 4/2015 | Botzer | ............... | G06F 9/45558 |
| | | | | 718/1 |
| 2015/0186172 A1* | 7/2015 | Thomas | ............. | G06F 9/45558 |
| | | | | 718/1 |
| 2015/0237132 A1* | 8/2015 | Antony | ................... | H04L 67/10 |
| | | | | 709/224 |
| 2016/0080451 A1* | 3/2016 | Morton | ............. | H04N 21/8456 |
| | | | | 709/219 |
| 2017/0077964 A1 | 3/2017 | Guilford et al. | | |
| 2017/0244593 A1* | 8/2017 | Rangasamy | ........ | H04L 67/1097 |
| 2018/0060104 A1* | 3/2018 | Tarasuk-Levin | ...... | G06F 9/4856 |
| 2018/0123895 A1* | 5/2018 | Khasnabish | ........ | H04L 12/4641 |
| 2019/0041967 A1* | 2/2019 | Ananthakrishnan | ......................... | |
| | | | | G06F 1/3293 |
| 2019/0065281 A1 | 2/2019 | Bernat et al. | | |
| 2019/0243672 A1* | 8/2019 | Yadav | ................... | G06F 3/0617 |
| 2020/0097280 A1* | 3/2020 | Simeonov | ............... | G06F 8/656 |
| 2021/0081216 A1* | 3/2021 | Komarov | .............. | H04L 9/3239 |
| 2021/0326763 A1 | 10/2021 | Bernat et al. | | |
| 2022/0385543 A1* | 12/2022 | Villasante Marcos | ....................... | |
| | | | | H04L 41/147 |
| 2022/0404798 A1* | 12/2022 | Amaro, Jr. | ........... | G06F 11/301 |
| 2023/0124947 A1* | 4/2023 | Mermoud | .......... | H04L 43/0876 |
| | | | | 709/224 |
| 2024/0143372 A1* | 5/2024 | Currid | ................. | G06F 9/45558 |
| 2024/0179086 A1 | 5/2024 | Lee et al. | | |

OTHER PUBLICATIONS

IEEE, "IEEE Standard for 802.3," IEEE Standard for Ethernetn, IEEE Computer Society, Dec. 28, 2012, 634 pages.

Wikipedia, "IEEE 802.11," Wikipedia the Free Enclyopedia, https://en.wikipedia.org/wiki/IEEE_802.11, most recent edit Sep. 20, 2020 [retrieved Sep. 22, 2020], 15 pages.

Wikipedia, "IEEE 802.5," Wikepedia The Free Encyclopedia, https://en.wikipedia.org/wiki/Token_Ring, Jan. 14, 2020, 12 pages.

NCCL, "NVIDIA Collective Communication Library (NCCL) Documentation," Retrieved from, https://docs.nvidia.com/deeplearning/nccl/user-guide/docs/index.html, 2020, 9 Pages.

OPENUCX, "OPENUCX," Retrieved from, https://openucx.readthedocs.io/en/master/, 2019, 2 Pages.

* cited by examiner

Data Center  104

Internal Network  106

102

| 102D | 102C | 102B | 102A |
| --- | --- | --- | --- |
| 122D | 122C | 122B | 122A |
| 120D | 120C | 120B | 120A |

122 →
120 →

Computing System
132

Virtualization
Management
Application
130

VM Database 134

| 102H | 102G | 102F | 102E |
| --- | --- | --- | --- |
| 122H | 122G | 122F | 122E |
| 120H | 120G | 120F | 120E |

122 →
120 →

Group Information  136

| Set 138A | Set 138E |
| --- | --- |
| Set 138B | Set 138F |
| Set 138C | Set 138G |
| Set 138D | Set 138H |

Network Gateway
Device(s)
114

External
Computing
Device(s)
112

External
Network
110

| | 340A | 340B | 330A | 330B | 330C | 330D | 350 |
|---|---|---|---|---|---|---|---|
| 340A | 0 | 0.25 | 12 | 12 | 1224 | 1224 | 113 |
| 340B | 0.25 | 0 | 1224 | 1224 | 12 | 12 | 1213 |
| 330A | 12 | 1224 | 0 | 12 | 1224 | 1224 | 113 |
| 330B | 12 | 1224 | 12 | 0 | 1224 | 1224 | 113 |
| 330C | 1224 | 12 | 1224 | 1224 | 0 | 12 | 1213 |
| 330D | 1224 | 12 | 1224 | 1224 | 12 | 0 | 1213 |
| 350 | 113 | 1213 | 113 | 113 | 1213 | 1213 | 0 |

| Predetermined Group Desc. | Group | Group Cost | Predetermined Group Desc. | Group | Group Cost |
|---|---|---|---|---|---|
| 1xGPU+1xNI | 340A+330A | 12 | 1xGPU+1xSA+1xNI | 340A+350+330A | 238 |
| 1xGPU+1xNI | 340A+330B | 12 | 1xGPU+1xSA+1xNI | 340A+350+330B | 238 |
| 1xGPU+1xNI | 340A+330C | 1224 | 1xGPU+1xSA+1xNI | 340A+350+330C | 2550 |
| 1xGPU+1xNI | 340A+330D | 1224 | 1xGPU+1xSA+1xNI | 340A+350+330D | 2550 |
| 1xGPU+1xNI | 340B+330A | 1224 | 1xGPU+1xSA+1xNI | 340B+350+330A | 2550 |
| 1xGPU+1xNI | 340B+330B | 1224 | 1xGPU+1xSA+1xNI | 340B+350+330B | 2550 |
| 1xGPU+1xNI | 340B+330C | 12 | 1xGPU+1xSA+1xNI | 340B+350+330C | 2438 |
| 1xGPU+1xNI | 340B+330D | 12 | 1xGPU+1xSA+1xNI | 340B+350+330D | 2438 |
| 1xGPU+2xNI | 340A+330A+330B | 36 | 1xGPU+1xSA+2xNI | 340A+350+330A+330B | 375 |
| 1xGPU+2xNI | 340A+330A+330C | 2460 | 1xGPU+1xSA+2xNI | 340A+350+330A+330C | 3899 |
| 1xGPU+2xNI | 340A+330A+330D | 2460 | 1xGPU+1xSA+2xNI | 340A+350+330A+330D | 3899 |
| 1xGPU+2xNI | 340A+330B+330C | 2460 | 1xGPU+1xSA+2xNI | 340A+350+330B+330C | 3899 |
| 1xGPU+2xNI | 340A+330B+330D | 2460 | 1xGPU+1xSA+2xNI | 340A+350+330B+330D | 3899 |
| 1xGPU+2xNI | 340A+330C+330D | 2460 | 1xGPU+1xSA+2xNI | 340A+350+330C+330D | 4999 |
| 1xGPU+2xNI | 340B+330A+330B | 2460 | 1xGPU+1xSA+2xNI | 340B+350+330A+330B | 3899 |
| 1xGPU+2xNI | 340B+330A+330C | 2460 | 1xGPU+1xSA+2xNI | 340B+350+330A+330C | 4999 |
| 1xGPU+2xNI | 340B+330A+330D | 2460 | 1xGPU+1xSA+2xNI | 340B+350+330A+330D | 4999 |
| 1xGPU+2xNI | 340B+330B+330C | 2460 | 1xGPU+1xSA+2xNI | 340B+350+330B+330C | 4999 |
| 1xGPU+2xNI | 340B+330B+330D | 2460 | 1xGPU+1xSA+2xNI | 340B+350+330B+330D | 4999 |
| 1xGPU+2xNI | 340B+330C+330D | 36 | 1xGPU+1xSA+2xNI | 340B+350+330C+330D | 3675 |
| 1xGPU+1xSA | 340A+350 | 113 | | | |
| 1xGPU+1xSA | 340B+350 | 1213 | | | |

| Predetermined Group Desc. | Group | Group Cost |
|---|---|---|
| 1xGPU+1xNI | 340A+330A | 12 |
| 1xGPU+1xNI | 340A+330B | 12 |
| 1xGPU+1xNI | 340B+330C | 12 |
| 1xGPU+1xNI | 340B+330D | 12 |
| 1xGPU+2xNI | 340A+330A+330B | 36 |
| 1xGPU+2xNI | 340B+330C+330D | 36 |
| 1xGPU+1xSA | 340A+350 | 113 |
| 1xGPU+1xSA+1xNI | 340A+350+330A | 238 |
| 1xGPU+1xSA+1xNI | 340A+350+330B | 238 |
| 1xGPU+1xSA+2xNI | 340A+350+330A+330B | 375 |
| 2xGPU | 340A+340B | 0.25 |

610　　612　　614

800

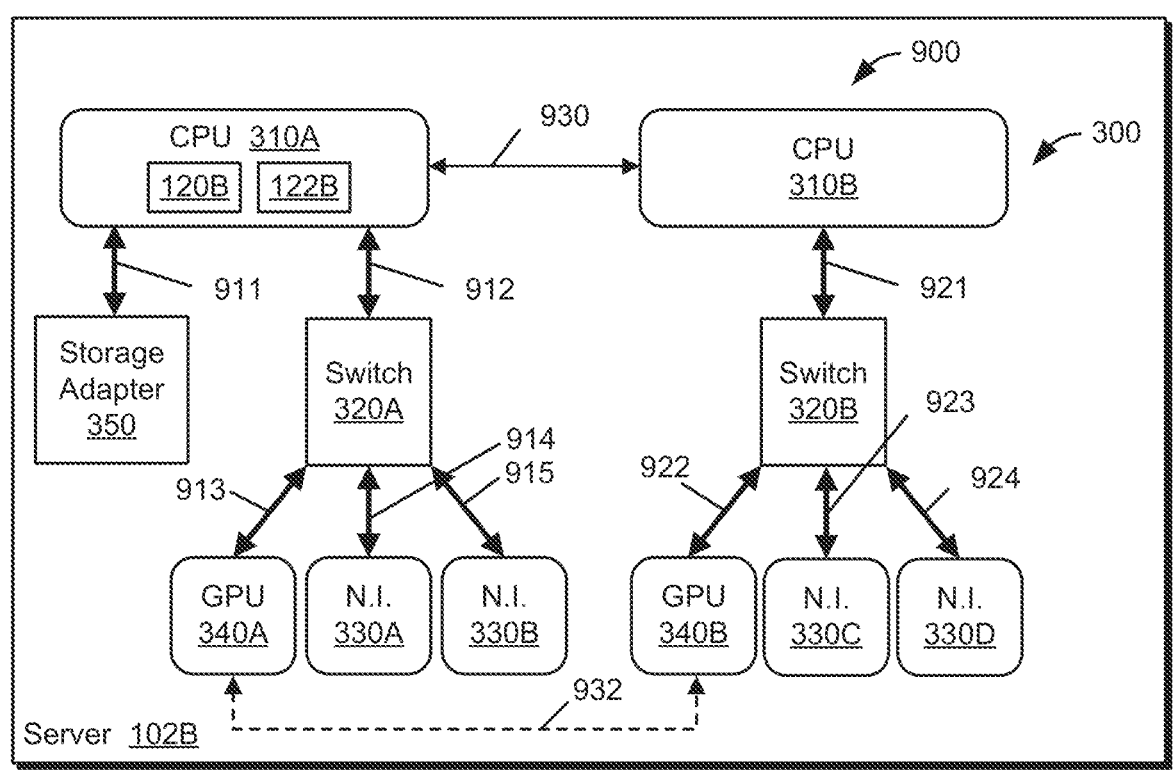
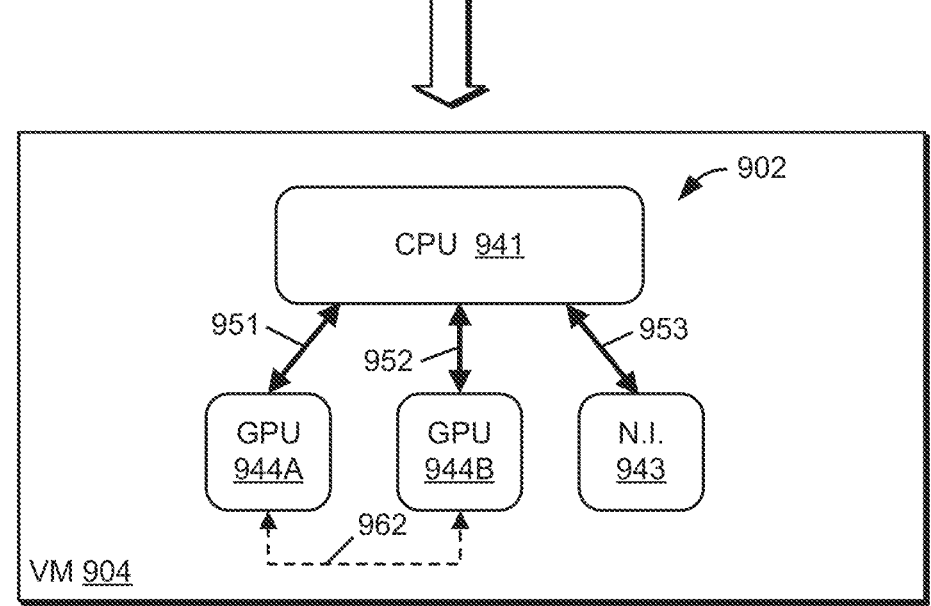
FIG. 9

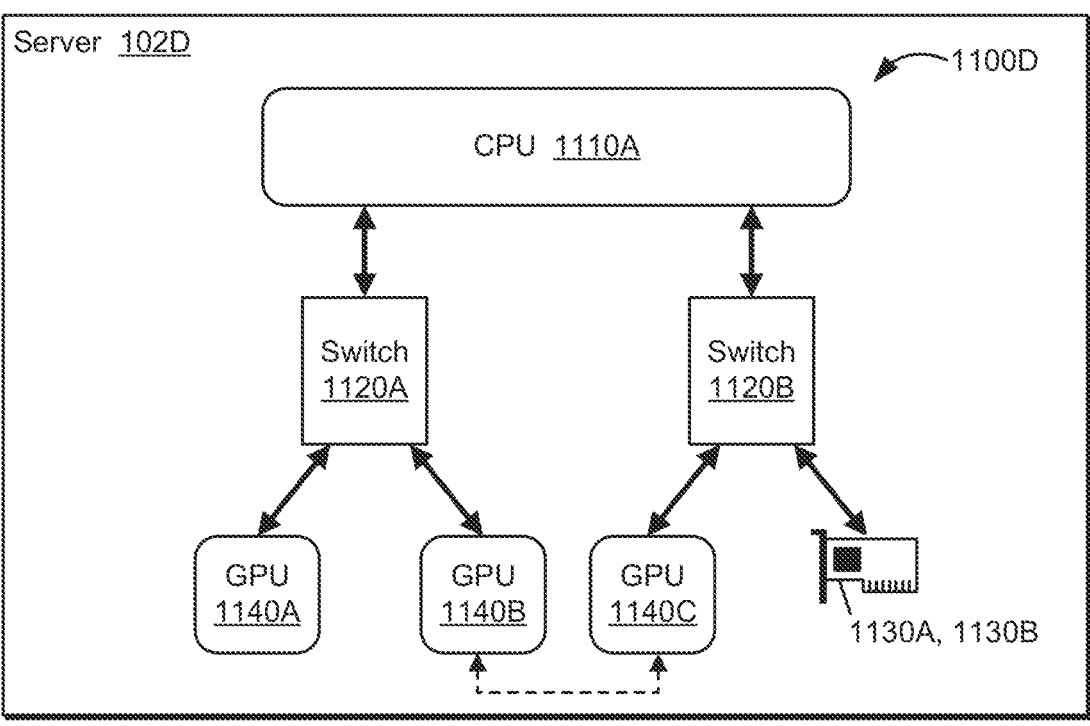
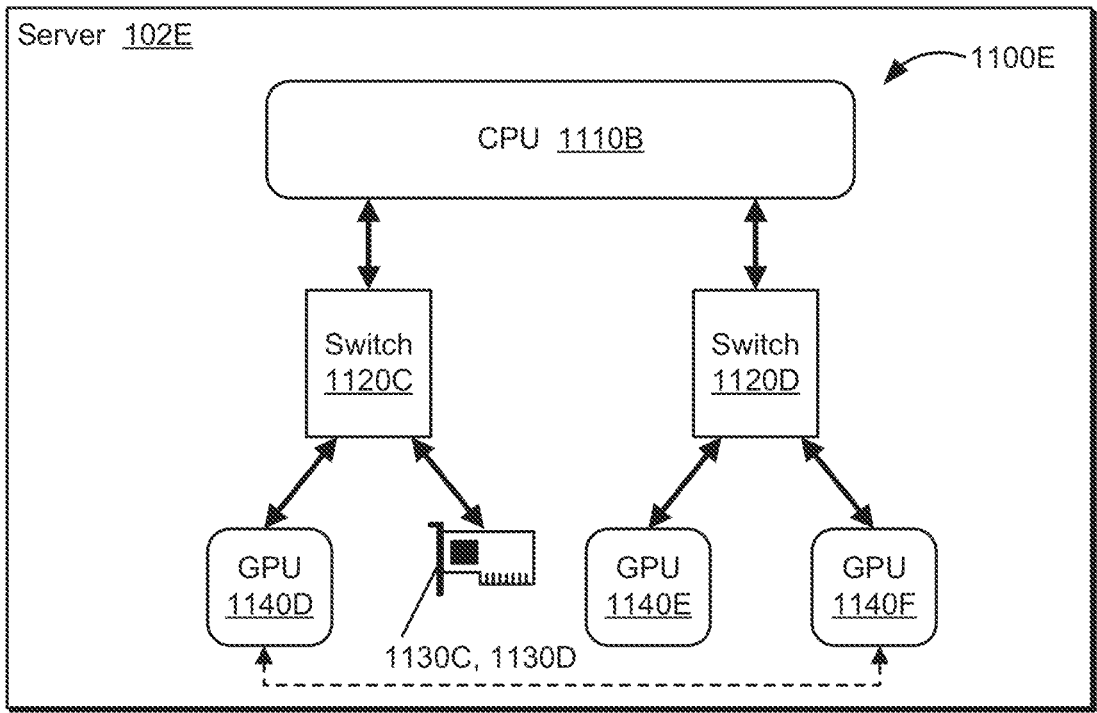
FIG. 11

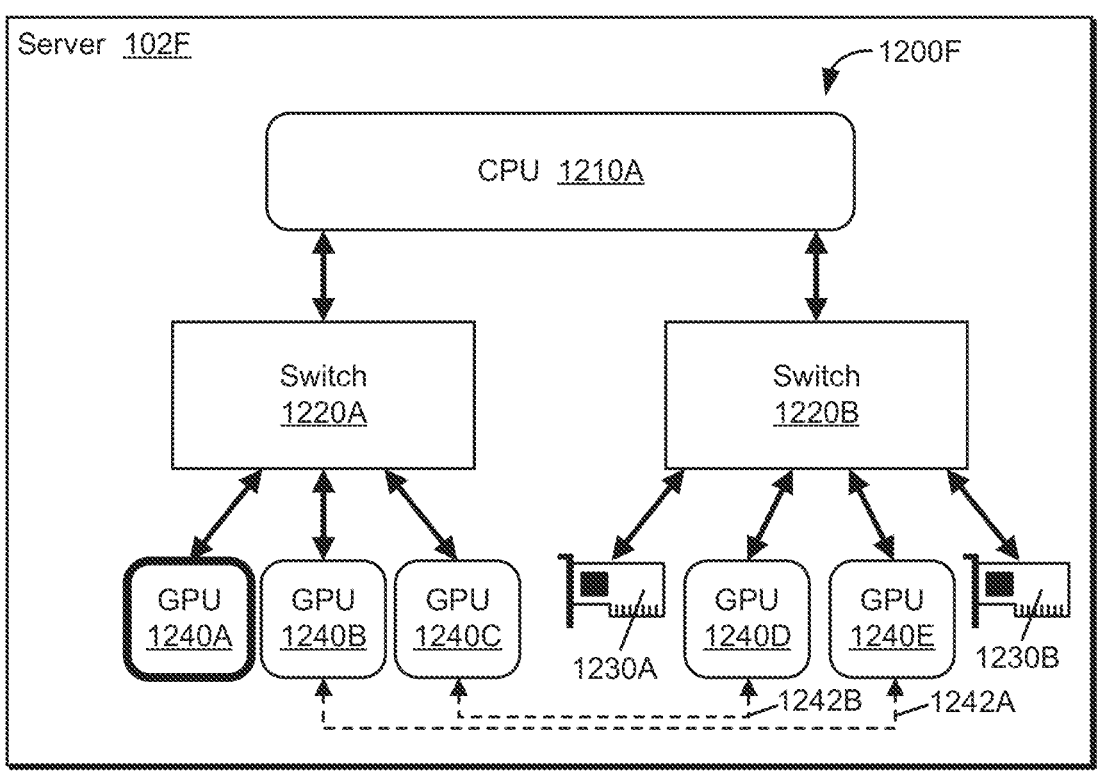
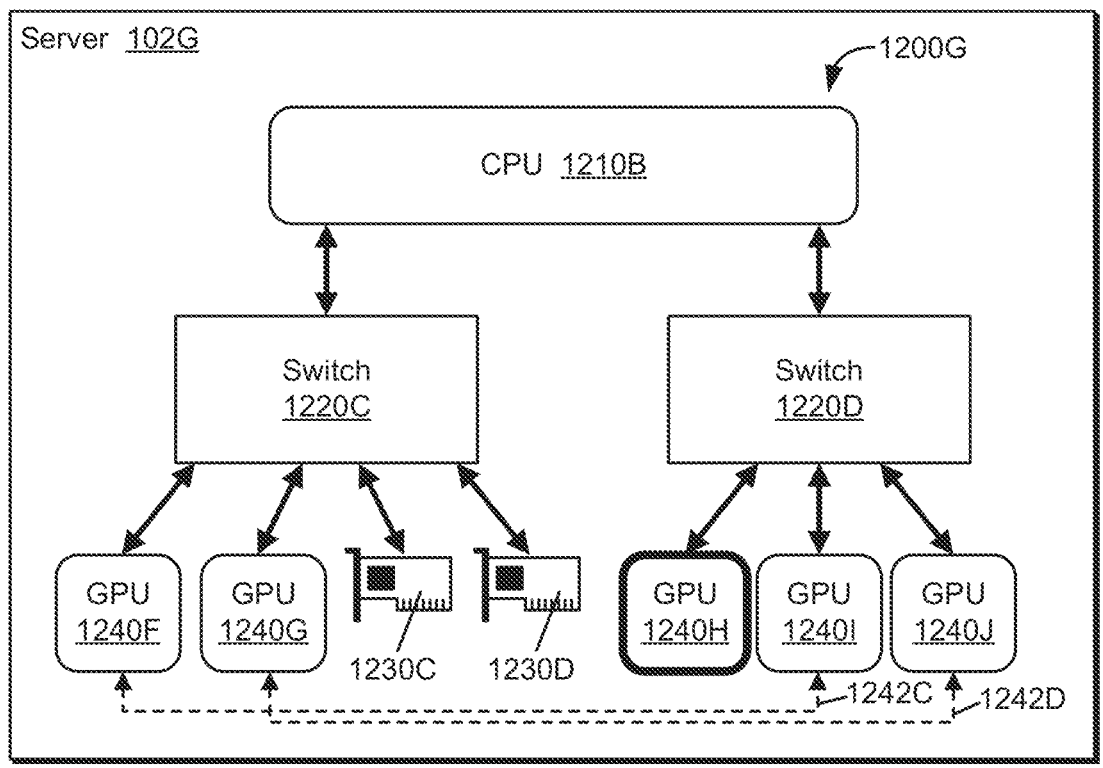
FIG. 12

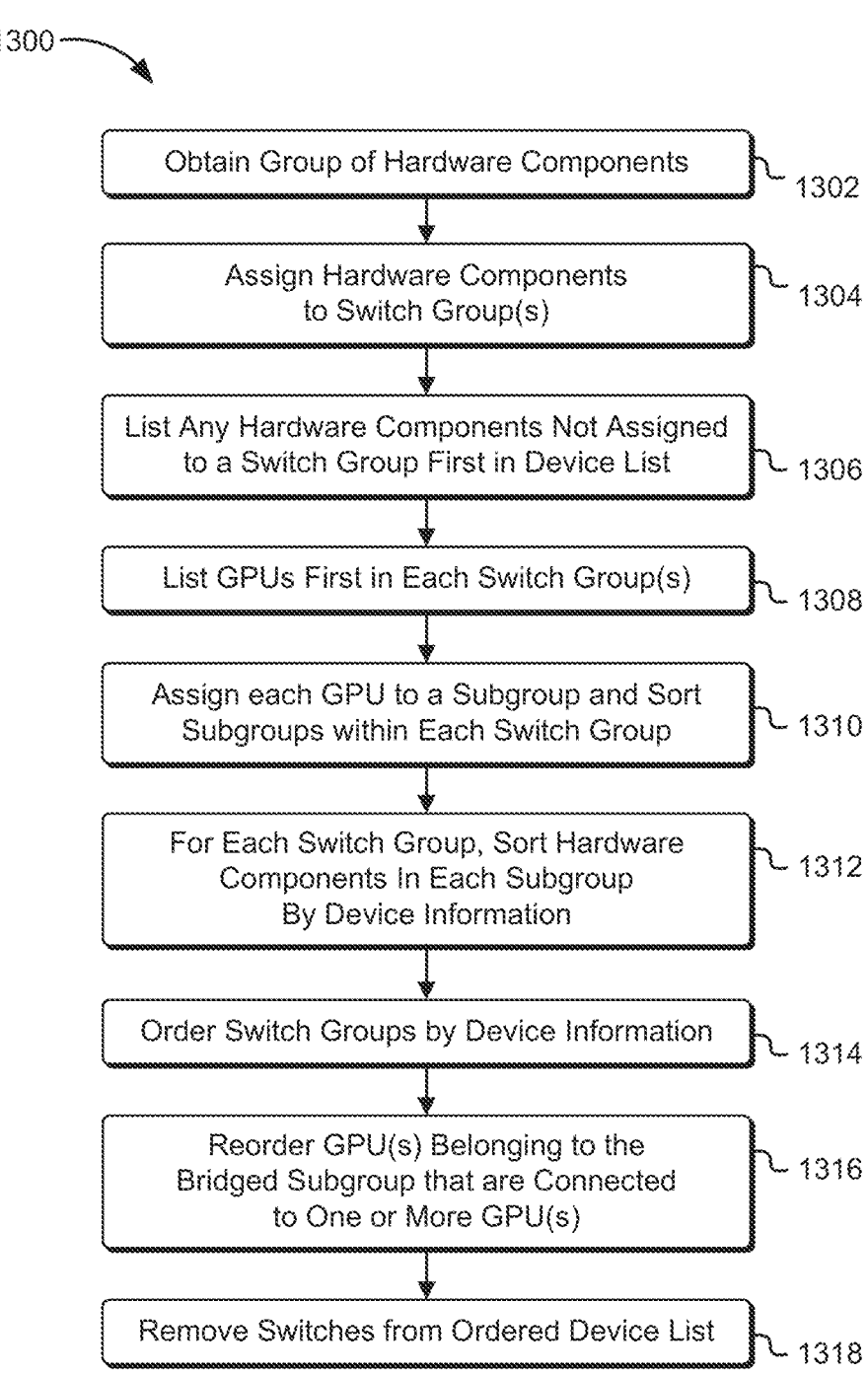

1300

Obtain Group of Hardware Components ⟍ 1302

Assign Hardware Components to Switch Group(s) ⟍ 1304

List Any Hardware Components Not Assigned to a Switch Group First in Device List ⟍ 1306

List GPUs First in Each Switch Group(s) ⟍ 1308

Assign each GPU to a Subgroup and Sort Subgroups within Each Switch Group ⟍ 1310

For Each Switch Group, Sort Hardware Components In Each Subgroup By Device Information ⟍ 1312

Order Switch Groups by Device Information ⟍ 1314

Reorder GPU(s) Belonging to the Bridged Subgroup that are Connected to One or More GPU(s) ⟍ 1316

Remove Switches from Ordered Device List ⟍ 1318

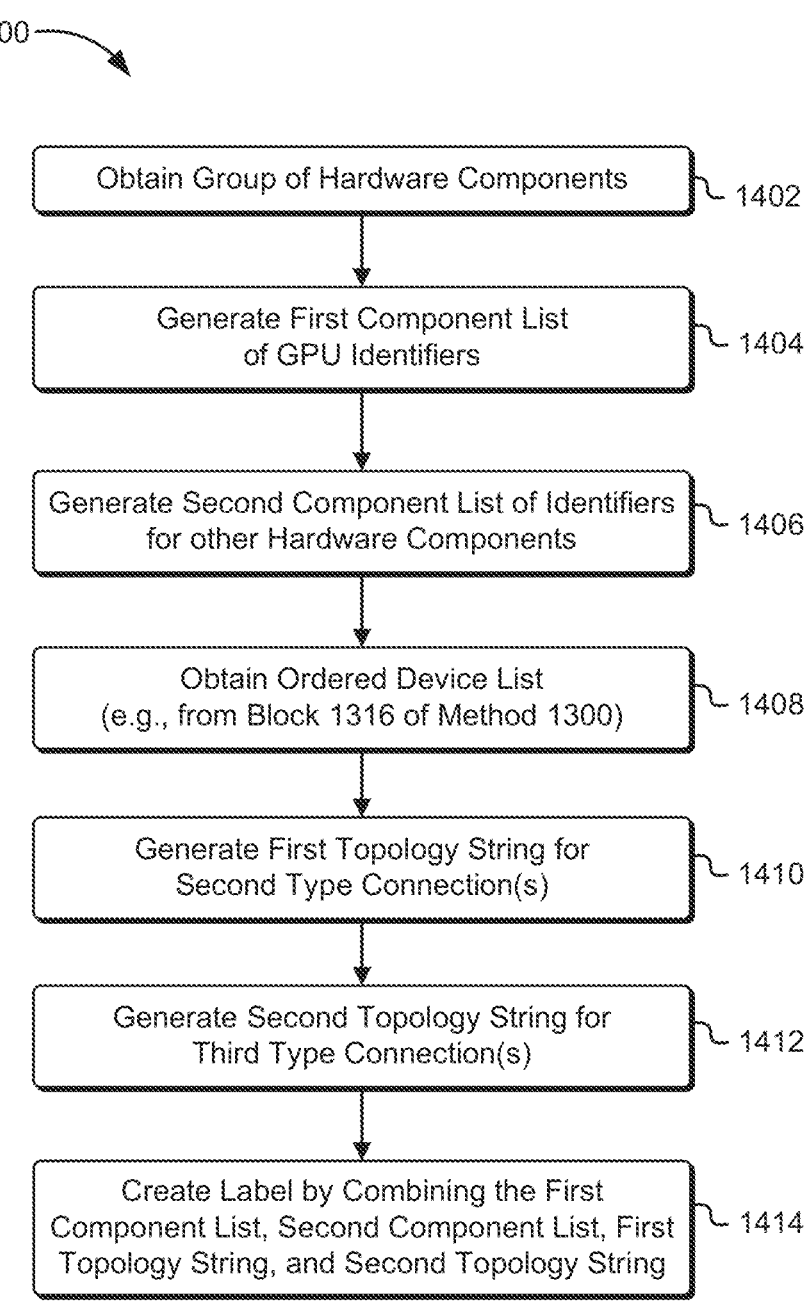

Obtain Group of Hardware Components ⟍ 1402

Generate First Component List of GPU Identifiers ⟍ 1404

Generate Second Component List of Identifiers for other Hardware Components ⟍ 1406

Obtain Ordered Device List (e.g., from Block 1316 of Method 1300) ⟍ 1408

Generate First Topology String for Second Type Connection(s) ⟍ 1410

Generate Second Topology String for Third Type Connection(s) ⟍ 1412

Create Label by Combining the First Component List, Second Component List, First Topology String, and Second Topology String ⟍ 1414

FIG. 14

1500
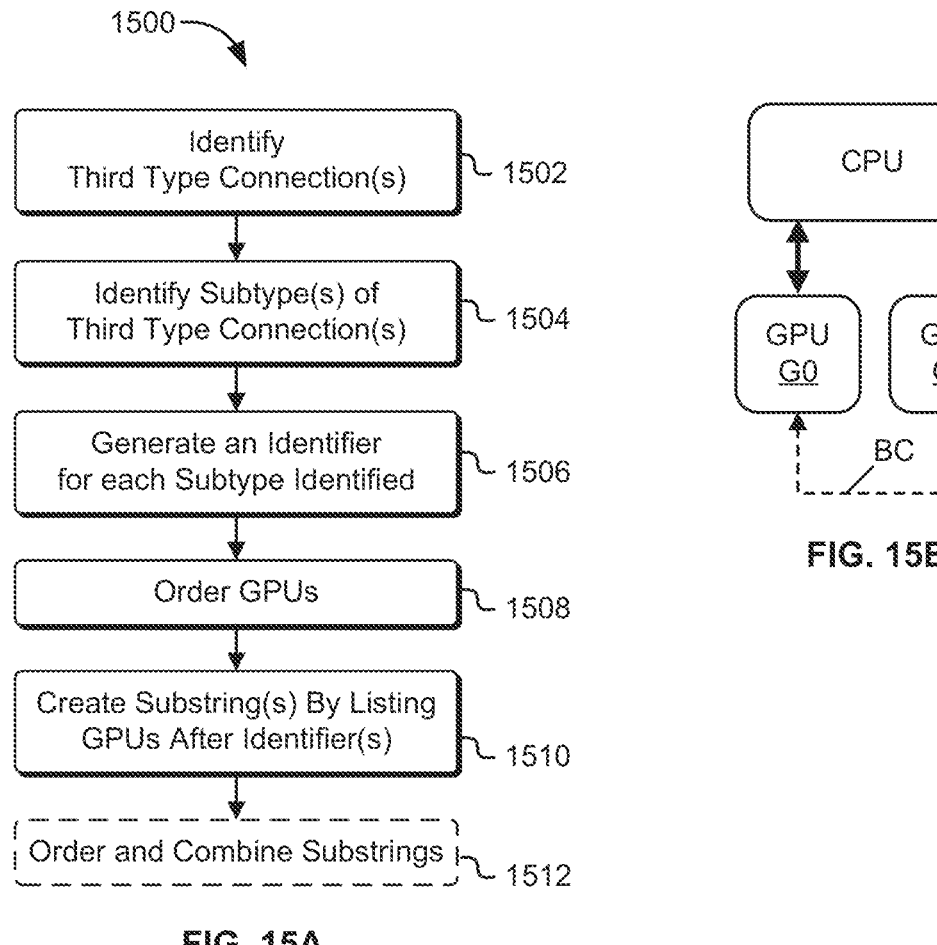
Identify
Third Type Connection(s) — 1502
Identify Subtype(s) of
Third Type Connection(s) — 1504
Generate an Identifier
for each Subtype Identified — 1506
Order GPUs — 1508
Create Substring(s) By Listing
GPUs After Identifier(s) — 1510
Order and Combine Substrings — 1512
FIG. 15A
FIG. 15B
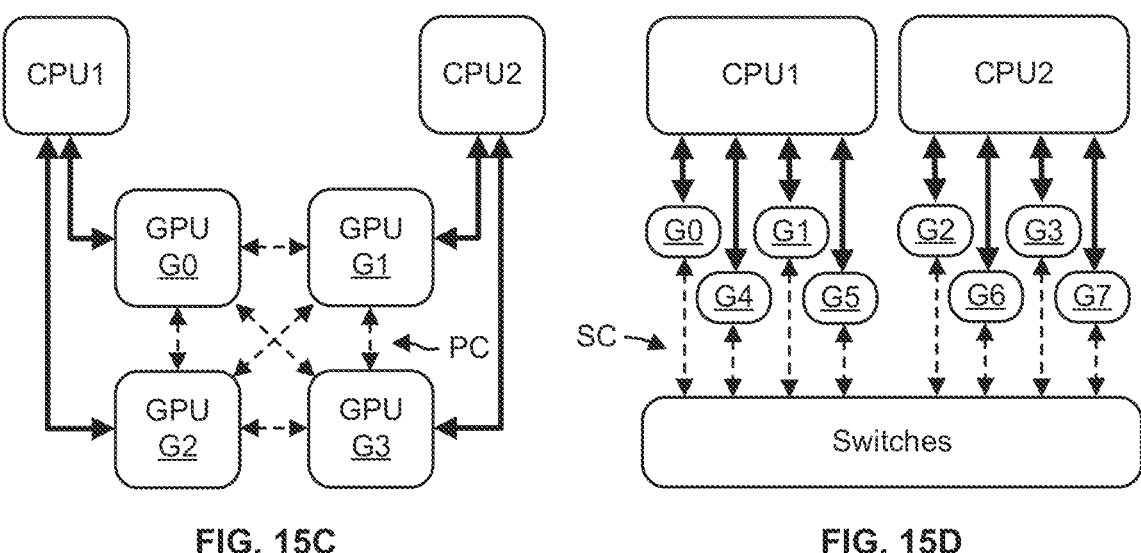
FIG. 15C
FIG. 15D

1600

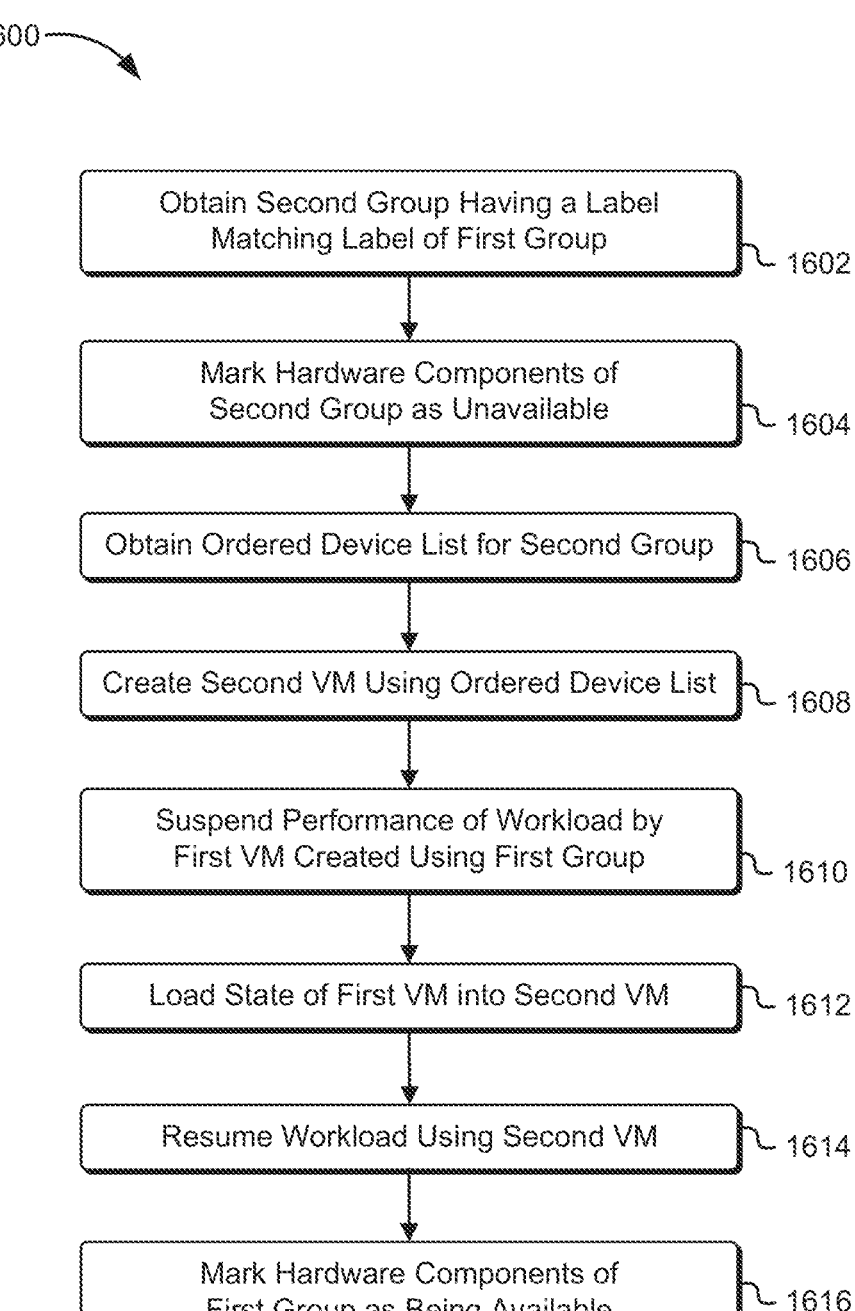

Obtain Second Group Having a Label
Matching Label of First Group ⟍ 1602

Mark Hardware Components of
Second Group as Unavailable ⟍ 1604

Obtain Ordered Device List for Second Group ⟍ 1606

Create Second VM Using Ordered Device List ⟍ 1608

Suspend Performance of Workload by
First VM Created Using First Group ⟍ 1610

Load State of First VM into Second VM ⟍ 1612

Resume Workload Using Second VM ⟍ 1614

Mark Hardware Components of
First Group as Being Available ⟍ 1616

DATABASE
1714

DATABASE
1716

COMPONENT
1718

COMPONENT
1720

COMPONENT
1722

• • •

SERVER 1712

NETWORK(S)
1710

1702

1708

1704

1706

Figure 18:
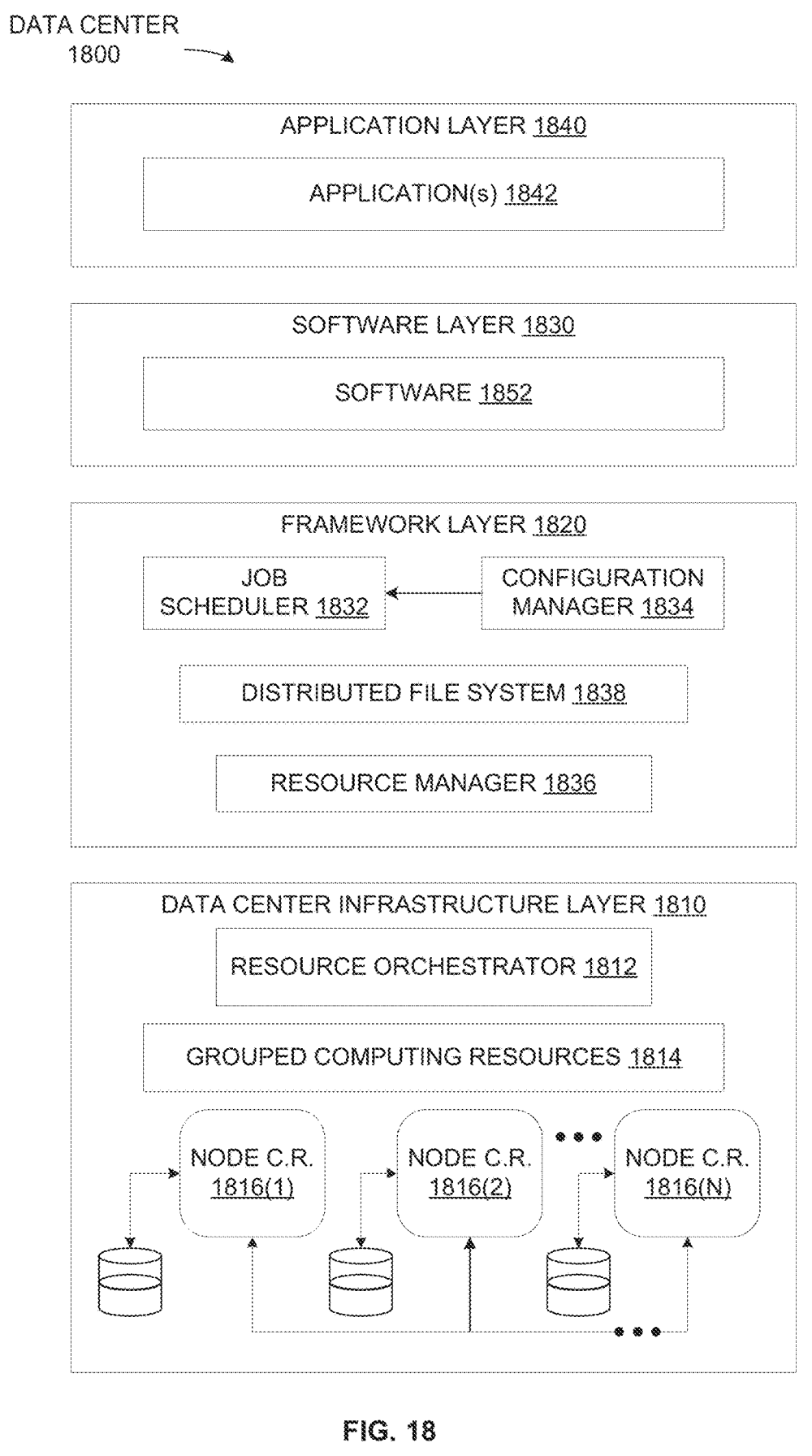

DATA CENTER
1800

APPLICATION LAYER 1840

APPLICATION(s) 1842

SOFTWARE LAYER 1830

SOFTWARE 1852

FRAMEWORK LAYER 1820

JOB SCHEDULER 1832  ◄  CONFIGURATION MANAGER 1834

DISTRIBUTED FILE SYSTEM 1838

RESOURCE MANAGER 1836

DATA CENTER INFRASTRUCTURE LAYER 1810

RESOURCE ORCHESTRATOR 1812

GROUPED COMPUTING RESOURCES 1814

NODE C.R. 1816(1)    NODE C.R. 1816(2)  •••  NODE C.R. 1816(N)

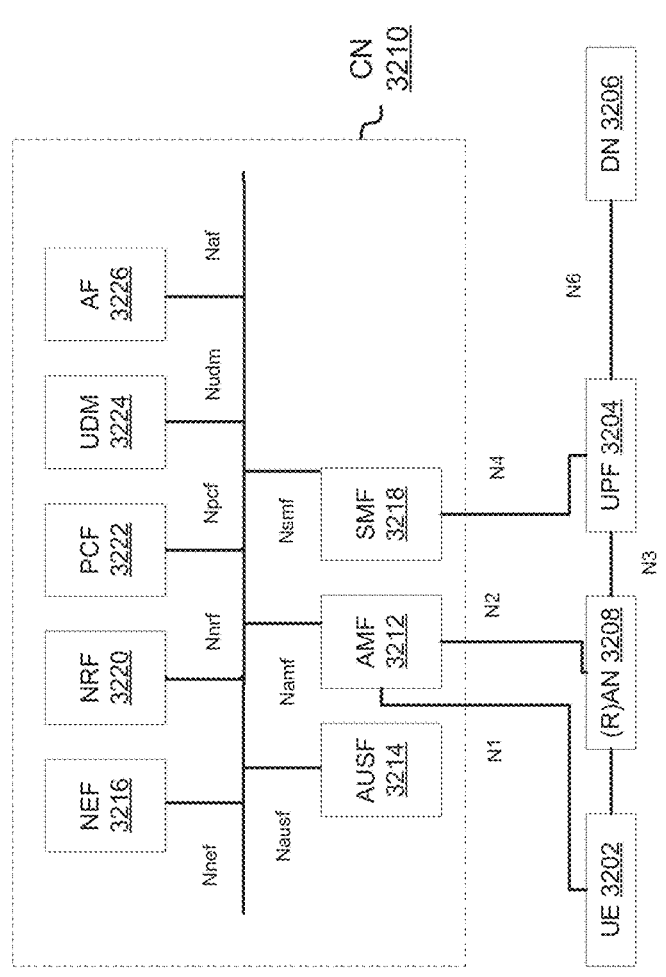
FIG. 32

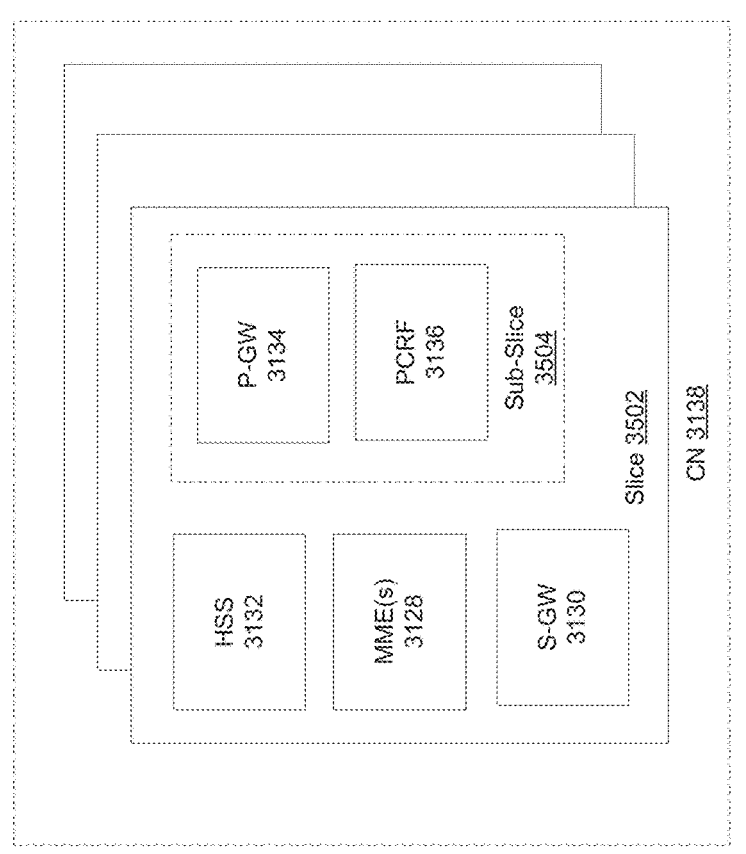
FIG. 35

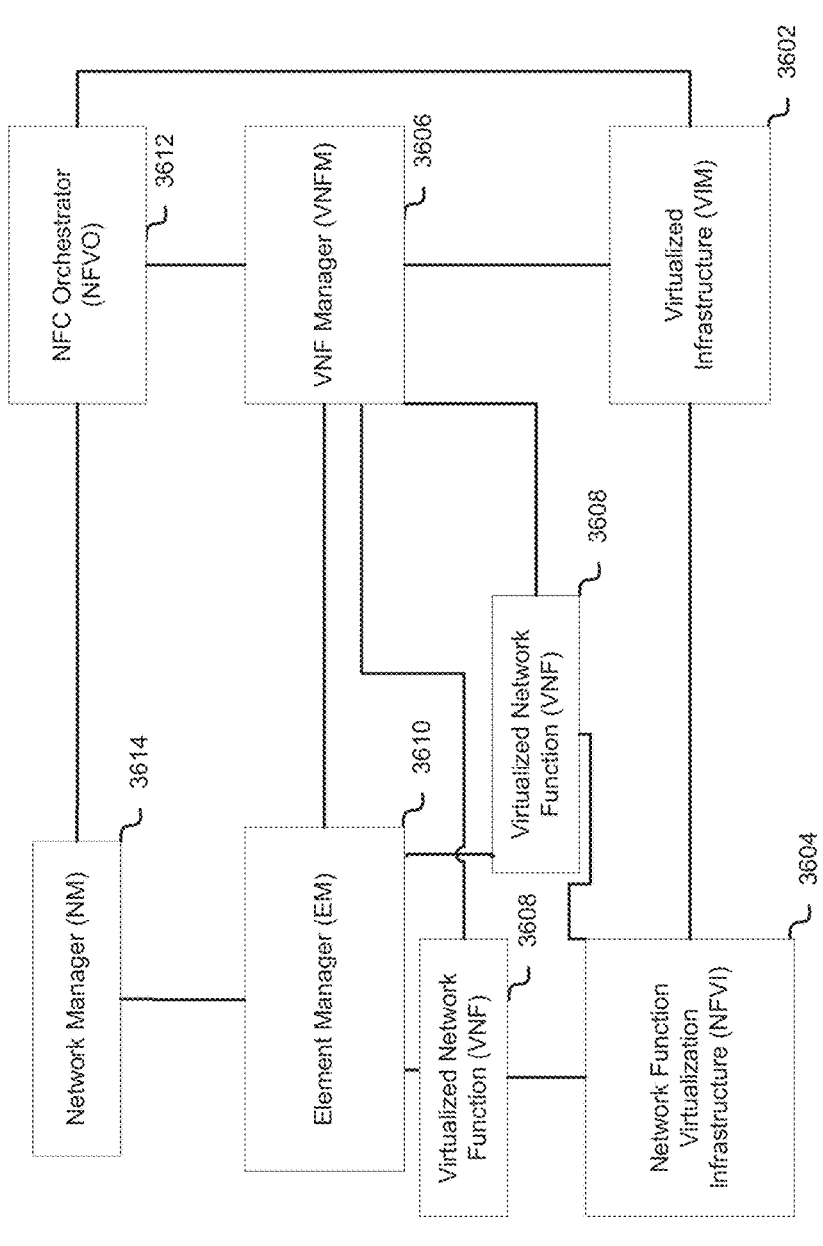
FIG. 36

GRAPHICS PROCESSOR
4510

GRAPHICS PROCESSOR
4540

INTER-CORE TASK MANAGER
(e.g., THREAD DISPATCHER)
4545

| SHADER CORE 4555A | SHADER CORE 4555C | SHADER CORE 4555E | - - - | SHADER CORE 4555N-1 |

| SHADER CORE 4555B | SHADER CORE 4555D | SHADER CORE 4555F | - - - | SHADER CORE 4555N |

TILING UNIT
4558

| MMU 4520A | MMU 4520B |

| CACHE 4525A | CACHE 4525B |

| INTERCONNECT 4530A | INTERCONNECT 4530B |

GRAPHICS CORE
4600

1

VIRTUAL MACHINE MANAGEMENT IN DATA CENTERS

CLAIM OF PRIORITY

This application is a continuation of U.S. patent application Ser. No. 17/977,942 titled "Facilitating Workload Migration in Data Centers Using Virtual Machine Management," filed Oct. 31, 2022, the entire contents of which is incorporated herein by reference.

FIELD

At least one embodiment pertains to methods and/or systems for selecting groups of hardware components to perform workload(s). In at least one embodiment, the groups may be selected based at least in part on expected performance. In at least one embodiment, information may be generated for the groups that may be used to migrate a workload from a first group to a different second group. In at least one embodiment, the methods may be implemented within a data center that implements various novel techniques described herein.

BACKGROUND

When a single workload would not consume all of the resources of a computing system, techniques like virtualization and containers may be used to perform multiple workloads that together consume at most all of the computing system's resources. These techniques assign subsets of the computing system's hardware to each workload so that the computing system (e.g., a data center, a server, and/or the like) may perform the multiple workloads simultaneously. Because the hardware assigned to the workloads may determine at least in part how much time the workloads will take to complete, how hardware is assigned to the workloads can impact performance.

BRIEF DESCRIPTION OF THE DRAWINGS

FIG. 5 illustrates a table listing example groups of the hardware components illustrated in FIG. 3, in accordance with at least one embodiment;

2

Figure 3:
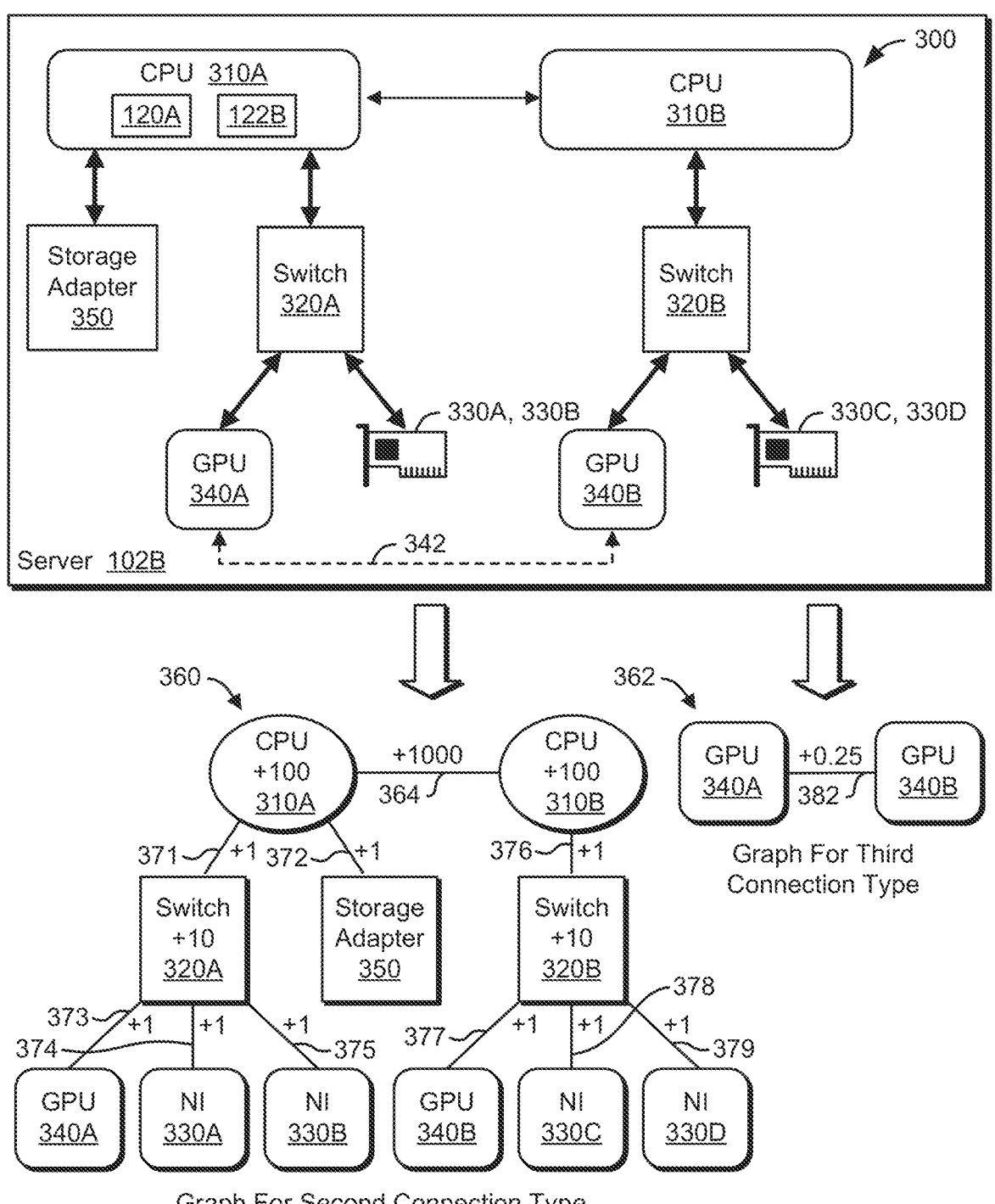
FIG. 3 illustrates example data structures constructed based at least in part on hardware components of a second server of the system illustrated in FIG. 1, in accordance with at least one embodiment.
Figure 10:
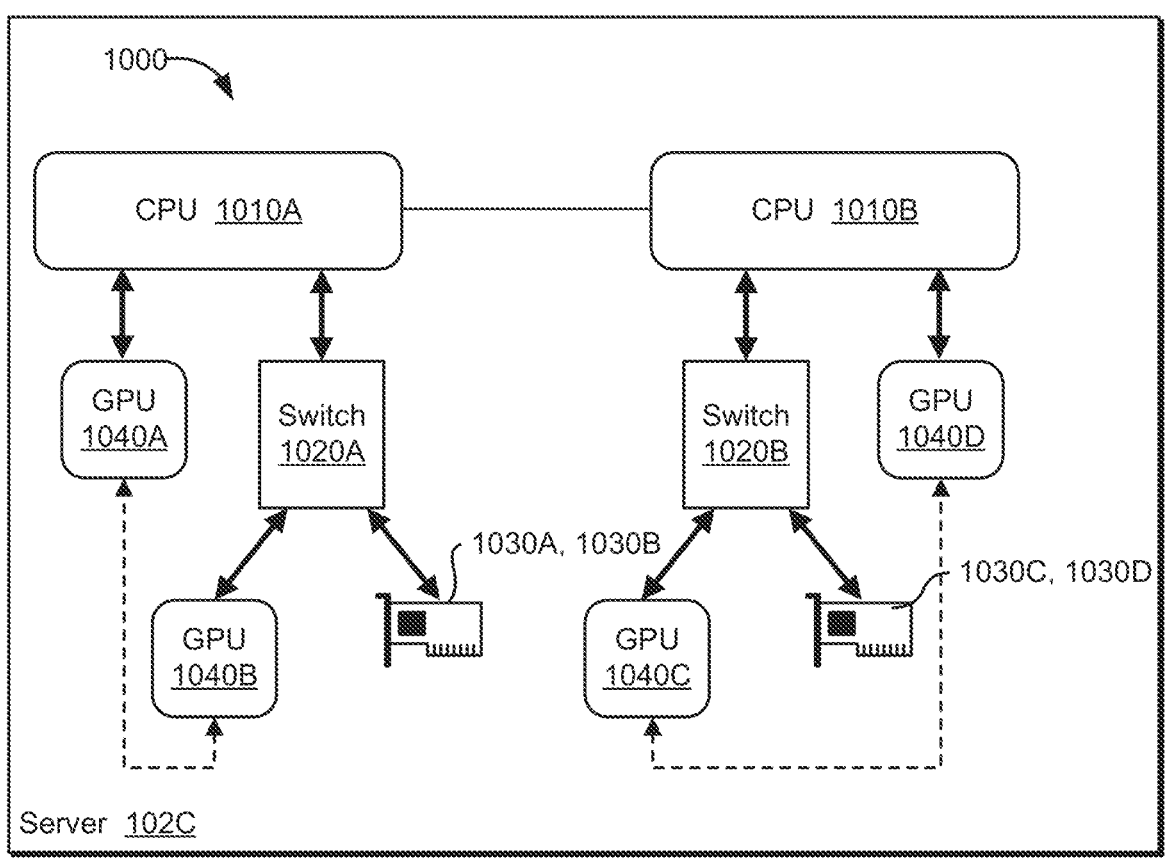
Figure 17:
Figure 19:
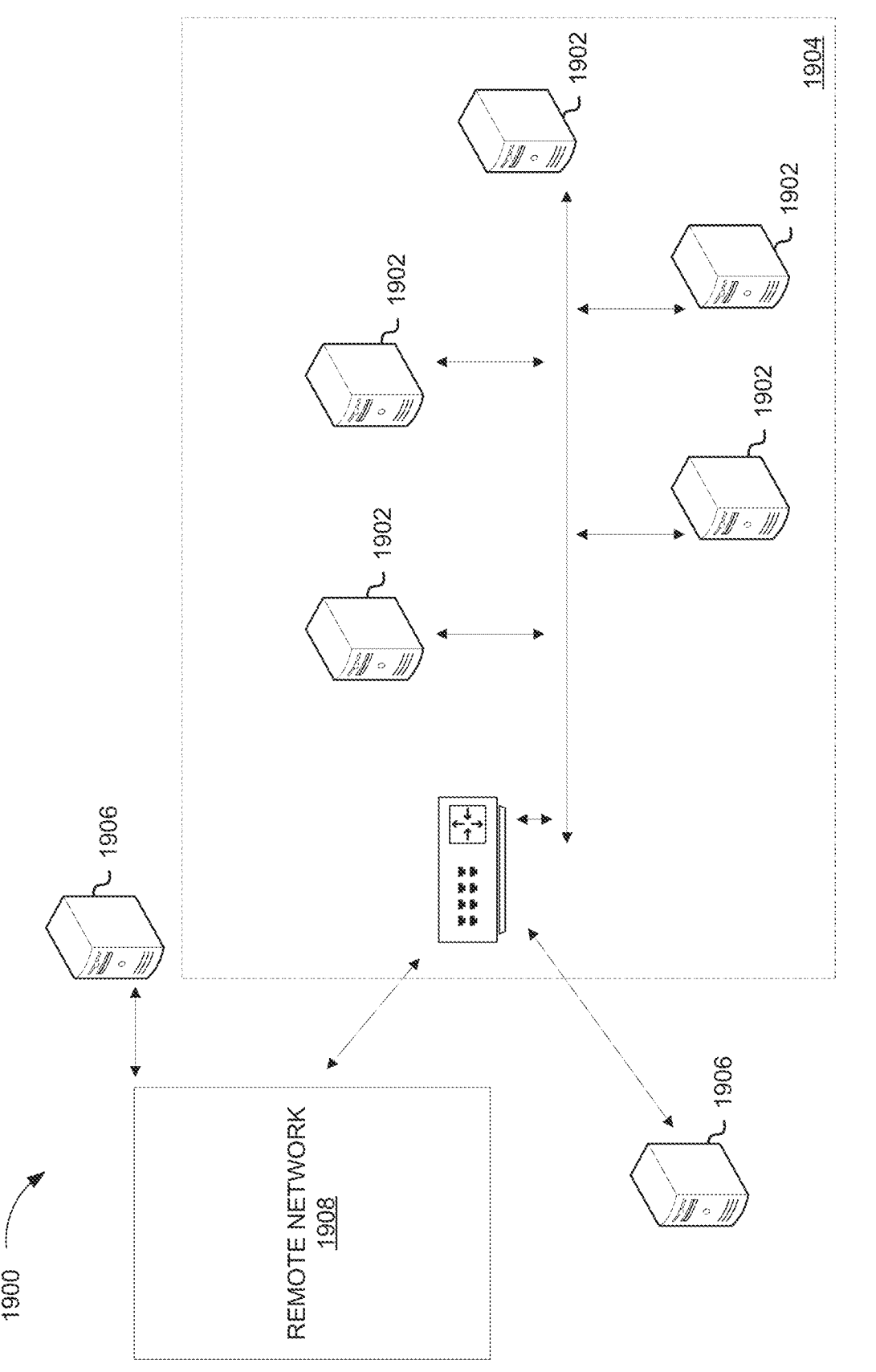
Figure 20:
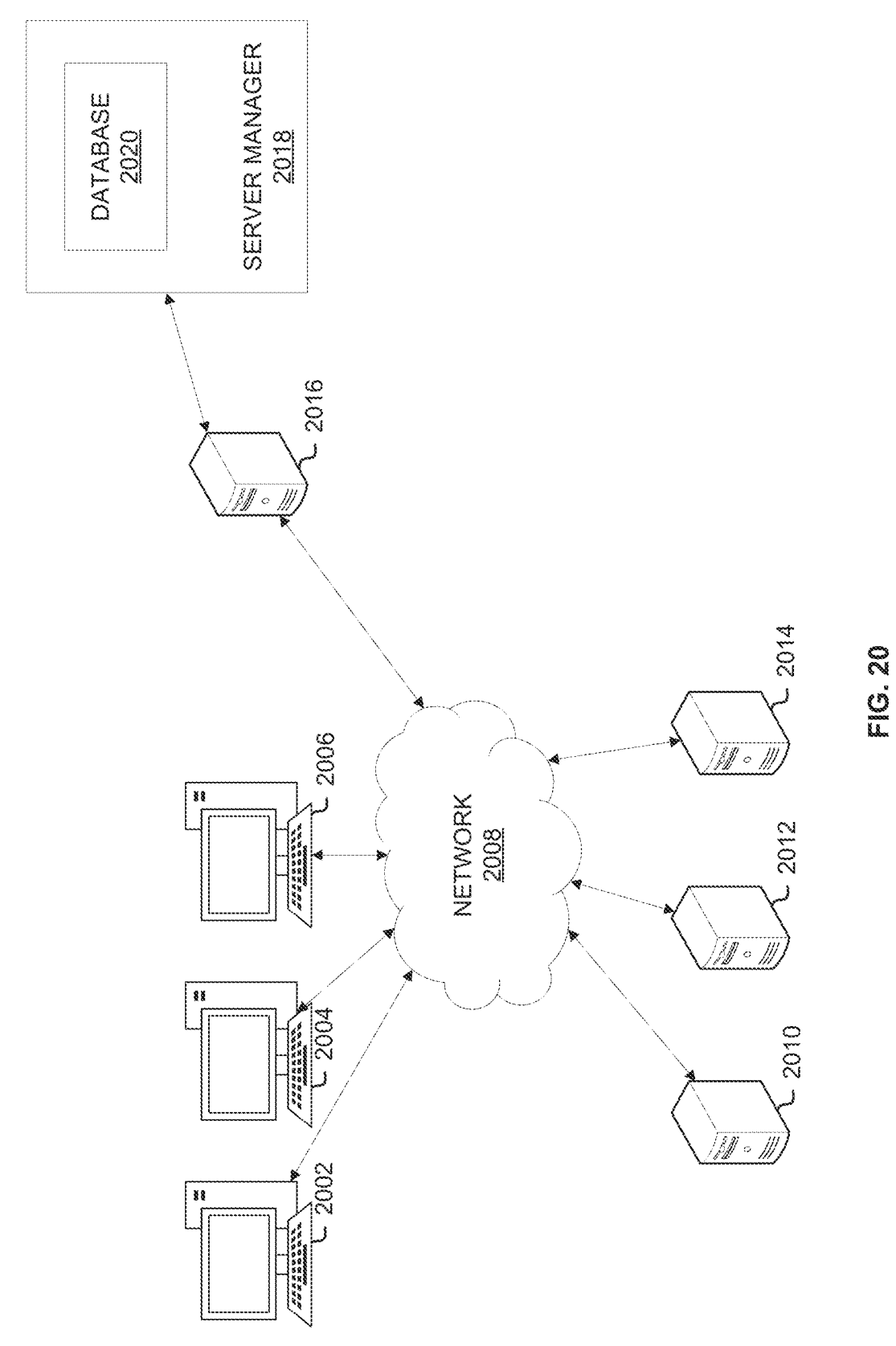
Figure 21A:
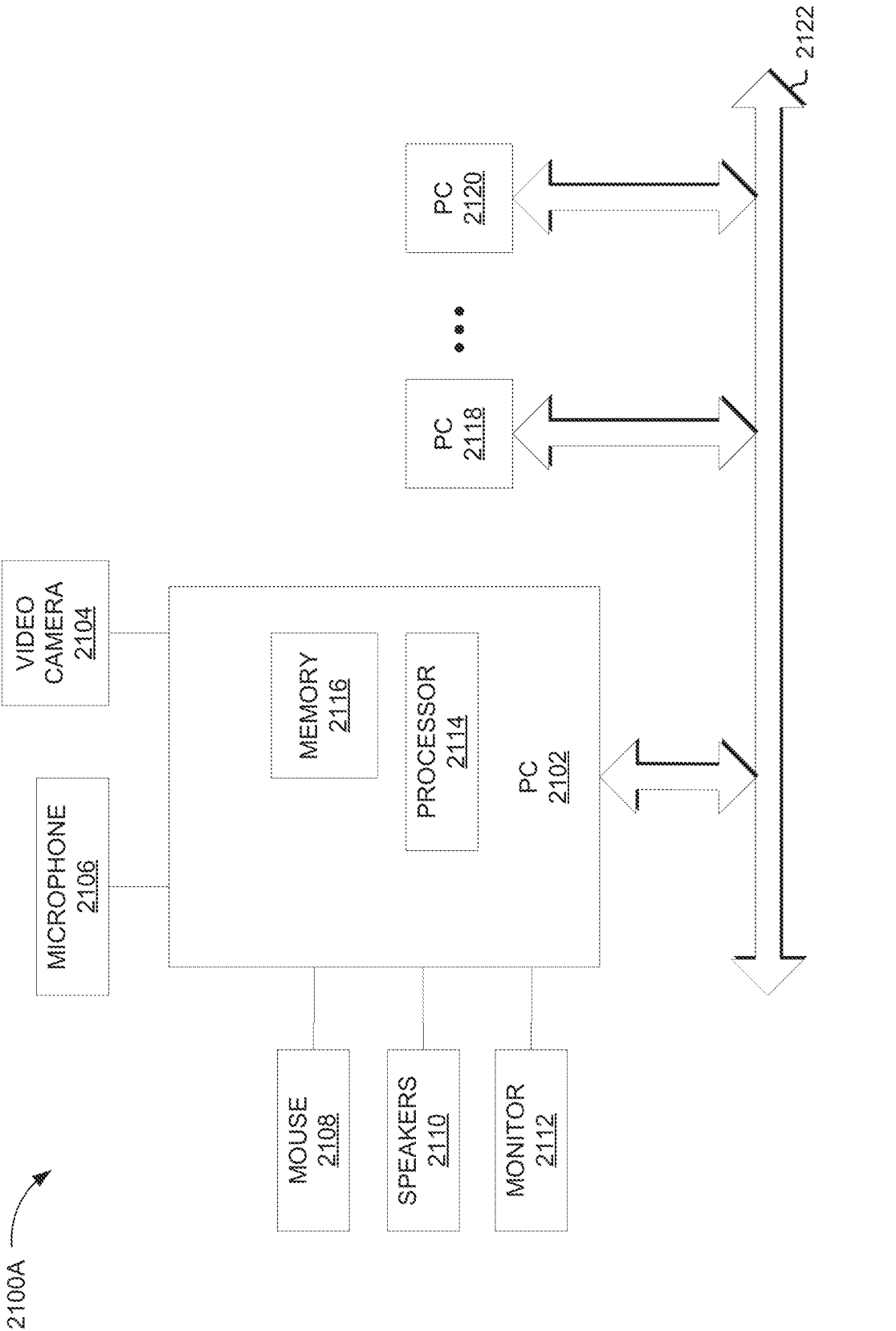
Figure 21B:
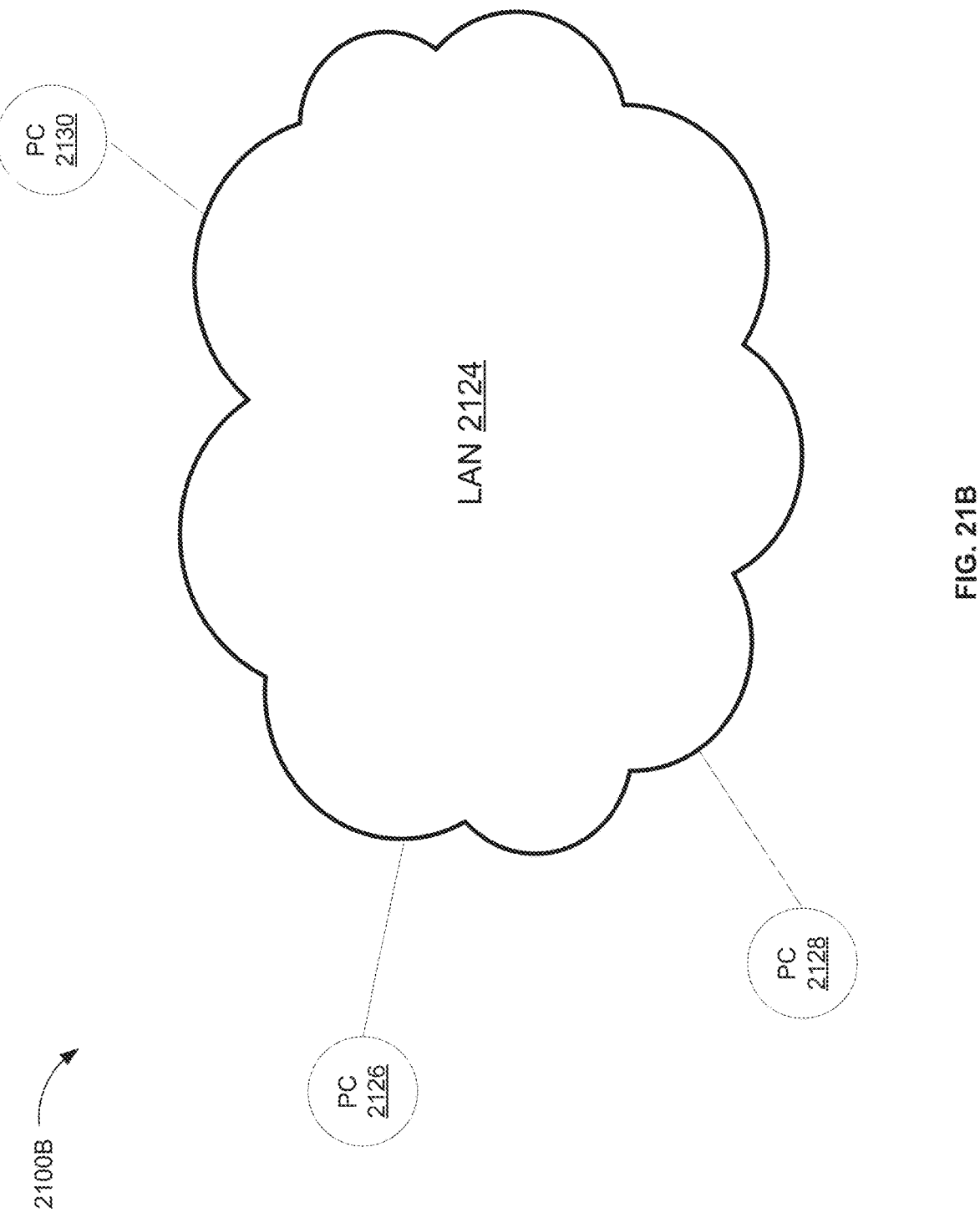
Figure 21C:
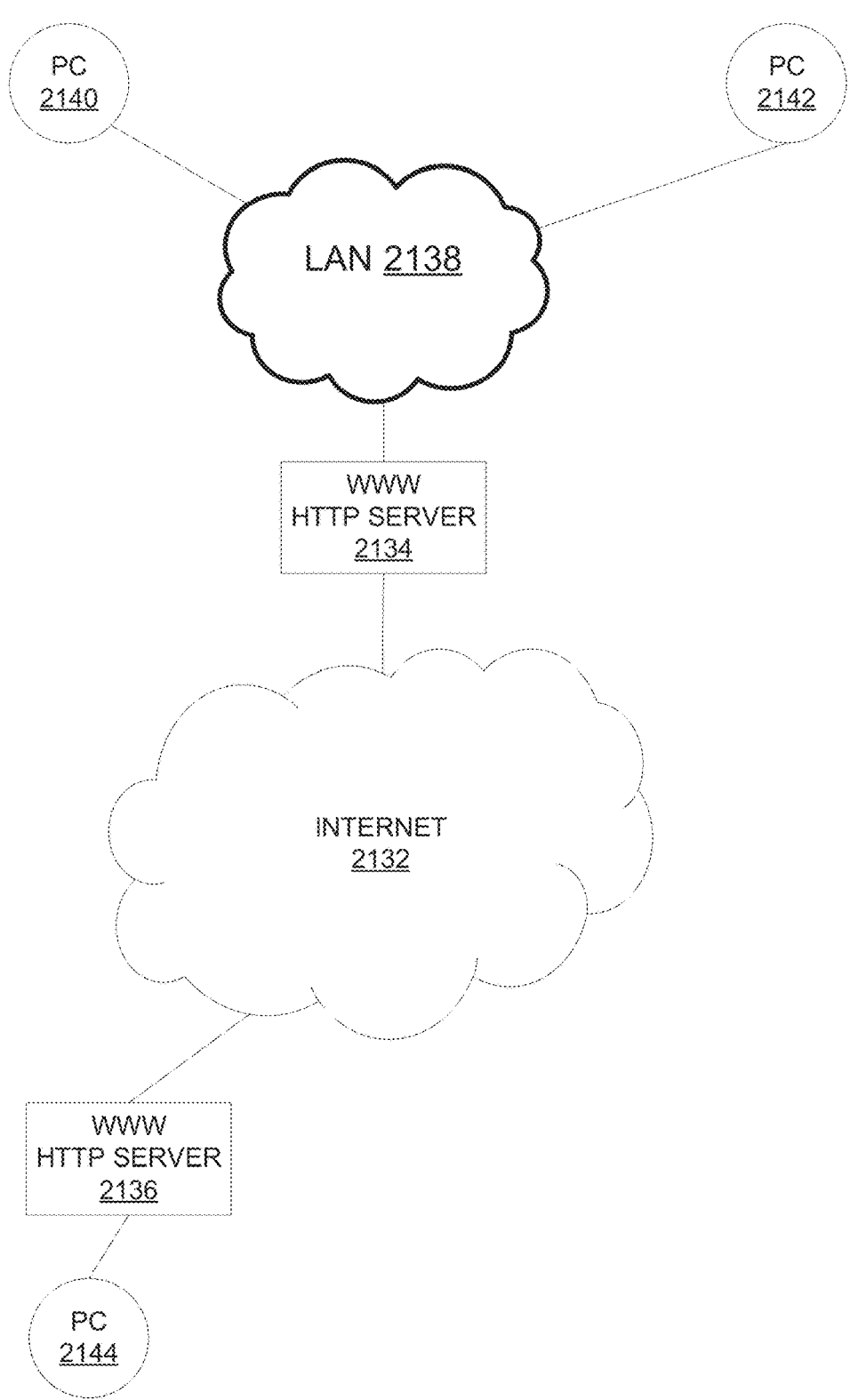
Figure 22:
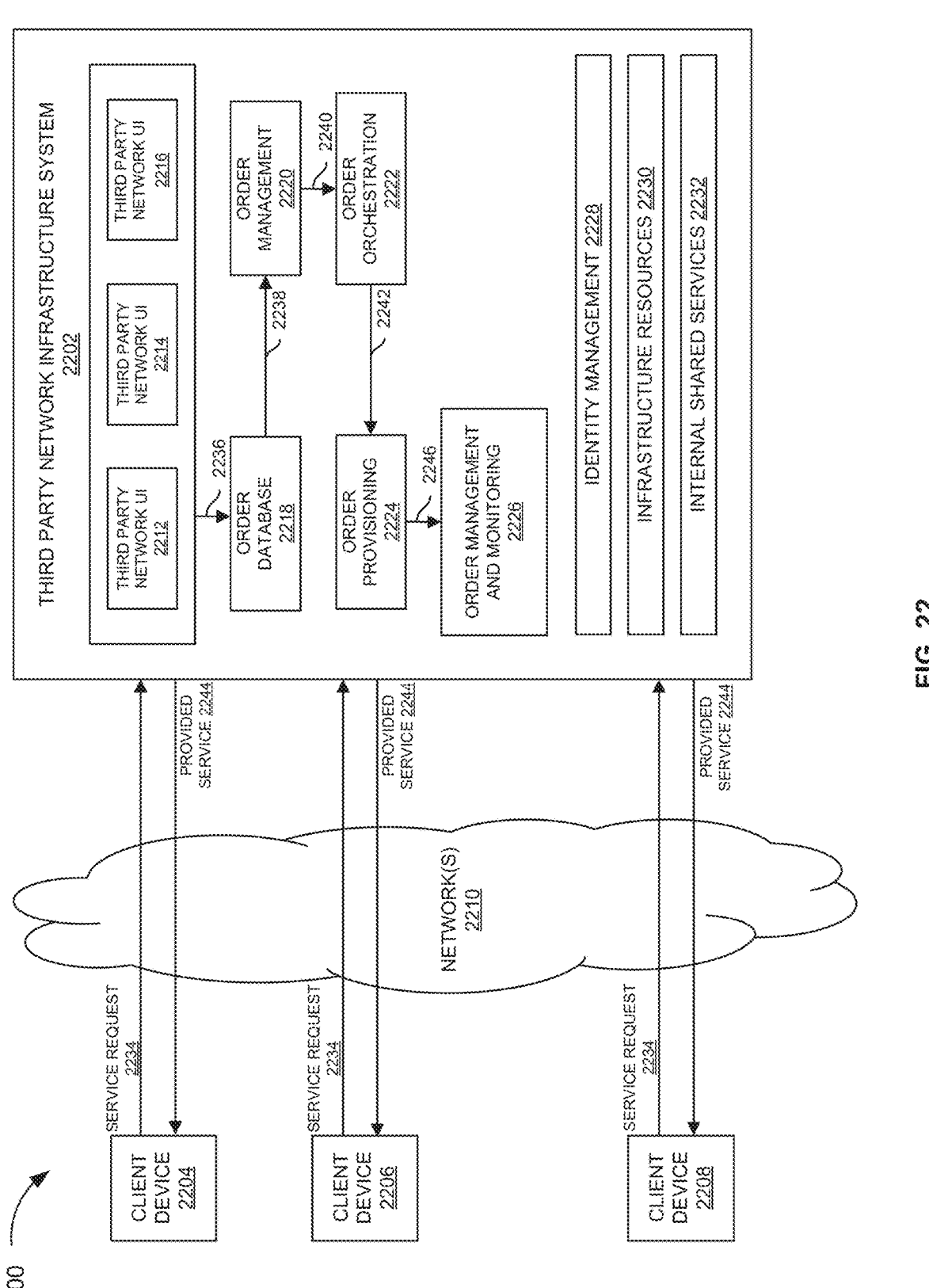
Figure 23:
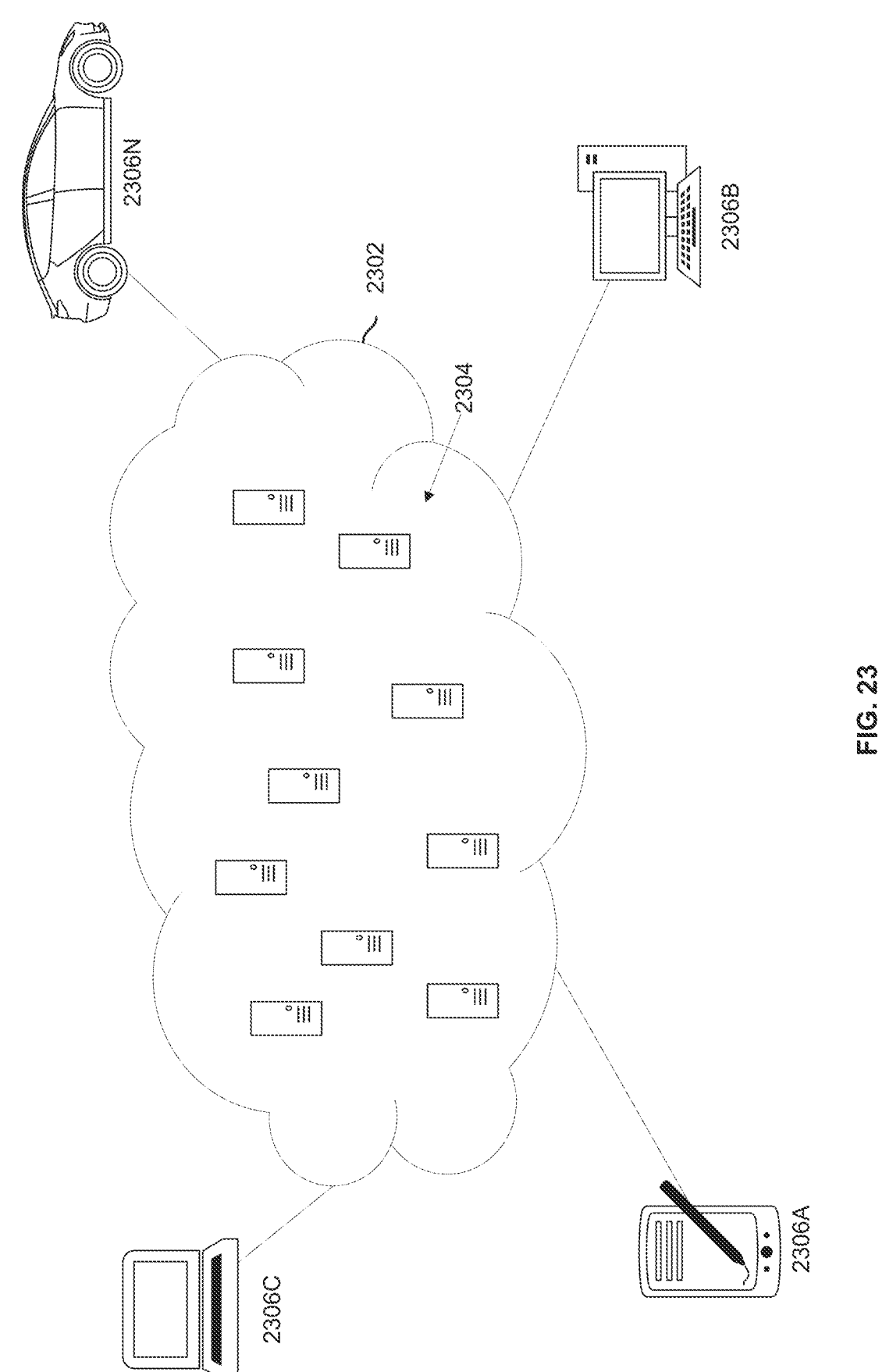
Figure 24:
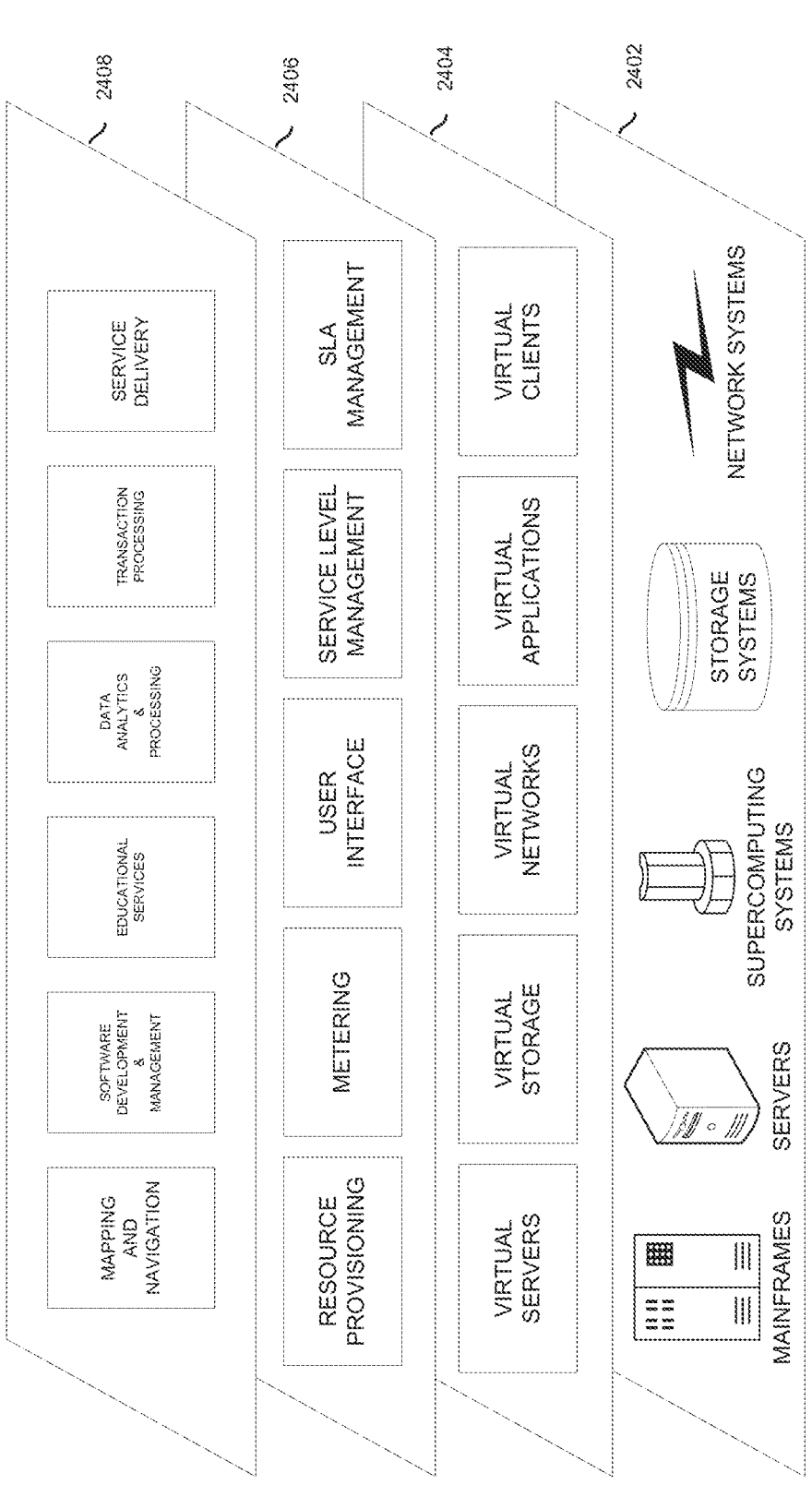
Figure 25:
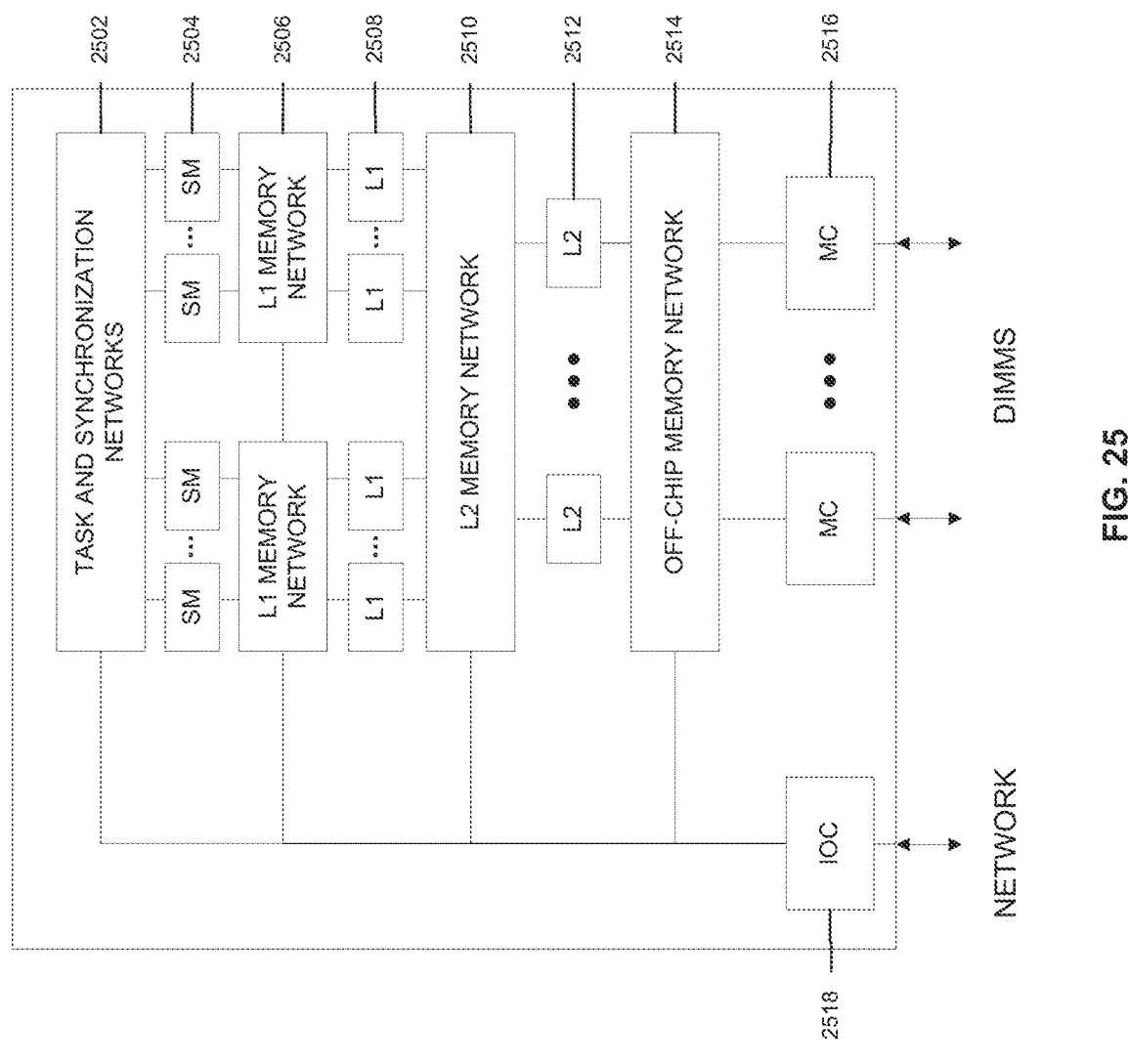
Figure 26:
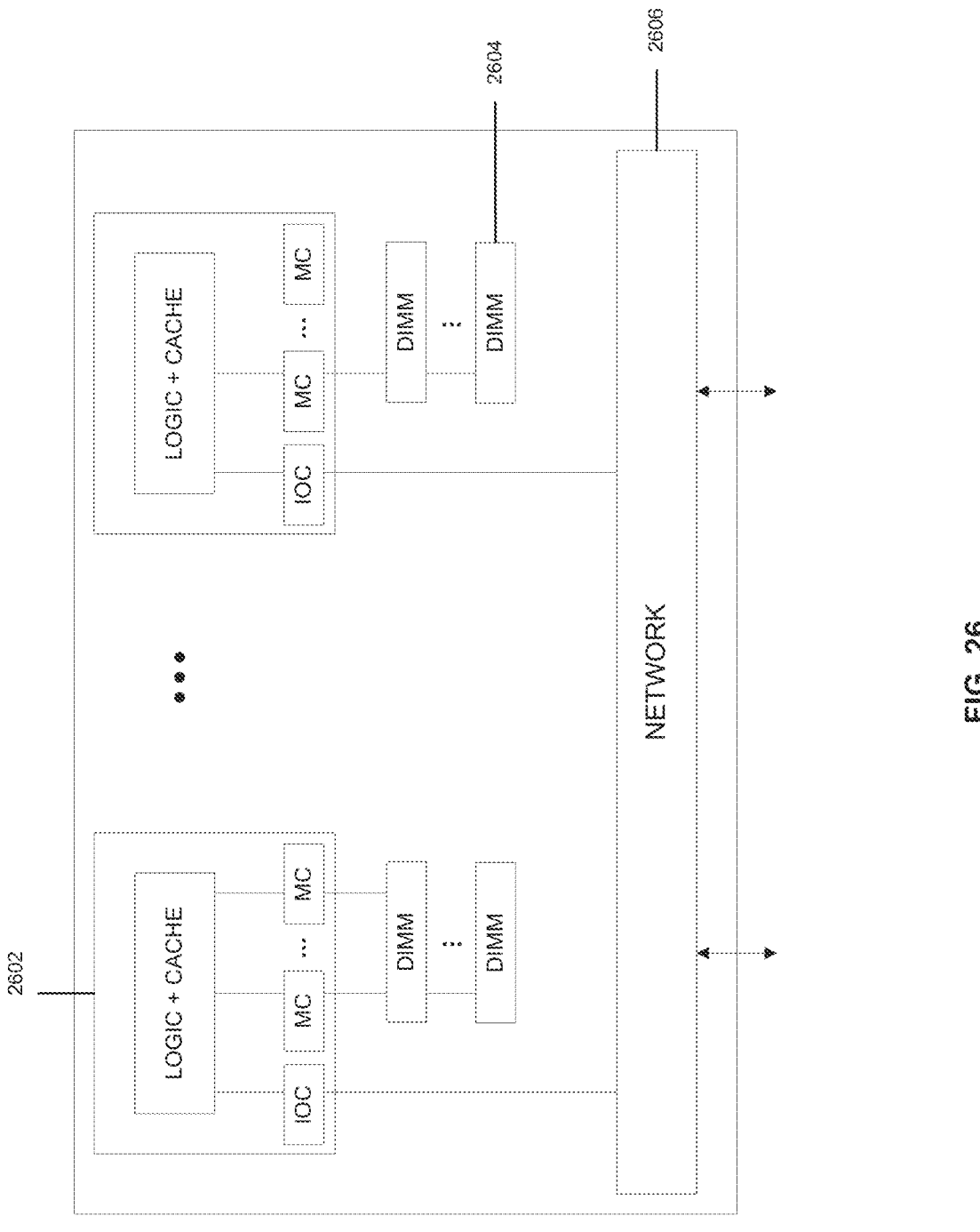
Figure 27:
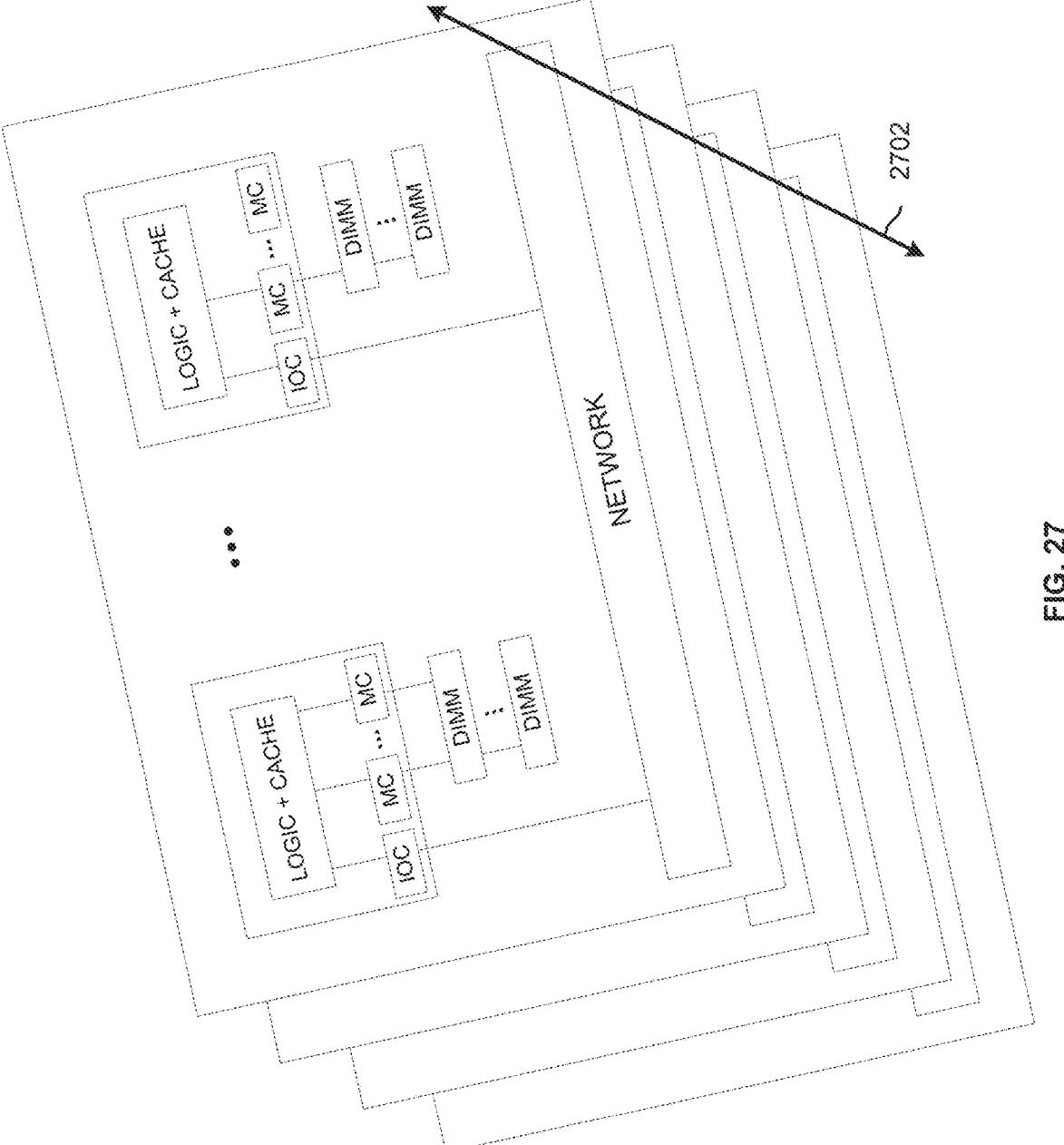
Figure 28:
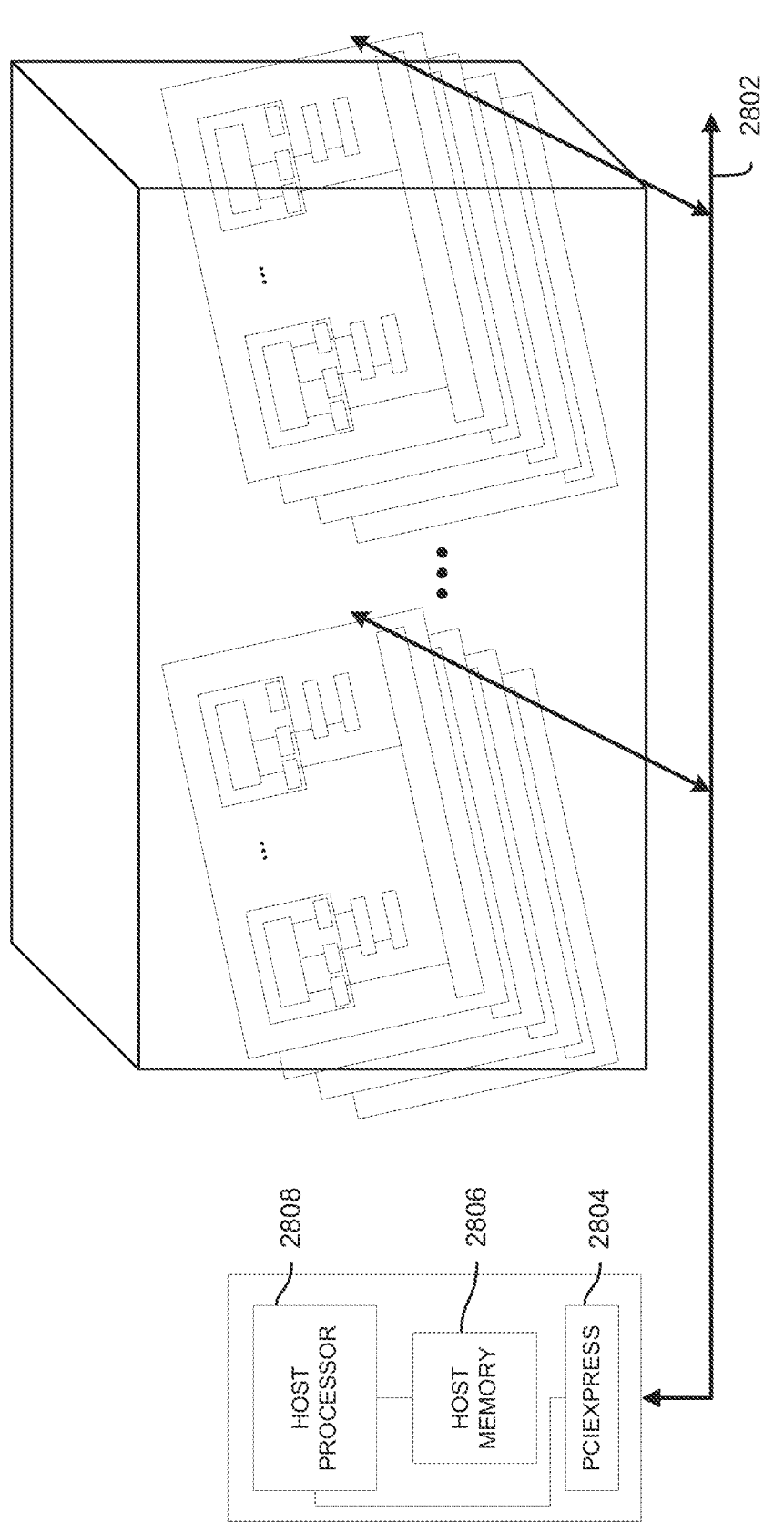
Figure 29A:
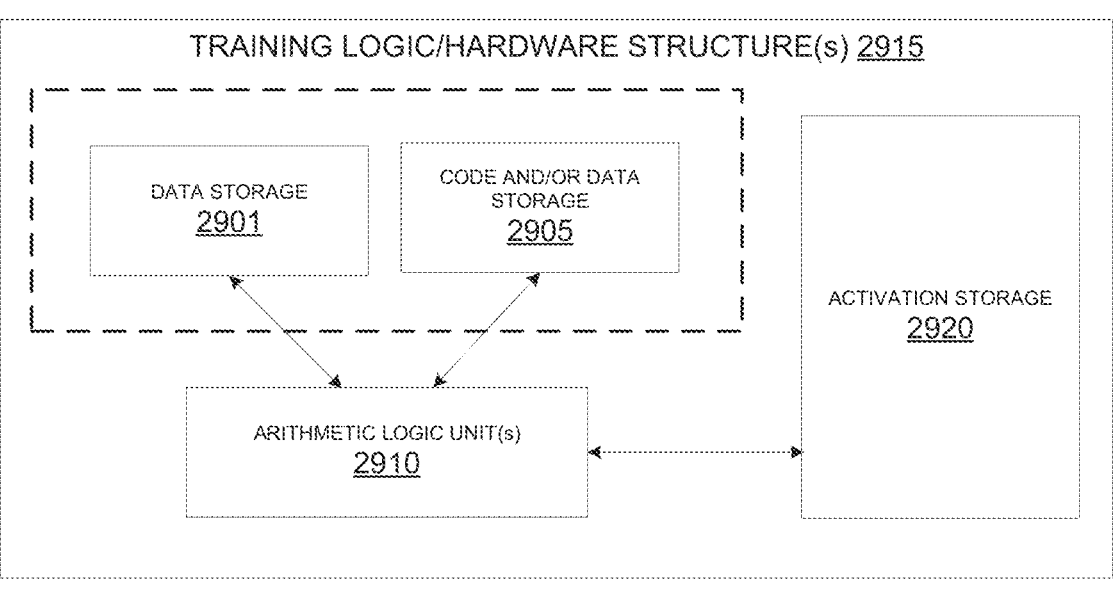
Figure 29B:
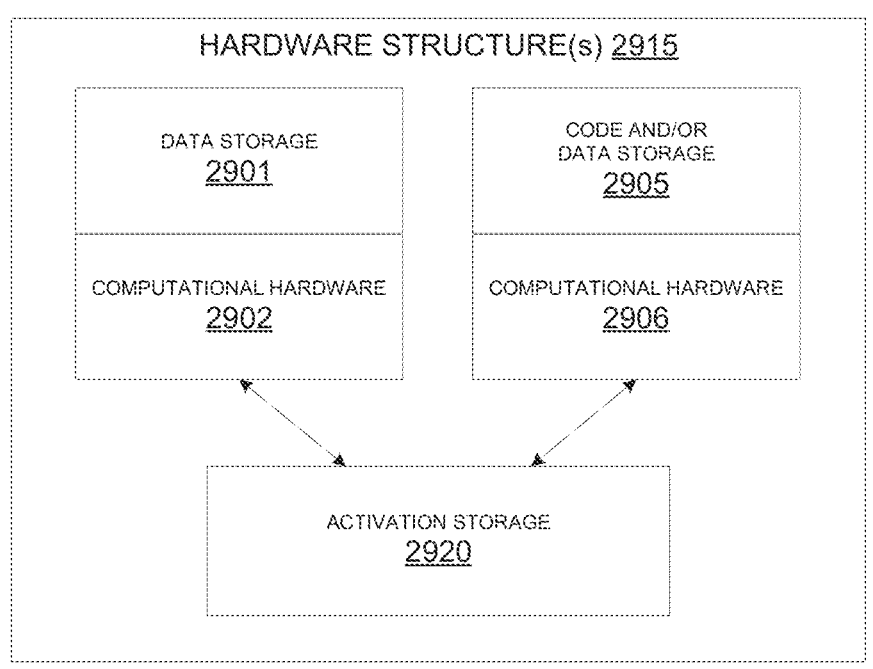
Figure 30:
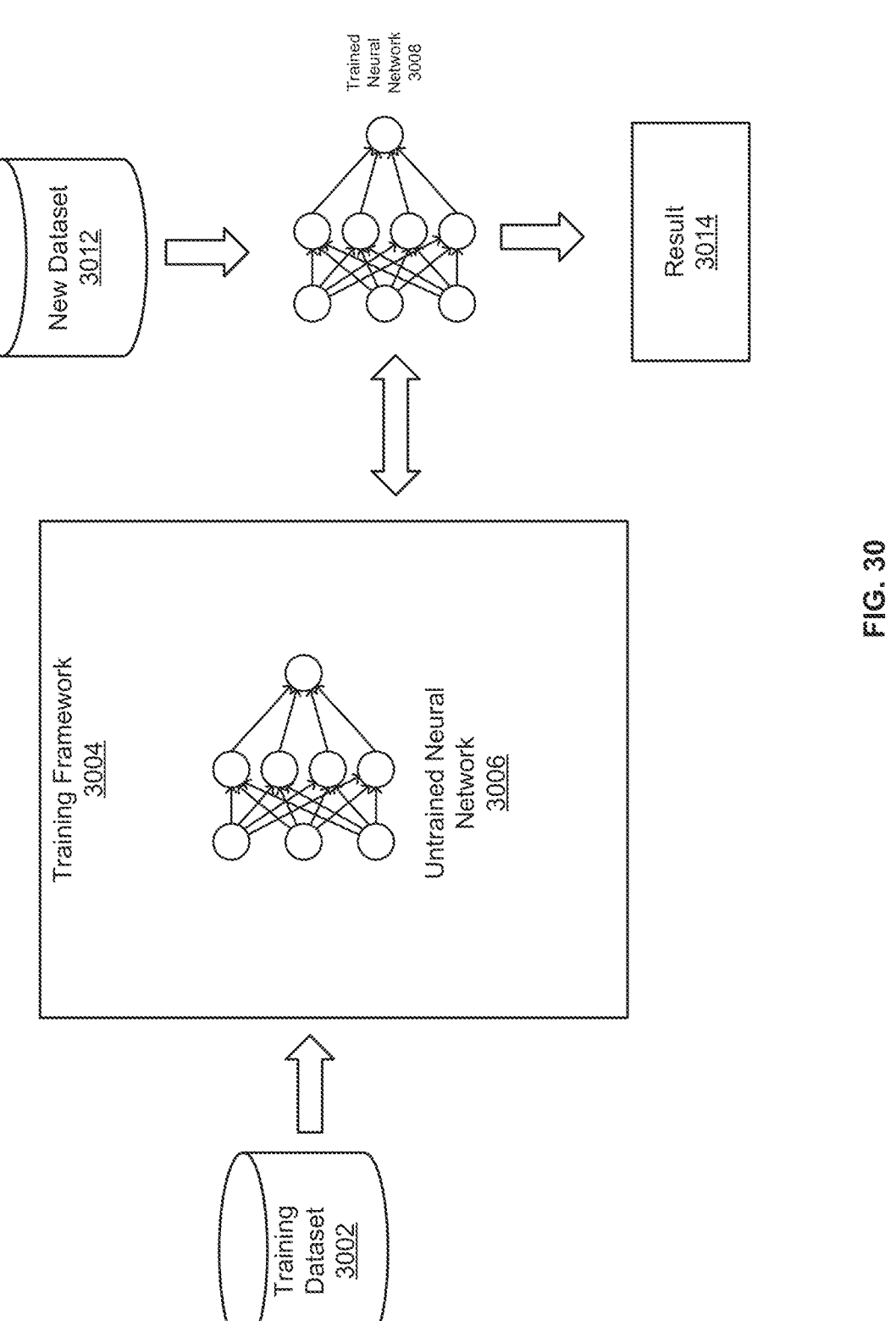
Figure 31:
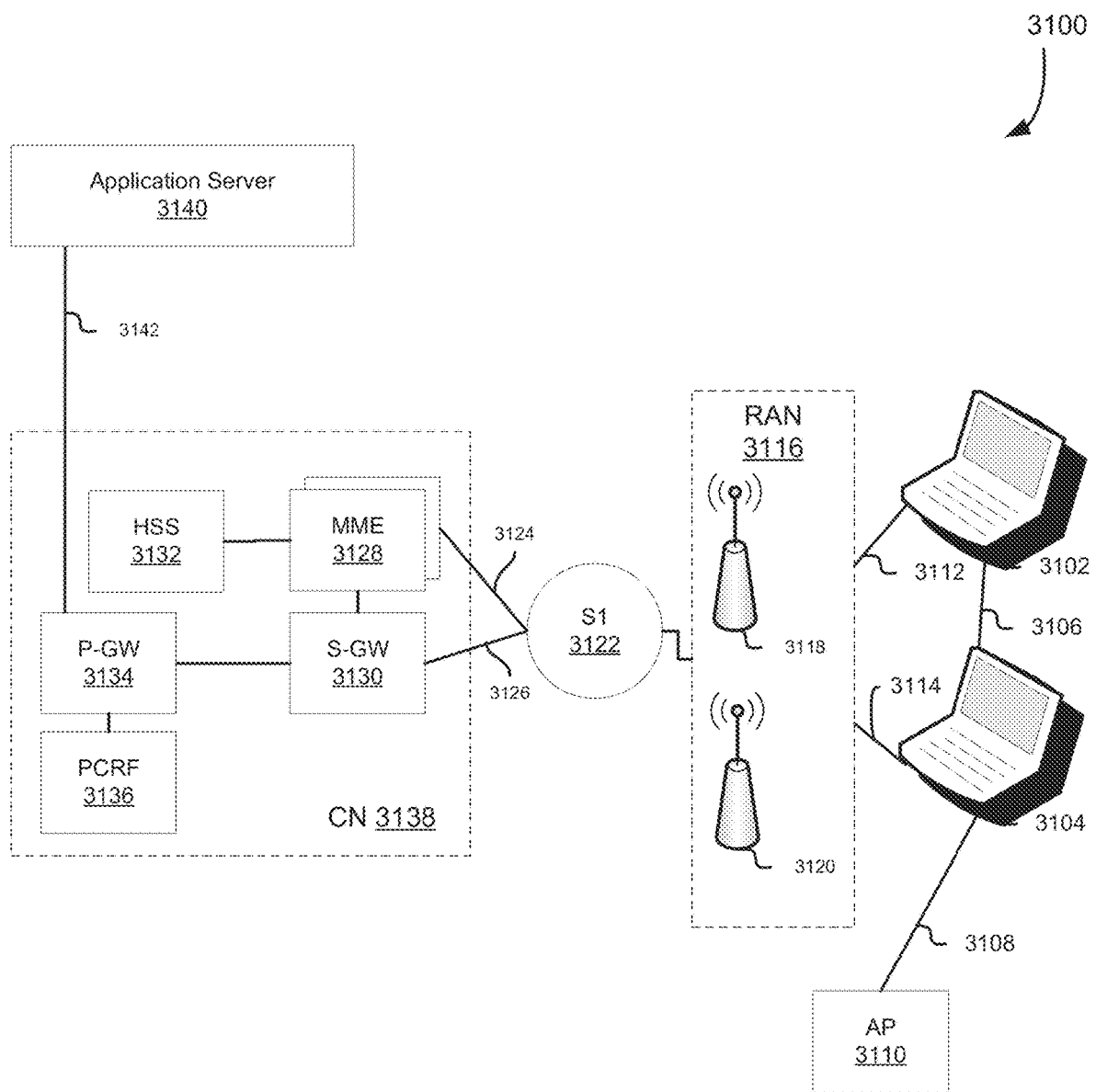
Figure 33:
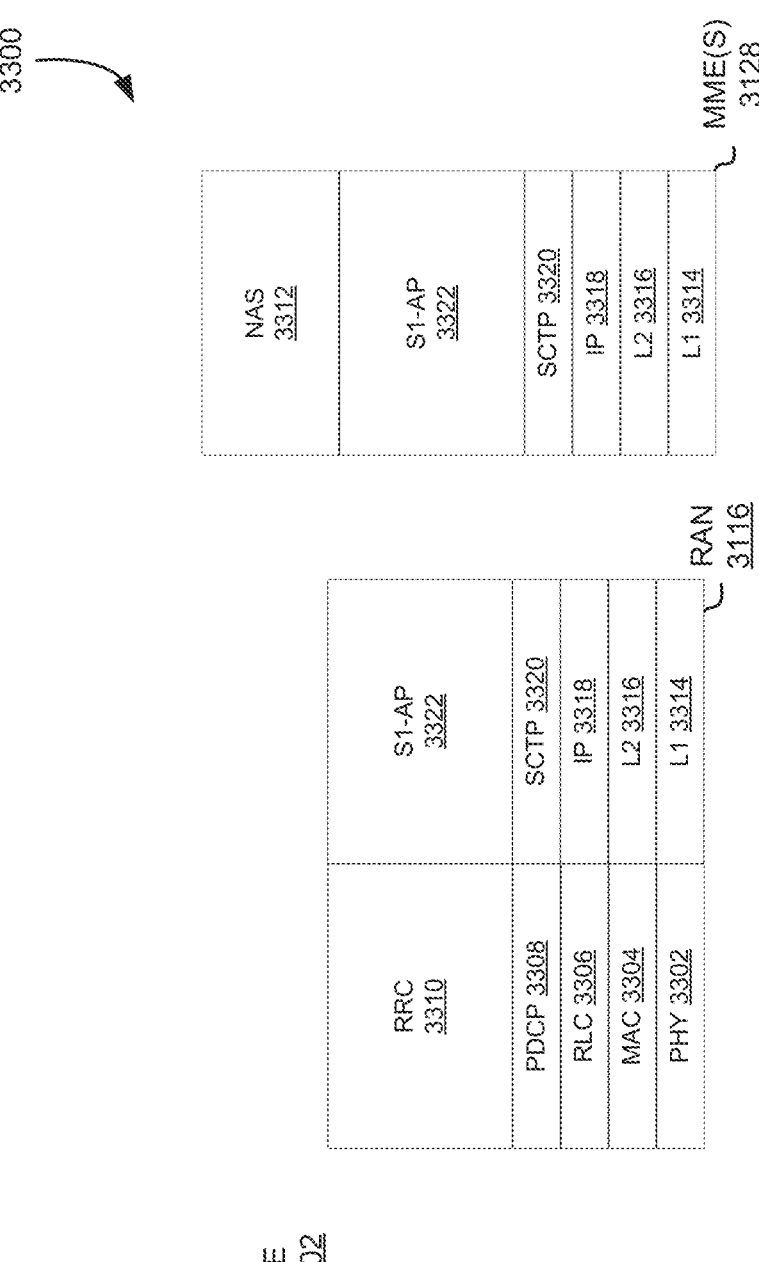
Figure 34:
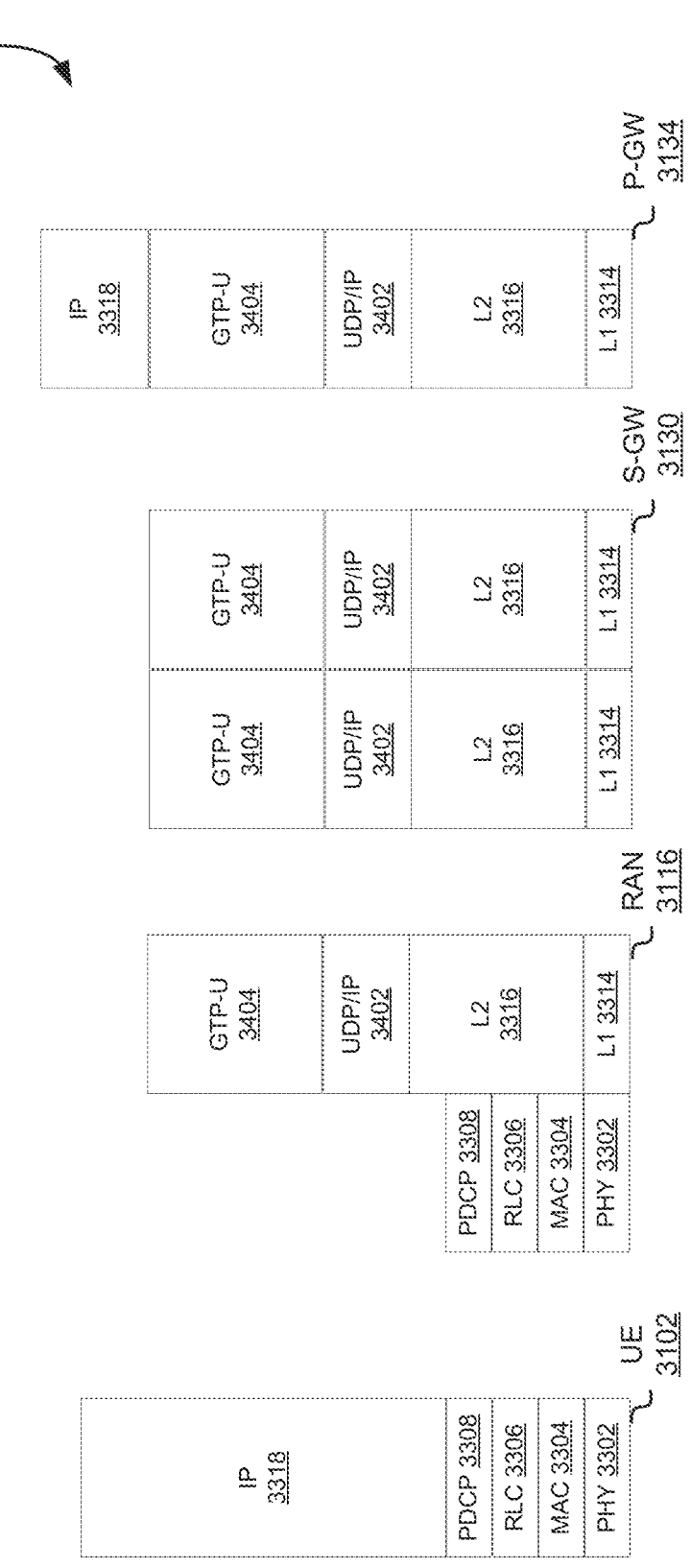
Figure 37:
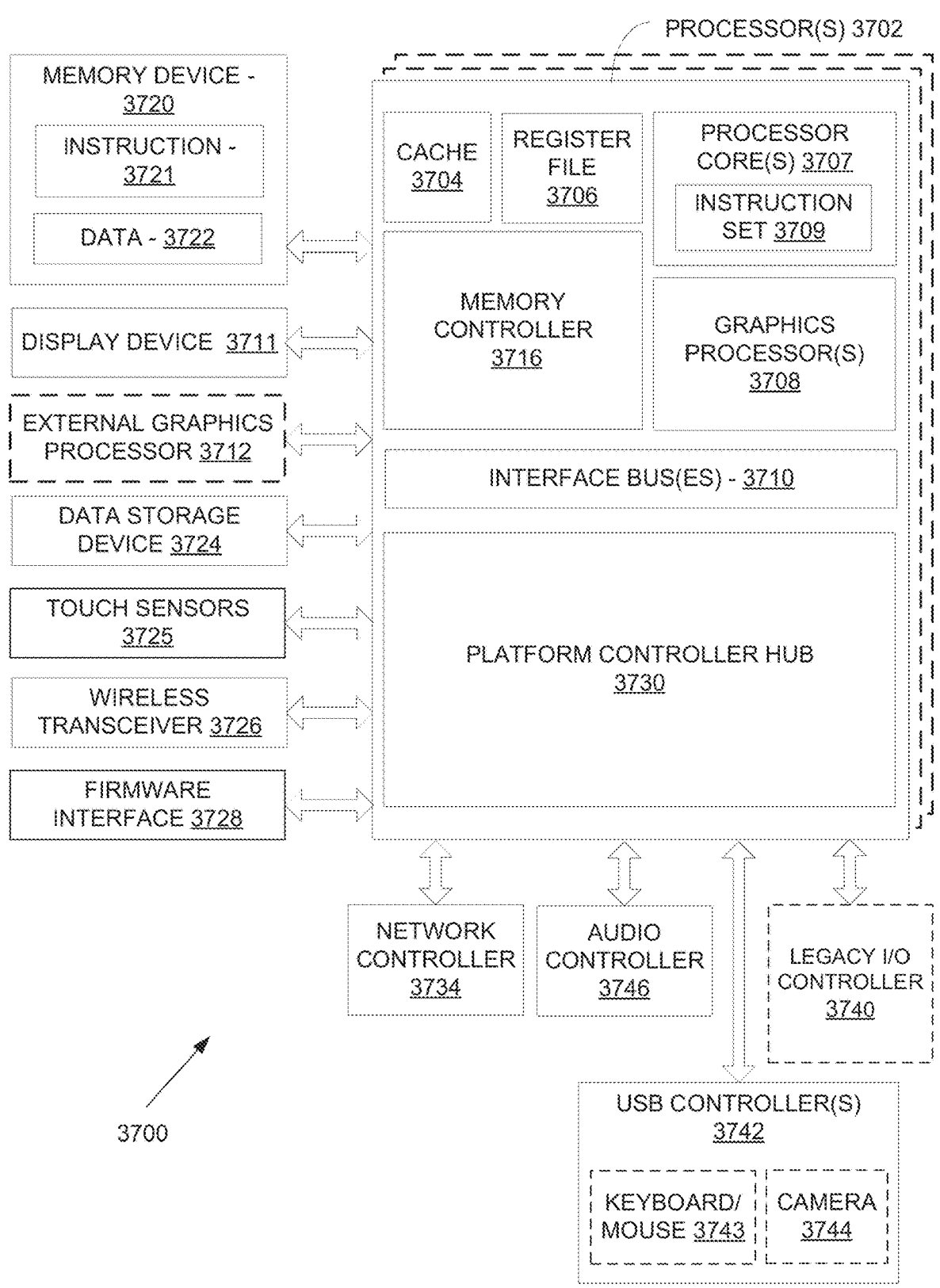
Figure 38:
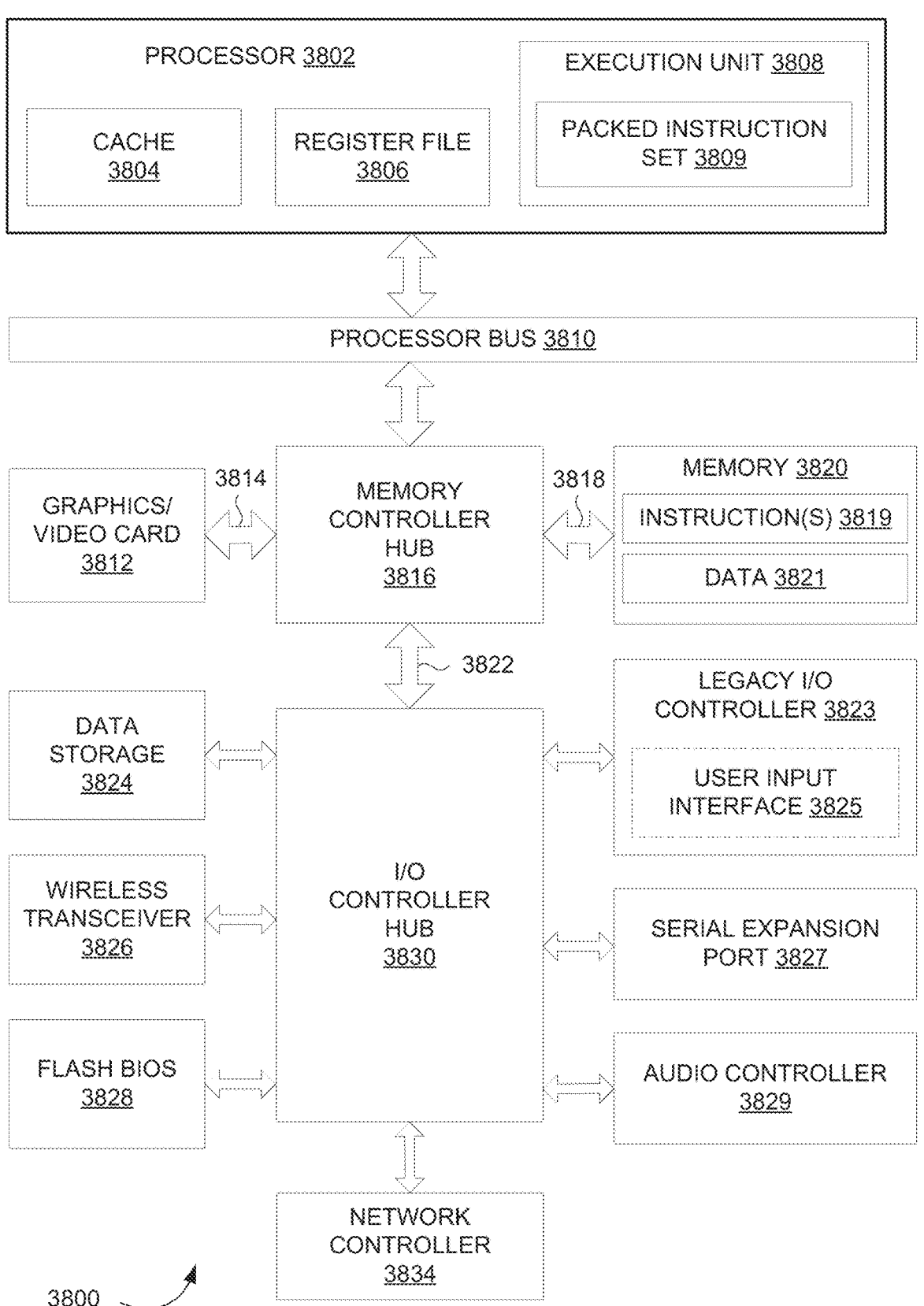
Figure 39:
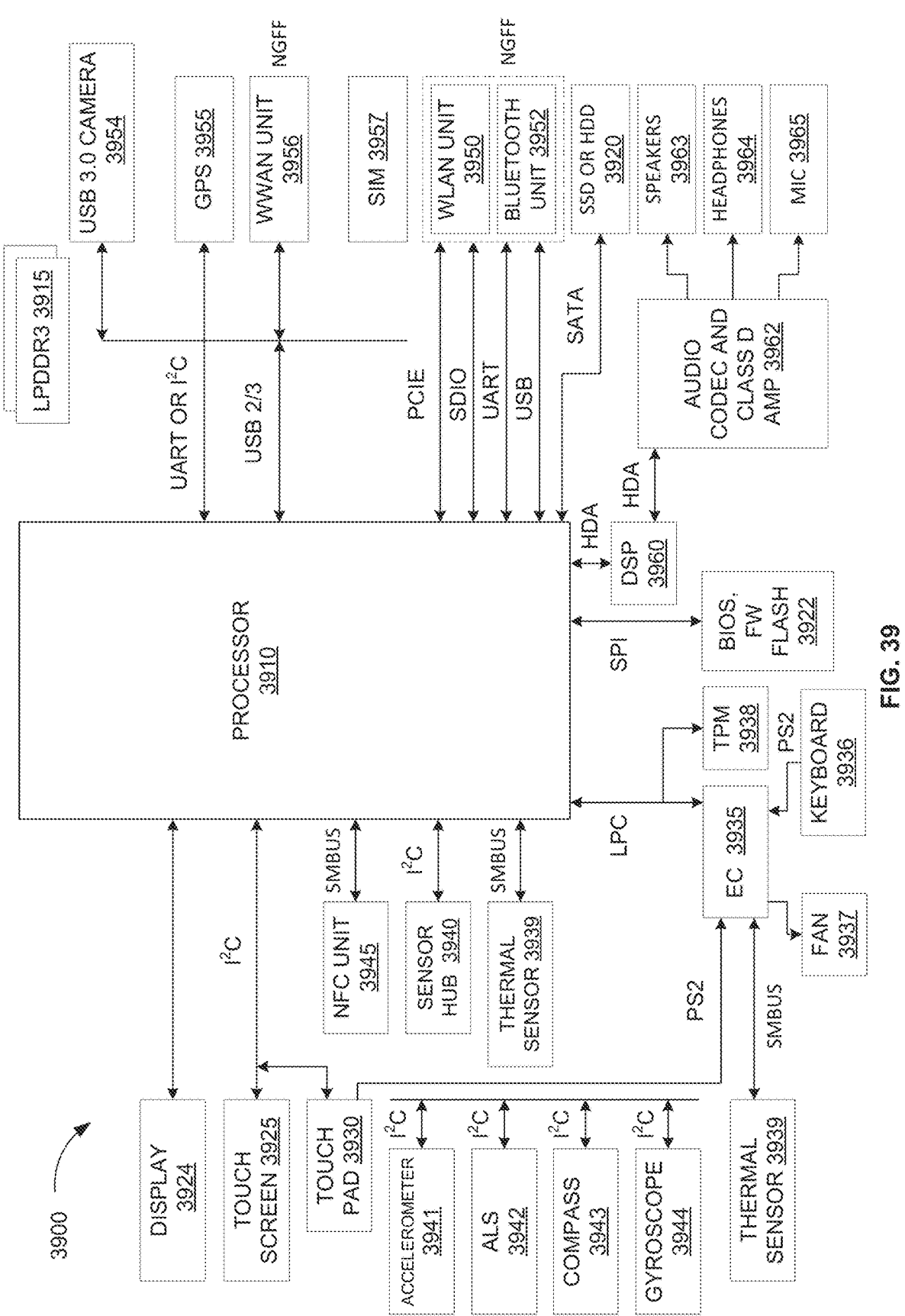
Figure 40:
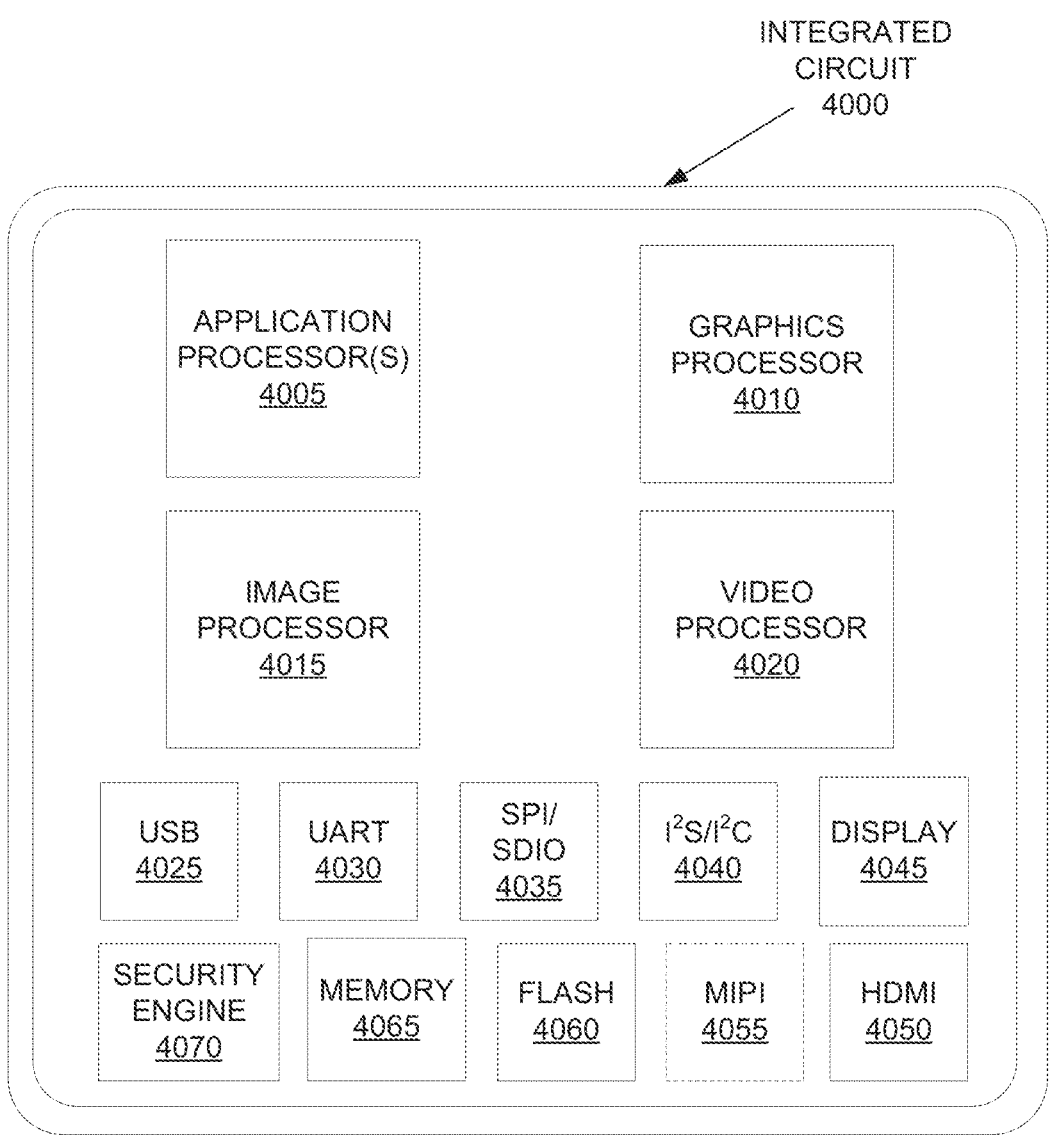
Figure 41:
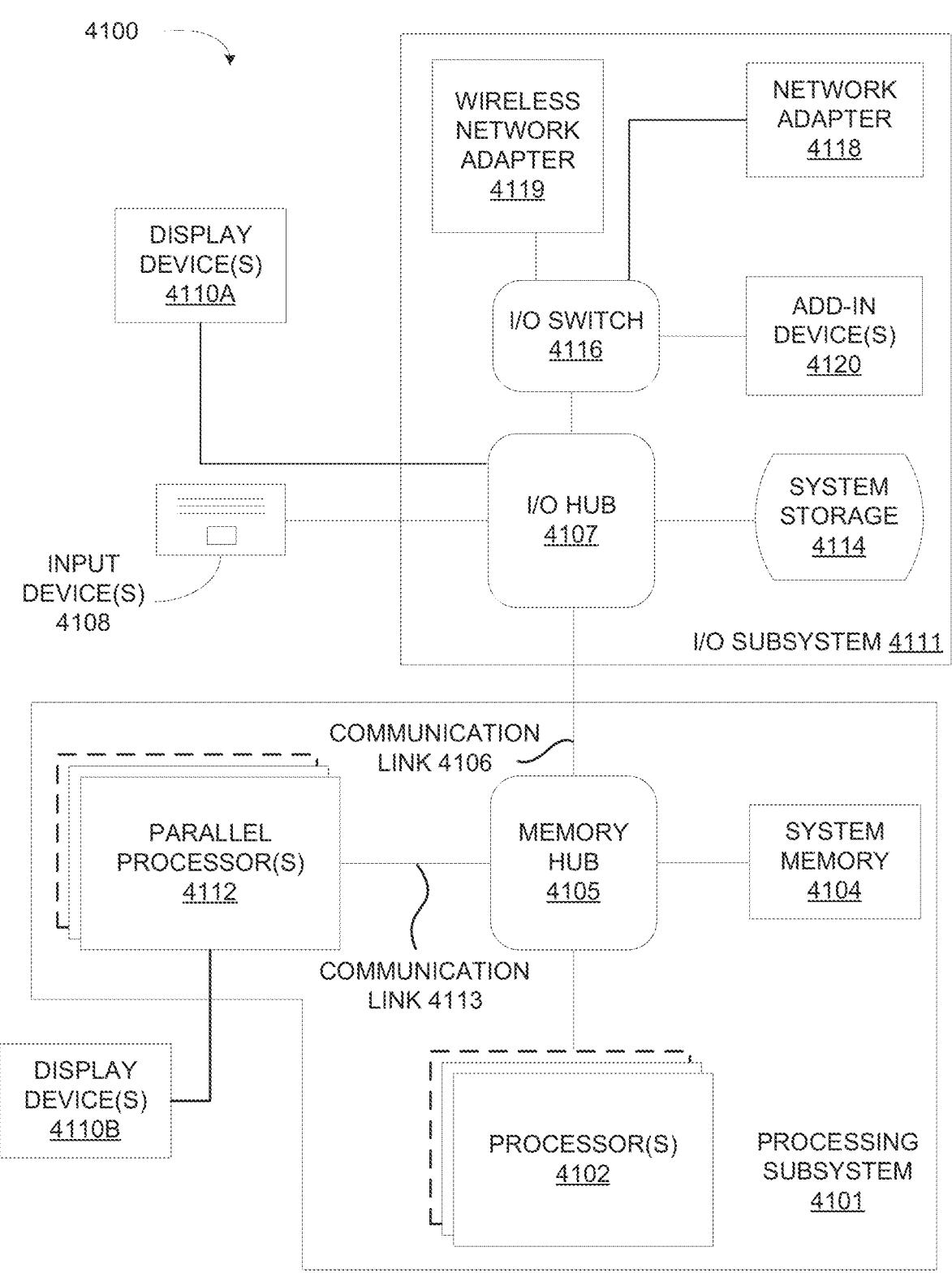
Figure 42:
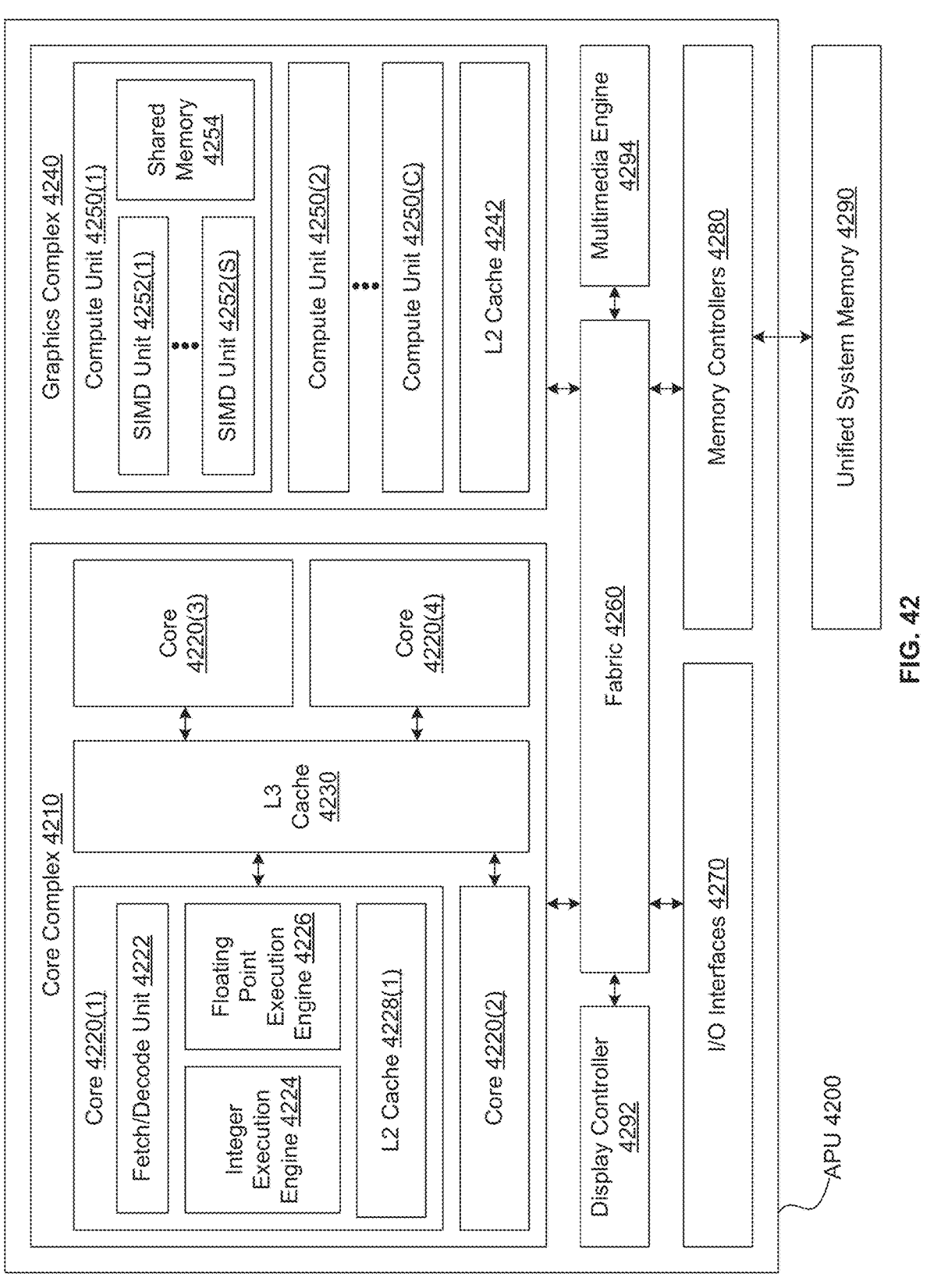
Figure 43:
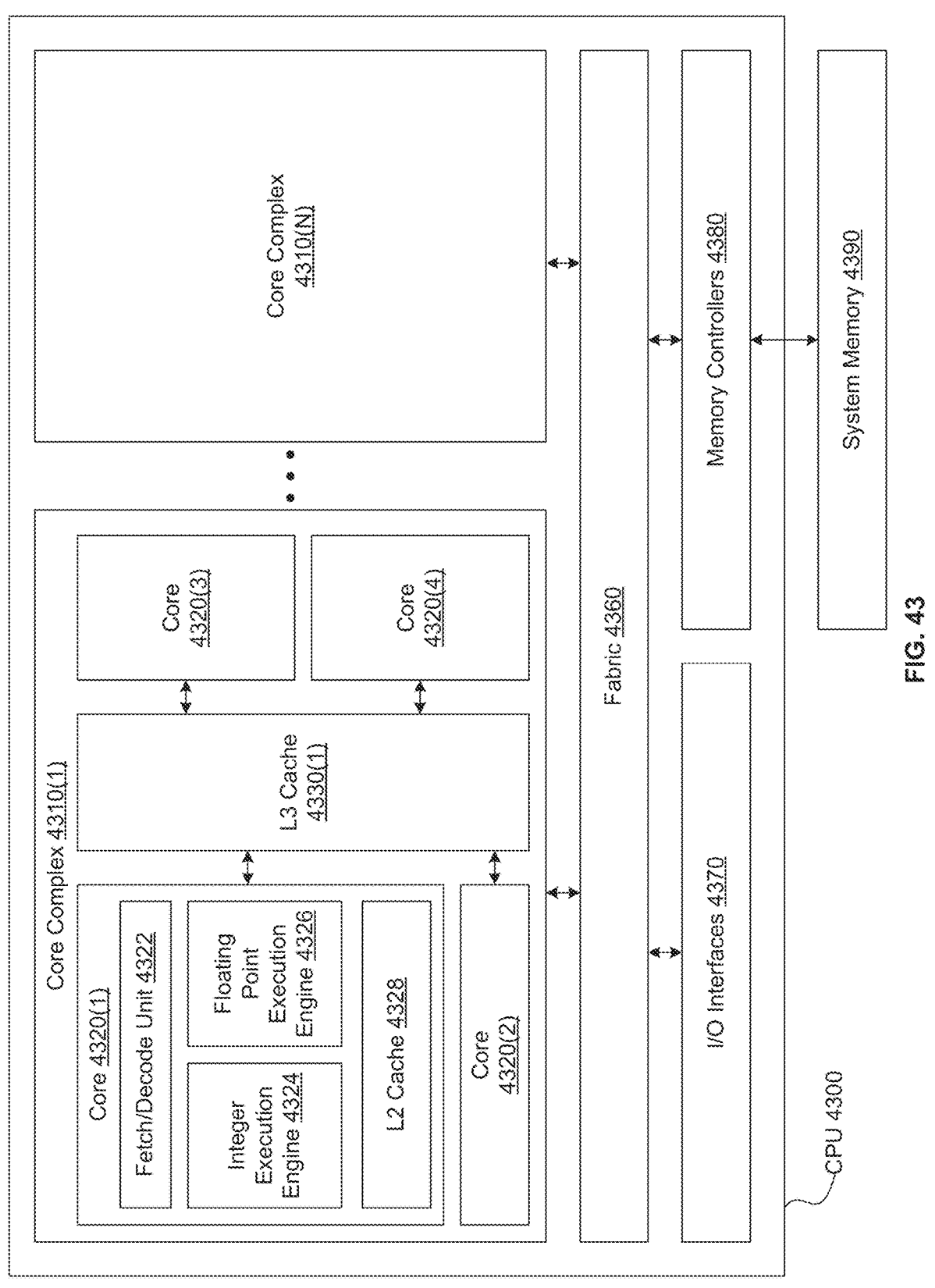
Figure 44:
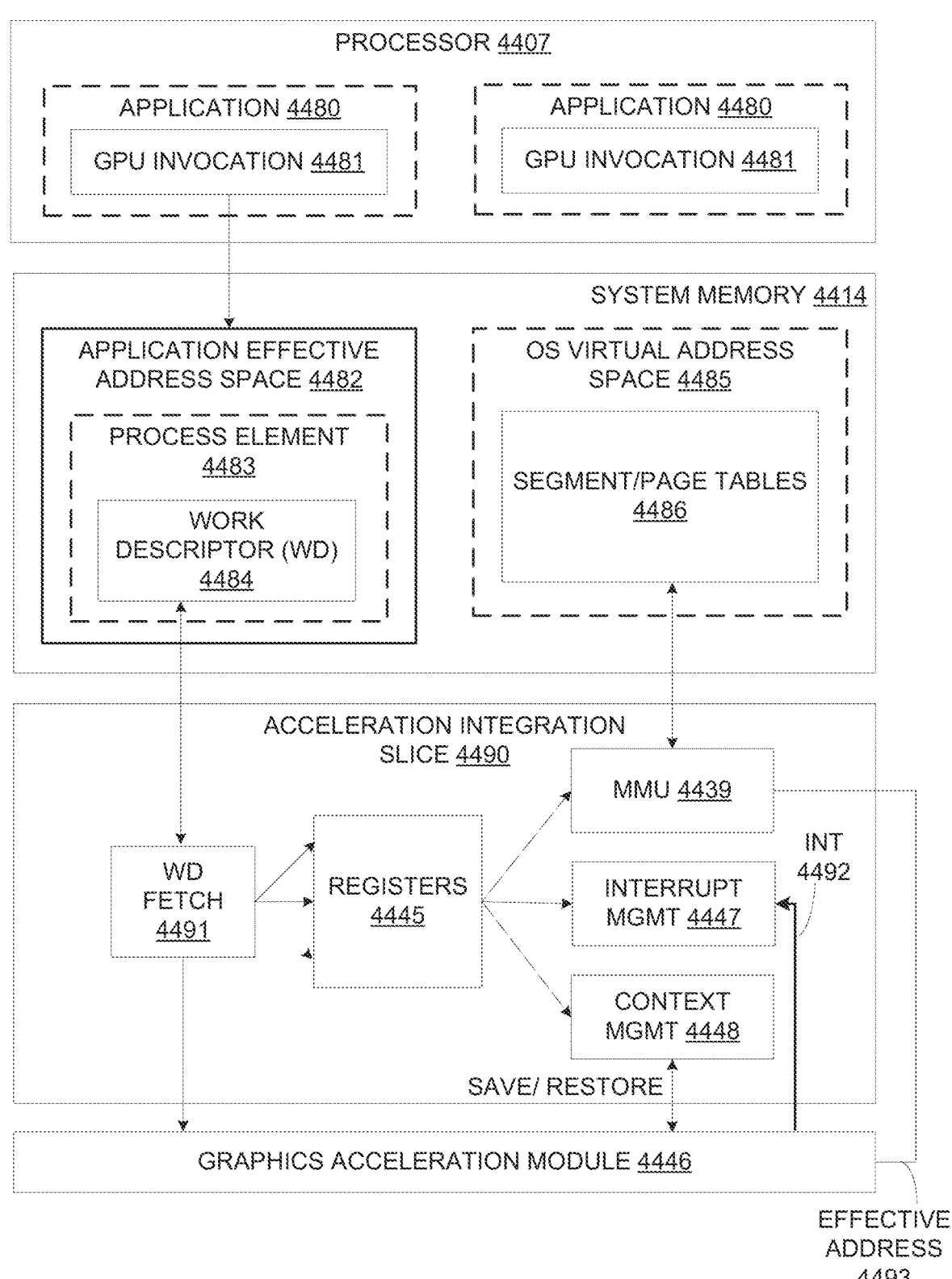
Figure 45A:
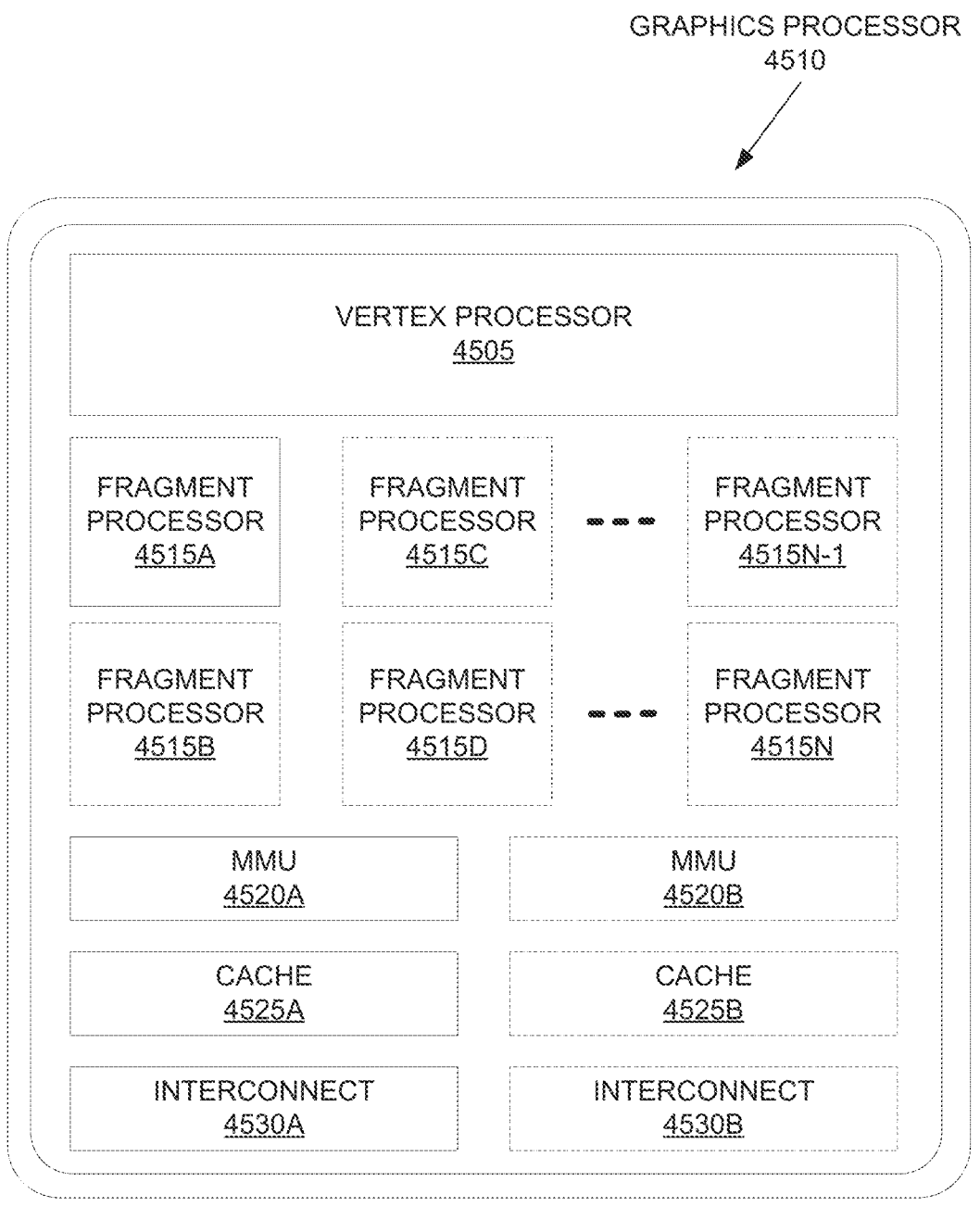
Figure 45B:
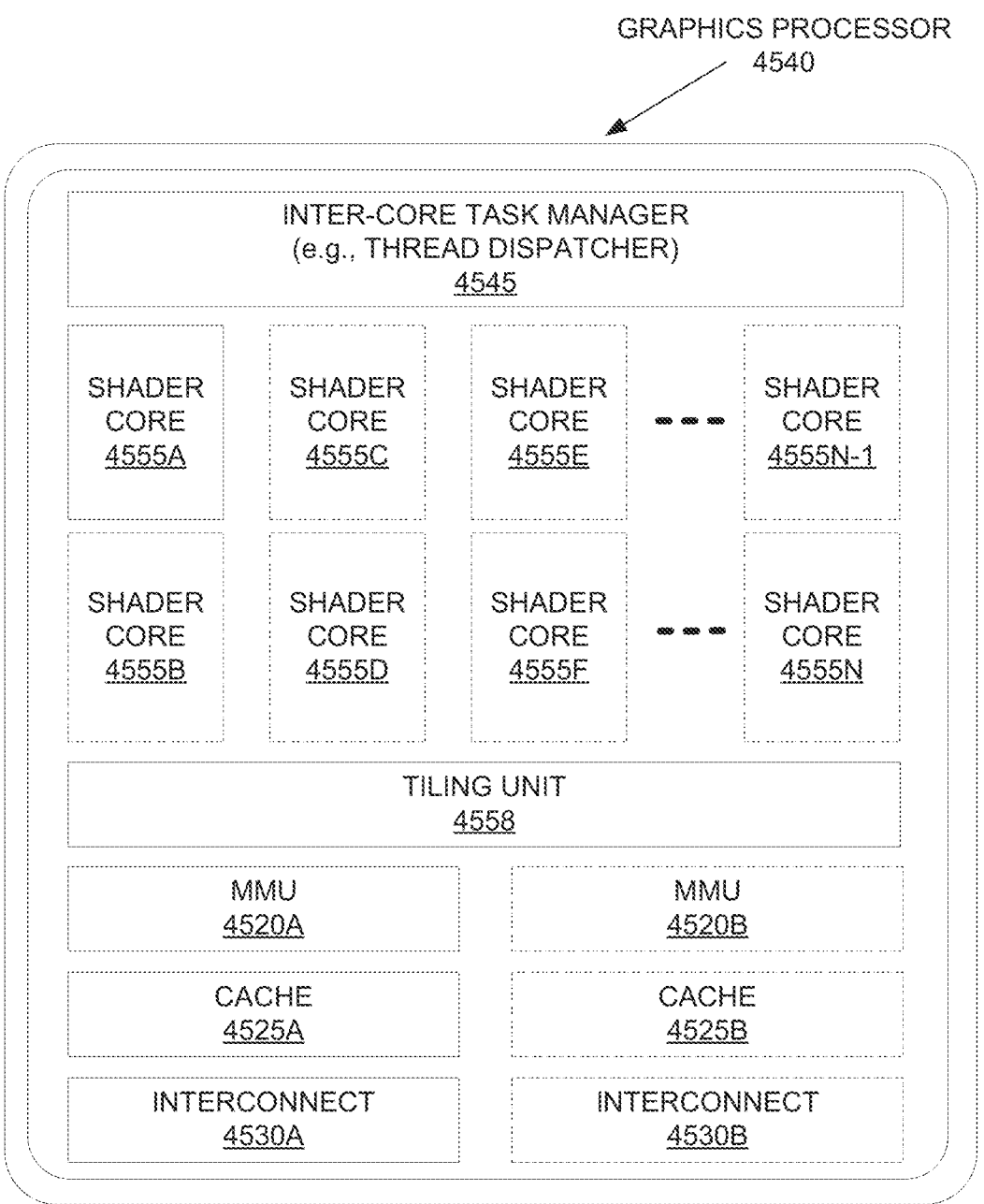
Figure 46A:
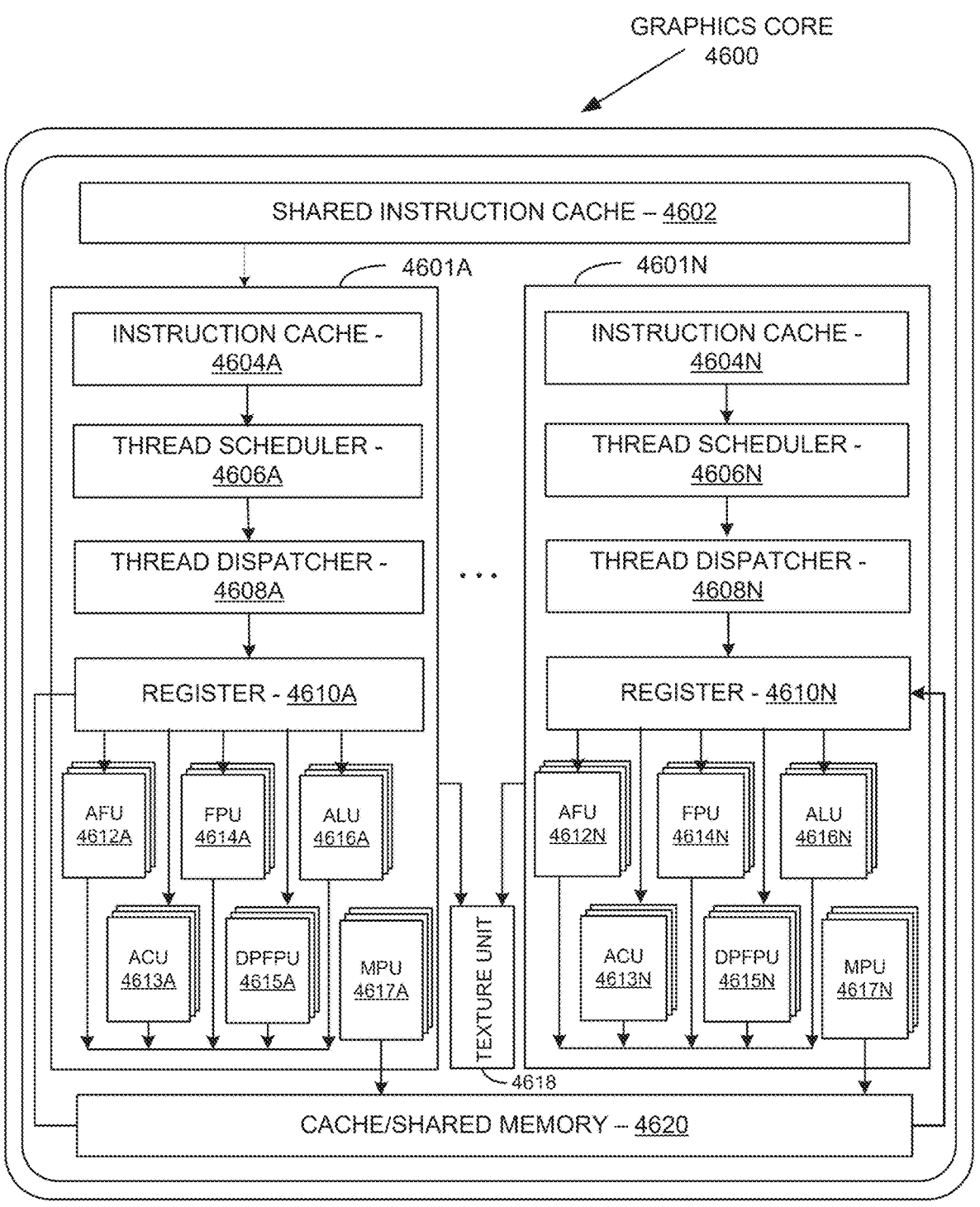
Figure 46B:
Figure 47A:
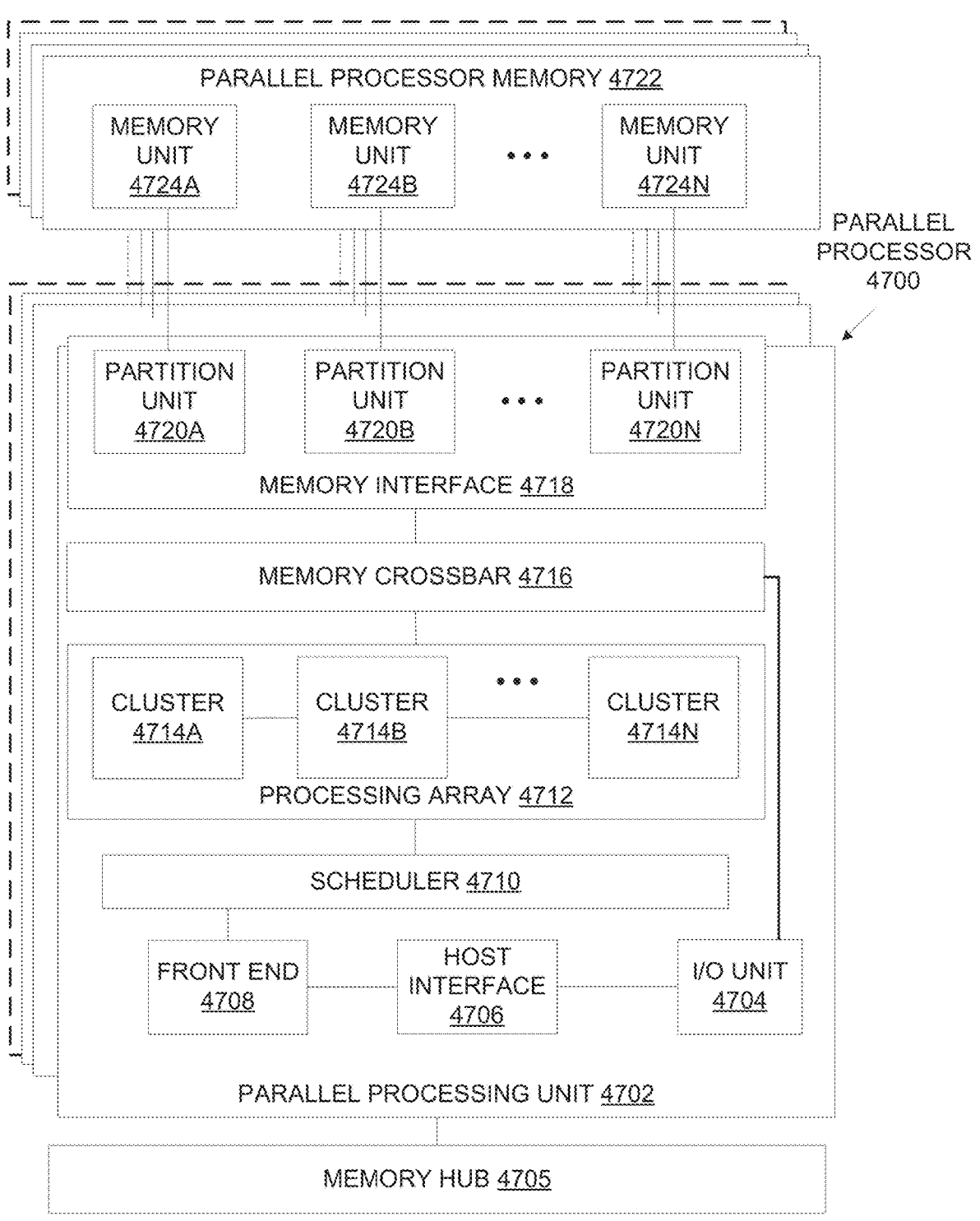
Figure 47B:
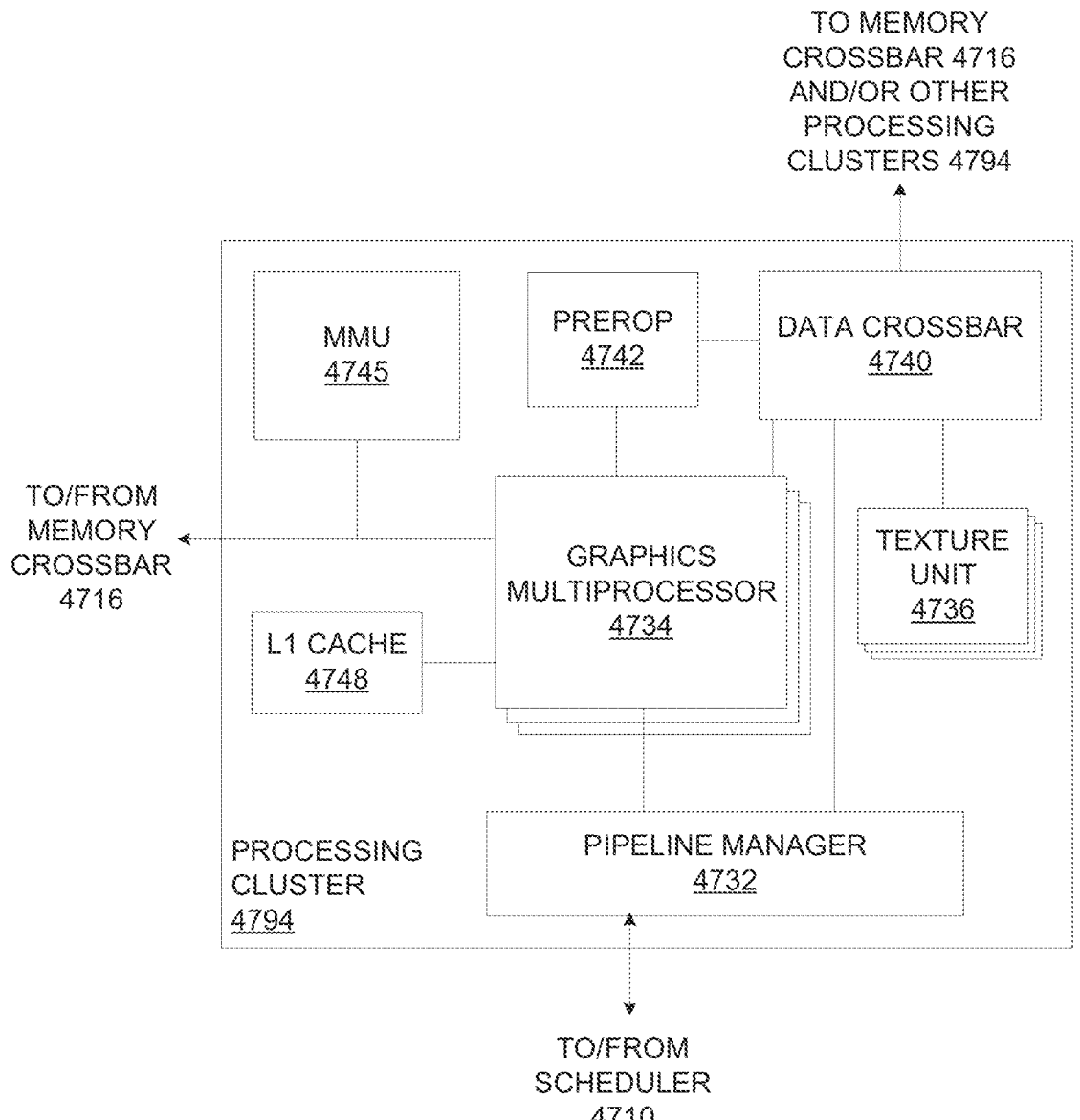
Figure 47C:
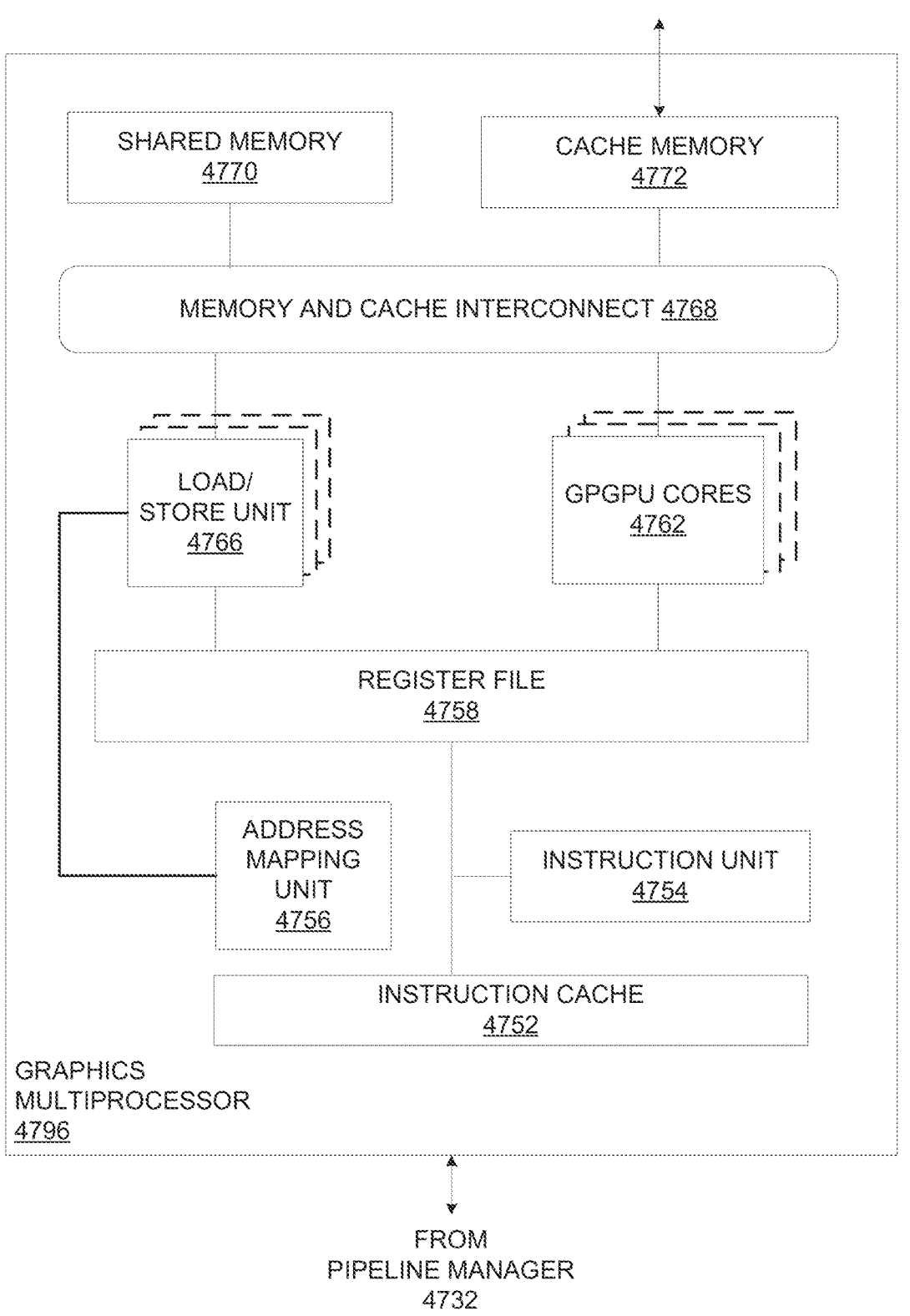
Figure 48:
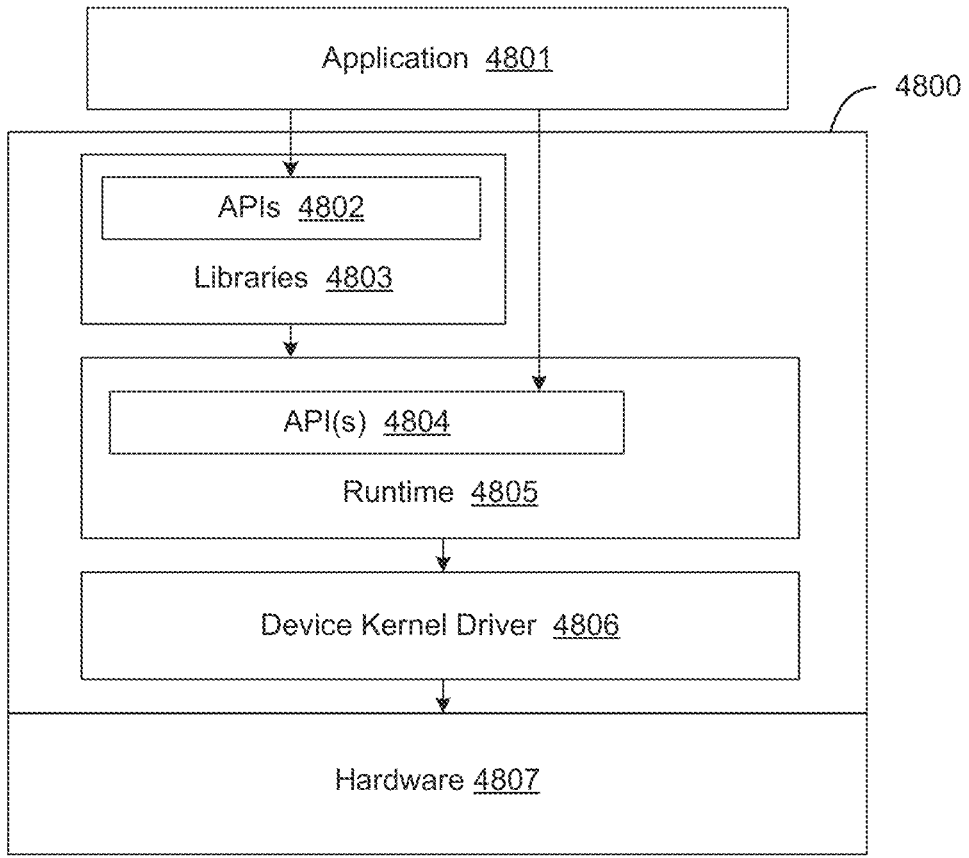
Figure 49:
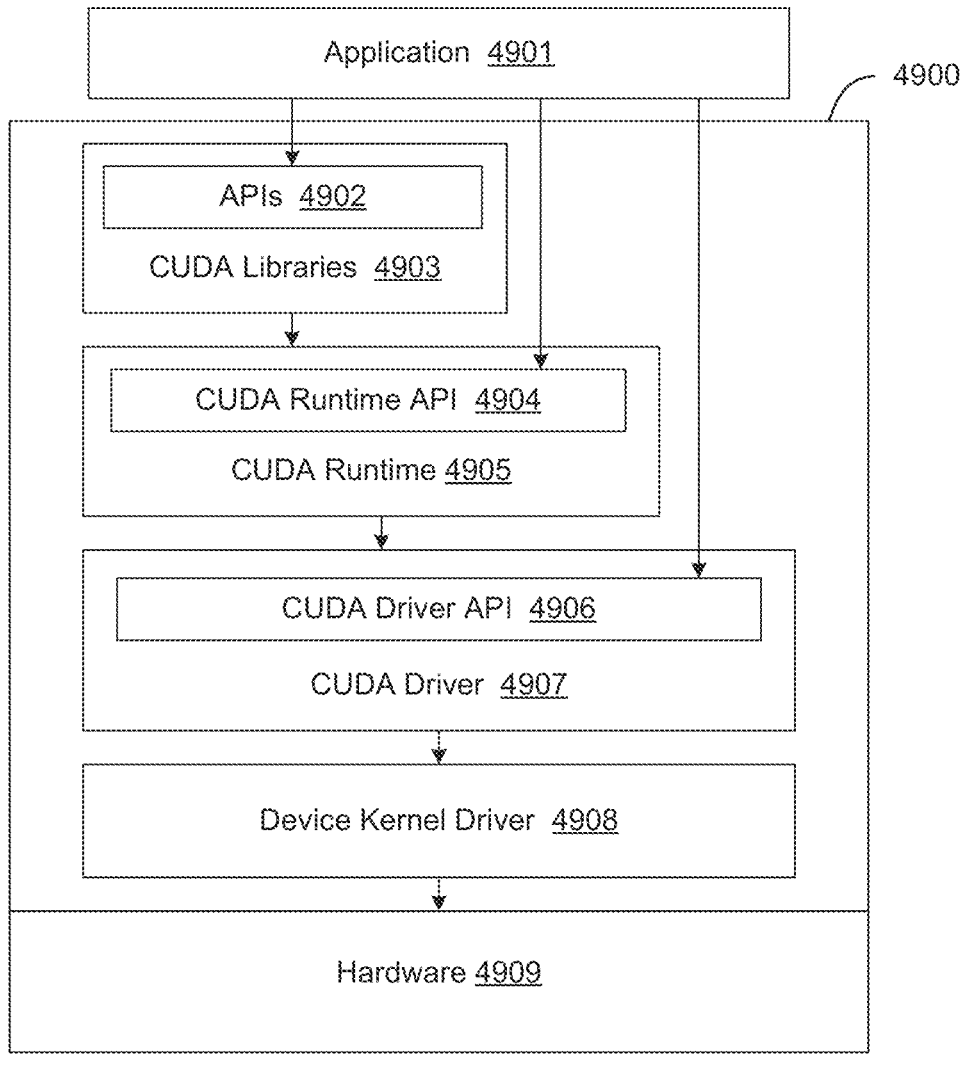
Figure 50:
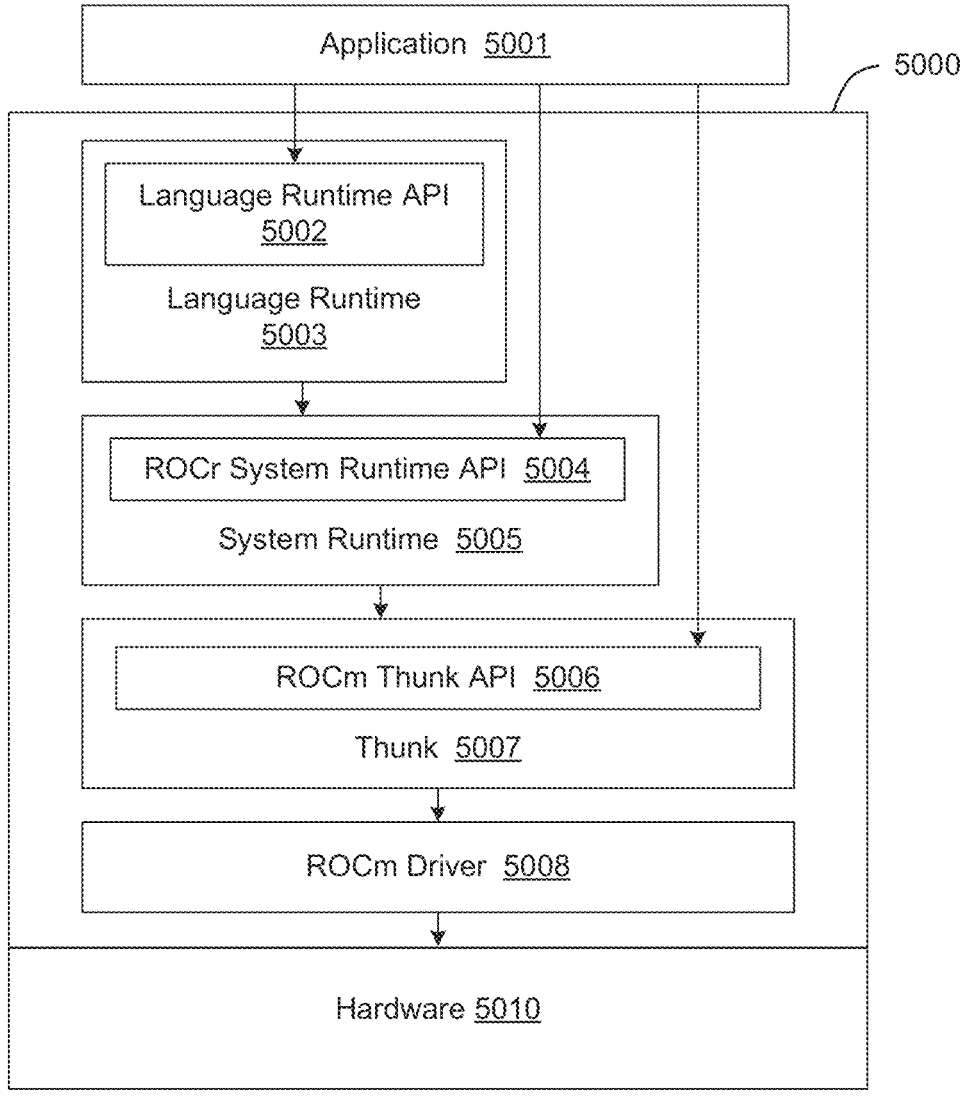
Figure 51:
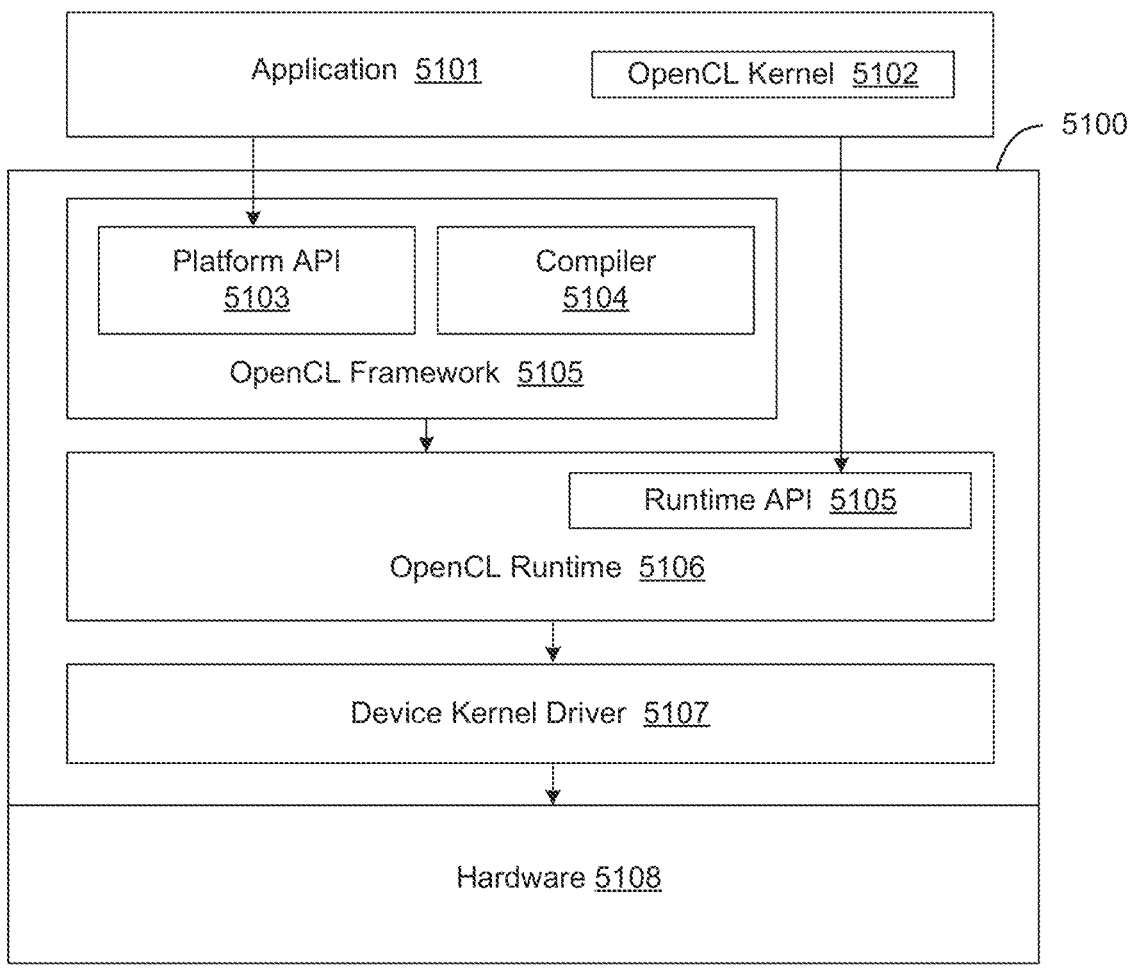
Figure 52:
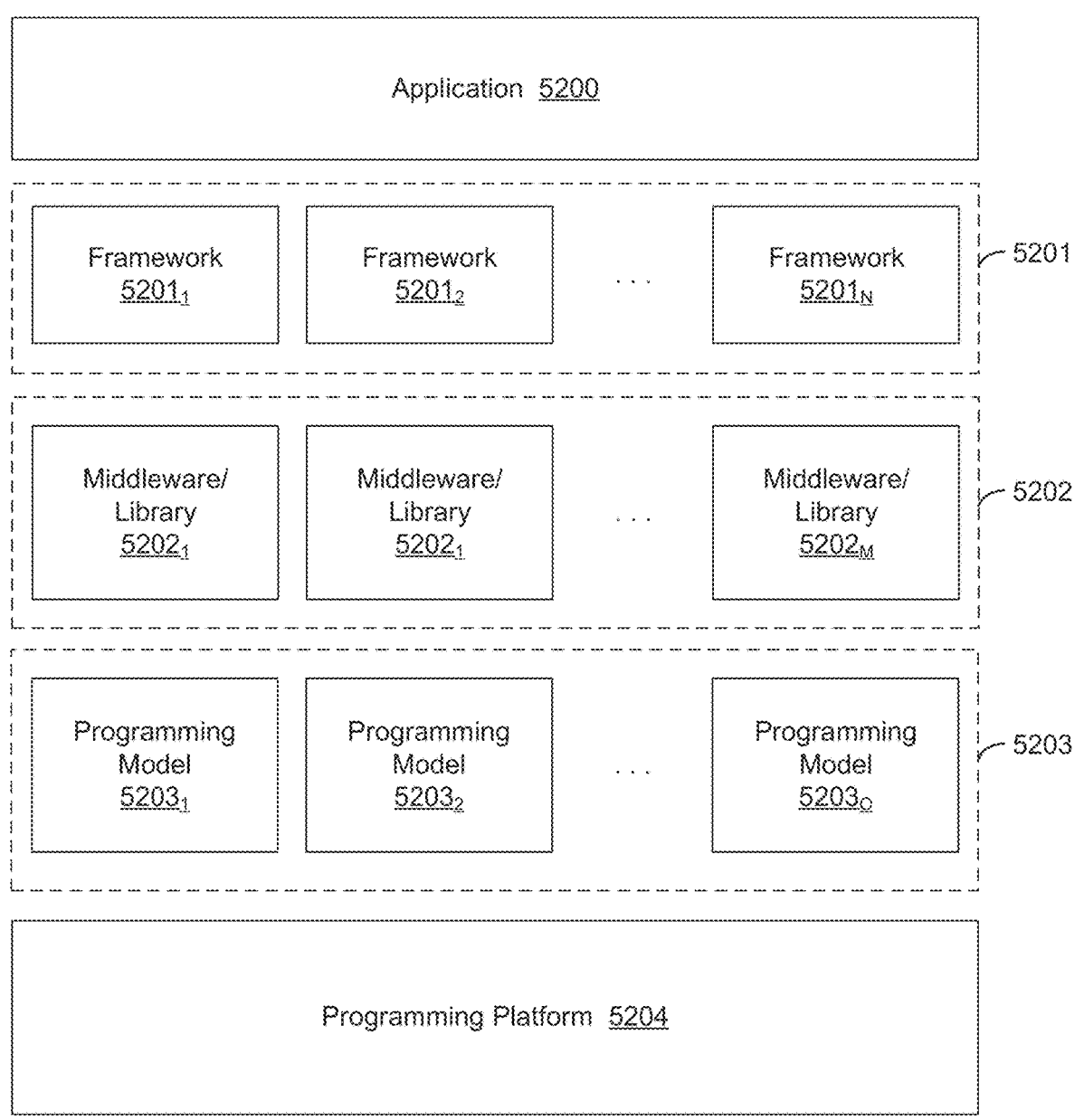
Figure 53:
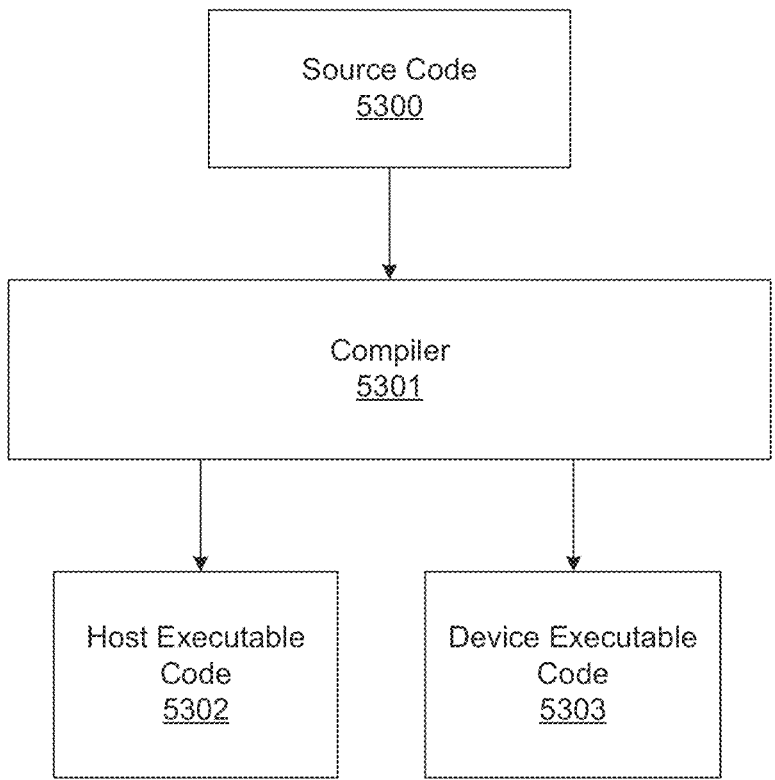

FIG. 9 illustrates a physical topology of the hardware components illustrated in FIG. 3 and an example virtual topology created by and/or existing within a VM executing on a portion of those hardware components, in accordance with at least one embodiment;

FIG. 10 illustrates a first example of groups of hardware components that have hardware component compatibility but lack relationship compatibility, in accordance with at least one embodiment;

FIG. 11 illustrates a second example of groups of hardware components that have hardware component compatibility but lack relationship compatibility, in accordance with at least one embodiment;

FIG. 12 illustrates a third example of groups of hardware components that have hardware component compatibility but lack relationship compatibility, in accordance with at least one embodiment;

FIG. 13 illustrates a flow diagram of a method that may be used to order the hardware components in an ordered device list, in accordance with at least one embodiment;

FIG. 14 illustrates a flow diagram of a method of generating a label (e.g., a migration class string) that may be used to identify compatible hardware, in accordance with at least one embodiment;

FIG. 15A illustrates a flow diagram of the method of determining a portion of a label for a group, in accordance with at least one embodiment;

FIG. 15B illustrates a group of hardware components that includes a bridged type connection between a pair of graphics processing units, in accordance with at least one embodiment;

FIG. 15C illustrates a group of hardware components that includes planar type connections between graphics processing units, in accordance with at least one embodiment;

FIG. 15D illustrates a group of hardware components that includes switched type connections between graphics processing units, in accordance with at least one embodiment;

FIG. 16 illustrates a flow diagram of the method of migrating a workload from a first virtual machine to a different second virtual machine, in accordance with at least one embodiment;

FIG. 17 illustrates a distributed system, in accordance with at least one embodiment;

FIG. 18 illustrates an exemplary data center, in accordance with at least one embodiment;

FIG. 19 illustrates a client-server network, in accordance with at least one embodiment;

FIG. 20 illustrates an example system that includes a computer network, in accordance with at least one embodiment;

FIG. 21A illustrates a networked computer system, in accordance with at least one embodiment;

FIG. 21B illustrates a networked computer system, in accordance with at least one embodiment;

FIG. 21C illustrates a networked computer system, in accordance with at least one embodiment;

FIG. 22 illustrates one or more components of a system environment in which services may be offered as third party network services, in accordance with at least one embodiment;

FIG. 23 illustrates a cloud computing environment, in accordance with at least one embodiment;

FIG. 24 illustrates a set of functional abstraction layers provided by a cloud computing environment, in accordance with at least one embodiment;

FIG. 25 illustrates a supercomputer at a chip level, in accordance with at least one embodiment;

FIG. 26 illustrates a supercomputer at a rack module level, in accordance with at least one embodiment;

FIG. 27 illustrates a supercomputer at a rack level, in accordance with at least one embodiment;

FIG. 28 illustrates a supercomputer at a whole system level, in accordance with at least one embodiment;

FIG. 29A illustrates inference and/or training logic, in accordance with at least one embodiment;

FIG. 29B illustrates inference and/or training logic, in accordance with at least one embodiment;

FIG. 30 illustrates training and deployment of a neural network, in accordance with at least one embodiment;

FIG. 31 illustrates an architecture of a system of a network, in accordance with at least one embodiment;

FIG. 32 illustrates an architecture of a system of a network, in accordance with at least one embodiment;

FIG. 33 illustrates a control plane protocol stack, in accordance with at least one embodiment;

FIG. 34 illustrates a user plane protocol stack, in accordance with at least one embodiment;

FIG. 35 illustrates components of a core network, in accordance with at least one embodiment; and FIG. 36 illustrates components of a system to support network function virtualization (NFV), in accordance with at least one embodiment;

FIG. 37 illustrates a processing system, in accordance with at least one embodiment;

FIG. 38 illustrates a computer system, in accordance with at least one embodiment;

FIG. 39 illustrates a system, in accordance with at least one embodiment;

FIG. 40 illustrates an exemplary integrated circuit, in accordance with at least one embodiment;

FIG. 41 illustrates a computing system, according to at least one embodiment;

FIG. 42 illustrates an APU, in accordance with at least one embodiment;

FIG. 43 illustrates a CPU, in accordance with at least one embodiment;

FIG. 44 illustrates an exemplary accelerator integration slice, in accordance with at least one embodiment;

FIGS. 45A-45B illustrate exemplary graphics processors, in accordance with at least one embodiment;

FIG. 46A illustrates a graphics core, in accordance with at least one embodiment;

FIG. 46B illustrates a GPGPU, in accordance with at least one embodiment;

FIG. 47A illustrates a parallel processor, in accordance with at least one embodiment;

FIG. 47B illustrates a processing cluster, in accordance with at least one embodiment;

FIG. 47C illustrates a graphics multiprocessor, in accordance with at least one embodiment;

FIG. 48 illustrates a software stack of a programming platform, in accordance with at least one embodiment;

FIG. 49 illustrates a CUDA implementation of a software stack of FIG. 48, in accordance with at least one embodiment;

FIG. 50 illustrates a ROCm implementation of a software stack of FIG. 48, in accordance with at least one embodiment;

FIG. 51 illustrates an OpenCL implementation of a software stack of FIG. 48, in accordance with at least one embodiment;

FIG. 52 illustrates software that is supported by a programming platform, in accordance with at least one embodiment; and FIG. 53 illustrates compiling code to execute on programming platforms of FIGS. 48-51, in accordance with at least one embodiment;

DETAILED DESCRIPTION

In the following description, numerous specific details are set forth to provide a more thorough understanding of at least one embodiment. However, it will be apparent to one skilled in the art that the inventive concepts may be practiced without one or more of these specific details.

Figure 1:
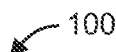
FIG. 1 illustrates example components of an example system, in accordance with at least one embodiment.

FIG. 1 illustrates example components of an example system 100, in accordance with at least one embodiment. The system 100 includes system hardware and may determine a suitable (e.g., optimal) portion of the system hardware to which to assign one or more workloads. After the workload(s) is/are assigned to the portion of the system hardware, the portion performs the workload(s). Such functionality may be implemented for example in a virtualization implementation, a container implementation (e.g., on a bare metal platform), and/or the like. Alternatively or additionally, the system 100 may determine one or more compatible portions of the system hardware to which one of the workload(s) may be migrated. During a migration, the system 100 stops performing the workload(s), saves the state of the stopped workload(s), identifies a compatible portion of the system hardware, loads or pushes the saved state into the compatible portion, and resumes performing the workload(s) on the compatible portion of the system hardware.

The system 100 includes one or more computing devices or systems (e.g., one or more servers 102). In FIG. 1, the server(s) 102 are illustrated as including servers 102A-102H. However, the server(s) 102 may include any number of servers, including a single server. By way of a non-limiting example, the server(s) 102 may implement (e.g., be a component of) another system, such as a data center 104, a cloud computing system, a machine learning system (e.g., utilizing one or more neural networks), an autonomous machine (e.g., an autonomous vehicle), medical imaging equipment, and/or the like.

When the server(s) 102 include(s) multiple servers (e.g., the servers 102A-102H), the server(s) 102 may be connected together to form an internal network 106. The internal network 106 may include one or more networking devices (not shown), such as switches and/or routers, that route data traffic within the internal network 106 to and from one or more of the server(s) 102. For example, the networking device(s) (not shown) may route the data traffic between two or more of the server(s) 102.

The server(s) 102 may be connected (e.g., via the internal network 106) to an external network 110 (e.g., the Internet) that connects one or more external computing devices 112 with the server(s) 102. The server(s) 102 and/or the internal network 106 may be connected to the external network 110 by one or more network gateway devices 114 that route(s) traffic between the external network 110 and the server(s) 102 (e.g., via the internal network 106). The network gateway device(s) 114 may be characterized as providing an interface between the external network 110 (e.g., the Internet) and the server(s) 102 (e.g., via the internal network 106).

The system 100 may implement one or more hypervisors 120. Each of the hypervisor(s) 120 is a virtual machine manager, which may assign hardware components to one or more Virtual Machines ("VM(s)"). In the embodiment illustrated, each of the server(s) 102 implements a different one of the hypervisor(s) 120. Thus, FIG. 1 illustrates hypervisors 120A-120H implemented by the servers 102A-102H, respectively. By way of non-limiting examples, the hypervisor(s) 120 may be implemented using VMware ESX software, VMware ESXi software, Hyper-V software, Kernel-based Virtual Machine ("KVM") software, and/or the like.

The system 100 may implement one or more group generators 122. In the embodiment illustrated, each of the server(s) 102 implements a different one of the group generator(s) 122. Thus, FIG. 1 illustrates group generators 122A-122H implemented by the servers 102A-102H, respectively.

The system 100 may implement a virtualization management application 130 (e.g., executing on a computing system 132). The virtualization management application 130 may select hardware components of the server(s) 102 to perform one or more workloads. The virtualization management application 130 may monitor the performance of the workloads (e.g., being executed by VMs) on the server(s) 102. The virtualization management application 130 may include and/or have access to a VM database 134. For example, the VM database 134 may be implemented by the computing system 132 and/or another computing system (e.g., one of the server(s) 120). The VM database 134 may store group information 136 that identifies at least one set of group (e.g., sets 138A-138H of groups). In at least one embodiment, the group information 136 stores a different set of groups for each of the server(s) 102. Thus, in FIG. 1, the group information 136 stores the sets 138A-138H of groups for the servers 102A-102H, respectively. The set(s) of groups each include one or more collection or group of hardware components that may be used by the hypervisor(s) 120 and the virtualization management application 130 to perform one or more workloads, such as by creating and initiating a VM and/or a container to perform the workload(s).

The computing system 132 and/or another computing system (e.g., one of the server(s) 120) may include memory (e.g., one or more non-transitory processor-readable medium) storing processor executable instructions that when executed by one or more processors of the computing system 132 implement the virtualization management application 130 and/or the VM database 134. The processor(s) may be implemented, for example, using a main central processing unit ("CPU") complex, one or more microprocessors, one or more microcontrollers, one or more graphics processing units ("GPU(s)"), one or more data processing units ("DPU(s)"), and/or the like. By way of additional non-limiting examples, the memory (e.g., one or more non-transitory processor-readable medium) may be implemented, for example, using volatile memory (e.g., dynamic random-access memory ("DRAM")) and/or nonvolatile memory (e.g., a hard drive, a solid-state device ("SSD"), and/or the like).

Figure 2:
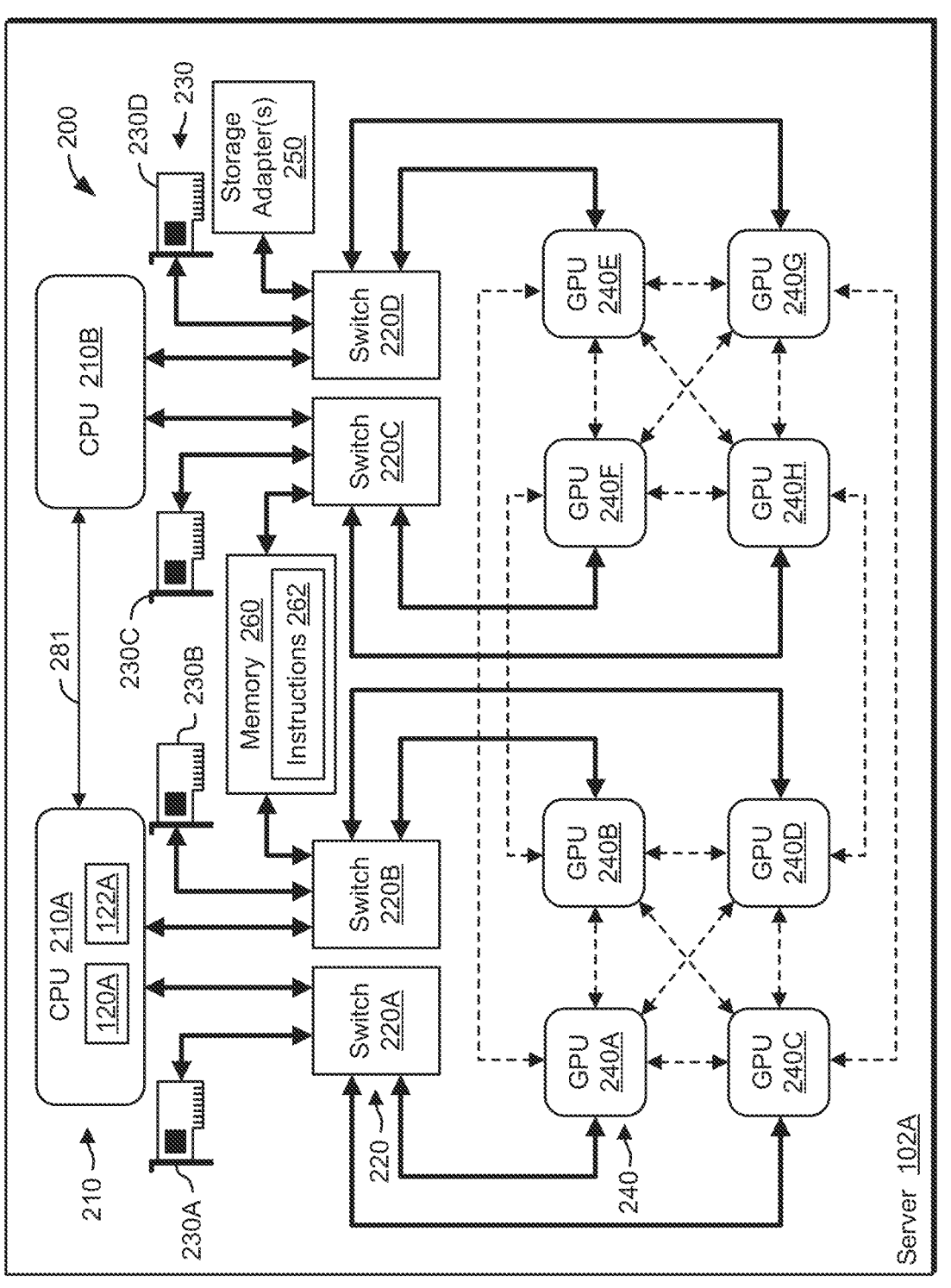
FIG. 2 illustrates example hardware components of a first server of the system illustrated in FIG. 1, in accordance with at least one embodiment.

FIG. 2 illustrates example hardware components 200 of a computing system of the system 100 illustrated in FIG. 1, in accordance with at least one embodiment. For ease of illustration, the hardware components 200 illustrated in FIG. 2 will be described as being components of the server 102A. However, the hardware components 200 may be used to implement any of the server(s) 102 illustrated in FIG. 1.

Referring to FIG. 2, the hardware components 200 may include one or more CPUs 210, one or more switches 220, one or more network interfaces 230, one or more parallel processing units ("PPU(s)") 240, one or more storage adapters 250, and memory 260. In the embodiment illustrated, the CPU(s) 210 include(s) CPUs 210A and 210B, the switch(es) 220 include the switches 220A-220D, the network interface(s) 230 include network interfaces 230A-230D, and the PPU(s) 240 include GPUs 240A-240H. The hardware components 200 may be characterized as including one or more devices (e.g., the CPU(s) 210, the PPU(s) 240, the network interface(s) 230, the storage adapter(s) 250, and/or the like) connected together by infrastructure components (e.g., the switch(es) 220). The CPU(s) 210 may be implemented, for example, using a main CPU complex, one or more microprocessors, one or more microcontrollers, one or more GPU, one or more DPUs, and/or the like. The storage adapter(s) 250 provide(s) connectivity and/or an interface to one or more data storage devices (e.g., such as one or more devices connected to the storage adapter(s) 250 by a Non-Volatile Memory Express ("NVMe"), a Small Computer System Interface ("SCSI"), an Internet SCSI ("iSCSI"), a Redundant Array of Independent Disks ("RAID") storage system, Fibre Channel ("FC"), FC over Ethernet ("FCoE"), and/or an Ethernet connection). One or more of the network interface(s) 230 may be implemented as a network interface controller ("NIC"), a network interface card, a network adapter, a Local Area Network ("LAN") adapter, a physical network interface, a host channel adapter ("HCA"), an Ethernet NIC, one or more circuits, and/or the like. One or more of the network interface(s) 230 may include one or more DPUs. By way of a non-limiting example, a single network interface card may include one or more of the network interface(s) 230.

In FIG. 2, the server 102A is illustrated as including three types of connections between the hardware components 200. A first type of connection (illustrated with a thin solid line 281) connects the CPUs 210A and 210B to one another. By way of a non-limiting example, the first type of connection may be implemented as an Infinity Fabric ("IF") connection, an Intel QuickPath Interconnect ("QPI") connection, and/or the like. A connection of the first type will be referred to as being a first type connection.

A second type of connection (illustrated with thick solid lines) connects the switches 220A-220D to other hardware components. By way of a non-limiting example, the second type of connection may be implemented as a Peripheral Component Interconnect Express ("PCIe") connection (or bus) and/or the like. A connection of the second type will be referred to as being a second type connection.

A third type of connection (illustrated with dashed lines) connects the GPU(s) 240 to one another. By way of a non-limiting example, the third type of connection may be implemented as a GPU-to-GPU connection (e.g., a NVLINK® GPU-to-GPU interconnect fabric) and/or the like. A connection of the third type will be referred to as being a third type connection. The bandwidth and/or structure of the third type connections may not be the same between all of the GPU(s) 240. For example, a third type connection may belong to a subtype that may help determine performance characteristics of the third type connection. The subtypes may include switched, planar, bridged, and/or the like. Third type connections that include switches, instead of the GPUs being directly to one another, are examples of third type connections that belong to the switched subtype (e.g., connections formed by NVLINK® GPU-to-GPU interconnect fabric). Such connections will be referred to as being switched subtype connections. The speed of switched subtype connections may be implicitly defined by the type(s) of GPUs (e.g., generation of the GPUs) connected to the switched subtype connections. The switched subtype connections connecting the GPUs may have equal bandwidths and the GPUs may be fully connected with one another. By way of a non-limiting example, any number of GPUs may be connected together by switched subtype connections.

Third type connections belonging to the planar subtype may be routed between GPUs over or through a baseboard or a motherboard. Such connections will be referred to as being planar subtype connections. The speed of planar subtype connections may be implicitly defined by the type(s) of GPUs (e.g., generation of the GPUs) connected by the planar subtype connections. The bandwidth of planar subtype connections may be determined based at least in part on a type of motherboard and/or a type of server on which the planar subtype connections are implemented. At least some of the planar subtype connections may have a different bandwidth from at least one other of the planar subtype connections. By way of a non-limiting example, two to four GPUs may be connected together by planar subtype connections.

Third type connections belonging to the bridged subtype include implementations in which a bridge (e.g., including top connectors) is used to connect two circuit boards (e.g., PCIe circuit boards) together. Such connections will be referred to as being bridged subtype connections. The bridge may be implemented using a NVLINK bridge and/or the like. The bandwidth and/or speed of bridged subtype connections may be implicitly defined by the type(s) of GPUs (e.g., generation of the GPUs) connected to the bridged subtype connections. By way of a non-limiting example, one or more pairs of GPUs may each be connected together by a bridged subtype connection.

The memory 260 (e.g., one or more non-transitory processor-readable medium) may store processor executable instructions 262 that when executed by one or more processors (e.g., one or more of the CPU(s) 210) implement the hypervisor 120A and/or the group generator 122A. By way of non-limiting examples, the memory 260 (e.g., one or more non-transitory processor-readable medium) may be implemented using volatile memory (e.g., DRAM) and/or nonvolatile memory (e.g., a hard drive, a SSD, and/or the like). The group generator 122A groups one or more of the hardware components 200 into the set 138A (see FIG. 1) of groups that may each be used to perform at least a portion of one or more workloads. For example, the set 138A may include a particular group that the hypervisor 120A may use to create a new virtual machine to perform one or more workloads. The group generator 122A may store the set locally (e.g., in a file, a database, and/or the like) and/or upload the set 138A to the virtualization management application 130 and/or the VM database 134. The group generator 122A may be implemented as a service (e.g., as at least part of a driver) that generates the set 138A when the server 102A starts up. The servers 120B-120H may implement the group generators 122B-122H in a similar manner and the group generators 122B-122H may generate sets 138B-138H (see FIG. 1), respectively.

FIG. 3 illustrates example data structures constructed based at least in part on hardware components 300 of the server 102B, in accordance with at least one embodiment. While the hardware components 300 illustrated in FIG. 3 will be described as being components of the server 102B, the hardware components 300 may be used to implement any of the server(s) 102 illustrated in FIG. 1. Referring to FIG. 3, the hardware components 300 include CPUs 310A and 310B, switches 320A and 320B, network interfaces 330A-330D, GPUs 340A and 340B, and one or more storage adapters (e.g., a storage adapter 350). The CPUs 310A and 310B may be substantially identical to the CPUs 210A and 210B (see FIG. 2), respectively. The switches 320A and 320B may each be substantially identical to one of the switches 220A-220D (see FIG. 2). The network interfaces 330A-330D may be substantially identical to the network interfaces 330A-330D (see FIG. 2), respectively. The GPUs 340A and 340B may each be substantially identical to one of the GPUs 240A-240H (see FIG. 2). The storage adapter 350 may be substantially identical to one of the storage adapter(s) 250 (see FIG. 2). As in FIG. 2, in FIG. 3, first type connection(s) is/are illustrated with a thin solid line, second type connection(s) is/are illustrated with thick solid lines, and third type connection(s) is/are illustrated with a dashed line.

The group generator(s) 122 (see FIG. 1) may generate groups of the hardware components 300 by enumerating or identifying any those of the hardware components 300 connected together by the same type of connection. For example, the group generator(s) 122 may identify all of the hardware components connected together by one or more second type connections (illustrated using the thick solid lines in FIG. 3). Thus, in the example illustrated, the group generator 122B may identify the CPUs 310A and 310B, the switches 320A and 320B, the network interfaces 330A-330D, the GPUs 340A and 340B, and the storage adapter 350. This enumeration may be characterized as capturing a first connection topology for the second type connections, which the group generator 122B may store in a first data structure 360, such as a graph (e.g., an acyclic weighted graph), a tree, and/or the like.

By way of another non-limiting example, the group generator 122B may identify (e.g., by querying the GPUs 340A and 340B) all of the hardware components 300 connected together by one or more third type connections (illustrated using the dashed lines in FIG. 3) and determine properties of the third type connection(s). Thus, in the example illustrated, the group generator 122B may identify the GPUs 340A and 340B, which are connected to one another by a third type connection 342. This enumeration may be characterized as capturing a second connection topology for the third type connections, which the group generator 122B may store in a second data structure 362, such as a graph (e.g., an acyclic weighted graph), a tree, and/or the like.

The first and second data structures 360 and 362 may store identifications of hardware components (e.g., as nodes) and their connections to other hardware components (e.g., as edges). The connections (e.g., edges) may be weighted by connection weights that indicate an expected performance (e.g., bandwidth, reliability, speed, and/or the like) of the connection when the connection is used to communicate between the components connected by the connection. The connection weights may be analogized to costs of using each connection and the group generator 122B may attempt to select a communication path having an acceptable (e.g., lowest) total cost. For example, some types of connections are faster than others and may be assigned a lower connection weight than slower types of connections. Thus, slower types of connections may be described as costing more than faster ones. The connection weights may be based at least in part on bandwidth. In FIG. 3, an edge 364 represents a first type connection between the CPUs 310A and 310B and is assigned a first weight (e.g., 1000). The first weight may be relatively large to discourage paths that include traversing this connection. Edges 371-379 represent second type connections and are assigned a second weight (e.g., 1) that is less than the first weight. Similarly, within the second data structure 362, connection weights may be assigned to one or more of the edges. For example, an edge 382, which corresponds to the third type connection 342 and connects the nodes representing the GPUs 340A and 340B, may be assigned a third weight (e.g., 0.25) that is less than the second weight.

In at least one embodiment, within the first data structure 360, hardware component weights may be assigned to the hardware components that are connected to two or more other hardware components because such hardware components (e.g., the CPUs 310A and 310B, the switches 320A and 320B, and/or the like) may be traversed and may affect performance along a communication path. For example, hardware component weights may be assigned any nodes within a graph or tree that are not leaf nodes. Each of the ports of the switches 320A and 320B may be assigned a hardware component weight. However, for ease of illustration, FIG. 3 omits the ports and assigns a single fourth weight (e.g., 10) to each of the nodes representing the switches 320A and 320B. The nodes (representing the CPUs 310A and 310B) are each assigned a fifth weight (e.g., 100). The fifth weight is larger than the fourth weight to discourage paths that include traversing at least one of the CPUs 310A and 310B. Thus, a penalty or cost may be applied for such traversals to help the group generator 122B avoid selecting paths with one or more of these traversals. Similarly, within the second data structure 362, hardware component weights may be assigned to any nodes representing hardware components that are connected to two or more other hardware components by third type connections. For example, a sixth weight may be assigned to any such nodes. However, in FIG. 3, none of the hardware components (e.g., the GPUs 340A and 340B) are connected to two or more other components by third type connections.

The connection weights and/or the hardware component weights may be obtained empirically by measuring hardware performance. For the second data structure 362, the third weight and/or the sixth weight may be determined based at least in part on one or more properties of the GPU (e.g., generation of GPU), one or more properties of the motherboard, one or more properties of the server 102B, and/or the bandwidth of the connection.

Figure 4:
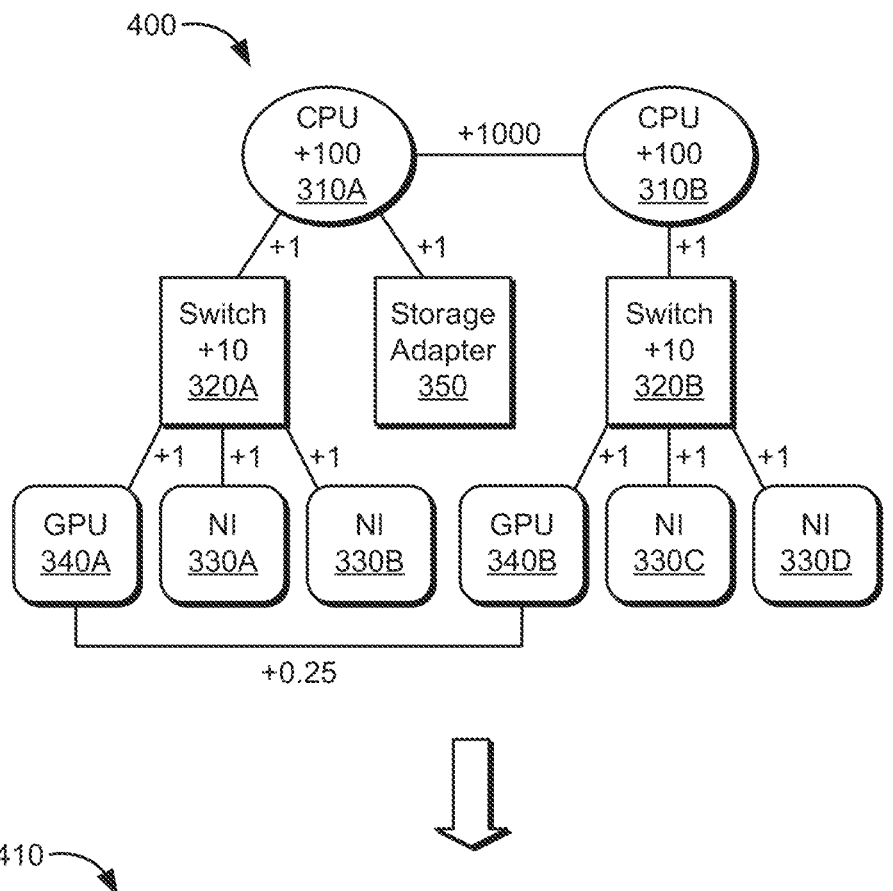
FIG. 4 illustrates a combined data structure and a table listing shortest weighted path lengths between the hardware components illustrated in FIG. 3, in accordance with at least one embodiment.

FIG. 4 illustrates a combined data structure 400 and a table 410 listing shortest weighted path lengths between the hardware components 300 of the server 102B (see FIG. 3), in accordance with at least one embodiment. Referring to FIG. 4, optionally, the data structures 360 and 362 may be combined into the combined data structure 400. However, this is not a requirement of the group generator 122B.

After the connection weights are assigned to the connections (e.g., edges) and/or the hardware component weights are assigned to the hardware components (e.g., nodes), the group generator 122B may determine weighted path lengths (or total costs) between pairs of the hardware components. For example, the group generator 122B may determine shortest weighted path lengths (or a lowest total cost paths) between all of the GPUs (e.g., the GPUs 340A and 340B) and all of the network interfaces (e.g., the network interfaces 330A-330D). By way of a non-limiting example, the group generator 122B may determine a shortest weighted path length between a pair of components using one or more methods such as Dijkstra's algorithm and/or any method capable of determining a minimum weighted path length in a graph (e.g., a directed acyclic graph) or a tree.

The table 410 in FIG. 4 provides example shortest weighted path lengths between pairs of the hardware components of the server 102B (see FIG. 3) obtained using the data structures 360 and 362 and/or the data structure 400. The table 410 provides a total cost of communicating between each pair of hardware components. Thus, the table 410 may be used to select a better performing pair over a worse performing pair. For example, if the GPU 340A is selected and a network interface needs to be selected for use with the GPU 340A, the table 410 lists the network interfaces 330A-330D having shortest weighted path lengths of 12, 12, 1224, and 1224, respectively. Therefore, the group generator 122B may select one of the network interfaces 330A and 330B which, as shown by their respective shortest weighted path lengths, are expected to offer better performance than the network interfaces 330C and 330D.

At this point, the group generator(s) 122 may identify groups of hardware components using the shortest weighted path lengths. While the group generator(s) 122 may identify all possible groups, doing so may produce a number of groups that would not be used to perform a workload. Therefore, the group generator(s) 122 may instead identify only desirable (e.g., optimized) groups based on prior knowledge of the types of workloads the system 100 will be performing. For example, particular workloads may typically require two GPUs and one to two network interfaces. If the system 100 will be performing at least one of these particular workloads, desirable groups may include at least one first group that includes two GPUs with one network interface and at least one second group that includes two GPUs with two network interfaces. In at least one embodiment, the desirable groups may be predetermined, for example, from historical workload data and/or input by a user. In the example embodiment illustrated in FIGS. 3 and 4, the predetermined groups may include two GPUs, one or two GPUs with one or two network interfaces, one or two GPUs with the storage device 350, and one or two GPUs with one to two network interfaces and the storage device 350.

FIG. 5 illustrates a table 500 listing example groups of the hardware components 300 (see FIG. 3), in accordance with at least one embodiment. For example, FIG. 5 illustrates all groups of the hardware components 300 that include a single GPU and at most two network interfaces. In other words, the predetermined groups used to create the groups illustrated in the table 500 include any combinations of the hardware components 300 that include a single GPU and at most two network interfaces, which in the example illustrated include five predetermined groups. Referring to FIG. 5, a first column 510 of the table 500 lists the following five predetermined groups:

1. one GPU and one network interface (identified as "1×GPU+1×NI" in first column 510);
2. one GPU and two network interfaces (identified as "1×GPU+2×NI" in first column 510);
3. one GPU and one storage adapter (identified as "1×GPU+1×SA" in first column 510);
4. one GPU, one storage adapter, and one network interface (identified as "1×GPU+1×SA+1×NI" in first column 510); and
5. one GPU, one storage adapter, and two network interfaces (identified as "1×GPU+1×SA+2×NI" in first column 510).

A second column 512 of the table 500 lists groups of the hardware components 300 that match the predetermined groups. The third column 514 lists group costs associated with the groups in the second column 512. Thus, each row lists a particular group in the second column 512 that includes the hardware components identified by the predetermined group listed in the first column 510 and has the group cost listed in the third column 514.

The group costs may be obtained for a particular group based at least in part on the shortest weighted path length(s) along a path between the hardware components in the group. For example, the group costs may be obtained by adding the shortest weighted path length(s) along a path between the hardware components in the group. In such embodiments, referring to FIG. 3, the group that includes the GPU 340A, the storage adapter 350, and the network interface 330A includes three sub-paths each having a shortest weighted path length in the table 410 (see FIG. 4). Referring to the table 410, a first sub-path between the GPU 340A and the storage adapter 350 has a shortest weighted path length 113. A second sub-path between the GPU 340A and the network interface 330A has a shortest weighted path length 12. A third sub-path between the storage adapter 350 and the network interface 330A has a shortest weighted path length 113. Thus, the group cost of the group that includes the GPU 340A, the storage adapter 350, and the network interface 330A may be determined by totaling these shortest weighted path lengths (113+12+113=238).

Figure 6:
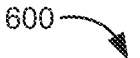
FIG. 6 illustrates a table listing example groups of the hardware components illustrated in FIG. 3 that have group costs less than a cost threshold value (e.g., 1000), in accordance with at least one embodiment.

Optionally, the group generator 122B may filter the groups to remove any with group costs greater than a cost threshold value. For example, FIG. 6 illustrates a table 600 listing example groups of the hardware components 300 having a group cost less than a cost threshold value (e.g., 1000), in accordance with at least one embodiment. The table 600 lists all groups of the hardware components 300 that include at most two GPUs and at most two network interfaces. In other words, the predetermined groups (or templates) include any combinations of the hardware components 300 that include at most two GPUs and at most two network interfaces. Referring to FIG. 6, a first column 610 of the table 600 lists the predetermined groups. In the example illustrated, the predetermined groups include those of the table 500 (see FIG. 5) and a group with two GPUs (identified by as "2×GPU" in a first column 610). A second column 612 of the table 600 lists groups of the hardware components 300 that match the predetermined groups. The third column 614 lists group costs associated with the groups in the second column 612. Thus, each row lists a particular group in the second column 612 that includes the hardware components identified by the predetermined group listed in the first column 610 and has the group cost listed in the third column 614.

At this point, referring to FIG. 1, the group generator 122B has identified the set 138B of groups (e.g., the groups listed in the second column 612 of FIG. 6) of the hardware components 300 (see FIG. 3) that may be used to perform the types of workloads that the system 100 is expected to be performing. The group generator 122B may store the set 138B of groups locally and/or send the set 138B of groups to the hypervisor 120B and/or the virtualization management application 130, which may store the set 138B of groups in the group information 136 in the VM database 134. Then, when the hypervisor 120B and/or the virtualization management application 130 receive a new workload, the hypervisor 120B and/or the virtualization management application 130 may use the group information 136 to select hardware components to perform the new workload. For example, the hypervisor 120B and/or the virtualization management application 130 may select an available group from the set 138B of groups.

By way of a non-limiting example, the hypervisor 120B and/or the virtualization management application 130 may determine the new workload is to be performed by a group that includes one GPU and one network interface. In this example, the hypervisor 120B and/or the virtualization management application 130 may look in the group information 136 (e.g., stored in the VM database 134) for any available groups that include one GPU and one network interface. After identifying the available groups, the hypervisor 120B and/or the virtualization management application 130 may select one of the available groups (e.g., a group with the lowest group cost) and generate a new VM for the workload. For example, referring to FIG. 6, the hypervisor 120B and/or the virtualization management application 130 may select the group that includes the GPU 340A and the network interface 330A. Then, the hypervisor 120B and/or the virtualization management application 130 may mark any hardware components included in the selected group as being unavailable. Thus, the hypervisor 120B and/or the virtualization management application 130 may avoid selecting groups that include the unavailable hardware. For example, referring to FIG. 6, if the group including the GPU 340A and the network interface 330A is selected, all of the groups except three (group "340B+330C," group "340B+330D," and group "340B+330C+330D") would be unavailable. Next, the hypervisor 120B and/or the virtualization management application 130 may cause the new VM to perform the workload. When the VM is no longer performing the workload (e.g., the workload has completed or is being migrated to different hardware), the hypervisor 120B and/or the virtualization management application 130 may mark the hardware components included in the selected group as being available.

Because the group information 136 identifies those groups expected to perform better than groups that are not included in the group information 136, the hypervisor(s) 120 and/or the virtualization management application 130 may select hardware components that will offer improved performance over hardware components selected using prior art methods (e.g., random selection) that do not consider the shortest weighted path lengths between the hardware components.

Figure 7:
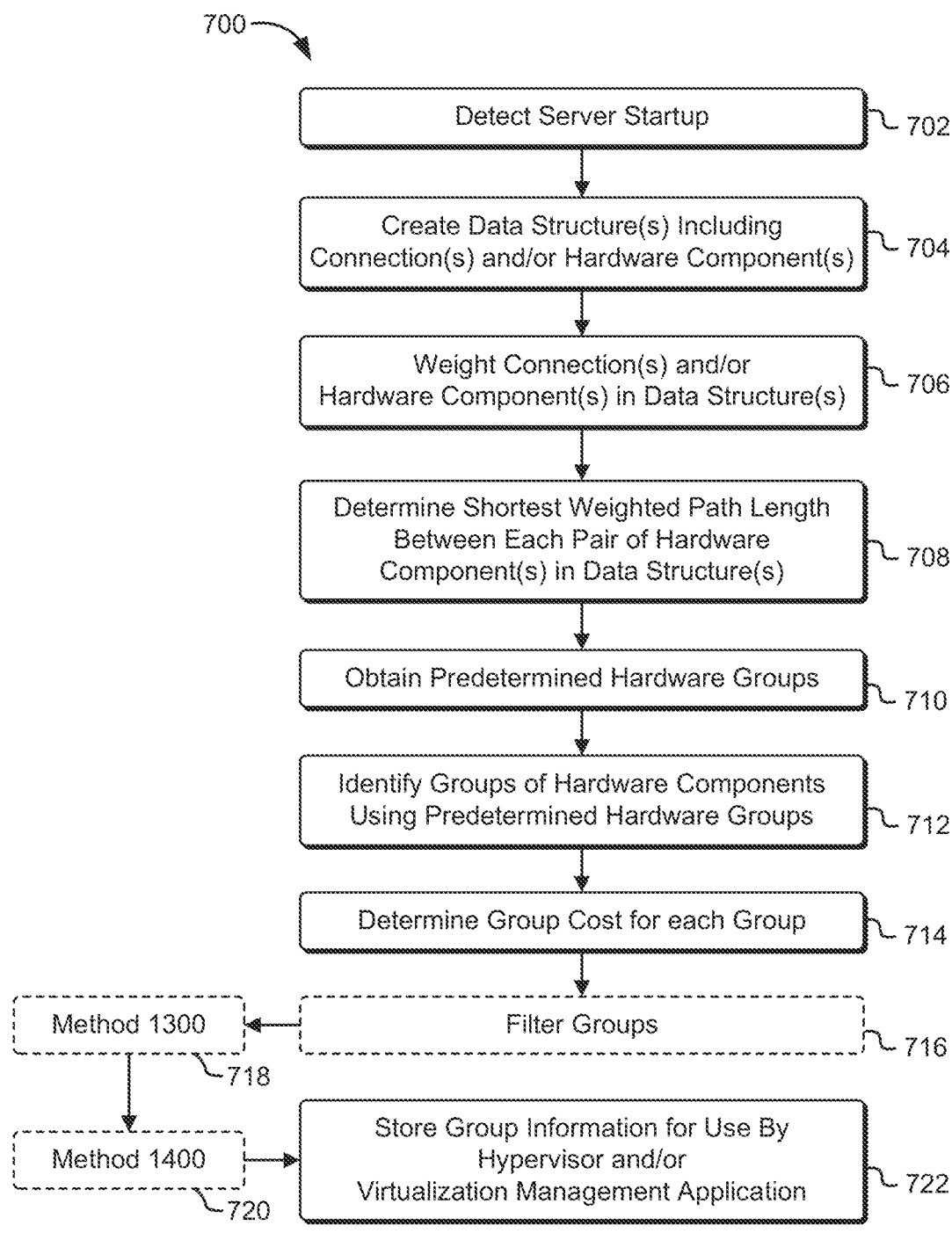
FIG. 7 illustrates a flow diagram of a method of identifying groups of hardware components, in accordance with at least one embodiment.

FIG. 7 illustrates a flow diagram of a method 700 of identifying groups of hardware components, in accordance with at least one embodiment. The method 700 may be performed by the group generator(s) 122. For illustrative purposes, the method 700 will be described as being performed by the group generator 122B (see FIG. 1) with respect to the hardware components 300 (see FIGS. 3 and 9) of the server 102B (see FIGS. 1, 3, and 9).

In first block 702, the group generator 122B detects the server 102B has started up. At next block 704, the group generator 122B creates the data structure 360 and/or the data structure 362, which include hardware components of the server 102B and/or connections between those hardware components. At next block 706, the group generator 122B assigns connection weights to the connection(s) (e.g., edges) and/or hardware component weights to the hardware component(s) (e.g., nodes) within the data structure 360 and/or the data structure 362.

At next block 708, the group generator 122B determines a shortest weighted path length between each pair of hardware components in the data structure 360 and/or the data structure 362.

At block 710, the group generator 122B obtains one or more predetermined hardware groups. At block 712, the group generator 122B uses the predetermined hardware group(s) to identify groups of the hardware components 300 (see FIG. 3) that match the predetermined hardware group(s). At block 714, the group generator 122B determines a group cost for each of the groups.

At optional block 716, the group generator 122B may filter the groups identified in block 712. For example, the group generator 122B may remove any of the groups having a group cost that exceeds a cost threshold value. At optional block 718, the group generator 122B may perform a method 1300 that may be used to determine an order for hardware components in an ordered device list for each of the groups. At optional block 720, the group generator 122B may perform a method 1400 that may be used to determine a label (e.g., a migration class string) for each of the groups.

At block 722, the group generator 122B may store the groups (e.g., as the set 138B of groups) for use by the hypervisor(s) 120 and/or the virtualization management application 130. For example, the group generator 122B may store the groups locally for use by the hypervisor 120B. The group generator 122B may transmit the set 138B of groups to the virtualization management application 130 and/or the VM database 134 for storage thereby. The method 700 may terminate after block 722. In embodiments that omit one or more of blocks 716-720, the group generator 122B may simply skip the omitted block and advance to the next block in the method 700.

Figure 8:
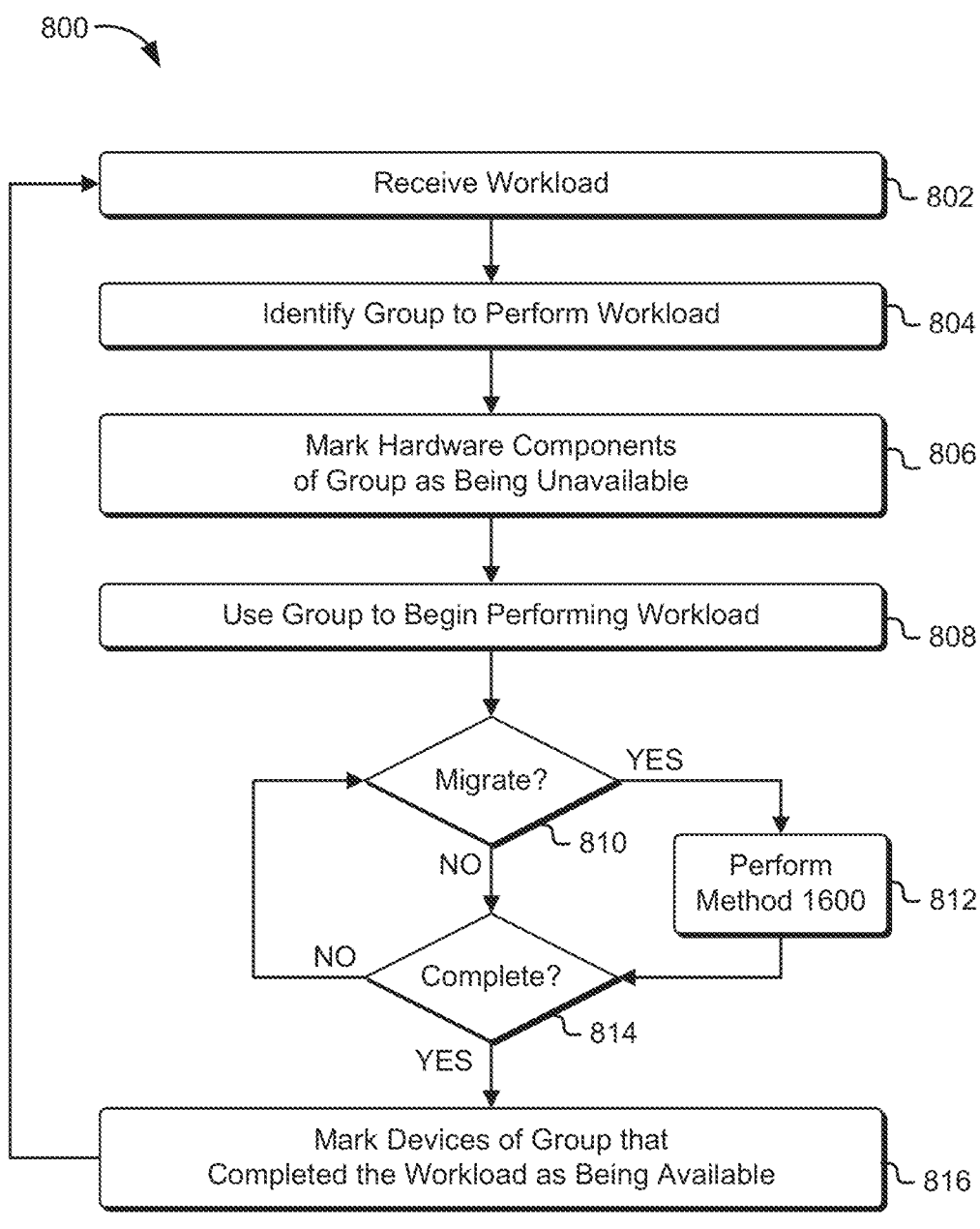
FIG. 8 illustrates a flow diagram of a method of using the groups to perform a workload, in accordance with at least one embodiment.

FIG. 8 illustrates a flow diagram of a method 800 of using the groups to perform a workload, in accordance with at least one embodiment. The method 800 may be performed by one of the hypervisor(s) 120 and/or the virtualization management application 130. For illustrative purposes, the method 800 will be described as being performed by the hypervisor 120B.

In first block 802, the hypervisor 120B receives a workload. Then, in block 804, the hypervisor 120B identifies one of the groups to perform the workload. The hypervisor 120B may use the set 138B of groups and/or the group information 136 (e.g., stored locally and/or in the VM database 134) to select the selected group. In at least one embodiment, the virtualization management application 130 may select the selected group and instruct the hypervisor 120B to use the selected group.

In block 806, the hypervisor 120B and/or the virtualization management application 130 may mark the hardware components of the selected group as being unavailable. In block 808, the hypervisor 120B uses the selected group to begin performing the workload. For example, the hypervisor 120B may create a VM using the selected group and cause the VM to begin performing the workload. The hypervisor 120B may use the ordered device list to map the hardware component of the selected group to the VM.

At decision block 810, the hypervisor 120B may decide to migrate the workload to a different group on one or more of the server(s) 102. By way of a non-limiting example, the hypervisor 120B may decide to migrate the workload in response to an instruction from the virtualization management application 130. The decision in decision block 810 is "YES," when the hypervisor 120B decides to migrate the workload. Otherwise, the decision in decision block 810 is "NO."

When the decision in decision block 810 is "YES," in block 812, a method 1600 may be performed. The hypervisor 120B may at least partially perform the method 1600. After the method 1600 is performed, the workload may be executing on the same server 102B and/or on at least one different server. Therefore, from this point onward, the hypervisor 120B may no longer be performing the method 800. However, for ease of illustration, the remainder of the method 800 will be described as being performed by the hypervisor 120B. After block 812, the hypervisor 120B advances to decision block 814.

When the decision in decision block 810 is "NO," the hypervisor 120B advances to decision block 814. At decision block 814, the hypervisor 120B determines whether the workload has finished executing and is complete. The decision in decision block 814 is "YES," when the workload is complete. Otherwise, the decision in decision block 814 is "NO."

When the decision in decision block 814 is "NO," the hypervisor 120B returns to decision block 810. On the other hand, when the decision in decision block 814 is "YES," at block 816, the hypervisor 120B and/or the virtualization management application 130 may mark the hardware components of the group that completed the workload as being available. Then, the hypervisor 120B may return to block 802 to receive a new workload.

Data center management may involve the use of virtualization management software offering suspend, resume, and migrate functions. For example, the virtualization management application 130 may implement suspend, resume, and migrate functionality. The suspend functionality may freeze or suspend the workload on first hardware mid-performance and preserve the workload's state (e.g., write that state to memory). Then, the migrate functionality may move the workload and its preserved state to different second hardware. Finally, the resume functionality may resume performance of the workload on the second hardware. For the workload to continue functioning as if the relocation to the second hardware had not occurred, the workload must be relocated to second hardware that is compatible with the first hardware. Compatible hardware is hardware to which a workload may be migrated and will continue processing without an issue but may process slightly differently (e.g., may take more or less time than on the original hardware). For example, failures, timeouts, etc. might result and the workload may fail if a workload is migrated from the first group to an incompatible second group. By way of a non-limiting example, compatible hardware may include GPUs of the same class, connected to one another by the same type of connection, included in hardware having the same topology, and having the same connections between the GPUs and network interfaces.

Conventionally, workloads have been migrated to identical hardware on the same or a different server. This is problematic because servers change and may be acquired over time (e.g., different server models with different properties) which can cause the system 100 to include heterogenous hardware. Further, sometimes servers, which may have been intended to be identical, are manufactured with hardware components that are placed in different orders and/or locations, which may result in a heterogenous hardware environment. Such heterogeneity may limit the locations to which a workload may be migrated.

FIG. 9 illustrates a physical topology 900 of the hardware components 300 of the server 102B and an example virtual topology 902 created by and/or existing within a VM 904 executing on a group of the hardware components 300, in accordance with at least one embodiment. In the physical topology 900, the CPU 310A is connected to the storage adapter 350 and the switch 320A by second type connections 911 and 912, respectively. The storage adapter 350 and the switch 320A may be described as being under the CPU 310A and as having a peer-to-peer relationship with one another. The switch 320A is connected to the GPU 340A, the network interface 330A, and the network interface 330B, by second type connections 913-915, respectively. The GPU 340A, the network interface 330A, and the network interface 330B may be described as being under the switch 320A and as having peer-to-peer relationships with one another. The CPU 310B is connected to the switch 320B by a second type connection 921. The switch 320B is connected to the GPU 340B, the network interface 330C, and the network interface 330D by second type connections 922-924, respectively. The GPU 340B, the network interface 330C, and the network interface 330D may be described as being under the switch 320B and as having peer-to-peer relationships with one another. The CPU 310A is connected to the CPU 310B by a first type connection 930 and the GPU 340A is connected to the GPU 340B by a third type connection 932. In this example, the VM 904 executes on a first group that includes the CPU 310A, the GPU 340A, the GPU 340B, and the network interface 330A.

In the virtual topology 902, a CPU 941 is connected to a GPU 944A, a GPU 944B, and a network interface 943 by second type connections 951-953, respectively. The GPU 944A, the GPU 944B, and the network interface 943 may be described as being under the CPU 941 and as having peer-to-peer relationships with one another. The GPU 944A is connected to the GPU 944B by a third type connection 962. Thus, any group of the hardware components 300 that include a CPU, a GPU, and a network interface could be used to implement the VM 904. However, the peer-to-peer relationships between the hardware components 300 are significant. Thus, in at least one embodiment, for a second group of the hardware components 300 to be compatible with a first group of the hardware components 300, they must have substantially equivalent peer-to-peer relationships.

When a VM (e.g., the VM 904) is created, physical hardware components are mapped to the virtual hardware components. This mapping imposes an ordering on and/or a spatial relationship between the virtual hardware components. However, this ordering and spatial relationship overlays underlying actual hardware components. For example, the VM 904 may be implemented by a first group that includes the CPU 310A, the GPU 340A, the GPU 340B, and the network interface 330A. The CPU 310A, the GPU 340A, the GPU 340B, and the network interface 330A may be mapped to the CPU 941, the GPU 944A, the GPU 944B, and the network interface 943, respectively, in accordance with this order. Thus, in this example, the GPU 340A (mapped to the GPU 944A) has a peer-to-peer relationship with the network interface 330A (mapped to the network interface 943). The first group would be compatible with a second group that includes the CPU 310A, the GPU 340A, the GPU 340B, and the network interface 330B, if mapped to the VM 904 in this order because the GPU 340A (mapped to the GPU 944A) has a peer-to-peer relationship with the network interface 330B (mapped to the network interface 943). As depicted, the first group may not be compatible with a third group that includes the CPU 310A, the GPU 340A, the GPU 340B, and the network interface 330C, if mapped to the VM 904 in this order because the GPU 340A (mapped to the GPU 944A) does not have a peer-to-peer relationship with the network interface 330C (mapped to the network inter-face 943). However, the first group would be compatible with a fourth group that includes the CPU 310A, the GPU 340B, the GPU 340A, and the network interface 330C, if mapped to the VM 904 in this order because the GPU 340B (mapped to the GPU 944A) has a peer-to-peer relationship with the network interface 330C (mapped to the network interface 943). Thus, an order in which the hardware components of groups are mapped to a VM (e.g., the VM 904) may help determine whether groups are compatible.

As shown herein, compatibility may include hardware component compatibility and relationship compatibility. Hardware component compatibility means the hardware components are compatible. In addition to requiring compatible peer-to-peer relationships between the hardware components, relationship compatibility means that the hardware components are connected to one another in a compatible manner (e.g., by similar and/or substantially identical third type connections) and/or positioned within at least a portion of the physical topology in the same or similar locations. As explained herein, labels may be assigned to the groups and used to determine hardware component compatibility and relationship compatibility. Further, ordered device lists may be assigned to the groups and used to ensure that the hardware components of the groups are mapped into VMs in specified orders that help assure relationship compatibility.

An initial order of the hardware components may be determined using any method that identifies and/or discovers the hardware components (e.g., an ordered traversal of the hardware components) present on the server 102B. By way of a non-limiting example, PCIe may maintain a hierarchy that lists all of the hardware components connected via PCIe. The PCIe hierarchy may be used to identify and/or discover all of the hardware components connected via PCIe. Thus, the initial order of the hardware components within a group may be the result of a traversal or other means (e.g., the PCIe hierarchy) of identifying the hardware components. But, using the initial orders may result in groups that have hardware component compatibility being incompatible because they lack relationship compatibility. This problem may be avoided by reordering the hardware components in at least one of the groups so that the groups have relationship compatibility. The reordered hardware components of the groups may be listed in ordered device lists.

An ordered device list may be associated with each group. The ordered device list may provide an ordering that the hypervisor(s) 120 may use to map the physical hardware components to a VM. The method 1300 (see FIG. 13) may be used to determine the order for the hardware components listed in the ordered device list for each of the groups. By ordering the hardware components using the method 1300, the ordering of hardware components in compatible groups will be the same even if the physical hardware components are arranged differently within their physical topology(ies).

FIGS. 10-12 depict additional examples of incompatible groups of hardware components. FIG. 10 illustrates a first example of groups of hardware components 1000 that have hardware component compatibility but lack relationship compatibility, in accordance with at least one embodiment. While the hardware components 1000 illustrated in FIG. 10 will be described as being components of the server 102C, the hardware components 1000 may be used to implement any of the server(s) 102 illustrated in FIG. 1.

In the example illustrated in FIG. 10, the hardware components 1000 include CPUs 1010A and 1010B that may be identical to one another and may each be substantially identical to one of the CPUs 210A and 210B (see FIG. 2). The hardware components 1000 may include switches 1020A and 1020B that may be identical to one another and may each be substantially identical to one of the switch 220A-220D (see FIG. 2). The hardware components 1000 may include network interface 1030A-1030D that may be identical to one another and may each be substantially identical to one of the network interface 230A-230D (see FIG. 2). The hardware components 1000 may include GPUs 1040A-1040D that may be identical to one another and may each be substantially identical to one of the GPUs 240A-240H (see FIG. 2).

In FIG. 10, a first group of hardware components may be connected to the CPU 1010A and may include the GPU 1040A, the switch 1020A, the GPU 1040B, the network interface 1030A, and the network interface 1030B. For illustrative purposes, the hypervisor 120C and/or the virtualization management application 130 identified and/or discovered the GPU 1040A, the switch 1020A, the GPU 1040B, the network interface 1030A, and the network interface 1030B in this first (initial) order. A second group of hardware components may be connected to the CPU 1010B and may include the switch 1020B, the GPU 1040C, the network interface 1030C, the network interface 1030D, and the GPU 1040D. For illustrative purposes, the hypervisor 120C and/or the virtualization management application 130 identified and/or discovered the switch 1020B, the GPU 1040C, the network interface 1030C, the network interface 1030D, and the GPU 1040D in this second (initial) order. If the first and second orders are used to map the hardware components of the first and second groups to VMs, those VMs may not be compatible. But, as explained herein, the hardware components may be reordered before being mapped into the VMs so that the resultant VMs will be compatible.

FIG. 11 illustrates a second example of groups of hardware components that have hardware component compatibility but lack relationship compatibility, in accordance with at least one embodiment. FIG. 11 illustrates example hardware components 1100D and 1100E. While the hardware components 1100D will be described as being components of the server 102D, the hardware components 1100D may be used to implement any of the server(s) 102 illustrated in FIG. 1. Similarly, while the hardware components 1100E illustrated in FIG. 11 will be described as being components of the server 102E, the hardware components 1100E may be used to implement any of the server(s) 102 illustrated in FIG. 1. As in FIG. 2, in FIG. 11, first type connection(s) is/are illustrated with a thin solid line, second type connection(s) is/are illustrated with thick solid lines, and third type connection(s) is/are illustrated with a dashed line.

The hardware components 1100D may include a CPU 1110A, a switch 1120A, a switch 1120B, a network interface 1130A, a network interface 1130B, and GPUs 1140A-1140C. The CPU 1110A may be substantially identical to at least one of the CPUs 210A and 210B (see FIG. 2). The switches 1120A and 1120B may each be substantially identical to one of the switches 220A-220D (see FIG. 2). The network interfaces 1130A and 1130B each may be substantially identical to one or more of the network interfaces 330A-330D (see FIG. 2), respectively. The GPUs 1140A-1140C may each be substantially identical to one of the GPUs 240A-240H (see FIG. 2).

The hardware components 1100E may include a CPU 1110B, a switch 1120C, a switch 1120D, a network interface 1130C, a network interface 1130D, and GPUs 1140D-1140F. The CPU 1110B may be substantially identical to at least one of the CPUs 210A and 210B (see FIG. 2). The switches 1120C and 1120D may each be substantially identical to one of the switches 220A-220D (see FIG. 2). The network interfaces 1130C and 1130D each may be substantially identical to one or more of the network interfaces 330A-330D (see FIG. 2), respectively. The GPUs 1140D-1140F may each be substantially identical to one of the GPUs 240A-240H (see FIG. 2).

The hardware components 1100D include a first group of hardware components that includes the CPU 1110A, the switch 1120A, the GPU 1140A, the GPU 1140B, the switch 1120B, the GPU 1140C, the network interface 1130A, and the network interface 1130B in this first (initial) order. Thus, in this example, a third type connection is between the second and third GPUs (or the GPUs 1140B and 1140C) in the first order. On the other hand, the hardware components 1100E include a second group of hardware components that includes the CPU 1110B, the switch 1120C, the GPU 1140D, the network interface 1130C, the network interface 1130D, the switch 1120D, the GPU 1140E, and the GPU 1140F in this second (initial) order. Thus, in this example, a third type connection is between the first and third GPUs (or the GPUs 1140D and 1140F) in the second order. Therefore, if the first and second orders are used to map the hardware components of the first and second groups to VMs, those VMs may not be compatible. But, as explained herein, the hardware components may be reordered before being mapped into VMs so that the resultant VMs will be compatible.

FIG. 12 illustrates a third example of groups of hardware components that have hardware component compatibility but lack relationship compatibility, in accordance with at least one embodiment. FIG. 12 illustrates example hardware components 1200F and 1200G. While the hardware components 1200F will be described as being components of the server 102F, the hardware components 1200F may be used to implement any of the server(s) 102 illustrated in FIG. 1. Similarly, while the hardware components 1200G illustrated in FIG. 11 will be described as being components of the server 102G, the hardware components 1200G may be used to implement any of the server(s) 102 illustrated in FIG. 1. As in FIG. 2, in FIG. 11, first type connection(s) is/are illustrated with a thin solid line, second type connection(s) is/are illustrated with thick solid lines, and third type connection(s) is/are illustrated with a dashed line.

The hardware components 1200F may include a CPU 1210A, a switch 1220A, a switch 1220B, a network interface 1230A, a network interface 1230B, and GPUs 1240A-1240E. The CPU 1210A may be substantially identical to at least one of the CPUs 210A and 210B (see FIG. 2). The switches 1220A and 1220B may each be substantially identical to one of the switches 220A-220D (see FIG. 2). The network interfaces 1230A and 1230B each may be substantially identical to one or more of the network interfaces 330A-330D (see FIG. 2), respectively. The GPUs 1240A-1240E may each be substantially identical to one of the GPUs 240A-240H (see FIG. 2).

The hardware components 1200G may include a CPU 1210B, a switch 1220C, a switch 1220D, a network interface 1230C, a network interface 1230D, and GPUs 1240F-1240J. The CPU 1210B may be substantially identical to at least one of the CPUs 210A and 210B (see FIG. 2). The switches 1220C and 1220D may each be substantially identical to one of the switches 220A-220D (see FIG. 2). The network interfaces 1230C and 1230D each may be substantially identical to one or more of the network interfaces 330A-330D (see FIG. 2), respectively. The GPUs 1240F-1240J may each be substantially identical to one of the GPUs 240A-240H (see FIG. 2).

The hardware components 1200F include a first group of hardware components that include a CPU 1210A, a switch 1220A, a GPU 1240A, a GPU 1240B, a GPU 1240C, a switch 1020B, a network interface 1230A, a GPU 1240D, a GPU 1240E, and a network interface 1230B in this first order. The GPUs 1240B-1240E are identical to one another and the GPU 1240A is non-identical to the GPUs 1240B-1240E. The network interfaces 1230A and 1230B are non-identical. The GPUs 1240B and 1240E are connected together by a third type connection 1242A and the GPUs 1240C and 1240D are connected together by a third type connection 1242B.

The hardware components 1200G include a second group of hardware components that include a CPU 1210B, a switch 1220C, a GPU 1240F, a GPU 1240G, a network interface 1230C, a network interface 1230D, a switch 1220D, a GPU 1240H, a GPU 1240I, and a GPU 1240J in this second order. The GPUs 1240F, 1240G, 1240I, and 1240J are identical to the GPUs 1240B-1240D, and the GPU 1240H is identical to the GPU 1240A. The network interfaces 1230A and 1230B are identical to the network interfaces 1230D and 1230C, respectively. The GPUs 1240F and 1240I are connected together by a third type connection 1242C and the GPUs 1240G and 1240I are connected together by a third type connection 1242D.

As can be seen in FIG. 12, the hardware components under the switch 1220A are identical to the hardware components under the switch 1220D but because the switches 1220A and 1220D appear in different locations within the servers 102F and 102G, a first group including the hardware components under the switch 1220A may not be compatible with a second group including the hardware components under the switch 1220D. Further, while the hardware components under the switch 1220B are identical to the hardware components under the switch 1220C, those hardware components appear in different orders and therefore may not within the ordered device lists to increase (e.g., maximize) relationship compatibility. FIG. 13 illustrates a flow diagram of the method 1300 that may be used to order the hardware components in an ordered device list, in accordance with at least one embodiment. The method 1300 may be performed by the group generator(s) 122. For ease of illustration, the method 1300 will be described as being performed by the group generators 122F and 122G for the servers 102F and 102G illustrated in FIG. 12.

In first block 1302 (see FIG. 13), the group generators 122F and 122G each obtain a group of hardware components (e.g., using the method 700 illustrated in FIG. 7). Then, in block 1304, the group generators 122F and 122G may each begin creating ordered device lists by assigning the hardware components to switch groups. For example, in block 1304, the group generators 122F and 122G may list the hardware components under (or after) topmost switches connected to those hardware components by second type connections (e.g., PCIe connections). If multiple switches are stacked, they may be combined (or collapsed) and represented as a single switch (e.g., a topmost switch in the stack). Table A below is an example of the hardware components illustrated in FIG. 12 listed under (or after) their topmost switches:

TABLE A

| Device List for Server 102F | Device List for Server 102G |
|---|---|
| switch 1220A, GPU 1240A, GPU 1240B, GPU 1240C, switch 1020B, network interface 1230A, GPU 1240D, GPU 1240E, network interface 1230B | switch 1220C, GPU 1240F, GPU 1240G, network interface 1230C, network interface 1230D, switch 1220D, GPU 1240H, GPU 1240I, GPU 1240J | be compatible depending on how they are mapped into VMs. Finally, the third type connections between GPUs are ordered differently in the servers 102F and 102G. But, as explained herein, the hardware components may be reordered before being mapped into VMs so that the resultant VMs will be compatible.

The group generator(s) 122 may determine some groups are incompatible if performance would be reduced below a threshold value (e.g., a group that required traversal of a CPU socket). In other words, a group that is too expensive may be deemed incompatible with the other groups. For example, such groups may be removed from the group information 136 (see FIG. 1). By way of a non-limiting example, the group generator(s) 122, the hypervisor(s) 120, and/or the virtualization management application 130 may remove any of the groups (and/or not select any groups) that have a group cost that exceeds a cost threshold value.

The group generator(s) 122 may increase a number of compatible groups by ordering the hardware components As shown in Table A, the server 102F may be characterized as including a first switch group for the switch 1220A and a second switch group for the switch 1220B. Similarly, the server 102G may be characterized as including a third switch group for the switch 1220C and a fourth switch group for the switch 1220D.

At block 1306, the group generators 122F and 122G may list any hardware components not connected to a switch (e.g., by one or more second type connections) first within their respective the device lists. All of the hardware components illustrated in FIG. 12 are connected to a switch by one or more second type connections. Therefore, in this example, the device lists are unchanged by block 1306. But, that may not be true for FIG. 10. For example, Table B illustrates the results of block 1306 on two groups obtained from FIG. 10. As can be seen in Table B, the first and second device lists obtained for these two groups are identical after block 1306:

TABLE B

| | First Device List for Server 102C | Second Device List for Server 102C |
|---|---|---|
| Groups Obtained At Block 1302 | GPU 1040A, switch 1020A, GPU 1040B, network interface 1030A, network interface 1030B | switch 1020B, GPU 1040C, network interface 1030C, network interface 1030D, GPU 1040D |
| Device List Obtained At Block 1304 | switch 1020A, GPU 1040B, network interface 1030A, network interface 1030B | switch 1020B, GPU 1040C, network interface 1030C, network interface 1030D |
| Device List Obtained At Block 1306 | GPU 1040A, switch 1020A, GPU 1040B, network interface 1030A, network interface 1030B | GPU 1040D, switch 1020B, GPU 1040C, network interface 1030C, network interface 1030D |

Thus, if the hypervisor(s) 120 and/or the virtualization management application 130 use the device lists obtained at block 1306 to map the hardware components to VMs, those VMs would be compatible with one another.

At block 1308, the group generators 122F and 122G may list any GPUs appearing in any switch group first within its respective switch group. For example, as shown in Table C below, the group generator 122F may list the GPUs 1240D and 1240E first in the second switch group for the switch 1220B.

TABLE C

| Device List for Server 102F | Device List for Server 102G |
|---|---|
| switch 1220A, GPU 1240A, GPU 1240B, GPU 1240C, switch 1220B, GPU 1240D, GPU 1240E, network interface 1230A, network interface 1230B | switch 1220C, GPU 1240F, GPU 1240G, network interface 1230C, network interface 1230D, switch 1220D, GPU 1240H, GPU 1240I, GPU 1240J |

The third connection type may include two or more subtypes. For example, the subtypes may include switched, planar, bridged, and non-linked. At block 1310, the group generators 122F and 122G may sort any GPUs in each switch group into subgroups according to subtype. For example, the third type connections in FIG. 12 are illustrated by dashed double headed arrows and may be of the bridged subtype. Thus, the GPUs 1240B-1240E, 1240F, 1240G, 1240I, and 1240J are classified as being bridged and belonging to a bridged subgroup. Because the GPUs 1240A and 1240H are not connected to third type connections, the GPUs 1240A and 1240H are classified as being non-linked and belonging to a non-linked subgroup. By way of a non-limiting example, GPU(s) classified as being switched (and therefore belonging to a switched subgroup) may be listed before GPU(s) classified as being planar (and therefore belonging to the planar subgroup), which may be listed before GPU(s) classified as being bridged (and therefore belonging to a bridged subgroup). GPU(s) classified as being non-linked (and therefore belonging to the non-linked subgroup) may be listed last. The reordering of block 1310 is illustrated in Table D below.

TABLE D

| Device List for Server 102F | Device List for Server 102G |
|---|---|
| switch 1220A, GPU 1240B, GPU 1240C, GPU 1240A, switch 1220B, GPU 1240D, GPU 1240E, network interface 1230A, network interface 1230B | switch 1220C, GPU 1240F, GPU 1240G, network interface 1230C, network interface 1230D, switch 1220D, GPU 1240I, GPU 1240J, GPU 1240H |

Additionally, hardware components other than GPUs are included in their own subgroup. At block 1312, for each switch group, the group generators 122F and 122G may sort the hardware components in each subgroup by device information (e.g., a vendor identifier, a device identifier, and/or the like). For example, as shown in Table E, this sorting may change the order of the network interface 1230A and 1230B:

TABLE E

| Device List for Server 102F | Device List for Server 102G |
|---|---|
| switch 1220A, GPU 1240B, GPU 1240C, GPU 1240A, switch 1220B, GPU 1240D, | switch 1220C, GPU 1240F, GPU 1240G, network interface 1230C, network interface |

TABLE E-continued

| Device List for Server 102F | Device List for Server 102G |
|---|---|
| GPU 1240E, network interface 1230B, and network interface 1230A | 1230D, switch 1220D, GPU 1240I, GPU 1240J, and GPU 1240H, |

At block 1314, the group generators 122F and 122G may sort the switch groups (e.g., by device information of the hardware components in the switch groups). For example, as shown in Table F, the group generator 122G may move the switch group for the switch 1220D to before the switch group for the switch 1220C:

TABLE F

| Device List for Server 102F | Device List for Server 102G |
|---|---|
| switch 1220A, GPU 1240B, GPU 1240C, GPU 1240A, switch 1220B, GPU 1240D, GPU 1240E, network interface 1230B, and network interface 1230A | switch 1220D, GPU 1240I, GPU 1240J, GPU 1240H, switch 1220C, GPU 1240F, GPU 1240G, network interface 1230C, and network interface 1230D |

At block 1316, the group generators 122F and 122G may reorder the GPUs belonging to the bridged subgroup. For example, the GPUs 1240B-1240E, 1240F, 1240G, 1240I, and 1240I may belong to the bridged subgroup and are each connected to a GPU in a different switch group. At block 1316, the group generators 122F and 122G may move those of the GPUs that belong to the bridged subgroup and are connected to a GPU in a different switch group to the front of the bridged subgroup with the connected GPU positioned in an identical corresponding position in its switch group. The GPUs belonging to the bridged subgroup and connected to a GPU in a different switch group may be sorted by device information. For example, the GPU 1240C is connected to the GPU 1240D in the server 102F. But, in Table F above, the GPU 1240C is in the second position in the first switch group for the switch 1220A and the GPU 1240D is in the first position in the second switch group for the switch 1220B. Thus, the GPUs 1240C and 1240D are not in corresponding positions within the first and second switch groups. Similarly, the GPUs 1240B and 1240E are not in corresponding positions within the first and second switch groups. The group generator 122F may reorder the GPUs 1240B-1240E to produce the ordered device lists shown in Table G below:

TABLE G

| Ordered Device List for Server 102F | Ordered Device List for Server 102G |
|---|---|
| switch 1220A, GPU 1240B, GPU 1240C, GPU 1240A, switch 1220B, GPU 1240E, GPU 1240D, network interface 1230B, and network interface 1230A | switch 1220D, GPU 1240I, GPU 1240J, GPU 1240H, switch 1220C, GPU 1240F, GPU 1240G, network interface 1230C, and network interface 1230D |

At block 1316, the group generators 122F and 122G may move those of the GPUs that belong to the bridged subgroup and are connected to a GPU in the same switch group to be positioned after the GPUs connected to a GPU in a different switch group. Connected pairs of GPUs may be listed sequentially and may be sorted based at least in part on their device information.

At block 1318, the group generators 122F and 122G may remove the switches from the ordered device lists.

TABLE H

| Device List for Server 102F | Device List for Server 102G |
|---|---|
| GPU 1240B, GPU 1240C, GPU 1240A, GPU 1240E, GPU 1240D, network interface 1230B, and network interface 1230A | GPU 1240I, GPU 1240J, GPU 1240H, GPU 1240F, GPU 1240G, network interface 1230C, and network interface 1230D |

At this point, the ordered device list is ordered such that GPUs linked by second type connections appear in corresponding locations within the ordered device lists. For example, the GPU 1240B is substantially identical to the GPU 1240I because they are the same type of GPU and located in equivalent locations within the physical topology of the servers 102F and 102G, respectively. Additionally, the ordered device list is ordered such that identical hardware components below different switches are ordered identically. For example, the hardware components under the switches 1220B and 1220C are ordered identically. Additionally, switch groups including identical hardware components correspond to one another within the ordered device lists. For example, the switch groups for the switches 1220A and 1220B are positioned to correspond with identical switch groups for the switches 1220D and 1220C, respectively. The method 1300 may terminate after block 1318.

In at least one embodiment, the group generator(s) 122 may label the groups such that their compatibility may be determined based on the labels assigned to the groups. For example, groups having the same labels may be compatible. The label and/or ordered device list obtained for each group may be stored locally and/or in the group information 136. Because the group generator(s) 122 identify(ies) many (e.g., all) compatible hardware groups, the hypervisor(s) 120 and/or the virtualization management application 130 has many alternate groups from which to choose. Thus, the group generator(s) 122 may be characterized as maximizing migration possibilities or options.

FIG. 14 illustrates a flow diagram of a method 1400 of generating a label (e.g., a migration class string) that may be used to identify compatible hardware, in accordance with at least one embodiment. The method 1400 may be performed by the group generator(s) 122 (see FIG. 1). For ease of illustration, the method 1400 will be described as being performed by the group generator 122F (see FIG. 1). In first block 1402, the group generator 122F obtains a group of hardware components (e.g., using the method 700 illustrated in FIG. 7). For ease of illustration, the group will be described as including the hardware components of the server 102F illustrated in FIG. 12.

At block 1404 (see FIG. 14), the group generator 122F may generate a first component list (e.g., a string) listing GPU identifiers for the GPUs present in the group obtained in block 1402. The first component list may be ordered based at least in part on device information (e.g., the GPU identifier, a vendor identifier, a device identifier, and/or the like). A first row of Table I below provides an example of a first component list obtained for the group that includes the hardware components of the server 102F illustrated in FIG. 12. The first component list provided in Table I below indicates that the first component list includes GPUs with a code "G:." The first component list also identifies the four identical GPUs 1240B-1240E as four ("4x") GPUs associated with a device identifier "10de20b5" and the GPU 1240A as one GPU associated with a device identifier "10de2235." The first component list may be sorted by the device identifiers.

In block 1406 (see FIG. 14), the group generator 122F may generate a second component list (e.g., a string) listing hardware identifiers for hardware components other than the GPUs present on the server 102F. The second component lists may each be ordered based at least in part on device information. A second row of Table I below provides an example of a second component list obtained for the group that includes the hardware components of the server 102F illustrated in FIG. 12. The second component list provided in Table I below indicates that the second component list includes devices other than GPUs with a code "D:." The network interface 1230B is identified in the second component list as a device associated with a device identifier "15b31021" and the network interface 1230A is identified in the second component list as a device associated with a device identifier "15b3a2dc." The second component list may be sorted by the device identifiers.

At block 1408 (see FIG. 14), the group generator 122F may obtain an ordered device list created for the group. For example, the group generator 122F may obtain the ordered device list created by the method 1300 (see FIG. 13). By way of a non-limiting example, the ordered device list obtained in block 1316 (see FIG. 13) that include the switches 1220A and 1220B (see Table G above and/or a third row of Table I below) may obtained in block 1408.

At block 1410 (see FIG. 14), the group generator 122F may generate a first topology string for any second type connections in the group. The ordered device list may be used to generate hardware identifiers for the hardware components of the group. Referring to a fourth row of Table I below, the four identical GPUs 1240B-1240E (each associated with the device identifier "10de20b5") are identified first in the first component list. Therefore, they are assigned hardware identifiers G0-G3 and the GPU 1240A (associated with the device identifier "10de2235") is assigned the hardware identifier G4. The network interface 1230B (associated with the device identifier "15b31021") is listed before the network interface 1230A (associated with the device identifier "15b3a2dc") in the second component list. Thus, the network interfaces 1230B and 1230A are assigned hardware identifiers D0 and D1, respectively. The switches 1220A and 1220B may be assigned hardware identifiers (e.g., zero-based identifiers) based on an order of appearance of the switches 1220A and 1220B in the ordered device list. For example, the switches 1220A and 1220B may be assigned hardware identifiers S0 and S1, respectively. The group generator 122F generates the first topology string by replacing each hardware component in the ordered device list with the hardware identifiers and adding an identifier for a CPU socket (e.g., "C0:") and/or an identifier for a NUMA node ("N0") at the start of the first topology string.

At block 1412 (see FIG. 14), the group generator 122F may generate a second topology string that encodes any third type connections in the group. By way of a non-limiting example, the group generator 122F may use a method 1500 (see FIG. 15) to obtain the second topology string. A fifth row of Table I below provides an example second topology string obtained for the third type connections of server 102F depicted in FIG. 12.

At block 1414, the group generator 122F may create the label for the group by combining the first component list, the second component list, the first topology string, and the second topology string. For example, the group generator 122F may concatenate the first component list, the second component list, the first topology string, and the second topology string and separate them with an indicator (e.g., ";"). A six row of the Table I provides an example label created for the group. The method 1400 may terminate after block 1414.

TABLE I

| First Component List | G: 4x10de20b5, 10de2235 |
|---|---|
| Second Component List | D: 15b31021,15b3a2dc |
| Ordered Device List including Switches | switch 1220A, GPU 1240B, GPU 1240C, GPU 1240A, switch 1220B, GPU 1240E, |

TABLE I-continued

| | GPU 1240D, network interface 1230B, and network interface 1230A |
|---|---|
| First Topology String | C0: N0-S0-G0-G1-G4-S1-G2-G3-D0-D1 |
| Second Topology String | NLB: G0 + G2, G1 + G3 |
| Label | G: 4x10de20b5, 10de2235; |
| | D: 15b31021, 15b3a2dc; |
| | NLB: G0 + G2, G1 + G3; |
| | C0: N0-S0-G0-G1-G4-S1-G2-G3-D0-D1 |

FIG. 15A illustrates a flow diagram of the method 1500 of determining a portion of a label for a group, in accordance with at least one embodiment. The method 1500 may determine a second topology string for a group and may be performed in block 1412 of the method 1400 (see FIG. 14). FIGS. 15B-15D each illustrate an example group to aid in the understanding of the method 1500. FIG. 15B illustrates a group of hardware components that includes a bridged subtype connection BC between a pair of GPUs G0 and G1, in accordance with at least one embodiment. FIG. 15C illustrates a group of hardware components that includes planar type connections PC between GPUs G0-G3, in accordance with at least one embodiment. FIG. 15D illustrates a group of hardware components that includes switched type connections SC between GPUs G0-G7, in accordance with at least one embodiment.

Before the method 1500 begins, a group has been identified. For ease of illustration, the method 1500 will be described with respect to each of the groups illustrated in FIGS. 15B-15D. The method 1500 may be performed by the group generator(s) 122. For illustrative purposes, the method 1500 will be described as being performed by the group generator 122H. Thus, at least one of the groups illustrated in FIGS. 15B-15D may be characterized as being a component of the server 102H (see FIG. 1).

In first block 1502, the group generator 122H identifies any third type connections in the group. For example, referring to FIG. 15B, the group generator 122H may identify the bridged subtype connection BC. By way of another non-limiting example, referring to FIG. 15C, the group generator 122H may identify the six planar type connections PC. By way of yet another non-limiting example, referring to FIG. 15D, the group generator 122H may identify the switched type connections SC.

At block 1504, the group generator 122H determines the subtype(s) of the third type connections. By way of non-limiting examples, the subtypes may include switched, bridged, and planar. For example, referring to FIG. 15B, the group generator 122H may identify the bridged subtype connection BC as being a bridged subtype connection. By way of another non-limiting example, referring to FIG. 15C, the group generator 122H may identify the six planar type connections PC as being planar subtype connections. By way of yet another non-limiting example, referring to FIG. 15D, the group generator 122H may identify the switched type connections SC as being switched subtype connections.

At block 1506, the group generator 122F generates at least one identifier for each subtype identified in block 1504. By way of non-limiting examples, the group generator 122H may generate a first identifier (e.g., "NLS:") for any third type connection that is switched, a second identifier (e.g., "NLP:") for any third type connection that is planar, and a third identifier (e.g., "NLB:") for any third type connection that is bridged. Thus, for the group generator 122H may generate the third identifier (e.g., "NLB:") for the bridged subtype connection BC, the second identifier (e.g., "NLP:") for the six planar subtype connections PC, and the first identifier (e.g., "NLS:") for the switched subtype connections SC. The group generator 122H may also include an indicator (e.g., an integer) in the second identifier (e.g., "NLP:") that indicates one or more properties of planar subtype connections. Non-limiting examples of the property (ies) include bandwidth (which may equate to a maximum data transfer rate of the link), generation, and/or the like. For example, the indicator may be "1" for any of the planar subtype connections PC that have a first bandwidth and "2" for any of the planar subtype connections PC that have a second bandwidth. Thus, the group generator 122F may generate more than one identifier for each subtype (e.g., identifiers "NLP1:" and "NLP2:").

In block 1508, the group generator 122H may order the GPUs based at least in part on their device information (e.g., a vendor identifier, a device identifier, and/or the like).

At block 1510, the group generator 122H may create a substring for each identifier generated in block 1506 by listing those GPUs associated with the identifier after the identifier (e.g., in order according to the device information). The GPUs may be listed as a range separated by a first indicator (e.g., a "–"). The GPUs may be listed in connected pairs with different pairs separated by a second indicator (e.g., a comma). The GPUs of a pair may be separated by a third indicator (e.g., "+"). For example, referring to FIG. 15B, the group generator 122H may construct a substring (e.g., "NLB:G0+G1") for the third identifier (e.g., "NLB:") by listing GPUs G0 and G1 after the third identifier. When the third type connections are bridged subtype connections, ordering the GPUs by their device information helps ensure that GPUs with different properties (e.g., different generations) will not be associated with identical second topology strings.

By way of another non-limiting example, the group generator 122H may construct a substring (e.g., "NLS:G0-G7") for the first identifier (e.g., "NLS:") by listing GPUs G0-G7 after the first identifier. When the third type connections are switched subtype connections, ordering the GPUs by their device information helps ensure that GPUs with different properties (e.g., different generations) will not be associated with identical second topology strings.

By way of yet another non-limiting example, referring to FIG. 15C, if the GPUs connected to the planar subtype connections PC are substantially similar to one another (e.g., all have one or more of the same properties, such as bandwidth, generation, and/or the like, indicated by the indicator 3), in block 1506, the group generator 122H may have generated a fourth identifier (e.g., "NLP3:") associated with the property(ies) of the planar subtype connections. Then, the group generator 122H may construct a substring (e.g., "NLP3:G0-G3") for the fourth identifier (e.g., "NLP3:") by listing GPUs G0-G3 after the fourth identifier. On the other hand, when the planar subtype connections have different properties (e.g., have different bandwidths, are of different generations, and/or the like), the group generator 122H may generate a substring for each portion with different properties. For example, if a planar subtype connection having a first bandwidth connects the GPU G1 to the GPU G2 and the remainder of the planar subtype connections PC have a different second bandwidth, in block 1506, the group generator 122H may have generated a fifth identifier (e.g., "NLP1:") associated with the property(ies) of the planar subtype connection connecting the GPUs G1 and G2, and a sixth identifier (e.g., "NLP2:") associated with the property(ies) of the other planar subtype connections. In block 1508, the group generator 122H may create a first substring "NLP1:G1+G2" by listing the GPUs G1 and G2 after the fifth identifier (e.g., "NLP1:") and a second sub-string "NLP2:G0+G1, G0+G2, G0+G3, G1+G3,G2+G3" by listing remaining pairs of the GPUs G0-G3 after the sixth identifier (e.g., "NLP2:").

At this point, if, at block 1510, the group generator 122F created only a single substring, that substring is used as the second topology string. On the other hand, if, at block 1510, the group generator 122F created multiple substrings, at optional block 1512, the group generator 122F may sort and combine those substrings. By way of a non-limiting example, the group generator 122F may sort the substrings so that the switched sub string is first followed by the bridged substring. The planar substring may be last. Further, in optional block 1512, the group generator 122H may assemble the planar substring by ordering (e.g., alphanu-merically) the first and second substrings and combining them to create the planar substring "NLP1:G1+G2;NLP2: G0+G1, G0+G2, G0+G3, G1+G3,G2+G3." In this example, the group generator 122H separates the first and second substrings by a fourth indicator (e.g., ";"). Thus, when the planar subtype connections in two different groups have different properties (e.g., have different bandwidths, are of different generations, and/or the like), the second topology strings of the groups will not match, which means the labels generated for the groups using the method 1400 (see FIG. 14) will not match. The method 1500 may terminate after the optional block 1512. In embodiments omitting optional block 1512, the method 1500 may terminate after the block 1510.

For each group, the group generator(s) 122 may create an ordered device list using the method 13 (see FIG. 13) and a label using the method 1400 (see FIG. 14). Together the label and ordered device list may identify the hardware components in the group as well as the relationships between the hardware components. For example, referring to FIG. 2, a group of the GPU 240A and the network interface 230A may be associated with the following label: "G:10de1db1;D:15b31013;C0:N0+S0+G0+D0;." In this example label, the first component list includes "G:10de1db1," the second component list includes "D:15b31013," the first topology string includes "C0:N0+ S0+G0+D0," and the label does not include a second topol-ogy string because there are not third type connections between the GPU 240A and the network interface 230A. After the "G:" in the first component list, a type of each GPU in the group is identified. This label indicates that GPUs (identified by "G:") in the group include a "10de1db1" type GPU, which corresponds to a Tesla V100 GPU. After the "D:" in the second component list, a type of each network interface in the group is identified. This label indicates that network interfaces (identified by "D:") in the group include a "15b31013" type network interface, which corresponds to a ConnectX 4 NIC. The first topology string ("C0:N0+S0+ G0+D0") encodes any second type connections between the hardware components. For example, the first topology string may encode the PCIe relationship between the GPU 240A and the network interface 230A. The first topology string indicates that below a single CPU socket (encoded as "C0") and within a single Non-Uniform Memory Access ("NUMA") node (encoded as "N0") is a switch (encoded as "S0"), a GPU (encoded as "G0"), and a network interface (encoded as "D0"), which correspond to the switch 220A, the GPU 240A, and the network interface 230A, respec-tively. In this example, this group is compatible with any groups (e.g., identified in the group information 136 illus-trated in FIG. 1) having an identical label if the hardware components of this group are mapped to a VM in an order prescribed by the ordered device list associated with the group.

By way of another example, a group of the GPU 240A and the network interfaces 230A and 230B may be associated with the following label: "G:10de1db1;D:2x15b31013;C0: N0+S0+G0+D0+S1+D1;." In this example label, the first component list includes "G:10de1db1," the second compo-nent list includes "D:2x15b31013," the first topology string includes "C0:N0+S0+G0+D0+S1+D1," and the label does not include a second topology string because there are not third type connections between the GPU 240A, the network interface 230A, and the network interface 230B. The first component list indicates that GPUs (identified by "G:") in the group include a "10de1db1" type GPU, which corre-sponds to a Tesla V100 GPU. The second component list indicates that network interfaces (identified by "D:") in the group include two (encoded as "2x") "15b31013" type net-work interfaces, which correspond to ConnectX 4 NICs. The first topology string ("C0:N0+S0+G0+D0+S1+D1") encodes the relationships between the hardware components and indicates that below a single CPU socket (encoded as "C0") and within a single NUMA node (encoded as "N0") is a first switch (encoded as "S0"), a GPU (encoded as "G0"), a first network interface (encoded as "D0"), a second switch (encoded as "S1"), and a second network interface (encoded as "D1"), which correspond to the switch 220A, the GPU 240A, the network interface 230A, the switch 220B, and the network interface 230B, respectively. In this example, this group is compatible with any groups (e.g., identified in the group information 136 illustrated in FIG. 1) having an identical label if the hardware components of this group are mapped to a VM in an order prescribed by the ordered device list associated with the group.

By way of yet another example, a group of the GPUs 240A and 240B may be associated with the following label: "G:2x10de1db1;NLP1:G0+G1;C0:N0+S0+G0+G1;." In this example label, the first component list includes "G:2x10de1db1," the first topology string includes "C0:N0+ S0+G0+G1," and the second topology string includes "NLP1:G0+G1." The label omits a second component list because the group includes only the GPUs 240A and 240B, which are listed in the first component list.

The first component list indicates that GPUs (identified by "G:") in the group include two (encoded as "2x") "10de1db1" type GPUs, which corresponds to Tesla V100 GPUs. The second topology string indicates a planar subtype connection (encoded as "NLP1") between the pair of GPUs. The "NLP1" may indicate one or more properties (e.g., band-width) of the planar subtype connection. For example, the "1" may indicate bandwidth and/or a generation of the connection. The first topology string ("C0:N0+S0+G0+G1") indicates that below a single CPU socket (encoded as "C0") and within a single NUMA node (encoded as "N0") is a first switch (encoded as "S0"), a first GPU (encoded as "G0"), and a second GPU (encoded as "G1"), which correspond to the switch 220A, the GPU 240A, and the GPU 240B, respectively. In this example, this group is compatible with any groups (e.g., identified in the group information 136 illustrated in FIG. 1) having an identical label if the hard-ware components of this group are mapped to a VM in an order prescribed by the ordered device list associated with the group.

FIG. 16 illustrates a flow diagram of the method of migrating a workload from a first VM to a different second VM, in accordance with at least one embodiment. The method 1600 may be performed by any of the hypervisor(s)

120 and/or the virtualization management application 130. In a first example, the method 1600 will be described as migrating a workload from a first group of the hardware components of the server 102F to a second group of the hardware components of the server 102G. In this first example, the method 1600 will be described as being performed by the hypervisors 102F and 102G and virtualization management application 130.

Before first block 1602, the hypervisor 120F creates a first VM using a first group of the hardware components of the server 102F and starts performance of the workload using the first VM. For example, the hypervisor 120F may perform blocks 802-808 of the method 800 illustrated in FIG. 8. Referring to FIG. 12, the hypervisor 120F may have identified the first group using the group information 136 (see FIG. 1) and/or the virtualization management application 130 may have instructed the hypervisor 120F to use the first group. The hypervisor 120F obtains (e.g., from the virtualization management application 130 and/or the group information 136) the label associated with the first group. By way of a non-limiting example, the hypervisor 120F may obtain the label from group information stored locally by the group generator 122F. By way of a non-limiting example, the label may be "G:4x10de20b5,10de2235; D:15b31021,15b3a2dc; NLB:G0+G2, G1+G3; C0:N0-S0-G0-G1-G4-S1-G2-G3-D0-D1."

At first block 1602, the virtualization management application 130 obtains a second group with a label that matches the label of the first group. For example, the virtualization management application 130 may identify the second group, which includes hardware components of the server 102G illustrated in FIG. 12, and instruct the hypervisor 120F that the workload is being migrated to the second group.

At block 1604, the hypervisor 120F, the hypervisor 120G, and/or the virtualization management application 130 may mark the hardware components of the second group as being unavailable.

At block 1606, the hypervisor 120G obtains the ordered device list for the second group. At block 1608, the hypervisor 120G creates the new second VM using the ordered device list to map the hardware components of the second group to the VM.

At block 1610, the hypervisor 120F suspends performance of the workload by the first VM before the workload is completed. The hypervisor 120F stores state information related to the first VM after the workload has been suspended. By way of a non-limiting example, the virtualization management application 130 may have instructed the hypervisor 120F to suspend performance of the workload and/or to save the state information.

At block 1612, the hypervisor 120G loads the state information obtained from the first VM into the second VM. The hypervisor 120F may provide the state information to the hypervisor 120G and/or the virtualization management application 130. The virtualization management application 130 may provide the state information to the hypervisor 120G. Then, at block 1614, the hypervisor 120G resumes performance of the workload using the new second VM.

At block 1616, the hypervisor 120F, the hypervisor 120G, and/or the virtualization management application 130 may mark the hardware components of the first group as being available. The method 1600 may terminate after block 1616.

In a second example, the method 1600 may be used to migrate a workload from a first group of the hardware components of the server 102C (see FIG. 10) to a second group of the hardware components of the server 102C. In this second example, the method 1600 will be described as being performed by the hypervisor 120C and/or the virtualization management application 130. Before first block 1602, the hypervisor 120C creates a first VM using a first group of the hardware components of the server 102C and starts performance of the workload using the first VM. For example, the hypervisor 120C may perform blocks 802-808 of the method 800 illustrated in FIG. 8. By way of a non-limiting example, referring to FIG. 10, the first group may include the GPU 1040A, the GPU 1040B, the network interface 1030A, and the network interface 1030B. The hypervisor 120C may have identified the first group using the group information 136 (see FIG. 1) and/or the virtualization management application 130 may have instructed the hypervisor 120C to use the first group. The hypervisor 120C obtains (e.g., from the virtualization management application 130 and/or the group information 136) the label associated with the first group. By way of a non-limiting example, the hypervisor 120C may obtain the label from group information stored locally by the group generator 122C.

At block 1602, the hypervisor 120C and/or the virtualization management application 130 obtains a second group with a label that matches the label of the first group. For example, the hypervisor 120C may identify, as the second group, the GPU 1040C, the network interface 1030C, the network interface 1030D, and the GPU 1040D.

At block 1604, the hypervisor 120C and/or the virtualization management application 130 may mark the hardware components of the second group as being unavailable.

At block 1606, the hypervisor 120C obtains the ordered device list for the second group. At block 1608, the hypervisor 120C creates the new second VM using the ordered device list to map the hardware components of the second group to the VM.

At block 1610, the hypervisor 120C suspends performance of the workload by the first VM before the workload is completed and stores state information related to the first VM after the workload has been suspended. By way of a non-limiting example, the virtualization management application 130 may have instructed the hypervisor 120C to suspend performance of the workload and/or to save the state information.

At block 1612, the hypervisor 120C loads the state information obtained from the first VM into the second VM. Then, at block 1614, the hypervisor 120C resumes performance of the workload using the new second VM.

At block 1616, the hypervisor 120C and/or the virtualization management application 130 may mark the hardware components of the first group as being available. The method 1600 may terminate after block 1616.

The system 100 may implement other functionality (such as checkpointing) that is similar to suspend, resume, and migrate functionality instead of or in addition to the suspend, resume, and migrate functionality.

The systems and methods described herein may be used by, without limitation, non-autonomous vehicles, semi-autonomous vehicles (e.g., in one or more adaptive driver assistance systems ("ADAS")), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. The systems and methods described herein may be used in augmented reality, virtual reality, mixed reality, robotics, security and surveillance, autonomous or semi-autonomous machine applications, and/or any other technology spaces where hardware components are assigned to workloads and/or workloads are migrated from one group of hardware components to another.

The systems and methods described herein may be used by, without limitation, non-autonomous vehicles, semi-autonomous vehicles (e.g., in one or more ADAS), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing, web-hosted services or web-hosted platforms, and/or any other suitable applications.

Disclosed embodiments may be included in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more VMs, systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, systems for implementing web-hosted services (e.g., for program optimization at runtime) or web-hosted platforms (e.g., integrated development environments that include program optimization as a service), as an application programming interface ("API") between two or more separate applications or systems, and/or other types of systems.

Servers and Data Centers

The following figures set forth, without limitation, exemplary network server and data center based systems that can be used to implement at least one embodiment.

FIG. 17 illustrates a distributed system 1700, in accordance with at least one embodiment. In at least one embodiment, distributed system 1700 includes one or more client computing devices 1702, 1704, 1706, and 1708, which are configured to execute and operate a client application such as a web browser, proprietary client, and/or variations thereof over one or more network(s) 1710. In at least one embodiment, server 1712 may be communicatively coupled with remote client computing devices 1702, 1704, 1706, and 1708 via network 1710.

In at least one embodiment, server 1712 may be adapted to run one or more services or software applications such as services and applications that may manage session activity of single sign-on (SSO) access across multiple data centers. In at least one embodiment, server 1712 may also provide other services or software applications can include non-virtual and virtual environments. In at least one embodiment, these services may be offered as web-based or cloud services or under a Software as a Service (SaaS) model to users of client computing devices 1702, 1704, 1706, and/or 1708. In at least one embodiment, users operating client computing devices 1702, 1704, 1706, and/or 1708 may in turn utilize one or more client applications to interact with server 1712 to utilize services provided by these components.

In at least one embodiment, software components 1718, 1720 and 1722 of system 1700 are implemented on server 1712. In at least one embodiment, one or more components of system 1700 and/or services provided by these components may also be implemented by one or more of client computing devices 1702, 1704, 1706, and/or 1708. In at least one embodiment, users operating client computing devices may then utilize one or more client applications to use services provided by these components. In at least one embodiment, these components may be implemented in hardware, firmware, software, or combinations thereof. It should be appreciated that various different system configurations are possible, which may be different from distributed system 1700. The embodiment shown in FIG. 17 is thus one example of a distributed system for implementing an embodiment system and is not intended to be limiting.

In at least one embodiment, client computing devices 1702, 1704, 1706, and/or 1708 may include various types of computing systems. In at least one embodiment, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and/or variations thereof. In at least one embodiment, devices may support various applications such as various Internet-related apps, e-mail, short message service (SMS) applications, and may use various other communication protocols. In at least one embodiment, client computing devices may also include general purpose personal computers including, by way of example, personal computers and/or laptop computers running various versions of Microsoft Windows®, Apple Macintosh®, and/or Linux operating systems. In at least one embodiment, client computing devices can be workstation computers running any of a variety of commercially-available UNIX® or UNIX-like operating systems, including without limitation a variety of GNU/Linux operating systems, such as Google Chrome OS. In at least one embodiment, client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 1710. Although distributed system 1700 in FIG. 17 is shown with four client computing devices, any number of client computing devices may be supported. Other devices, such as devices with sensors, etc., may interact with server 1712.

In at least one embodiment, network(s) 1710 in distributed system 1700 may be any type of network that can support data communications using any of a variety of available protocols, including without limitation TCP/IP (transmission control protocol/Internet protocol), SNA (systems network architecture), IPX (Internet packet exchange), AppleTalk, and/or variations thereof. In at least one embodiment, network(s) 1710 can be a local area network (LAN), networks based on Ethernet, Token-Ring, a wide-area network, Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

In at least one embodiment, server 1712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In at least one embodiment, server 1712 can include one or more virtual machines running virtual operating systems, or other computing architectures involving virtualization. In at least one embodiment, one or more flexible pools of logical storage devices can be virtualized to maintain virtual storage devices for a server. In at least one embodiment, virtual networks can be controlled by server 1712 using software defined networking. In at least one embodiment, server 1712 may be adapted to run one or more services or software applications.

In at least one embodiment, server 1712 may run any operating system, as well as any commercially available server operating system. In at least one embodiment, server 1712 may also run any of a variety of additional server applications and/or mid-tier applications, including HTTP (hypertext transport protocol) servers, FTP (file transfer protocol) servers, CGI (common gateway interface) servers, JAVA® servers, database servers, and/or variations thereof. In at least one embodiment, exemplary database servers include without limitation those commercially available from Oracle, Microsoft, Sybase, IBM (International Business Machines), and/or variations thereof.

In at least one embodiment, server 1712 may include one or more applications to analyze and consolidate data feeds and/or event updates received from users of client computing devices 1702, 1704, 1706, and 1708. In at least one embodiment, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and/or variations thereof. In at least one embodiment, server 1712 may also include one or more applications to display data feeds and/or real-time events via one or more display devices of client computing devices 1702, 1704, 1706, and 1708.

In at least one embodiment, distributed system 1700 may also include one or more databases 1714 and 1716. In at least one embodiment, databases may provide a mechanism for storing information such as user interactions information, usage patterns information, adaptation rules information, and other information. In at least one embodiment, databases 1714 and 1716 may reside in a variety of locations. In at least one embodiment, one or more of databases 1714 and 1716 may reside on a non-transitory storage medium local to (and/or resident in) server 1712. In at least one embodiment, databases 1714 and 1716 may be remote from server 1712 and in communication with server 1712 via a network-based or dedicated connection. In at least one embodiment, databases 1714 and 1716 may reside in a storage-area network (SAN). In at least one embodiment, any necessary files for performing functions attributed to server 1712 may be stored locally on server 1712 and/or remotely, as appropriate. In at least one embodiment, databases 1714 and 1716 may include relational databases, such as databases that are adapted to store, update, and retrieve data in response to SQL-formatted commands.

In at least one embodiment, the server 1712 may be used to implement at least one of server(s) 102 (see FIG. 1) and/or the computing system 132 (see FIG. 1). In at least one embodiment, the network(s) 1710 may be used to implement at least a portion of the external network 110, and/or the client computing devices 1702, 1704, 1706, and/or 1708 may be used to implement at least one of the external computing device(s) 112. In at least one embodiment, at least a portion of the system(s) depicted in FIG. 17 is used to implement one or more systems, techniques, functions, and/or processes described in connection with FIGS. 1-16. For example, in at least one embodiment, at least one component shown or described with respect to FIG. 17 is used to create hardware component groups on which virtual machines may be executed and/or to which virtual machine states may be migrated in accordance with one or more techniques, functions, and/or processes described with respect to any of FIGS. 1-16.

FIG. 18 illustrates an exemplary data center 1800, in accordance with at least one embodiment. In at least one embodiment, data center 1800 includes, without limitation, a data center infrastructure layer 1810, a framework layer 1820, a software layer 1830 and an application layer 1840.

In at least one embodiment, as shown in FIG. 18, data center infrastructure layer 1810 may include a resource orchestrator 1812, grouped computing resources 1814, and node computing resources ("node C.R.s") 1816(1)-1816(N), where "N" represents any whole, positive integer. In at least one embodiment, node C.R.s 1816(1)-1816(N) may include, but are not limited to, any number of central processing units ("CPUs") or other processors (including accelerators, field programmable gate arrays ("FPGAs"), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1816(1)-1816(N) may be a server having one or more of above-mentioned computing resources.

In at least one embodiment, grouped computing resources 1814 may include separate groupings of node C.R.s housed within one or more racks (not shown), or many racks housed in data centers at various geographical locations (also not shown). Separate groupings of node C.R.s within grouped computing resources 1814 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1812 may configure or otherwise control one or more node C.R.s 1816(1)-1816(N) and/or grouped computing resources 1814. In at least one embodiment, resource orchestrator 1812 may include a software design infrastructure ("SDI") management entity for data center 1800. In at least one embodiment, resource orchestrator 1812 may include hardware, software or some combination thereof.

In at least one embodiment, as shown in FIG. 18, framework layer 1820 includes, without limitation, a job scheduler 1832, a configuration manager 1834, a resource manager 1836 and a distributed file system 1838. In at least one embodiment, framework layer 1820 may include a framework to support software 1852 of software layer 1830 and/or one or more application(s) 1842 of application layer 1840. In at least one embodiment, software 1852 or application(s) 1842 may respectively include web-based service software or applications, such as those provided by Amazon Web Services, Google Cloud and Microsoft Azure. In at least one embodiment, framework layer 1820 may be, but is not limited to, a type of free and open-source software web application framework such as Apache Spark™ (hereinafter "Spark") that may utilize distributed file system 1838 for large-scale data processing (e.g., "big data"). In at least one embodiment, job scheduler 1832 may include a Spark driver to facilitate scheduling of workloads supported by various layers of data center 1800. In at least one embodiment, configuration manager 1834 may be capable of configuring different layers such as software layer 1830 and framework layer 1820, including Spark and distributed file system 1838 for supporting large-scale data processing. In at least one embodiment, resource manager 1836 may be capable of managing clustered or grouped computing resources mapped to or allocated for support of distributed file system 1838 and job scheduler 1832. In at least one embodiment, clustered or grouped computing resources may include grouped computing resource 1814 at data center infrastructure layer 1810. In at least one embodiment, resource manager 1836 may coordinate with resource orchestrator 1812 to manage these mapped or allocated computing resources.

In at least one embodiment, software 1852 included in software layer 1830 may include software used by at least portions of node C.R.s 1816(1)-1816(N), grouped computing resources 1814, and/or distributed file system 1838 of framework layer 1820. One or more types of software may include, but are not limited to, Internet web page search software, e-mail virus scan software, database software, and streaming video content software.

In at least one embodiment, application(s) 1842 included in application layer 1840 may include one or more types of applications used by at least portions of node C.R.s 1816 (1)-1816(N), grouped computing resources 1814, and/or distributed file system 1838 of framework layer 1820. In at least one or more types of applications may include, without limitation, CUDA applications, 5G network applications, artificial intelligence application, data center applications, and/or variations thereof.

In at least one embodiment, any of configuration manager 1834, resource manager 1836, and resource orchestrator 1812 may implement any number and type of self-modifying actions based on any amount and type of data acquired in any technically feasible fashion. In at least one embodiment, self-modifying actions may relieve a data center operator of data center 1800 from making possibly bad configuration decisions and possibly avoiding underutilized and/or poor performing portions of a data center.

In at least one embodiment, the data center 1800 may be used to implement the data center 104 (see FIG. 1) of the system 100 (see FIG. 1) and/or the grouped computing resources 1814 and/or one or more of the node C.R.s 1816(1)-1816(N) may be used to implement the server(s) 102 (see FIG. 1) and/or the computing system 132 (see FIG. 1). In at least one embodiment, at least a portion of the system(s) depicted in FIG. 18 is used to implement one or more systems, techniques, functions, and/or processes described in connection with FIGS. 1-16.

For example, in at least one embodiment, at least one component shown or described with respect to FIG. 18 is used to create hardware component groups on which virtual machines may be executed and/or to which virtual machine states may be migrated in accordance with one or more techniques, functions, and/or processes described with respect to any of FIGS. 1-16.

FIG. 19 illustrates a client-server network 1904 formed by a plurality of network server computers 1902 which are interlinked, in accordance with at least one embodiment. In at least one embodiment, in a system 1900, each network server computer 1902 stores data accessible to other network server computers 1902 and to client computers 1906 and networks 1908 which link into a wide area network 1904. In at least one embodiment, configuration of a client-server network 1904 may change over time as client computers 1906 and one or more networks 1908 connect and disconnect from a network 1904, and as one or more trunk line server computers 1902 are added or removed from a network 1904. In at least one embodiment, when a client computer 1906 and a network 1908 are connected with network server computers 1902, client-server network includes such client computer 1906 and network 1908. In at least one embodiment, the term computer includes any device or machine capable of accepting data, applying prescribed processes to data, and supplying results of processes.

In at least one embodiment, client-server network 1904 stores information which is accessible to network server computers 1902, remote networks 1908 and client computers 1906. In at least one embodiment, network server computers 1902 are formed by main frame computers minicomputers, and/or microcomputers having one or more processors each. In at least one embodiment, server computers 1902 are linked together by wired and/or wireless transfer media, such as conductive wire, fiber optic cable, and/or microwave transmission media, satellite transmission media or other conductive, optic or electromagnetic wave transmission media. In at least one embodiment, client computers 1906 access a network server computer 1902 by a similar wired or a wireless transfer medium. In at least one embodiment, a client computer 1906 may link into a client-server network 1904 using a modem and a standard telephone communication network. In at least one embodiment, alternative carrier systems such as cable and satellite communication systems also may be used to link into client-server network 1904. In at least one embodiment, other private or time-shared carrier systems may be used. In at least one embodiment, network 1904 is a global information network, such as the Internet. In at least one embodiment, network is a private intranet using similar protocols as the Internet, but with added security measures and restricted access controls. In at least one embodiment, network 1904 is a private, or semi-private network using proprietary communication protocols.

In at least one embodiment, client computer 1906 is any end user computer, and may also be a mainframe computer, mini-computer or microcomputer having one or more microprocessors. In at least one embodiment, server computer 1902 may at times function as a client computer accessing another server computer 1902. In at least one embodiment, remote network 1908 may be a local area network, a network added into a wide area network through an independent service provider (ISP) for the Internet, or another group of computers interconnected by wired or wireless transfer media having a configuration which is either fixed or changing over time. In at least one embodiment, client computers 1906 may link into and access a network 1904 independently or through a remote network 1908.

In at least one embodiment, the system 1900 may be used to implement the system 100 (see FIG. 1), the client-server network 1904 may be used to implement the internal network 106, and/or the plurality of network server computers 1902 may be used to implement one or more of the server(s) 102 (see FIG. 1) and/or the computing system 132 (see FIG. 1). In at least one embodiment, the network(s) 1908 may be used to implement at least a portion of the external network 110 and/or the client computers 1906 may be used to implement at least one of the external computing device(s) 112. In at least one embodiment, at least a portion of the system(s) depicted in FIG. 19 is used to implement one or more systems, techniques, functions, and/or processes described in connection with FIGS. 1-16. For example, in at least one embodiment, at least one component shown or described with respect to FIG. 19 is used to create hardware component groups on which virtual machines may be executed and/or to which virtual machine states may be migrated in accordance with one or more techniques, functions, and/or processes described with respect to any of FIGS. 1-16.

FIG. 20 illustrates an example system 2000 that includes a computer network 2008 connecting one or more computing machines, in accordance with at least one embodiment. In at least one embodiment, network 2008 may be any type of electronically connected group of computers including, for instance, the following networks: Internet, Intranet, Local Area Networks (LAN), Wide Area Networks (WAN) or an interconnected combination of these network types. In at least one embodiment, connectivity within a network 2008 may be a remote modem, Ethernet (IEEE 802.3), Token Ring (IEEE 802.5), Fiber Distributed Datalink Interface (FDDI), Asynchronous Transfer Mode (ATM), or any other communication protocol. In at least one embodiment, computing devices linked to a network may be desktop, server, portable, handheld, set-top box, personal digital assistant (PDA), a terminal, or any other desired type or configuration. In at least one embodiment, depending on their functionality, network connected devices may vary widely in processing power, internal memory, and other performance aspects. In at least one embodiment, communications within a network and to or from computing devices connected to a network may be either wired or wireless. In at least one embodiment, network 2008 may include, at least in part, the world-wide public Internet which generally connects a plurality of users in accordance with a client-server model in accordance with a transmission control protocol/internet protocol (TCP/IP) specification. In at least one embodiment, client-server network is a dominant model for communicating between two computers. In at least one embodiment, a client computer ("client") issues one or more commands to a server computer ("server"). In at least one embodiment, server fulfills client commands by accessing available network resources and returning information to a client pursuant to client commands. In at least one embodiment, client computer systems and network resources resident on network servers are assigned a network address for identification during communications between elements of a network. In at least one embodiment, communications from other network connected systems to servers will include a network address of a relevant server/network resource as part of communication so that an appropriate destination of a data/request is identified as a recipient. In at least one embodiment, when a network 2008 includes the global Internet, a network address is an IP address in a TCP/IP format which may, at least in part, route data to an e-mail account, a website, or other Internet tool resident on a server. In at least one embodiment, information and services which are resident on network servers may be available to a web browser of a client computer through a domain name (e.g. www.site.com) which maps to an IP address of a network server.

In at least one embodiment, a plurality of clients 2002, 2004, and 2006 are connected to a network 2008 via respective communication links. In at least one embodiment, each of these clients may access a network 2008 via any desired form of communication, such as via a dial-up modem connection, cable link, a digital subscriber line (DSL), wireless or satellite link, or any other form of communication. In at least one embodiment, each client may communicate using any machine that is compatible with a network 2008, such as a personal computer (PC), work station, dedicated terminal, personal data assistant (PDA), or other similar equipment. In at least one embodiment, clients 2002, 2004, and 2006 may or may not be located in a same geographical area.

In at least one embodiment, a plurality of servers 2010, 2012, and 2014 are connected to a network 2008 to serve clients that are in communication with a network 2008. In at least one embodiment, each server is typically a powerful computer or device that manages network resources and responds to client commands. In at least one embodiment, servers include computer readable data storage media such as hard disk drives and RAM memory that store program instructions and data. In at least one embodiment, servers 2010, 2012, 2014 run application programs that respond to client commands. In at least one embodiment, server 2010 may run a web server application for responding to client requests for HTML, pages and may also run a mail server application for receiving and routing electronic mail. In at least one embodiment, other application programs, such as an FTP server or a media server for streaming audio/video data to clients may also be running on a server 2010. In at least one embodiment, different servers may be dedicated to performing different tasks. In at least one embodiment, server 2010 may be a dedicated web server that manages resources relating to web sites for various users, whereas a server 2012 may be dedicated to provide electronic mail (email) management. In at least one embodiment, other servers may be dedicated for media (audio, video, etc.), file transfer protocol (FTP), or a combination of any two or more services that are typically available or provided over a network. In at least one embodiment, each server may be in a location that is the same as or different from that of other servers. In at least one embodiment, there may be multiple servers that perform mirrored tasks for users, thereby relieving congestion or minimizing traffic directed to and from a single server. In at least one embodiment, servers 2010, 2012, 2014 are under control of a web hosting provider in a business of maintaining and delivering third party content over a network 2008.

In at least one embodiment, web hosting providers deliver services to two different types of clients. In at least one embodiment, one type, which may be referred to as a browser, requests content from servers 2010, 2012, 2014 such as web pages, email messages, video clips, etc. In at least one embodiment, a second type, which may be referred to as a user, hires a web hosting provider to maintain a network resource such as a web site, and to make it available to browsers. In at least one embodiment, users contract with a web hosting provider to make memory space, processor capacity, and communication bandwidth available for their desired network resource in accordance with an amount of server resources a user desires to utilize.

In at least one embodiment, in order for a web hosting provider to provide services for both of these clients, application programs which manage a network resources hosted by servers must be properly configured. In at least one embodiment, program configuration process involves defining a set of parameters which control, at least in part, an application program's response to browser requests and which also define, at least in part, a server resources available to a particular user.

In one embodiment, an intranet server 2016 is in communication with a network 2008 via a communication link. In at least one embodiment, intranet server 2016 is in communication with a server manager 2018. In at least one embodiment, server manager 2018 includes a database of an application program configuration parameters which are being utilized in servers 2010, 2012, 2014. In at least one embodiment, users modify a database 2020 via an intranet 2016, and a server manager 2018 interacts with servers 2010, 2012, 2014 to modify application program parameters so that they match a content of a database. In at least one embodiment, a user logs onto an intranet server 2016 by connecting to an intranet 2016 via computer 2002 and entering authentication information, such as a username and password.

In at least one embodiment, when a user wishes to sign up for new service or modify an existing service, an intranet server 2016 authenticates a user and provides a user with an interactive screen display/control panel that allows a user to access configuration parameters for a particular application program. In at least one embodiment, a user is presented with a number of modifiable text boxes that describe aspects of a configuration of a user's web site or other network resource. In at least one embodiment, if a user desires to increase memory space reserved on a server for its web site, a user is provided with a field in which a user specifies a desired memory space. In at least one embodiment, in response to receiving this information, an intranet server 2016 updates a database 2020. In at least one embodiment, server manager 2018 forwards this information to an appropriate server, and a new parameter is used during application program operation. In at least one embodiment, an intranet server 2016 is configured to provide users with access to configuration parameters of hosted network resources (e.g., web pages, email, FTP sites, media sites, etc.), for which a user has contracted with a web hosting service provider.

In at least one embodiment, the system 2000 may be used to implement the system 100 (see FIG. 1), and/or at least one of the servers 2010, 2012, 2014 may be used to implement one or more of the server(s) 102 (see FIG. 1) and/or the computing system 132 (see FIG. 1). In at least one embodiment, the network(s) 2008 may be used to implement at least a portion of the external network 110, and/or one or more of the clients 2002, 2004, and 2006 may be used to implement at least one of the external computing device(s) 112. Alternatively or additionally, the intranet server 2016 and/or the server manager 2018 may be used to implement the internal network 106 (see FIG. 1), or more of the server(s) 102 (see FIG. 1) and/or the computing system 132 (see FIG. 1). In at least one embodiment, at least a portion of the system(s) depicted in FIG. 20 is used to implement one or more systems, techniques, functions, and/or processes described in connection with FIGS. 1-16. For example, in at least one embodiment, at least one component shown or described with respect to FIG. 20 is used to create hardware component groups on which virtual machines may be executed and/or to which virtual machine states may be migrated in accordance with one or more techniques, functions, and/or processes described with respect to any of FIGS. 1-16.

FIG. 21A illustrates a networked computer system 2100A, in accordance with at least one embodiment. In at least one embodiment, networked computer system 2100A includes a plurality of nodes or personal computers ("PCs") 2102, 2118, 2120. In at least one embodiment, personal computer or node 2102 includes a processor 2114, memory 2116, video camera 2104, microphone 2106, mouse 2108, speakers 2110, and monitor 2112. In at least one embodiment, PCs 2102, 2118, 2120 may each run one or more desktop servers of an internal network within a given company, for instance, or may be servers of a general network not limited to a specific environment. In at least one embodiment, there is one server per PC node of a network, so that each PC node of a network represents a particular network server, having a particular network URL address. In at least one embodiment, each server defaults to a default web page for that server's user, which may itself contain embedded URLs pointing to further subpages of that user on that server, or to other servers or pages on other servers on a network.

In at least one embodiment, nodes 2102, 2118, 2120 and other nodes of a network are interconnected via medium 2122. In at least one embodiment, medium 2122 may be, a communication channel such as an Integrated Services Digital Network ("ISDN"). In at least one embodiment, various nodes of a networked computer system may be connected through a variety of communication media, including local area networks ("LANs"), plain-old telephone lines ("POTS"), sometimes referred to as public switched telephone networks ("PSTN"), and/or variations thereof. In at least one embodiment, various nodes of a network may also constitute computer system users inter-connected via a network such as the Internet. In at least one embodiment, each server on a network (running from a particular node of a network at a given instance) has a unique address or identification within a network, which may be specifiable in terms of an URL.

In at least one embodiment, a plurality of multi-point conferencing units ("MCUs") may thus be utilized to transmit data to and from various nodes or "endpoints" of a conferencing system. In at least one embodiment, nodes and/or MCUs may be interconnected via an ISDN link or through a local area network ("LAN"), in addition to various other communications media such as nodes connected through the Internet. In at least one embodiment, nodes of a conferencing system may, in general, be connected directly to a communications medium such as a LAN or through an MCU, and that a conferencing system may include other nodes or elements such as routers, servers, and/or variations thereof.

In at least one embodiment, processor 2114 is a general-purpose programmable processor. In at least one embodiment, processors of nodes of networked computer system 2100A may also be special-purpose video processors. In at least one embodiment, various peripherals and components of a node such as those of node 2102 may vary from those of other nodes. In at least one embodiment, node 2118 and node 2120 may be configured identically to or differently than node 2102. In at least one embodiment, a node may be implemented on any suitable computer system in addition to PC systems.

FIG. 21B illustrates a networked computer system 2100B, in accordance with at least one embodiment. In at least one embodiment, system 2100B illustrates a network such as LAN 2124, which may be used to interconnect a variety of nodes that may communicate with each other. In at least one embodiment, attached to LAN 2124 are a plurality of nodes such as PC nodes 2126, 2128, 2130. In at least one embodiment, a node may also be connected to the LAN via a network server or other means. In at least one embodiment, system 2100B includes other types of nodes or elements, for example including routers, servers, and nodes.

FIG. 21C illustrates a networked computer system 2100C, in accordance with at least one embodiment. In at least one embodiment, system 2100C illustrates a WWW system having communications across a backbone communications network such as Internet 2132, which may be used to interconnect a variety of nodes of a network. In at least one embodiment, WWW is a set of protocols operating on top of the Internet, and allows a graphical interface system to operate thereon for accessing information through the Internet. In at least one embodiment, attached to Internet 2132 in WWW are a plurality of nodes such as PCs 2140, 2142, 2144. In at least one embodiment, a node is interfaced to other nodes of WWW through a WWW HTTP server such as servers 2134, 2136. In at least one embodiment, PC 2144 may be a PC forming a node of network 2132 and itself running its server 2136, although PC 2144 and server 2136 are illustrated separately in FIG. 21C for illustrative purposes.

In at least one embodiment, WWW is a distributed type of application, characterized by WWW HTTP, WWW's protocol, which runs on top of the Internet's transmission control protocol/Internet protocol ("TCP/IP"). In at least one embodiment, WWW may thus be characterized by a set of protocols (i.e., HTTP) running on the Internet as its "backbone."

In at least one embodiment, a web browser is an application running on a node of a network that, in WWW-compatible type network systems, allows users of a particular server or node to view such information and thus allows a user to search graphical and text-based files that are linked together using hypertext links that are embedded in documents or files available from servers on a network that understand HTTP. In at least one embodiment, when a given web page of a first server associated with a first node is retrieved by a user using another server on a network such as the Internet, a document retrieved may have various hypertext links embedded therein and a local copy of a page is created local to a retrieving user. In at least one embodiment, when a user clicks on a hypertext link, locally-stored information related to a selected hypertext link is typically sufficient to allow a user's machine to open a connection across the Internet to a server indicated by a hypertext link.

In at least one embodiment, more than one user may be coupled to each HTTP server, for example through a LAN such as LAN 2138 as illustrated with respect to WWW HTTP server 2134. In at least one embodiment, system 2100C may also include other types of nodes or elements. In at least one embodiment, a WWW HTTP server is an application running on a machine, such as a PC. In at least one embodiment, each user may be considered to have a unique "server," as illustrated with respect to PC 2144. In at least one embodiment, a server may be considered to be a server such as WWW HTTP server 2134, which provides access to a network for a LAN or plurality of nodes or plurality of LANs. In at least one embodiment, there are a plurality of users, each having a desktop PC or node of a network, each desktop PC potentially establishing a server for a user thereof. In at least one embodiment, each server is associated with a particular network address or URL, which, when accessed, provides a default web page for that user. In at least one embodiment, a web page may contain further links (embedded URLs) pointing to further subpages of that user on that server, or to other servers on a network or to pages on other servers on a network.

Cloud Computing and Services

The following figures set forth, without limitation, exemplary cloud-based systems that can be used to implement at least one embodiment.

In at least one embodiment, cloud computing is a style of computing in which dynamically scalable and often virtualized resources are provided as a service over the Internet. In at least one embodiment, users need not have knowledge of, expertise in, or control over technology infrastructure, which can be referred to as "in the cloud," that supports them. In at least one embodiment, cloud computing incorporates infrastructure as a service, platform as a service, software as a service, and other variations that have a common theme of reliance on the Internet for satisfying computing needs of users. In at least one embodiment, a typical cloud deployment, such as in a private cloud (e.g., enterprise network), or a data center (DC) in a public cloud (e.g., Internet) can consist of thousands of servers (or alternatively, VMs), hundreds of Ethernet, Fiber Channel or Fiber Channel over Ethernet (FCoE) ports, switching and storage infrastructure, etc. In at least one embodiment, cloud can also consist of network services infrastructure like IPsec VPN hubs, firewalls, load balancers, wide area network (WAN) optimizers etc. In at least one embodiment, remote subscribers can access cloud applications and services securely by connecting via a VPN tunnel, such as an IPsec VPN tunnel.

In at least one embodiment, cloud computing is a model for enabling convenient, on-demand network access to a shared pool of configurable computing resources (e.g., networks, servers, storage, applications, and services) that can be rapidly provisioned and released with minimal management effort or service provider interaction.

In at least one embodiment, cloud computing is characterized by on-demand self-service, in which a consumer can unilaterally provision computing capabilities, such as server time and network storage, as needed automatically without requiring human inter-action with each service's provider. In at least one embodiment, cloud computing is characterized by broad network access, in which capabilities are available over a network and accessed through standard mechanisms that promote use by heterogeneous thin or thick client platforms (e.g., mobile phones, laptops, and PDAs). In at least one embodiment, cloud computing is characterized by resource pooling, in which a provider's computing resources are pooled to serve multiple consumers using a multi-tenant model, with different physical and virtual resources dynamically as-signed and reassigned according to consumer demand. In at least one embodiment, there is a sense of location independence in that a customer generally has no control or knowledge over an exact location of provided resources, but may be able to specify location at a higher level of abstraction (e.g., country, state, or datacenter). In at least one embodiment, examples of resources include storage, processing, memory, network bandwidth, and virtual machines. In at least one embodiment, cloud computing is characterized by rapid elasticity, in which capabilities can be rapidly and elastically provisioned, in some cases automatically, to quickly scale out and rapidly released to quickly scale in. In at least one embodiment, to a consumer, capabilities available for provisioning often appear to be unlimited and can be purchased in any quantity at any time. In at least one embodiment, cloud computing is characterized by measured service, in which cloud systems automatically control and optimize resource use by leveraging a metering capability at some level of abstraction appropriate to a type of service (e.g., storage, processing, bandwidth, and active user accounts). In at least one embodiment, resource usage can be monitored, controlled, and reported providing transparency for both a provider and consumer of a utilized service.

In at least one embodiment, cloud computing may be associated with various services. In at least one embodiment, cloud Software as a Service (SaaS) may refer to as service in which a capability provided to a consumer is to use a provider's applications running on a cloud infrastructure. In at least one embodiment, applications are accessible from various client devices through a thin client interface such as a web browser (e.g., web-based email). In at least one embodiment, consumer does not manage or control underlying cloud infrastructure including network, servers, operating systems, storage, or even individual application capabilities, with a possible exception of limited user-specific application configuration settings.

In at least one embodiment, cloud Platform as a Service (PaaS) may refer to a service in which a capability provided to a consumer is to deploy onto cloud infrastructure consumer-created or acquired applications created using programming languages and tools supported by a provider. In at least one embodiment, consumer does not manage or control underlying cloud infrastructure including networks, servers, operating systems, or storage, but has control over deployed applications and possibly application hosting environment configurations.

In at least one embodiment, cloud Infrastructure as a Service (IaaS) may refer to a service in which a capability provided to a consumer is to provision processing, storage, networks, and other fundamental computing resources where a consumer is able to deploy and run arbitrary software, which can include operating systems and applications. In at least one embodiment, consumer does not manage or control underlying cloud infrastructure, but has control over operating systems, storage, deployed applications, and possibly limited control of select networking components (e.g., host firewalls).

In at least one embodiment, cloud computing may be deployed in various ways. In at least one embodiment, a private cloud may refer to a cloud infrastructure that is operated solely for an organization. In at least one embodiment, a private cloud may be managed by an organization or a third party and may exist on-premises or off-premises. In at least one embodiment, a community cloud may refer to a cloud infrastructure that is shared by several organizations and supports a specific community that has shared concerns (e.g., mission, security requirements, policy, and compliance considerations). In at least one embodiment, a community cloud may be managed by organizations or a third party and may exist on-premises or off-premises. In at least one embodiment, a public cloud may refer to a cloud infrastructure that is made available to a general public or a large industry group and is owned by an organization providing cloud services. In at least one embodiment, a hybrid cloud may refer to a cloud infrastructure is a composition of two or more clouds (private, community, or public) that remain unique entities, but are bound together by standardized or proprietary technology that enables data and application portability (e.g., cloud bursting for load-balancing between clouds). In at least one embodiment, a cloud computing environment is service oriented with a focus on statelessness, low coupling, modularity, and semantic interoperability.

In at least one embodiment, one or more of the networked computer systems 2100A, 2100B, and 2100C may be used to implement the system 100 (see FIG. 1). In at least one embodiment, at least one of the PC nodes 2126, 2128, 2130 and/or at least one of the PCs 2102, 2118, 2120, 2140, 2142 may be used to implement one or more of the server(s) 102 (see FIG. 1) and/or the computing system 132 (see FIG. 1). In at least one embodiment, the Internet 2132 may be used to implement at least a portion of the external network 110, and/or the PC 2144 may be used to implement at least one of the external computing device(s) 112. Alternatively or additionally, the LAN 2124 and/or the LAN manager 2138 may be used to implement the internal network 106 (see FIG. 1). In at least one embodiment, the medium 2122 may be used to implement the internal network 106. In at least one embodiment, the processor 2114 may be used to implement one or more of the CPU(s) 210, 310, 910, 1010, and/or 1110. In at least one embodiment, the memory 2116 may be used to implement the memory 260. In at least one embodiment, at least a portion of the system(s) depicted in FIG. 21 is used to implement one or more systems, techniques, functions, and/or processes described in connection with FIGS. 1-16. For example, in at least one embodiment, at least one component shown or described with respect to FIG. 21 is used to create hardware component groups on which virtual machines may be executed and/or to which virtual machine states may be migrated in accordance with one or more techniques, functions, and/or processes described with respect to any of FIGS. 1-16.

FIG. 22 illustrates one or more components of a system environment 2200 in which services may be offered as third party network services, in accordance with at least one embodiment. In at least one embodiment, a third party network may be referred to as a cloud, cloud network, cloud computing network, and/or variations thereof. In at least one embodiment, system environment 2200 includes one or more client computing devices 2204, 2206, and 2208 that may be used by users to interact with a third party network infrastructure system 2202 that provides third party network services, which may be referred to as cloud computing services. In at least one embodiment, third party network infrastructure system 2202 may include one or more computers and/or servers.

It should be appreciated that third party network infrastructure system 2202 depicted in FIG. 22 may have other components than those depicted. Further, FIG. 22 depicts an embodiment of a third party network infrastructure system. In at least one embodiment, third party network infrastructure system 2202 may have more or fewer components than depicted in FIG. 22, may combine two or more components, or may have a different configuration or arrangement of components.

In at least one embodiment, client computing devices 2204, 2206, and 2208 may be configured to operate a client application such as a web browser, a proprietary client application, or some other application, which may be used by a user of a client computing device to interact with third party network infrastructure system 2202 to use services provided by third party network infrastructure system 2202. Although exemplary system environment 2200 is shown with three client computing devices, any number of client computing devices may be supported. In at least one embodiment, other devices such as devices with sensors, etc. may interact with third party network infrastructure system 2202. In at least one embodiment, network(s) 2210 may facilitate communications and exchange of data between client computing devices 2204, 2206, and 2208 and third party network infrastructure system 2202.

In at least one embodiment, services provided by third party network infrastructure system 2202 may include a host of services that are made available to users of a third party network infrastructure system on demand. In at least one embodiment, various services may also be offered including without limitation online data storage and backup solutions, Web-based e-mail services, hosted office suites and document collaboration services, database management and processing, managed technical support services, and/or variations thereof. In at least one embodiment, services provided by a third party network infrastructure system can dynamically scale to meet needs of its users.

In at least one embodiment, a specific instantiation of a service provided by third party network infrastructure system 2202 may be referred to as a "service instance." In at least one embodiment, in general, any service made available to a user via a communication network, such as the Internet, from a third party network service provider's system is referred to as a "third party network service." In at least one embodiment, in a public third party network environment, servers and systems that make up a third party network service provider's system are different from a customer's own on-premises servers and systems. In at least one embodiment, a third party network service provider's system may host an application, and a user may, via a communication network such as the Internet, on demand, order and use an application.

In at least one embodiment, a service in a computer network third party network infrastructure may include protected computer network access to storage, a hosted database, a hosted web server, a software application, or other service provided by a third party network vendor to a user. In at least one embodiment, a service can include password-protected access to remote storage on a third party network through the Internet. In at least one embodiment, a service can include a web service-based hosted relational database and a script-language middleware engine for private use by a networked developer. In at least one embodiment, a service can include access to an email software application hosted on a third party network vendor's web site.

In at least one embodiment, third party network infrastructure system 2202 may include a suite of applications, middleware, and database service offerings that are delivered to a customer in a self-service, subscription-based, elastically scalable, reliable, highly available, and secure manner. In at least one embodiment, third party network infrastructure system 2202 may also provide "big data" related computation and analysis services. In at least one embodiment, term "big data" is generally used to refer to extremely large data sets that can be stored and manipulated by analysts and researchers to visualize large amounts of data, detect trends, and/or otherwise interact with data. In at least one embodiment, big data and related applications can be hosted and/or manipulated by an infrastructure system on many levels and at different scales. In at least one embodiment, tens, hundreds, or thousands of processors linked in parallel can act upon such data in order to present it or simulate external forces on data or what it represents. In at least one embodiment, these data sets can involve structured data, such as that organized in a database or otherwise according to a structured model, and/or unstructured data (e.g., emails, images, data blobs (binary large objects), web pages, complex event processing). In at least one embodiment, by leveraging an ability of an embodiment to relatively quickly focus more (or fewer) computing resources upon an objective, a third party network infrastructure system may be better available to carry out tasks on large data sets based on demand from a business, government agency, research organization, private individual, group of like-minded individuals or organizations, or other entity.

In at least one embodiment, third party network infrastructure system 2202 may be adapted to automatically provision, manage and track a customer's subscription to services offered by third party network infrastructure system 2202. In at least one embodiment, third party network infrastructure system 2202 may provide third party network services via different deployment models. In at least one embodiment, services may be provided under a public third party network model in which third party network infrastructure system 2202 is owned by an organization selling third party network services and services are made available to a general public or different industry enterprises. In at least one embodiment, services may be provided under a private third party network model in which third party network infrastructure system 2202 is operated solely for a single organization and may provide services for one or more entities within an organization. In at least one embodiment, third party network services may also be provided under a community third party network model in which third party network infrastructure system 2202 and services provided by third party network infrastructure system 2202 are shared by several organizations in a related community. In at least one embodiment, third party network services may also be provided under a hybrid third party network model, which is a combination of two or more different models.

In at least one embodiment, services provided by third party network infrastructure system 2202 may include one or more services provided under Software as a Service (SaaS) category, Platform as a Service (PaaS) category, Infrastructure as a Service (IaaS) category, or other categories of services including hybrid services. In at least one embodiment, a customer, via a subscription order, may order one or more services provided by third party network infrastructure system 2202. In at least one embodiment, third party network infrastructure system 2202 then performs processing to provide services in a customer's subscription order.

In at least one embodiment, services provided by third party network infrastructure system 2202 may include, without limitation, application services, platform services and infrastructure services. In at least one embodiment, application services may be provided by a third party network infrastructure system via a SaaS platform. In at least one embodiment, SaaS platform may be configured to provide third party network services that fall under a SaaS category. In at least one embodiment, SaaS platform may provide capabilities to build and deliver a suite of on-demand applications on an integrated development and deployment platform. In at least one embodiment, SaaS platform may manage and control underlying software and infrastructure for providing SaaS services. In at least one embodiment, by utilizing services provided by a SaaS platform, customers can utilize applications executing on a third party network infrastructure system. In at least one embodiment, customers can acquire an application services without a need for customers to purchase separate licenses and support. In at least one embodiment, various different SaaS services may be provided. In at least one embodiment, examples include, without limitation, services that provide solutions for sales performance management, enterprise integration, and business flexibility for large organizations.

In at least one embodiment, platform services may be provided by third party network infrastructure system 2202 via a PaaS platform. In at least one embodiment, PaaS platform may be configured to provide third party network services that fall under a PaaS category. In at least one embodiment, examples of platform services may include without limitation services that enable organizations to consolidate existing applications on a shared, common architecture, as well as an ability to build new applications that leverage shared services provided by a platform. In at least one embodiment, PaaS platform may manage and control underlying software and infrastructure for providing PaaS services. In at least one embodiment, customers can acquire PaaS services provided by third party network infrastructure system 2202 without a need for customers to purchase separate licenses and support.

In at least one embodiment, by utilizing services provided by a PaaS platform, customers can employ programming languages and tools supported by a third party network infrastructure system and also control deployed services. In at least one embodiment, platform services provided by a third party network infrastructure system may include database third party network services, middleware third party network services and third party network services. In at least one embodiment, database third party network services may support shared service deployment models that enable organizations to pool database resources and offer customers a Database as a Service in a form of a database third party network. In at least one embodiment, middleware third party network services may provide a platform for customers to develop and deploy various business applications, and third party network services may provide a platform for customers to deploy applications, in a third party network infrastructure system.

In at least one embodiment, various different infrastructure services may be provided by an IaaS platform in a third party network infrastructure system. In at least one embodiment, infrastructure services facilitate management and control of underlying computing resources, such as storage, networks, and other fundamental computing resources for customers utilizing services provided by a SaaS platform and a PaaS platform.

In at least one embodiment, third party network infrastructure system 2202 may also include infrastructure resources 2230 for providing resources used to provide various services to customers of a third party network infrastructure system. In at least one embodiment, infrastructure resources 2230 may include pre-integrated and optimized combinations of hardware, such as servers, storage, and networking resources to execute services provided by a Paas platform and a Saas platform, and other resources.

In at least one embodiment, resources in third party network infrastructure system 2202 may be shared by multiple users and dynamically re-allocated per demand. In at least one embodiment, resources may be allocated to users in different time zones. In at least one embodiment, third party network infrastructure system 2202 may enable a first set of users in a first time zone to utilize resources of a third party network infrastructure system for a specified number of hours and then enable a re-allocation of same resources to another set of users located in a different time zone, thereby maximizing utilization of resources.

In at least one embodiment, a number of internal shared services 2232 may be provided that are shared by different components or modules of third party network infrastructure system 2202 to enable provision of services by third party network infrastructure system 2202. In at least one embodiment, these internal shared services may include, without limitation, a security and identity service, an integration service, an enterprise repository service, an enterprise manager service, a virus scanning and white list service, a high availability, backup and recovery service, service for enabling third party network support, an email service, a notification service, a file transfer service, and/or variations thereof.

In at least one embodiment, third party network infrastructure system 2202 may provide comprehensive management of third party network services (e.g., SaaS, PaaS, and IaaS services) in a third party network infrastructure system. In at least one embodiment, third party network management functionality may include capabilities for provisioning, managing and tracking a customer's subscription received by third party network infrastructure system 2202, and/or variations thereof.

In at least one embodiment, as depicted in FIG. 22, third party network management functionality may be provided by one or more modules, such as an order management module 2220, an order orchestration module 2222, an order provisioning module 2224, an order management and monitoring module 2226, and an identity management module 2228. In at least one embodiment, these modules may include or be provided using one or more computers and/or servers, which may be general purpose computers, specialized server computers, server farms, server clusters, or any other appropriate arrangement and/or combination.

In at least one embodiment, at step 2234, a customer using a client device, such as client computing devices 2204, 2206 or 2208, may interact with third party network infrastructure system 2202 by requesting one or more services provided by third party network infrastructure system 2202 and placing an order for a subscription for one or more services offered by third party network infrastructure system 2202. In at least one embodiment, a customer may access a third party network User Interface (UI) such as third party network UI 2212, third party network UI 2214 and/or third party network UI 2216 and place a subscription order via these UIs. In at least one embodiment, order information received by third party network infrastructure system 2202 in response to a customer placing an order may include information identifying a customer and one or more services offered by a third party network infrastructure system 2202 that a customer intends to subscribe to.

In at least one embodiment, at step 2236, an order information received from a customer may be stored in an order database 2218. In at least one embodiment, if this is a new order, a new record may be created for an order. In at least one embodiment, order database 2218 can be one of several databases operated by third party network infrastructure system 2218 and operated in conjunction with other system elements.

In at least one embodiment, at step 2238, an order information may be forwarded to an order management module 2220 that may be configured to perform billing and accounting functions related to an order, such as verifying an order, and upon verification, booking an order.

In at least one embodiment, at step 2240, information regarding an order may be communicated to an order orchestration module 2222 that is configured to orchestrate provisioning of services and resources for an order placed by a customer. In at least one embodiment, order orchestration module 2222 may use services of order provisioning module 2224 for provisioning. In at least one embodiment, order orchestration module 2222 enables management of business processes associated with each order and applies business logic to determine whether an order should proceed to provisioning.

In at least one embodiment, at step 2242, upon receiving an order for a new subscription, order orchestration module 2222 sends a request to order provisioning module 2224 to allocate resources and configure resources needed to fulfill a subscription order. In at least one embodiment, order provisioning module 2224 enables an allocation of resources for services ordered by a customer. In at least one embodiment, order provisioning module 2224 provides a level of abstraction between third party network services provided by third party network infrastructure system 2200 and a physical implementation layer that is used to provision resources for providing requested services. In at least one embodiment, this enables order orchestration module 2222 to be isolated from implementation details, such as whether or not services and resources are actually provisioned in real-time or pre-provisioned and only allocated/assigned upon request.

In at least one embodiment, at step 2244, once services and resources are provisioned, a notification may be sent to subscribing customers indicating that a requested service is now ready for use. In at least one embodiment, information (e.g. a link) may be sent to a customer that enables a customer to start using requested services.

In at least one embodiment, at step 2246, a customer's subscription order may be managed and tracked by an order management and monitoring module 2226. In at least one embodiment, order management and monitoring module 2226 may be configured to collect usage statistics regarding a customer use of subscribed services. In at least one embodiment, statistics may be collected for an amount of storage used, an amount data transferred, a number of users, and an amount of system up time and system down time, and/or variations thereof.

In at least one embodiment, third party network infra-structure system 2200 may include an identity management module 2228 that is configured to provide identity services, such as access management and authorization services in third party network infrastructure system 2200. In at least one embodiment, identity management module 2228 may control information about customers who wish to utilize services provided by third party network infrastructure sys-tem 2202. In at least one embodiment, such information can include information that authenticates identities of such customers and information that describes which actions those customers are authorized to perform relative to various system resources (e.g., files, directories, applications, com-munication ports, memory segments, etc.). In at least one embodiment, identity management module 2228 may also include management of descriptive information about each customer and about how and by whom that descriptive information can be accessed and modified.

In at least one embodiment, the system environment 2200 may be used to implement the system 100 (see FIG. 1), the third party network infrastructure system 2202 may be used to implement the data center 104, the network(s) 2210 may be used to implement at least a portion of the external network 110, and/or at least one of the client computing devices 2204, 2206, and 2208 may be used to implement at least one of the external computing device(s) 112. In at least one embodiment, at least a portion of the system(s) depicted in FIG. 22 is used to implement one or more systems, techniques, functions, and/or processes described in connec-tion with FIGS. 1-16. For example, in at least one embodi-ment, at least one component shown or described with respect to FIG. 22 is used to create hardware component groups on which virtual machines may be executed and/or to which virtual machine states may be migrated in accordance with one or more techniques, functions, and/or processes described with respect to any of FIGS. 1-16.

FIG. 23 illustrates a cloud computing environment 2302, in accordance with at least one embodiment. In at least one embodiment, cloud computing environment 2302 includes one or more computer system/servers 2304 with which computing devices such as, personal digital assistant (PDA) or cellular telephone 2306A, desktop computer 2306B, laptop computer 2306C, and/or automobile computer system 2306N communicate. In at least one embodiment, this allows for infrastructure, platforms and/or software to be offered as services from cloud computing environment 2302, so as to not require each client to separately maintain such resources. It is understood that types of computing devices 2306A-N shown in FIG. 23 are intended to be illustrative only and that cloud computing environment 2302 can communicate with any type of computerized device over any type of network and/or network/addressable connection (e.g., using a web browser).

In at least one embodiment, a computer system/server 2304, which can be denoted as a cloud computing node, is operational with numerous other general purpose or special purpose computing system environments or configurations. In at least one embodiment, examples of computing systems, environments, and/or configurations that may be suitable for use with computer system/server 2304 include, but are not limited to, personal computer systems, server computer systems, thin clients, thick clients, hand-held or laptop devices, multiprocessor systems, microprocessor-based sys-tems, set top boxes, programmable consumer electronics, network PCs, minicomputer systems, mainframe computer systems, and distributed cloud computing environments that include any of the above systems or devices, and/or varia-tions thereof.

In at least one embodiment, computer system/server 2304 may be described in a general context of computer system-executable instructions, such as program modules, being executed by a computer system. In at least one embodiment, program modules include routines, programs, objects, com-ponents, logic, data structures, and so on, that perform particular tasks or implement particular abstract data types. In at least one embodiment, exemplary computer system/ server 2304 may be practiced in distributed loud computing environments where tasks are performed by remote process-ing devices that are linked through a communications net-work. In at least one embodiment, in a distributed cloud computing environment, program modules may be located in both local and remote computer system storage media including memory storage devices.

In at least one embodiment, the cloud computing envi-ronment 2302 may be used to implement the system 100 (see FIG. 1). In at least one embodiment, at least one of the computer system/servers 2304 may be used to implement one or more of the server(s) 102 (see FIG. 1) and/or the computing system 132 (see FIG. 1). In at least one embodi-ment, the Internet 1032 may be used to implement at least a portion of the external network 110, and/or one or more of the computing devices 2306A-2306N may be used to implement at least one of the external computing device(s) 112. In at least one embodiment, at least a portion of the system(s) depicted in FIG. 23 is used to implement one or more systems, techniques, functions, and/or processes described in connection with FIGS. 1-16. For example, in at least one embodiment, at least one component shown or described with respect to FIG. 23 is used to create hardware component groups on which virtual machines may be executed and/or to which virtual machine states may be migrated in accordance with one or more techniques, functions, and/or processes described with respect to any of FIGS. 1-16.

FIG. 24 illustrates a set of functional abstraction layers provided by cloud computing environment 2302 (FIG. 23), in accordance with at least one embodiment. It should be understood in advance that components, layers, and functions shown in FIG. 24 are intended to be illustrative only, and components, layers, and functions may vary.

In at least one embodiment, hardware and software layer 2402 includes hardware and software components. In at least one embodiment, examples of hardware components include mainframes, various RISC (Reduced Instruction Set Computer) architecture based servers, various computing systems, supercomputing systems, storage devices, networks, networking components, and/or variations thereof. In at least one embodiment, examples of software components include network application server software, various application server software, various database software, and/or variations thereof.

In at least one embodiment, virtualization layer 2404 provides an abstraction layer from which following exemplary virtual entities may be provided: virtual servers, virtual storage, virtual networks, including virtual private networks, virtual applications, virtual clients, and/or variations thereof.

In at least one embodiment, management layer 2406 provides various functions. In at least one embodiment, resource provisioning provides dynamic procurement of computing resources and other resources that are utilized to perform tasks within a cloud computing environment. In at least one embodiment, metering provides usage tracking as resources are utilized within a cloud computing environment, and billing or invoicing for consumption of these resources. In at least one embodiment, resources may include application software licenses. In at least one embodiment, security provides identity verification for users and tasks, as well as protection for data and other resources. In at least one embodiment, user interface provides access to a cloud computing environment for both users and system administrators. In at least one embodiment, service level management provides cloud computing resource allocation and management such that required service levels are met. In at least one embodiment, Service Level Agreement (SLA) management provides pre-arrangement for, and procurement of, cloud computing resources for which a future requirement is anticipated in accordance with an SLA.

In at least one embodiment, workloads layer 2408 provides functionality for which a cloud computing environment is utilized. In at least one embodiment, examples of workloads and functions which may be provided from this layer include: mapping and navigation, software development and management, educational services, data analytics and processing, transaction processing, and service delivery.

Supercomputing

The following figures set forth, without limitation, exemplary supercomputer-based systems that can be used to implement at least one embodiment.

In at least one embodiment, a supercomputer may refer to a hardware system exhibiting substantial parallelism and including at least one chip, where chips in a system are interconnected by a network and are placed in hierarchically organized enclosures. In at least one embodiment, a large hardware system filling a machine room, with several racks, each containing several boards/rack modules, each containing several chips, all interconnected by a scalable network, is one particular example of a supercomputer. In at least one embodiment, a single rack of such a large hardware system is another example of a supercomputer. In at least one embodiment, a single chip exhibiting substantial parallelism and containing several hardware components can equally be considered to be a supercomputer, since as feature sizes may decrease, an amount of hardware that can be incorporated in a single chip may also increase.

FIG. 25 illustrates a supercomputer at a chip level, in accordance with at least one embodiment. In at least one embodiment, inside an FPGA or ASIC chip, main computation is performed within finite state machines (2504) called thread units. In at least one embodiment, task and synchronization networks (2502) connect finite state machines and are used to dispatch threads and execute operations in correct order. In at least one embodiment, a multi-level partitioned on-chip cache hierarchy (2508, 2512) is accessed using memory networks (2506, 2510). In at least one embodiment, off-chip memory is accessed using memory controllers (2516) and an off-chip memory network (2514). In at least one embodiment, I/O controller (2518) is used for cross-chip communication when a design does not fit in a single logic chip.

In at least one embodiment, the supercomputer illustrated in FIG. 25 may be used to implement the system 100 (see FIG. 1). For example, the supercomputer may be used to implement one or more of the server(s) 102 (see FIG. 1), and/or the computing system 132 (see FIG. 1), and/or at least one of the external computing device(s) 112. In at least one embodiment, the supercomputer illustrated in FIG. 25 may be used to implement the CPU(s) 210, 310, 910, 1010, and/or 1110. In at least one embodiment, at least a portion of the system(s) depicted in FIG. 25 is used to implement one or more systems, techniques, functions, and/or processes described in connection with FIGS. 1-16. For example, in at least one embodiment, at least one component shown or described with respect to FIG. 25 is used to create hardware component groups on which virtual machines may be executed and/or to which virtual machine states may be migrated in accordance with one or more techniques, functions, and/or processes described with respect to any of FIGS. 1-16.

FIG. 26 illustrates a supercomputer at a rock module level, in accordance with at least one embodiment. In at least one embodiment, within a rack module, there are multiple FPGA or ASIC chips (2602) that are connected to one or more DRAM units (2604) which constitute main accelerator memory. In at least one embodiment, each FPGA/ASIC chip is connected to its neighbor FPGA/ASIC chip using wide busses on a board, with differential high speed signaling (2606). In at least one embodiment, each FPGA/ASIC chip is also connected to at least one high-speed serial communication cable.

In at least one embodiment, the supercomputer illustrated in FIG. 26 may be used to implement the system 100 (see FIG. 1). For example, the supercomputer may be used to implement one or more of the server(s) 102 (see FIG. 1), the computing system 132 (see FIG. 1), and/or at least one of the external computing device(s) 112. In at least one embodiment, the supercomputer illustrated in FIG. 26 may be used to implement the CPU(s) 210, 310, 910, 1010, 1110, and/or 1210. In at least one embodiment, at least a portion of the system(s) depicted in FIG. 26 is used to implement one or more systems, techniques, functions, and/or processes described in connection with FIGS. 1-16. For example, in at least one embodiment, at least one component shown or described with respect to FIG. 26 is used to create hardware component groups on which virtual machines may be executed and/or to which virtual machine states may be migrated in accordance with one or more techniques, functions, and/or processes described with respect to any of FIGS. 1-16.

FIG. 27 illustrates a supercomputer at a rack level, in accordance with at least one embodiment. FIG. 28 illustrates a supercomputer at a whole system level, in accordance with at least one embodiment. In at least one embodiment, referring to FIG. 27 and FIG. 28, between rack modules in a rack and across racks throughout an entire system, high-speed serial optical or copper cables (2702, 2802) are used to realize a scalable, possibly incomplete hypercube network. In at least one embodiment, one of FPGA/ASIC chips of an accelerator is connected to a host system through a PCI-Express connection (2804). In at least one embodiment, host system includes a host microprocessor (2808) that a software part of an application runs on and a memory consisting of one or more host memory DRAM units (2806) that is kept coherent with memory on an accelerator. In at least one embodiment, host system can be a separate module on one of racks, or can be integrated with one of a super-computer's modules. In at least one embodiment, cube-connected cycles topology provide communication links to create a hypercube network for a large supercomputer. In at least one embodiment, a small group of FPGA/ASIC chips on a rack module can act as a single hypercube node, such that a total number of external links of each group is increased, compared to a single chip. In at least one embodiment, a group contains chips A, B, C and D on a rack module with internal wide differential busses connecting A, B, C and D in a torus organization. In at least one embodiment, there are 12 serial communication cables connecting a rack module to an outside world. In at least one embodiment, chip A on a rack module connects to serial communication cables 0, 1, 2. In at least one embodiment, chip B connects to cables 3, 4, 5. In at least one embodiment, chip C connects to 6, 7, 8. In at least one embodiment, chip D connects to 9, 10, 11. In at least one embodiment, an entire group {A, B, C, D} constituting a rack module can form a hypercube node within a supercomputer system, with up to 212=4096 rack modules (16384 FPGA/ASIC chips). In at least one embodiment, for chip A to send a message out on link 4 of group {A, B, C, D}, a message has to be routed first to chip B with an on-board differential wide bus connection. In at least one embodiment, a message arriving into a group {A, B, C, D} on link 4 (i.e., arriving at B) destined to chip A, also has to be routed first to a correct destination chip (A) internally within a group {A, B, C, D}. In at least one embodiment, parallel supercomputer systems of other sizes may also be implemented.

In at least one embodiment, the supercomputer illustrated in FIG. 27 and/or the supercomputer illustrated in FIG. 28 may be used to implement the system 100 (see FIG. 1). For example, the supercomputer illustrated in FIG. 27 and/or FIG. 28 may be used to implement one or more of the server(s) 102 (see FIG. 1), the computing system 132 (see FIG. 1), and/or at least one of the external computing device(s) 112. In at least one embodiment, the supercomputer illustrated in FIG. 27 and/or FIG. 28 may be used to implement the CPU(s) 210, 310, 910, 1010, 1110, and/or 1210. In at least one embodiment, at least a portion of the system(s) depicted in FIG. 27 and/or FIG. 28 is used to implement one or more systems, techniques, functions, and/or processes described in connection with FIGS. 1-16. For example, in at least one embodiment, at least one component shown or described with respect to FIG. 27 and/or FIG. 28 is used to create hardware component groups on which virtual machines may be executed and/or to which virtual machine states may be migrated in accordance with one or more techniques, functions, and/or processes described with respect to any of FIGS. 1-16.

Artificial Intelligence

The following figures set forth, without limitation, exemplary artificial intelligence-based systems that can be used to implement at least one embodiment.

FIG. 29A illustrates inference and/or training logic 2915 used to perform inferencing and/or training operations associated with one or more embodiments. Details regarding inference and/or training logic 2915 are provided below in conjunction with FIGS. 29A and/or 29B.

In at least one embodiment, inference and/or training logic 2915 may include, without limitation, code and/or data storage 2901 to store forward and/or output weight and/or input/output data, and/or other parameters to configure neurons or layers of a neural network trained and/or used for inferencing in aspects of one or more embodiments. In at least one embodiment, training logic 2915 may include, or be coupled to code and/or data storage 2901 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which such code corresponds. In at least one embodiment code and/or data storage 2901 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 2901 may be included with other on-chip or off-chip data storage, including a processor's L1, L2, or L3 cache or system memory.

In at least one embodiment, any portion of code and/or data storage 2901 may be internal or external to one or more processors or other hardware logic devices or circuits. In at least one embodiment, code and/or code and/or data storage 2901 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 2901 is internal or external to a processor, for example, or including DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 2915 may include, without limitation, a code and/or data storage 2905 to store backward and/or output weight and/or input/output data corresponding to neurons or layers of a neural network trained and/or used for inferencing in aspects of one or more embodiments. In at least one embodiment, code and/or data storage 2905 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 2915 may include, or be coupled to code and/or data storage 2905 to store graph code or other software to control timing and/or order, in which weight and/or other parameter information is to be loaded to configure, logic, including integer and/or floating point units (collectively, arithmetic logic units (ALUs).

In at least one embodiment, code, such as graph code, causes loading of weight or other parameter information into processor ALUs based on an architecture of a neural network to which such code corresponds. In at least one embodiment, any portion of code and/or data storage 2905 may be included with other on-chip or off-chip data storage, including a processor's L1, L2, or L3 cache or system memory. In at least one embodiment, any portion of code and/or data storage 2905 may be internal or external to one or more processors or other hardware logic devices or circuits. In at least one embodiment, code and/or data storage 2905 may be cache memory, DRAM, SRAM, non-volatile memory (e.g., flash memory), or other storage. In at least one embodiment, a choice of whether code and/or data storage 2905 is internal or external to a processor, for example, or including DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 2901 and code and/or data storage 2905 may be separate storage structures. In at least one embodiment, code and/or data storage 2901 and code and/or data storage 2905 may be a combined storage structure. In at least one embodiment, code and/or data storage 2901 and code and/or data storage 2905 may be partially combined and partially separate. In at least one embodiment, any portion of code and/or data storage 2901 and code and/or data storage 2905 may be included with other on-chip or off-chip data storage, including a processor's L1, L2, or L3 cache or system memory.

In at least one embodiment, inference and/or training logic 2915 may include, without limitation, one or more arithmetic logic unit(s) ("ALU(s)") 2910, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 2920 that are functions of input/output and/or weight parameter data stored in code and/or data storage 2901 and/or code and/or data storage 2905. In at least one embodiment, activations stored in activation storage 2920 are generated according to linear algebraic and or matrix-based mathematics performed by ALU(s) 2910 in response to performing instructions or other code, wherein weight values stored in code and/or data storage 2905 and/or data storage 2901 are used as operands along with other values, such as bias values, gradient information, momentum values, or other parameters or hyperparameters, any or all of which may be stored in code and/or data storage 2905 or code and/or data storage 2901 or another storage on or off-chip.

In at least one embodiment, ALU(s) 2910 are included within one or more processors or other hardware logic devices or circuits, whereas in another embodiment, ALU(s) 2910 may be external to a processor or other hardware logic device or circuit that uses them (e.g., a co-processor). In at least one embodiment, ALUs 2910 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 2901, code and/or data storage 2905, and activation storage 2920 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 2920 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 2920 may be cache memory, DRAM, SRAM, non-volatile memory (e.g., flash memory), or other storage. In at least one embodiment, activation storage 2920 may be completely or partially within or external to one or more processors or other logical circuits. In at least one embodiment, a choice of whether activation storage 2920 is internal or external to a processor, for example, or including DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 2915 illustrated in FIG. 29A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 2915 illustrated in FIG. 29A may be used in conjunction with central processing unit ("CPU") hardware, graphics processing unit ("GPU") hardware or other hardware, such as field programmable gate arrays ("FPGAs").

FIG. 29B illustrates inference and/or training logic 2915, according to at least one embodiment. In at least one embodiment, inference and/or training logic 2915 may include, without limitation, hardware logic in which computational resources are dedicated or otherwise exclusively used in conjunction with weight values or other information corresponding to one or more layers of neurons within a neural network. In at least one embodiment, inference and/or training logic 2915 illustrated in FIG. 29B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 2915 illustrated in FIG. 29B may be used in conjunction with central processing unit (CPU) hardware, graphics processing unit (GPU) hardware or other hardware, such as field programmable gate arrays (FPGAs). In at least one embodiment, inference and/or training logic 2915 includes, without limitation, code and/or data storage 2901 and code and/or data storage 2905, which may be used to store code (e.g., graph code), weight values and/or other information, including bias values, gradient information, momentum values, and/or other parameter or hyperparameter information. In at least one embodiment illustrated in FIG. 29B, each of code and/or data storage 2901 and code and/or data storage 2905 is associated with a dedicated computational resource, such as computational hardware 2902 and computational hardware 2906, respectively. In at least one embodiment, each of computational hardware 2902 and computational hardware 2906 includes one or more ALUs that perform mathematical functions, such as linear algebraic functions, only on information stored in code and/or data storage 2901 and code and/or data storage 2905, respectively, result of which is stored in activation storage 2920.

In at least one embodiment, each of code and/or data storage 2901 and 2905 and corresponding computational hardware 2902 and 2906, respectively, correspond to different layers of a neural network, such that resulting activation from one storage/computational pair 2901/2902 of code and/or data storage 2901 and computational hardware 2902 is provided as an input to a next storage/computational pair 2905/2906 of code and/or data storage 2905 and computational hardware 2906, in order to mirror a conceptual organization of a neural network. In at least one embodiment, each of storage/computational pairs 2901/2902 and 2905/2906 may correspond to more than one neural network layer. In at least one embodiment, additional storage/computation pairs (not shown) subsequent to or in parallel with storage/computation pairs 2901/2902 and 2905/2906 may be included in inference and/or training logic 2915.

In at least one embodiment, the inference and/or training logic 2915 may be used to implement the system 100 (see FIG. 1). For example, the inference and/or training logic 2915 may be used to implement the group generator(s) 122 (see FIG. 2) and/or at least a portion of the workload(s). In at least one embodiment, the inference and/or training logic 2915 may be implemented by one or more of the server(s) 102 (see FIG. 1), one or more of the CPU(s) 210, 310, 910, 1010, 1110, and/or 1210, and/or one or more of the GPUs 240, 340, 940, 1040, 1140, and/or 1240. In at least one embodiment, at least a portion of the system(s) depicted in FIG. 29 is used to implement one or more systems, techniques, functions, and/or processes described in connection with FIGS. 1-16. For example, in at least one embodiment, at least one component shown or described with respect to FIG. 29 is used to create hardware component groups on which virtual machines may be executed and/or to which virtual machine states may be migrated in accordance with one or more techniques, functions, and/or processes described with respect to any of FIGS. 1-16.

FIG. 30 illustrates training and deployment of a deep neural network, according to at least one embodiment. In at least one embodiment, untrained neural network 3006 is trained using a training dataset 3002. In at least one embodiment, training framework 3004 is a PyTorch framework, whereas in other embodiments, training framework 3004 is a TensorFlow, Boost, Caffe, Microsoft Cognitive Toolkit/ CNTK, MXNet, Chainer, Keras, Deeplearning4j, or other training framework. In at least one embodiment, training framework 3004 trains an untrained neural network 3006 and enables it to be trained using processing resources described herein to generate a trained neural network 3008. In at least one embodiment, weights may be chosen randomly or by pre-training using a deep belief network. In at least one embodiment, training may be performed in either a supervised, partially supervised, or unsupervised manner.

In at least one embodiment, untrained neural network 3006 is trained using supervised learning, wherein training dataset 3002 includes an input paired with a desired output for an input, or where training dataset 3002 includes input having a known output and an output of neural network 3006 is manually graded. In at least one embodiment, untrained neural network 3006 is trained in a supervised manner and processes inputs from training dataset 3002 and compares resulting outputs against a set of expected or desired outputs. In at least one embodiment, errors are then propagated back through untrained neural network 3006. In at least one embodiment, training framework 3004 adjusts weights that control untrained neural network 3006. In at least one embodiment, training framework 3004 includes tools to monitor how well untrained neural network 3006 is converging towards a model, such as trained neural network 3008, suitable to generating correct answers, such as in result 3014, based on input data such as a new dataset 3012. In at least one embodiment, training framework 3004 trains untrained neural network 3006 repeatedly while adjust weights to refine an output of untrained neural network 3006 using a loss function and adjustment algorithm, such as stochastic gradient descent. In at least one embodiment, training framework 3004 trains untrained neural network 3006 until untrained neural network 3006 achieves a desired accuracy. In at least one embodiment, trained neural network 3008 can then be deployed to implement any number of machine learning operations.

In at least one embodiment, untrained neural network 3006 is trained using unsupervised learning, wherein untrained neural network 3006 attempts to train itself using unlabeled data. In at least one embodiment, unsupervised learning training dataset 3002 will include input data without any associated output data or "ground truth" data. In at least one embodiment, untrained neural network 3006 can learn groupings within training dataset 3002 and can determine how individual inputs are related to untrained dataset 3002. In at least one embodiment, unsupervised training can be used to generate a self-organizing map in trained neural network 3008 capable of performing operations useful in reducing dimensionality of new dataset 3012. In at least one embodiment, unsupervised training can also be used to perform anomaly detection, which allows identification of data points in new dataset 3012 that deviate from normal patterns of new dataset 3012.

In at least one embodiment, semi-supervised learning may be used, which is a technique in which in training dataset 3002 includes a mix of labeled and unlabeled data. In at least one embodiment, training framework 3004 may be used to perform incremental learning, such as through transferred learning techniques. In at least one embodiment, incremental learning enables trained neural network 3008 to adapt to new dataset 3012 without forgetting knowledge instilled within trained neural network 3008 during initial training.

In at least one embodiment, the training and deployment illustrated in FIG. 30 of the deep neural network may be used to implement the system 100 (see FIG. 1). For example, the training and deployment may be used to implement the group generator(s) 122 (see FIG. 2) and/or at least a portion of the workload(s). In at least one embodiment, the training and deployment may be implemented by one or more of the server(s) 102 (see FIG. 1), one or more of the CPU(s) 210, 310, 910, 1010, 1110, and/or 1210, and/or one or more of the GPUs 240, 340, 940, 1040, 1140, and/or 1240. In at least one embodiment, at least a portion of the system(s) depicted in FIG. 30 is used to implement one or more systems, techniques, functions, and/or processes described in connection with FIGS. 1-16. For example, in at least one embodiment, at least one component shown or described with respect to FIG. 30 is used to create hardware component groups on which virtual machines may be executed and/or to which virtual machine states may be migrated in accordance with one or more techniques, functions, and/or processes described with respect to any of FIGS. 1-16.

5G Networks

The following figures set forth, without limitation, exemplary 5G network-based systems that can be used to implement at least one embodiment.

FIG. 31 illustrates an architecture of a system 3100 of a network, in accordance with at least one embodiment. In at least one embodiment, system 3100 is shown to include a user equipment (UE) 3102 and a UE 3104. In at least one embodiment, UEs 3102 and 3104 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, or any computing device including a wireless communications interface.

In at least one embodiment, any of UEs 3102 and 3104 can include an Internet of Things (IoT) UE, which can include a network access layer designed for low-power IoT applications utilizing short-lived UE connections. In at least one embodiment, an IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. In at least one embodiment, a M2M or MTC exchange of data may be a machine-initiated exchange of data. In at least one embodiment, an IoT network describes interconnecting IoT UEs, which may include uniquely identifiable embedded computing devices (within Internet infrastructure), with short-lived connections. In at least one embodiment, an IoT UEs may execute background applications (e.g., keep alive messages, status updates, etc.) to facilitate connections of an IoT network.

In at least one embodiment, UEs 3102 and 3104 may be configured to connect, e.g., communicatively couple, with a radio access network (RAN) 3116. In at least one embodiment, RAN 3116 may be, for example, an Evolved Universal Mobile Telecommunications System (UMTS) Terrestrial Radio Access Network (E-UTRAN), a NextGen RAN (NG RAN), or some other type of RAN. In at least one embodiment, UEs 3102 and 3104 utilize connections 3112 and 3114, respectively, each of which includes a physical communications interface or layer. In at least one embodiment, connections 3112 and 3114 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC)

protocol, a Universal Mobile Telecommunications System (UMTS) protocol, a 3GPP Long Term Evolution (LTE) protocol, a fifth generation (5G) protocol, a New Radio (NR) protocol, and variations thereof.

In at least one embodiment, UEs 3102 and 3104 may further directly exchange communication data via a ProSe interface 3106. In at least one embodiment, ProSe interface 3106 may alternatively be referred to as a sidelink interface including one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

In at least one embodiment, UE 3104 is shown to be configured to access an access point (AP) 3110 via connection 3108. In at least one embodiment, connection 3108 can include a local wireless connection, such as a connection consistent with any IEEE 802.11 protocol, wherein AP 3110 would include a wireless fidelity (WiFi®) router. In at least one embodiment, AP 3110 is shown to be connected to an Internet without connecting to a core network of a wireless system.

In at least one embodiment, RAN 3116 can include one or more access nodes that enable connections 3112 and 3114. In at least one embodiment, these access nodes (ANs) can be referred to as base stations (BSs), NodeBs, evolved NodeBs (eNBs), next Generation NodeBs (gNB), RAN nodes, and so forth, and can include ground stations (e.g., terrestrial access points) or satellite stations providing coverage within a geographic area (e.g., a cell). In at least one embodiment, RAN 3116 may include one or more RAN nodes for providing macrocells, e.g., macro RAN node 3118, and one or more RAN nodes for providing femtocells or picocells (e.g., cells having smaller coverage areas, smaller user capacity, or higher bandwidth compared to macrocells), e.g., low power (LP) RAN node 3120.

In at least one embodiment, any of RAN nodes 3118 and 3120 can terminate an air interface protocol and can be a first point of contact for UEs 3102 and 3104. In at least one embodiment, any of RAN nodes 3118 and 3120 can fulfill various logical functions for RAN 3116 including, but not limited to, radio network controller (RNC) functions such as radio bearer management, uplink and downlink dynamic radio resource management and data packet scheduling, and mobility management.

In at least one embodiment, UEs 3102 and 3104 can be configured to communicate using Orthogonal Frequency-Division Multiplexing (OFDM) communication signals with each other or with any of RAN nodes 3118 and 3120 over a multi-carrier communication channel in accordance various communication techniques, such as, but not limited to, an Orthogonal Frequency Division Multiple Access (OFDMA) communication technique (e.g., for downlink communications) or a Single Carrier Frequency Division Multiple Access (SC-FDMA) communication technique (e.g., for uplink and ProSe or sidelink communications), and/or variations thereof. In at least one embodiment, OFDM signals can include a plurality of orthogonal subcarriers.

In at least one embodiment, a downlink resource grid can be used for downlink transmissions from any of RAN nodes 3118 and 3120 to UEs 3102 and 3104, while uplink transmissions can utilize similar techniques. In at least one embodiment, a grid can be a time frequency grid, called a resource grid or time-frequency resource grid, which is a physical resource in a downlink in each slot. In at least one embodiment, such a time frequency plane representation is a common practice for OFDM systems, which makes it intuitive for radio resource allocation. In at least one embodiment, each column and each row of a resource grid corresponds to one OFDM symbol and one OFDM subcarrier, respectively. In at least one embodiment, a duration of a resource grid in a time domain corresponds to one slot in a radio frame. In at least one embodiment, a smallest time-frequency unit in a resource grid is denoted as a resource element. In at least one embodiment, each resource grid includes a number of resource blocks, which describe a mapping of certain physical channels to resource elements. In at least one embodiment, each resource block includes a collection of resource elements. In at least one embodiment, in a frequency domain, this may represent a smallest quantity of resources that currently can be allocated. In at least one embodiment, there are several different physical downlink channels that are conveyed using such resource blocks.

In at least one embodiment, a physical downlink shared channel (PDSCH) may carry user data and higher-layer signaling to UEs 3102 and 3104. In at least one embodiment, a physical downlink control channel (PDCCH) may carry information about a transport format and resource allocations related to PDSCH channel, among other things. In at least one embodiment, it may also inform UEs 3102 and 3104 about a transport format, resource allocation, and HARQ (Hybrid Automatic Repeat Request) information related to an uplink shared channel. In at least one embodiment, typically, downlink scheduling (assigning control and shared channel resource blocks to UE 3102 within a cell) may be performed at any of RAN nodes 3118 and 3120 based on channel quality information fed back from any of UEs 3102 and 3104. In at least one embodiment, downlink resource assignment information may be sent on a PDCCH used for (e.g., assigned to) each of UEs 3102 and 3104.

In at least one embodiment, a PDCCH may use control channel elements (CCEs) to convey control information. In at least one embodiment, before being mapped to resource elements, PDCCH complex valued symbols may first be organized into quadruplets, which may then be permuted using a sub-block interleaver for rate matching. In at least one embodiment, each PDCCH may be transmitted using one or more of these CCEs, where each CCE may correspond to nine sets of four physical resource elements known as resource element groups (REGs). In at least one embodiment, four Quadrature Phase Shift Keying (QPSK) symbols may be mapped to each REG. In at least one embodiment, PDCCH can be transmitted using one or more CCEs, depending on a size of a downlink control information (DCI) and a channel condition. In at least one embodiment, there can be four or more different PDCCH formats defined in LTE with different numbers of CCEs (e.g., aggregation level, L=1, 2, 4, or 8).

In at least one embodiment, an enhanced physical downlink control channel (EPDCCH) that uses PDSCH resources may be utilized for control information transmission. In at least one embodiment, EPDCCH may be transmitted using one or more enhanced control channel elements (ECCEs). In at least one embodiment, each ECCE may correspond to nine sets of four physical resource elements known as an enhanced resource element groups (EREGs). In at least one embodiment, an ECCE may have other numbers of EREGs in some situations.

In at least one embodiment, RAN 3116 is shown to be communicatively coupled to a core network (CN) 3138 via an S1 interface 3122. In at least one embodiment, CN 3138 may be an evolved packet core (EPC) network, a NextGen Packet Core (NPC) network, or some other type of CN. In at least one embodiment, S1 interface 3122 is split into two parts: S1-U interface 3126, which carries traffic data between RAN nodes 3118 and 3120 and serving gateway (S-GW) 3130, and a S1-mobility management entity (MME) interface 3124, which is a signaling interface between RAN nodes 3118 and 3120 and MMEs 3128.

In at least one embodiment, CN 3138 includes MMEs 3128, S-GW 3130, Packet Data Network (PDN) Gateway (P-GW) 3134, and a home subscriber server (HSS) 3132. In at least one embodiment, MMEs 3128 may be similar in function to a control plane of legacy Serving General Packet Radio Service (GPRS) Support Nodes (SGSN). In at least one embodiment, MMES 3128 may manage mobility aspects in access such as gateway selection and tracking area list management. In at least one embodiment, HSS 3132 may include a database for network users, including subscription related information to support a network entities' handling of communication sessions. In at least one embodiment, CN 3138 may include one or several HSSs 3132, depending on a number of mobile subscribers, on a capacity of an equipment, on an organization of a network, etc. In at least one embodiment, HSS 3132 can provide support for routing/roaming, authentication, authorization, naming/addressing resolution, location dependencies, etc.

In at least one embodiment, S-GW 3130 may terminate a S1 interface 3122 towards RAN 3116, and routes data packets between RAN 3116 and CN 3138. In at least one embodiment, S-GW 3130 may be a local mobility anchor point for inter-RAN node handovers and also may provide an anchor for inter-3GPP mobility. In at least one embodiment, other responsibilities may include lawful intercept, charging, and some policy enforcement.

In at least one embodiment, P-GW 3134 may terminate an SGi interface toward a PDN. In at least one embodiment, P-GW 3134 may route data packets between an EPC network 3138 and external networks such as a network including application server 3140 (alternatively referred to as application function (AF)) via an Internet Protocol (IP) interface 3142. In at least one embodiment, application server 3140 may be an element offering applications that use IP bearer resources with a core network (e.g., UMTS Packet Services (PS) domain, LTE PS data services, etc.). In at least one embodiment, P-GW 3134 is shown to be communicatively coupled to an application server 3140 via an IP communications interface 3142. In at least one embodiment, application server 3140 can also be configured to support one or more communication services (e.g., Voice-over-Internet Protocol (VoIP) sessions, PTT sessions, group communication sessions, social networking services, etc.) for UEs 3102 and 3104 via CN 3138.

In at least one embodiment, P-GW 3134 may further be a node for policy enforcement and charging data collection. In at least one embodiment, policy and Charging Enforcement Function (PCRF) 3136 is a policy and charging control element of CN 3138. In at least one embodiment, in a non-roaming scenario, there may be a single PCRF in a Home Public Land Mobile Network (HPLMN) associated with a UE's Internet Protocol Connectivity Access Network (IP-CAN) session. In at least one embodiment, in a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). In at least one embodiment, PCRF 3136 may be communicatively coupled to application server 3140 via P-GW 3134. In at least one embodiment, application server 3140 may signal PCRF 3136 to indicate a new service flow and select an appropriate Quality of Service (QoS) and charging parameters. In at least one embodiment, PCRF 3136 may provision this rule into a Policy and Charging Enforcement Function (PCEF) (not shown) with an appropriate traffic flow template (TFT) and QoS class of identifier (QCI), which commences a QoS and charging as specified by application server 3140.

In at least one embodiment, the system 3100 may be used to implement the system 100 (see FIG. 1). For example, the system 3100 may be used to implement at least a portion of the external network 110 and/or the application server 3140 may be used to implement one or more of the server(s) 102 and/or the computing system 132 (see FIG. 1). In at least one embodiment, at least one of the UE 3102 and 3104 may be used to implement at least one of the external computing device(s) 114. In at least one embodiment, at least a portion of the system(s) depicted in FIG. 31 is used to implement one or more systems, techniques, functions, and/or processes described in connection with FIGS. 1-16. For example, in at least one embodiment, at least one component shown or described with respect to FIG. 31 is used to create hardware component groups on which virtual machines may be executed and/or to which virtual machine states may be migrated in accordance with one or more techniques, functions, and/or processes described with respect to any of FIGS. 1-16.

FIG. 32 illustrates an architecture of a system 3200 of a network in accordance with some embodiments. In at least one embodiment, system 3200 is shown to include a UE 3202, a 5G access node or RAN node (shown as (R)AN node 3208), a User Plane Function (shown as UPF 3204), a Data Network (DN 3206), which may be, for example, operator services, Internet access or 3rd party services, and a 5G Core Network (5GC) (shown as CN 3210).

In at least one embodiment, CN 3210 includes an Authentication Server Function (AUSF 3214); a Core Access and Mobility Management Function (AMF 3212); a Session Management Function (SMF 3218); a Network Exposure Function (NEF 3216); a Policy Control Function (PCF 3222); a Network Function (NF) Repository Function (NRF 3220); a Unified Data Management (UDM 3224); and an Application Function (AF 3226). In at least one embodiment, CN 3210 may also include other elements that are not shown, such as a Structured Data Storage network function (SDSF), an Unstructured Data Storage network function (UDSF), and variations thereof.

In at least one embodiment, UPF 3204 may act as an anchor point for intra-RAT and inter-RAT mobility, an external PDU session point of interconnect to DN 3206, and a branching point to support multi-homed PDU session. In at least one embodiment, UPF 3204 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in uplink and downlink, and downlink packet buffering and downlink data notification triggering. In at least one embodiment, UPF 3204 may include an uplink classifier to support routing traffic flows to a data network. In at least one embodiment, DN 3206 may represent various network operator services, Internet access, or third party services.

In at least one embodiment, AUSF 3214 may store data for authentication of UE 3202 and handle authentication related functionality. In at least one embodiment, AUSF 3214 may facilitate a common authentication framework for various access types.

In at least one embodiment, AMF 3212 may be responsible for registration management (e.g., for registering UE 3202, etc.), connection management, reachability management, mobility management, and lawful interception of AMF-related events, and access authentication and authorization. In at least one embodiment, AMF 3212 may provide transport for SM messages for SMF 3218, and act as a transparent proxy for routing SM messages. In at least one embodiment, AMF 3212 may also provide transport for short message service (SMS) messages between UE 3202 and an SMS function (SMSF) (not shown by FIG. 32). In at least one embodiment, AMF 3212 may act as Security Anchor Function (SEA), which may include interaction with AUSF 3214 and UE 3202 and receipt of an intermediate key that was established as a result of UE 3202 authentication process. In at least one embodiment, where USIM based authentication is used, AMF 3212 may retrieve security material from AUSF 3214. In at least one embodiment, AMF 3212 may also include a Security Context Management (SCM) function, which receives a key from SEA that it uses to derive access-network specific keys. In at least one embodiment, furthermore, AMF 3212 may be a termination point of RAN CP interface (N2 reference point), a termination point of NAS (NI) signaling, and perform NAS ciphering and integrity protection.

In at least one embodiment, AMF 3212 may also support NAS signaling with a UE 3202 over an N3 interworking-function (IWF) interface. In at least one embodiment, N3IWF may be used to provide access to untrusted entities. In at least one embodiment, N3IWF may be a termination point for N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in uplink, and enforce QoS corresponding to N3 packet marking taking into account QoS requirements associated to such marking received over N2. In at least one embodiment, N3IWF may also relay uplink and downlink control-plane NAS (NI) signaling between UE 3202 and AMF 3212, and relay uplink and downlink user-plane packets between UE 3202 and UPF 3204. In at least one embodiment, N3IWF also provides mechanisms for IPsec tunnel establishment with UE 3202.

In at least one embodiment, SMF 3218 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. In at least one embodiment, SMF 3218 may include following roaming functionality: handle local enforcement to apply QoS SLAB (VPLMN); charging data collection and charging interface (VPLMN); lawful intercept (in VPLMN for SM events and interface to LI System); support for interaction with external DN for transport of signaling for PDU session authorization/authentication by external DN.

In at least one embodiment, NEF 3216 may provide means for securely exposing services and capabilities provided by 3GPP network functions for third party, internal exposure/re-exposure, Application Functions (e.g., AF 3226), edge computing or fog computing systems, etc. In at least one embodiment, NEF 3216 may authenticate, authorize, and/or throttle AFs. In at least one embodiment, NEF 3216 may also translate information exchanged with AF 3226 and information exchanged with internal network functions. In at least one embodiment, NEF 3216 may translate between an AF-Service-Identifier and an internal 5GC information. In at least one embodiment, NEF 3216 may also receive information from other network functions (NFs) based on exposed capabilities of other network functions. In at least one embodiment, this information may be stored at NEF 3216 as structured data, or at a data storage NF using a standardized interfaces. In at least one embodiment, stored information can then be re-exposed by NEF 3216 to other NFs and AFs, and/or used for other purposes such as analytics.

In at least one embodiment, NRF 3220 may support service discovery functions, receive NF Discovery Requests from NF instances, and provide information of discovered NF instances to NF instances. In at least one embodiment, NRF 3220 also maintains information of available NF instances and their supported services.

In at least one embodiment, PCF 3222 may provide policy rules to control plane function(s) to enforce them, and may also support unified policy framework to govern network behavior. In at least one embodiment, PCF 3222 may also implement a front end (FE) to access subscription information relevant for policy decisions in a UDR of UDM 3224.

In at least one embodiment, UDM 3224 may handle subscription-related information to support a network entities' handling of communication sessions, and may store subscription data of UE 3202. In at least one embodiment, UDM 3224 may include two parts, an application FE and a User Data Repository (UDR). In at least one embodiment, UDM may include a UDM FE, which is in charge of processing of credentials, location management, subscription management and so on. In at least one embodiment, several different front ends may serve a same user in different transactions. In at least one embodiment, UDM-FE accesses subscription information stored in an UDR and performs authentication credential processing; user identification handling; access authorization; registration/mobility management; and subscription management. In at least one embodiment, UDR may interact with PCF 3222. In at least one embodiment, UDM 3224 may also support SMS management, wherein an SMS-FE implements a similar application logic as discussed previously.

In at least one embodiment, AF 3226 may provide application influence on traffic routing, access to a Network Capability Exposure (NCE), and interact with a policy framework for policy control. In at least one embodiment, NCE may be a mechanism that allows a 5GC and AF 3226 to provide information to each other via NEF 3216, which may be used for edge computing implementations. In at least one embodiment, network operator and third party services may be hosted close to UE 3202 access point of attachment to achieve an efficient service delivery through a reduced end-to-end latency and load on a transport network. In at least one embodiment, for edge computing implementations, 5GC may select a UPF 3204 close to UE 3202 and execute traffic steering from UPF 3204 to DN 3206 via N6 interface. In at least one embodiment, this may be based on UE subscription data, UE location, and information provided by AF 3226. In at least one embodiment, AF 3226 may influence UPF (re)selection and traffic routing. In at least one embodiment, based on operator deployment, when AF 3226 is considered to be a trusted entity, a network operator may permit AF 3226 to interact directly with relevant NFs.

In at least one embodiment, CN 3210 may include an SMSF, which may be responsible for SMS subscription checking and verification, and relaying SM messages to/from UE 3202 to/from other entities, such as an SMS-GMSC/IWMSC/SMS-router. In at least one embodiment, SMS may also interact with AMF 3212 and UDM 3224 for notification procedure that UE 3202 is available for SMS transfer (e.g., set a UE not reachable flag, and notifying UDM 3224 when UE 3202 is available for SMS).

In at least one embodiment, system 3200 may include following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

In at least one embodiment, system 3200 may include following reference points: N1: Reference point between UE and AMF; N2: Reference point between (R)AN and AMF; N3: Reference point between (R)AN and UPF; N4: Reference point between SMF and UPF; and N6: Reference point between UPF and a Data Network. In at least one embodiment, there may be many more reference points and/or service-based interfaces between a NF services in NFs, however, these interfaces and reference points have been omitted for clarity. In at least one embodiment, an NS reference point may be between a PCF and AF; an N7 reference point may be between PCF and SMF; an N11 reference point between AMF and SMF; etc. In at least one embodiment, CN 3210 may include an Nx interface, which is an inter-CN interface between MME and AMF 3212 in order to enable interworking between CN 3210 and CN 7232.

In at least one embodiment, system 3200 may include multiple RAN nodes (such as (R)AN node 3208) wherein an Xn interface is defined between two or more (R)AN node 3208 (e.g., gNBs) that connecting to 5GC 410, between a (R)AN node 3208 (e.g., gNB) connecting to CN 3210 and an eNB (e.g., a macro RAN node), and/or between two eNBs connecting to CN 3210.

In at least one embodiment, Xn interface may include an Xn user plane (Xn-U) interface and an Xn control plane (Xn-C) interface. In at least one embodiment, Xn-U may provide non-guaranteed delivery of user plane PDUs and support/provide data forwarding and flow control functionality. In at least one embodiment, Xn-C may provide management and error handling functionality, functionality to manage a Xn-C interface; mobility support for UE 3202 in a connected mode (e.g., CM-CONNECTED) including functionality to manage UE mobility for connected mode between one or more (R)AN node 3208. In at least one embodiment, mobility support may include context transfer from an old (source) serving (R)AN node 3208 to new (target) serving (R)AN node 3208; and control of user plane tunnels between old (source) serving (R)AN node 3208 to new (target) serving (R)AN node 3208.

In at least one embodiment, a protocol stack of a Xn-U may include a transport network layer built on Internet Protocol (IP) transport layer, and a GTP-U layer on top of a UDP and/or IP layer(s) to carry user plane PDUs. In at least one embodiment, Xn-C protocol stack may include an application layer signaling protocol (referred to as Xn Application Protocol (Xn-AP)) and a transport network layer that is built on an SCTP layer. In at least one embodiment, SCTP layer may be on top of an IP layer. In at least one embodiment, SCTP layer provides a guaranteed delivery of application layer messages. In at least one embodiment, in a transport IP layer point-to-point transmission is used to deliver signaling PDUs. In at least one embodiment, Xn-U protocol stack and/or a Xn-C protocol stack may be same or similar to an user plane and/or control plane protocol stack(s) shown and described herein.

In at least one embodiment, the network implemented by the system 3200 may be used to implement the system 100 (see FIG. 1). For example, the network implemented by the system 3200 may be used to implement at least a portion of the external network 110, and/or the UE 3202 may be used to implement at least one of the external computing device(s) 112. In at least one embodiment, at least a portion of the system(s) depicted in FIG. 32 is used to implement one or more systems, techniques, functions, and/or processes described in connection with FIGS. 1-16. For example, in at least one embodiment, at least one component shown or described with respect to FIG. 32 is used to create hardware component groups on which virtual machines may be executed and/or to which virtual machine states may be migrated in accordance with one or more techniques, functions, and/or processes described with respect to any of FIGS. 1-16.

FIG. 33 is an illustration of a control plane protocol stack in accordance with some embodiments. In at least one embodiment, a control plane 3300 is shown as a communications protocol stack between UE 3102 (or alternatively, UE 3104), RAN 3116, and MME(s) 3128.

In at least one embodiment, PHY layer 3302 may transmit or receive information used by MAC layer 3304 over one or more air interfaces. In at least one embodiment, PHY layer 3302 may further perform link adaptation or adaptive modulation and coding (AMC), power control, cell search (e.g., for initial synchronization and handover purposes), and other measurements used by higher layers, such as an RRC layer 3310. In at least one embodiment, PHY layer 3302 may still further perform error detection on transport channels, forward error correction (FEC) coding/de-coding of transport channels, modulation/demodulation of physical channels, interleaving, rate matching, mapping onto physical channels, and Multiple Input Multiple Output (MIMO) antenna processing.

In at least one embodiment, MAC layer 3304 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from PHY via transport channels, multiplexing MAC SDUs onto TBs, scheduling information reporting, error correction through hybrid automatic repeat request (HARD), and logical channel prioritization.

In at least one embodiment, RLC layer 3306 may operate in a plurality of modes of operation, including: Transparent Mode (TM), Unacknowledged Mode (UM), and Acknowledged Mode (AM). In at least one embodiment, RLC layer 3306 may execute transfer of upper layer protocol data units (PDUs), error correction through automatic repeat request (ARQ) for AM data transfers, and concatenation, segmentation and reassembly of RLC SDUs for UM and AM data transfers. In at least one embodiment, RLC layer 3306 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

In at least one embodiment, PDCP layer 3308 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

In at least one embodiment, main services and functions of a RRC layer 3310 may include broadcast of system information (e.g., included in Master Information Blocks (MIBs) or System Information Blocks (SIBs) related to a non-access stratum (NAS)), broadcast of system information related to an access stratum (AS), paging, establishment, maintenance and release of an RRC connection between an UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. In at least one embodiment, said MIBs and SIBs may include one or more information elements (IEs), which may each include individual data fields or data structures.

In at least one embodiment, UE 3102 and RAN 3116 may utilize a Uu interface (e.g., an LTE-Uu interface) to exchange control plane data via a protocol stack including PHY layer 3302, MAC layer 3304, RLC layer 3306, PDCP layer 3308, and RRC layer 3310.

In at least one embodiment, non-access stratum (NAS) protocols (NAS protocols 3312) form a highest stratum of a control plane between UE 3102 and MME(s) 3128. In at least one embodiment, NAS protocols 3312 support mobility of UE 3102 and session management procedures to establish and maintain IP connectivity between UE 3102 and P-GW 3134.

In at least one embodiment, Si Application Protocol (S1-AP) layer (Si-AP layer 3322) may support functions of a Si interface and include Elementary Procedures (EPs). In at least one embodiment, an EP is a unit of interaction between RAN 3116 and CN 3128. In at least one embodiment, S1-AP layer services may include two groups: UE-associated services and non UE-associated services. In at least one embodiment, these services perform functions including, but not limited to: E-UTRAN Radio Access Bearer (E-RAB) management, UE capability indication, mobility, NAS signaling transport, RAN Information Management (RIM), and configuration transfer.

In at least one embodiment, Stream Control Transmission Protocol (SCTP) layer (alternatively referred to as a stream control transmission protocol/internet protocol (SCTP/IP) layer) (SCTP layer 3320) may ensure reliable delivery of signaling messages between RAN 3116 and MME(s) 3128 based, in part, on an IP protocol, supported by an IP layer 3318. In at least one embodiment, L2 layer 3316 and an L1 layer 3314 may refer to communication links (e.g., wired or wireless) used by a RAN node and MME to exchange information.

In at least one embodiment, RAN 3116 and MME(s) 3128 may utilize an S1-MME interface to exchange control plane data via a protocol stack including a L1 layer 3314, L2 layer 3316, IP layer 3318, SCTP layer 3320, and Si-AP layer 3322.

FIG. 34 is an illustration of a user plane protocol stack in accordance with at least one embodiment. In at least one embodiment, a user plane 3400 is shown as a communications protocol stack between a UE 3102, RAN 3116, S-GW 3130, and P-GW 3134. In at least one embodiment, user plane 3400 may utilize a same protocol layers as control plane 3300. In at least one embodiment, for example, UE 3102 and RAN 3116 may utilize a Uu interface (e.g., an LTE-Uu interface) to exchange user plane data via a protocol stack including PHY layer 3302, MAC layer 3304, RLC layer 3306, PDCP layer 3308.

In at least one embodiment, General Packet Radio Service (GPRS) Tunneling Protocol for a user plane (GTP-U) layer (GTP-U layer 3404) may be used for carrying user data within a GPRS core network and between a radio access network and a core network. In at least one embodiment, user data transported can be packets in any of IPv4, IPv6, or PPP formats, for example. In at least one embodiment, UDP and IP security (UDP/IP) layer (UDP/IP layer 3402) may provide checksums for data integrity, port numbers for addressing different functions at a source and destination, and encryption and authentication on selected data flows. In at least one embodiment, RAN 3116 and S-GW 3130 may utilize an S1-U interface to exchange user plane data via a protocol stack including L1 layer 3314, L2 layer 3316, UDP/IP layer 3402, and GTP-U layer 3404. In at least one embodiment, S-GW 3130 and P-GW 3134 may utilize an S5/S8a interface to exchange user plane data via a protocol stack including L1 layer 3314, L2 layer 3316, UDP/IP layer 3402, and GTP-U layer 3404. In at least one embodiment, as discussed above with respect to FIG. 33, NAS protocols support a mobility of UE 3102 and session management procedures to establish and maintain IP connectivity between UE 3102 and P-GW 3134.

FIG. 35 illustrates components 3500 of a core network in accordance with at least one embodiment. In at least one embodiment, components of CN 3138 may be implemented in one physical node or separate physical nodes including components to read and execute instructions from a machine-readable or computer-readable medium (e.g., a non-transitory machine-readable storage medium). In at least one embodiment, Network Functions Virtualization (NFV) is utilized to virtualize any or all of above described network node functions via executable instructions stored in one or more computer readable storage mediums (described in further detail below). In at least one embodiment, a logical instantiation of CN 3138 may be referred to as a network slice 3502 (e.g., network slice 3502 is shown to include HSS 3132, MME(s) 3128, and S-GW 3130). In at least one embodiment, a logical instantiation of a portion of CN 3138 may be referred to as a network sub-slice 3504 (e.g., network sub-slice 3504 is shown to include P-GW 3134 and PCRF 3136).

In at least one embodiment, NFV architectures and infrastructures may be used to virtualize one or more network functions, alternatively performed by proprietary hardware, onto physical resources including a combination of industry-standard server hardware, storage hardware, or switches. In at least one embodiment, NFV systems can be used to execute virtual or reconfigurable implementations of one or more EPC components/functions.

FIG. 36 is a block diagram illustrating components, according to at least one embodiment, of a system 3600 to support network function virtualization (NFV). In at least one embodiment, system 3600 is illustrated as including a virtualized infrastructure manager (shown as VIM 3602), a network function virtualization infrastructure (shown as NFVI 3604), a VNF manager (shown as VNFM 3606), virtualized network functions (shown as VNF 3608), an element manager (shown as EM 3610), an NFV Orchestrator (shown as NFVO 3612), and a network manager (shown as NM 3614).

In at least one embodiment, VIM 3602 manages resources of NFVI 3604. In at least one embodiment, NFVI 3604 can include physical or virtual resources and applications (including hypervisors) used to execute system 3600. In at least one embodiment, VIM 3602 may manage a life cycle of virtual resources with NFVI 3604 (e.g., creation, maintenance, and tear down of virtual machines (VMs) associated with one or more physical resources), track VM instances, track performance, fault and security of VM instances and associated physical resources, and expose VM instances and associated physical resources to other management systems.

In at least one embodiment, VNFM 3606 may manage VNF 3608. In at least one embodiment, VNF 3608 may be used to execute EPC components/functions. In at least one embodiment, VNFM 3606 may manage a life cycle of VNF 3608 and track performance, fault and security of virtual aspects of VNF 3608. In at least one embodiment, EM 3610 may track performance, fault and security of functional aspects of VNF 3608. In at least one embodiment, tracking data from VNFM 3606 and EM 3610 may include, for example, performance measurement (PM) data used by VIM 3602 or NFVI 3604. In at least one embodiment, both VNFM 3606 and EM 3610 can scale up/down a quantity of VNFs of system 3600.

In at least one embodiment, NFVO 3612 may coordinate, authorize, release and engage resources of NFVI 3604 in order to provide a requested service (e.g., to execute an EPC function, component, or slice). In at least one embodiment, NM 3614 may provide a package of end-user functions with responsibility for a management of a network, which may include network elements with VNFs, non-virtualized network functions, or both (management of VNFs may occur via an EM 3610).

In at least one embodiment, the system 3600 may be used to implement the system 100 (see FIG. 1). For example, the virtual network implemented by the system 3600 may be used to implement at least a portion of the external network 110, and/or the UE 3602 may be used to implement at least one of the external computing device(s) 112. In at least one embodiment, at least a portion of the system(s) depicted in FIG. 36 is used to implement one or more systems, techniques, functions, and/or processes described in connection with FIGS. 1-16. For example, in at least one embodiment, at least one component shown or described with respect to FIG. 36 is used to create hardware component groups on which virtual machines may be executed and/or to which virtual machine states may be migrated in accordance with one or more techniques, functions, and/or processes described with respect to any of FIGS. 1-16.

Computer-Based Systems

The following figures set forth, without limitation, exemplary computer-based systems that can be used to implement at least one embodiment.

FIG. 37 illustrates a processing system 3700, in accordance with at least one embodiment. In at least one embodiment, processing system 3700 includes one or more processors 3702 and one or more graphics processors 3708, and may be a single processor desktop system, a multiprocessor workstation system, or a server system having a large number of processors 3702 or processor cores 3707. In at least one embodiment, processing system 3700 is a processing platform incorporated within a system-on-a-chip ("Sort") integrated circuit for use in mobile, handheld, or embedded devices.

In at least one embodiment, processing system 3700 can include, or be incorporated within a server-based gaming platform, a game console, a media console, a mobile gaming console, a handheld game console, or an online game console. In at least one embodiment, processing system 3700 is a mobile phone, smart phone, tablet computing device or mobile Internet device. In at least one embodiment, processing system 3700 can also include, couple with, or be integrated within a wearable device, such as a smart watch wearable device, smart eyewear device, augmented reality device, or virtual reality device. In at least one embodiment, processing system 3700 is a television or set top box device having one or more processors 3702 and a graphical interface generated by one or more graphics processors 3708.

In at least one embodiment, one or more processors 3702 each include one or more processor cores 3707 to process instructions which, when executed, perform operations for system and user software. In at least one embodiment, each of one or more processor cores 3707 is configured to process a specific instruction set 3709. In at least one embodiment, instruction set 3709 may facilitate Complex Instruction Set Computing ("CISC"), Reduced Instruction Set Computing ("RISC"), or computing via a Very Long Instruction Word ("VLIW"). In at least one embodiment, processor cores 3707 may each process a different instruction set 3709, which may include instructions to facilitate emulation of other instruction sets. In at least one embodiment, processor core 3707 may also include other processing devices, such as a digital signal processor ("DSP").

In at least one embodiment, processor 3702 includes cache memory ("cache") 3704. In at least one embodiment, processor 3702 can have a single internal cache or multiple levels of internal cache. In at least one embodiment, cache memory is shared among various components of processor 3702. In at least one embodiment, processor 3702 also uses an external cache (e.g., a Level 3 ("L3") cache or Last Level Cache ("LLC")) (not shown), which may be shared among processor cores 3707 using known cache coherency techniques. In at least one embodiment, register file 3706 is additionally included in processor 3702 which may include different types of registers for storing different types of data (e.g., integer registers, floating point registers, status registers, and an instruction pointer register). In at least one embodiment, register file 3706 may include general-purpose registers or other registers.

In at least one embodiment, one or more processor(s) 3702 are coupled with one or more interface bus(es) 3710 to transmit communication signals such as address, data, or control signals between processor 3702 and other components in processing system 3700. In at least one embodiment interface bus 3710, in one embodiment, can be a processor bus, such as a version of a Direct Media Interface ("DMI") bus. In at least one embodiment, interface bus 3710 is not limited to a DMI bus, and may include one or more Peripheral Component Interconnect buses (e.g., "PCI," PCI Express ("PCIe")), memory buses, or other types of interface buses. In at least one embodiment processor(s) 3702 include an integrated memory controller 3716 and a platform controller hub 3730. In at least one embodiment, memory controller 3716 facilitates communication between a memory device and other components of processing system 3700, while platform controller hub ("PCH") 3730 provides connections to Input/Output ("I/O") devices via a local I/O bus.

In at least one embodiment, memory device 3720 can be a dynamic random access memory ("DRAM") device, a static random access memory ("SRAM") device, flash memory device, phase-change memory device, or some other memory device having suitable performance to serve as processor memory. In at least one embodiment memory device 3720 can operate as system memory for processing system 3700, to store data 3722 and instructions 3721 for use when one or more processors 3702 executes an application or process. In at least one embodiment, memory controller 3716 also couples with an optional external graphics processor 3712, which may communicate with one or more graphics processors 3708 in processors 3702 to perform graphics and media operations. In at least one embodiment, a display device 3711 can connect to processor(s) 3702. In at least one embodiment display device 3711 can include one or more of an internal display device, as in a mobile electronic device or a laptop device or an external display device attached via a display interface (e.g., DisplayPort, etc.). In at least one embodiment, display device 3711 can include a head mounted display ("HMD") such as a stereoscopic display device for use in virtual reality ("VR") applications or augmented reality ("AR") applications.

In at least one embodiment, platform controller hub 3730 enables peripherals to connect to memory device 3720 and processor 3702 via a high-speed I/O bus. In at least one embodiment, I/O peripherals include, but are not limited to, an audio controller 3746, a network controller 3734, a firmware interface 3728, a wireless transceiver 3726, touch sensors 3725, a data storage device 3724 (e.g., hard disk drive, flash memory, etc.). In at least one embodiment, data storage device 3724 can connect via a storage interface (e.g., SATA) or via a peripheral bus, such as PCI, or PCIe. In at least one embodiment, touch sensors 3725 can include touch screen sensors, pressure sensors, or fingerprint sensors. In at least one embodiment, wireless transceiver 3726 can be a Wi-Fi transceiver, a Bluetooth transceiver, or a mobile network transceiver such as a 3G, 4G, or Long Term Evolution ("LTE") transceiver. In at least one embodiment, firmware interface 3728 enables communication with system firmware, and can be, for example, a unified extensible firmware interface ("UEFI"). In at least one embodiment, network controller 3734 can enable a network connection to a wired network. In at least one embodiment, a high-performance network controller (not shown) couples with interface bus 3710. In at least one embodiment, audio controller 3746 is a multi-channel high definition audio controller. In at least one embodiment, processing system 3700 includes an optional legacy I/O controller 3740 for coupling legacy (e.g., Personal System 2 ("PS/2")) devices to processing system 3700. In at least one embodiment, platform controller hub 3730 can also connect to one or more Universal Serial Bus ("USB") controllers 3742 connect input devices, such as keyboard and mouse 3743 combinations, a camera 3744, or other USB input devices.

In at least one embodiment, an instance of memory controller 3716 and platform controller hub 3730 may be integrated into a discreet external graphics processor, such as external graphics processor 3712. In at least one embodiment, platform controller hub 3730 and/or memory controller 3716 may be external to one or more processor(s) 3702. For example, in at least one embodiment, processing system 3700 can include an external memory controller 3716 and platform controller hub 3730, which may be configured as a memory controller hub and peripheral controller hub within a system chipset that is in communication with processor(s) 3702.

In at least one embodiment, the processing system 3700 may be used to implement the system 100 (see FIG. 1). For example, the processing system 3700 may be used to implement one or more of the server(s) 102 (see FIG. 1), the computing system 132 (see FIG. 1), at least one of the external computing device(s) 112, and/or one or more of the network interfaces 230 (see FIG. 2), 330, 930, 1030, 1130, and/or 1230. In at least one embodiment, at least one of the processor(s) 3702, the graphics processor(s) 3708, the processor core(s) 3707, and/or the external graphics processor 3712 may be used to implement the CPU(s) 210, 310, 910, 1010, 1110, 1210, and/or the processor of the computing system 132. In at least one embodiment, at least one of the processor(s) 3702, the graphics processor(s) 3708, the processor core(s) 3707, and/or the external graphics processor 3712 may be used to implement the GPUs 240, 340, 940, 1040, 1140, and/or 1240. In at least one embodiment, the network controller 3734 may be used to implement one or more of the network interfaces 230 (see FIG. 2), 330, 930, 1030, 1130, and/or 1230. In at least one embodiment, the instruction set 3709 and/or the instructions 3721 may include the instructions 262 and/or the instructions implementing the virtualization management application 130 and/or the VM database 134. In at least one embodiment, the memory device 3720, the data storage device 3724, and/or the cache 3704 may be used to implement the memory 260 and/or the memory of the computing system 132. In at least one embodiment, at least a portion of the system(s) depicted in FIG. 37 is used to implement one or more systems, techniques, functions, and/or processes described in connection with FIGS. 1-16. For example, in at least one embodiment, at least one component shown or described with respect to FIG. 37 is used to create hardware component groups on which virtual machines may be executed and/or to which virtual machine states may be migrated in accordance with one or more techniques, functions, and/or processes described with respect to any of FIGS. 1-16.

FIG. 38 illustrates a computer system 3800, in accordance with at least one embodiment. In at least one embodiment, computer system 3800 may be a system with interconnected devices and components, an SOC, or some combination. In at least on embodiment, computer system 3800 is formed with a processor 3802 that may include execution units to execute an instruction. In at least one embodiment, computer system 3800 may include, without limitation, a component, such as processor 3802 to employ execution units including logic to perform algorithms for processing data. In at least one embodiment, computer system 3800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 3800 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 3800 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions.

In at least one embodiment, computer system 3800 may include, without limitation, processor 3802 that may include, without limitation, one or more execution units 3808 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 3800 is a single processor desktop or server system. In at least one embodiment, computer system 3800 may be a multiprocessor system. In at least one embodiment, processor 3802 may include, without limitation, a CISC microprocessor, a RISC microprocessor, a VLIW microprocessor, a processor implementing a combination of instruction sets, or any other processor device, such as a digital signal processor, for example. In at least one embodiment, processor 3802 may be coupled to a processor bus 3810 that may transmit data signals between processor 3802 and other components in computer system 3800.

In at least one embodiment, processor 3802 may include, without limitation, a Level 1 ("L1") internal cache memory ("cache") 3804. In at least one embodiment, processor 3802 may have a single internal cache or multiple levels of internal cache. In at least one embodiment, cache memory may reside external to processor 3802. In at least one embodiment, processor 3802 may also include a combination of both internal and external caches. In at least one embodiment, a register file 3806 may store different types of data in various registers including, without limitation, integer registers, floating point registers, status registers, and instruction pointer register.

In at least one embodiment, execution unit 3808, including, without limitation, logic to perform integer and floating point operations, also resides in processor 3802. Processor 3802 may also include a microcode ("ucode") read only memory ("ROM") that stores microcode for certain macro instructions. In at least one embodiment, execution unit 3808 may include logic to handle a packed instruction set 3809. In at least one embodiment, by including packed instruction set 3809 in an instruction set of a general-purpose processor 3802, along with associated circuitry to execute instructions, operations used by many multimedia applications may be performed using packed data in a general-purpose processor 3802. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 3808 may also be used in microcontrollers, embedded processors, graphics devices, DSPs, and other types of logic circuits. In at least one embodiment, computer system 3800 may include, without limitation, a memory 3820. In at least one embodiment, memory 3820 may be implemented as a DRAM device, an SRAM device, flash memory device, or other memory device. Memory 3820 may store instruction(s) 3819 and/or data 3821 represented by data signals that may be executed by processor 3802.

In at least one embodiment, a system logic chip may be coupled to processor bus 3810 and memory 3820. In at least one embodiment, a system logic chip may include, without limitation, a memory controller hub ("MCH") 3816, and processor 3802 may communicate with MCH 3816 via processor bus 3810. In at least one embodiment, MCH 3816 may provide a high bandwidth memory path 3818 to memory 3820 for instruction and data storage and for storage of graphics commands, data and textures. In at least one embodiment, MCH 3816 may direct data signals between processor 3802, memory 3820, and other components in computer system 3800 and to bridge data signals between processor bus 3810, memory 3820, and a system I/O 3822. In at least one embodiment, system logic chip may provide a graphics port for coupling to a graphics controller. In at least one embodiment, MCH 3816 may be coupled to memory 3820 through high bandwidth memory path 3818 and graphics/video card 3812 may be coupled to MCH 3816 through an Accelerated Graphics Port ("AGP") interconnect 3814.

In at least one embodiment, computer system 3800 may use system I/O 3822 that is a proprietary hub interface bus to couple MCH 3816 to I/O controller hub ("ICH") 3830. In at least one embodiment, ICH 3830 may provide direct connections to some I/O devices via a local I/O bus. In at least one embodiment, local I/O bus may include, without limitation, a high-speed I/O bus for connecting peripherals to memory 3820, a chipset, and processor 3802. Examples may include, without limitation, an audio controller 3829, a firmware hub ("flash BIOS") 3828, a wireless transceiver 3826, a data storage 3824, a legacy I/O controller 3823 containing a user input interface 3825 and a keyboard interface, a serial expansion port 3827, such as a USB, and a network controller 3834. Data storage 3824 may include a hard disk drive, a floppy disk drive, a CD-ROM device, a flash memory device, or other mass storage device.

In at least one embodiment, FIG. 38 illustrates a system, which includes interconnected hardware devices or "chips." In at least one embodiment, FIG. 38 may illustrate an exemplary SoC. In at least one embodiment, devices illustrated in FIG. 38 may be interconnected with proprietary interconnects, standardized interconnects (e.g., PCIe), or some combination thereof. In at least one embodiment, one or more components of system 3800 are interconnected using compute express link ("CXL") interconnects.

In at least one embodiment, the computer system 3800 may be used to implement the system 100 (see FIG. 1). For example, the processing system 3800 may be used to implement one or more of the server(s) 102 (see FIG. 1), the computing system 132 (see FIG. 1), at least one of the external computing device(s) 112, and/or one or more of the network interfaces 230 (see FIG. 2), 330, 930, 1030, 1130, and/or 1230. In at least one embodiment, the processor 3802 may be used to implement the CPU(s) 210, 310, 910, 1010, 1110, 1210, and/or the processor of the computing system 132. In at least one embodiment, the processor 3802 may be used to implement the GPUs 240, 340, 940, 1040, 1140, and/or 1240. In at least one embodiment, the network controller 3834 may be used to implement the network interfaces 230 (see FIG. 2), 330, 930, 1030, 1130, and/or 1230. In at least one embodiment, the instruction set 3819 may include the instructions 262 and/or the instructions implementing the virtualization management application 130 and/or the VM database 134. In at least one embodiment, the memory 3820, the data storage 3824, and/or the cache 3804 may be used to implement the memory 260 and/or the memory of the computing system 132. In at least one embodiment, at least a portion of the system(s) depicted in FIG. 38 is used to implement one or more systems, techniques, functions, and/or processes described in connection with FIGS. 1-16. For example, in at least one embodiment, at least one component shown or described with respect to FIG. 38 is used to create hardware component groups on which virtual machines may be executed and/or to which virtual machine states may be migrated in accordance with one or more techniques, functions, and/or processes described with respect to any of FIGS. 1-16.

FIG. 39 illustrates a system 3900, in accordance with at least one embodiment. In at least one embodiment, system 3900 is an electronic device that utilizes a processor 3910. In at least one embodiment, system 3900 may be, for example and without limitation, a notebook, a tower server, a rack server, a blade server, a laptop, a desktop, a tablet, a mobile device, a phone, an embedded computer, or any other suitable electronic device.

In at least one embodiment, system 3900 may include, without limitation, processor 3910 communicatively coupled to any suitable number or kind of components, peripherals, modules, or devices. In at least one embodiment, processor 3910 is coupled using a bus or interface, such as an I²C bus, a System Management Bus ("SMBus"), a Low Pin Count ("LPC") bus, a Serial Peripheral Interface ("SPI"), a High Definition Audio ("HDA") bus, a Serial Advance Technology Attachment ("SATA") bus, a USB (versions 1, 2, 3), or a Universal Asynchronous Receiver/ Transmitter ("UART") bus. In at least one embodiment, FIG. 39 illustrates a system which includes interconnected hardware devices or "chips." In at least one embodiment, FIG. 39 may illustrate an exemplary SoC. In at least one embodiment, devices illustrated in FIG. 39 may be interconnected with proprietary interconnects, standardized interconnects (e.g., PCIe) or some combination thereof. In at least one embodiment, one or more components of FIG. 39 are interconnected using CXL interconnects.

In at least one embodiment, FIG. 39 may include a display 3924, a touch screen 3925, a touch pad 3930, a Near Field Communications unit ("NFC") 3945, a sensor hub 3940, a thermal sensor 3946, an Express Chipset ("EC") 3935, a Trusted Platform Module ("TPM") 3938, BIOS/firmware/ flash memory ("BIOS, FW Flash") 3922, a DSP 3960, a Solid State Disk ("SSD") or Hard Disk Drive ("HDD") 3920, a wireless local area network unit ("WLAN") 3950, a Bluetooth unit 3952, a Wireless Wide Area Network unit ("WWAN") 3956, a Global Positioning System ("GPS") 3955, a camera ("USB 3.0 camera") 3954 such as a USB 3.0 camera, or a Low Power Double Data Rate ("LPDDR") memory unit ("LPDDR3") 3915 implemented in, for example, LPDDR3 standard. These components may each be implemented in any suitable manner.

In at least one embodiment, other components may be communicatively coupled to processor 3910 through components discussed above. In at least one embodiment, an accelerometer 3941, an Ambient Light Sensor ("ALS") 3942, a compass 3943, and a gyroscope 3944 may be communicatively coupled to sensor hub 3940. In at least one embodiment, a thermal sensor 3939, a fan 3937, a keyboard 3946, and a touch pad 3930 may be communicatively coupled to EC 3935. In at least one embodiment, a speaker 3963, a headphones 3964, and a microphone ("mic") 3965 may be communicatively coupled to an audio unit ("audio codec and class d amp") 3964, which may in turn be communicatively coupled to DSP 3960. In at least one embodiment, audio unit 3964 may include, for example and without limitation, an audio coder/decoder ("codec") and a class D amplifier. In at least one embodiment, a SIM card ("SIM") 3957 may be communicatively coupled to WWAN unit 3956. In at least one embodiment, components such as WLAN unit 3950 and Bluetooth unit 3952, as well as WWAN unit 3956 may be implemented in a Next Generation Form Factor ("NGFF").

In at least one embodiment, the system 3900 may be used to implement the system 100 (see FIG. 1). For example, the system 3900 may be used to implement one or more of the server(s) 102 (see FIG. 1), the computing system 132 (see FIG. 1), at least one of the external computing device(s) 112, and/or one or more of the network interfaces 230 (see FIG. 2), 330, 930, 1030, 1130, and/or 1230. In at least one embodiment, the processor 3910 may be used to implement the CPU(s) 210, 310, 910, 1010, 1110, 1210, and/or the processor of the computing system 132. In at least one embodiment, the processor 3910 may be used to implement the GPUs 240, 340, 940, 1040, 1140, and/or 1240. In at least one embodiment, at least a portion of the system(s) depicted in FIG. 39 is used to implement one or more systems, techniques, functions, and/or processes described in connection with FIGS. 1-16. For example, in at least one embodiment, at least one component shown or described with respect to FIG. 39 is used to create hardware component groups on which virtual machines may be executed and/or to which virtual machine states may be migrated in accordance with one or more techniques, functions, and/or processes described with respect to any of FIGS. 1-16.

FIG. 40 illustrates an exemplary integrated circuit 4000, in accordance with at least one embodiment. In at least one embodiment, exemplary integrated circuit 4000 is an SoC that may be fabricated using one or more IP cores. In at least one embodiment, integrated circuit 4000 includes one or more application processor(s) 4005 (e.g., CPUs), at least one graphics processor 4010, and may additionally include an image processor 4015 and/or a video processor 4020, any of which may be a modular IP core. In at least one embodiment, integrated circuit 4000 includes peripheral or bus logic including a USB controller 4025, a UART controller 4030, an SPI/SDIO controller 4035, and an I²S/I²C controller 4040. In at least one embodiment, integrated circuit 4000 can include a display device 4045 coupled to one or more of a high-definition multimedia interface ("HDMI") controller 4050 and a mobile industry processor interface ("MIPI") display interface 4055. In at least one embodiment, storage may be provided by a flash memory subsystem 4060 including flash memory and a flash memory controller. In at least one embodiment, a memory interface may be provided via a memory controller 4065 for access to SDRAM or SRAM memory devices. In at least one embodiment, some integrated circuits additionally include an embedded security engine 4070.

In at least one embodiment, the integrated circuit 4000 may be used to implement the system 100 (see FIG. 1). For example, the integrated circuit 4000 may be used to implement one or more of the server(s) 102 (see FIG. 1), the computing system 132 (see FIG. 1), at least one of the external computing device(s) 112, and/or one or more of the network interfaces 230 (see FIG. 2), 330, 930, 1030, 1130, and/or 1230. In at least one embodiment, the integrated circuit 4000 may be used to implement the CPU(s) 210, 310, 910, 1010, 1110, 1210, and/or the processor of the computing system 132. In at least one embodiment, the integrated circuit 4000 may be used to implement the GPUs 240, 340, 940, 1040, 1140, and/or 1240. In at least one embodiment, the application processor(s) 4005, the graphics processor(s) 4010, the image processor 4015, and/or the video processor 4020 may be used to implement the GPUs 240, 340, 940, 1040, 1140, and/or 1240. In at least one embodiment, the flash memory subsystem 4060 may be used to implement the memory 260 and/or the memory of the computing system 132. In at least one embodiment, at least a portion of the system(s) depicted in FIG. 40 is used to implement one or more systems, techniques, functions, and/or processes described in connection with FIGS. 1-16. For example, in at least one embodiment, at least one component shown or described with respect to FIG. 40 is used to create hardware component groups on which virtual machines may be executed and/or to which virtual machine states may be migrated in accordance with one or more techniques, functions, and/or processes described with respect to any of FIGS. 1-16

FIG. 41 illustrates a computing system 4100, according to at least one embodiment; In at least one embodiment, computing system 4100 includes a processing subsystem 4101 having one or more processor(s) 4102 and a system memory 4104 communicating via an interconnection path that may include a memory hub 4105. In at least one embodiment, memory hub 4105 may be a separate component within a chipset component or may be integrated within one or more processor(s) 4102. In at least one embodiment, memory hub 4105 couples with an I/O subsystem 4111 via a communication link 4106. In at least one embodiment, I/O subsystem 4111 includes an I/O hub 4107 that can enable computing system 4100 to receive input from one or more input device(s) 4108. In at least one embodiment, I/O hub 4107 can enable a display controller, which may be included in one or more processor(s) 4102, to provide outputs to one or more display device(s) 4110A. In at least one embodiment, one or more display device(s) 4110A coupled with I/O hub 4107 can include a local, internal, or embedded display device.

In at least one embodiment, processing subsystem 4101 includes one or more parallel processor(s) 4112 coupled to memory hub 4105 via a bus or other communication link 4113. In at least one embodiment, communication link 4113 may be one of any number of standards based communication link technologies or protocols, such as, but not limited to PCIe, or may be a vendor specific communications interface or communications fabric. In at least one embodiment, one or more parallel processor(s) 4112 form a computationally focused parallel or vector processing system that can include a large number of processing cores and/or processing clusters, such as a many integrated core processor. In at least one embodiment, one or more parallel processor(s) 4112 form a graphics processing subsystem that can output pixels to one of one or more display device(s) 4110A coupled via I/O Hub 4107. In at least one embodiment, one or more parallel processor(s) 4112 can also include a display controller and display interface (not shown) to enable a direct connection to one or more display device(s) 4110B.

In at least one embodiment, a system storage unit 4114 can connect to I/O hub 4107 to provide a storage mechanism for computing system 4100. In at least one embodiment, an I/O switch 4116 can be used to provide an interface mechanism to enable connections between I/O hub 4107 and other components, such as a network adapter 4118 and/or wireless network adapter 4119 that may be integrated into a platform, and various other devices that can be added via one or more add-in device(s) 4120. In at least one embodiment, network adapter 4118 can be an Ethernet adapter or another wired network adapter. In at least one embodiment, wireless network adapter 4119 can include one or more of a Wi-Fi, Bluetooth, NFC, or other network device that includes one or more wireless radios.

In at least one embodiment, computing system 4100 can include other components not explicitly shown, including USB or other port connections, optical storage drives, video capture devices, and/or variations thereof, that may also be connected to I/O hub 4107. In at least one embodiment, communication paths interconnecting various components in FIG. 41 may be implemented using any suitable protocols, such as PCI based protocols (e.g., PCIe), or other bus or point-to-point communication interfaces and/or protocol(s), such as NVLink high-speed interconnect, or interconnect protocols.

In at least one embodiment, one or more parallel processor(s) 4112 incorporate circuitry optimized for graphics and video processing, including, for example, video output circuitry, and constitutes a graphics processing unit ("GPU"). In at least one embodiment, one or more parallel processor(s) 4112 incorporate circuitry optimized for general purpose processing. In at least embodiment, components of computing system 4100 may be integrated with one or more other system elements on a single integrated circuit. For example, in at least one embodiment, one or more parallel processor(s) 4112, memory hub 4105, processor(s) 4102, and I/O hub 4107 can be integrated into a SoC integrated circuit. In at least one embodiment, components of computing system 4100 can be integrated into a single package to form a system in package ("SIP") configuration. In at least one embodiment, at least a portion of components of computing system 4100 can be integrated into a multi-chip module ("MCM"), which can be interconnected with other multi-chip modules into a modular computing system. In at least one embodiment, I/O subsystem 4111 and display devices 4110B are omitted from computing system 4100.

In at least one embodiment, the computing system 4100 may be used to implement the system 100 (see FIG. 1). For example, the computing system 4100 may be used to implement one or more of the server(s) 102 (see FIG. 1), the computing system 132 (see FIG. 1), at least one of the external computing device(s) 112, and/or one or more of the network interfaces 230 (see FIG. 2), 330, 930, 1030, 1130, and/or 1230. In at least one embodiment, the processor(s) 4102, and/or the parallel processor(s) 4112 may be used to implement the CPU(s) 210, 310, 910, 1010, 1110, 1210, and/or the processor of the computing system 132. In at least one embodiment, the processor(s) 4102, and/or the parallel processor(s) 4112 may be used to implement the GPUs 240, 340, 940, 1040, 1140, and/or 1240. In at least one embodiment, the system memory 4104 may be used to implement the memory 260 and/or the memory of the computing system 132. In at least one embodiment, at least a portion of the system(s) depicted in FIG. 41 is used to implement one or more systems, techniques, functions, and/or processes described in connection with FIGS. 1-16. For example, in at least one embodiment, at least one component shown or described with respect to FIG. 41 is used to create hardware component groups on which virtual machines may be executed and/or to which virtual machine states may be migrated in accordance with one or more techniques, functions, and/or processes described with respect to any of FIGS. 1-16.

Processing Systems

The following figures set forth, without limitation, exemplary processing systems that can be used to implement at least one embodiment.

FIG. 42 illustrates an accelerated processing unit ("APU") 4200, in accordance with at least one embodiment. In at least one embodiment, APU 4200 is developed by AMD Corporation of Santa Clara, CA. In at least one embodiment, APU 4200 can be configured to execute an application program, such as a CUDA program. In at least one embodiment, APU 4200 includes, without limitation, a core complex 4210, a graphics complex 4240, fabric 4260, I/O interfaces 4270, memory controllers 4280, a display controller 4292, and a multimedia engine 4294. In at least one embodiment, APU 4200 may include, without limitation, any number of core complexes 4210, any number of graphics complexes 4240, any number of display controllers 4292, and any number of multimedia engines 4294 in any combination. For explanatory purposes, multiple instances of like objects are denoted herein with reference numbers identifying an object and parenthetical numbers identifying an instance where needed.

In at least one embodiment, core complex 4210 is a CPU, graphics complex 4240 is a GPU, and APU 4200 is a processing unit that integrates, without limitation, 4210 and 4240 onto a single chip. In at least one embodiment, some tasks may be assigned to core complex 4210 and other tasks may be assigned to graphics complex 4240. In at least one embodiment, core complex 4210 is configured to execute main control software associated with APU 4200, such as an operating system. In at least one embodiment, core complex 4210 is a master processor of APU 4200, controlling and coordinating operations of other processors. In at least one embodiment, core complex 4210 issues commands that control an operation of graphics complex 4240. In at least one embodiment, core complex 4210 can be configured to execute host executable code derived from CUDA source code, and graphics complex 4240 can be configured to execute device executable code derived from CUDA source code.

In at least one embodiment, core complex 4210 includes, without limitation, cores 4220(1)-4220(4) and an L3 cache 4230. In at least one embodiment, core complex 4210 may include, without limitation, any number of cores 4220 and any number and type of caches in any combination. In at least one embodiment, cores 4220 are configured to execute instructions of a particular instruction set architecture ("ISA"). In at least one embodiment, each core 4220 is a CPU core.

In at least one embodiment, each core 4220 includes, without limitation, a fetch/decode unit 4222, an integer execution engine 4224, a floating point execution engine 4226, and an L2 cache 4228. In at least one embodiment, fetch/decode unit 4222 fetches instructions, decodes such instructions, generates micro-operations, and dispatches separate micro-instructions to integer execution engine 4224 and floating point execution engine 4226. In at least one embodiment, fetch/decode unit 4222 can concurrently dispatch one micro-instruction to integer execution engine 4224 and another micro-instruction to floating point execution engine 4226. In at least one embodiment, integer execution engine 4224 executes, without limitation, integer and memory operations. In at least one embodiment, floating point engine 4226 executes, without limitation, floating point and vector operations. In at least one embodiment, fetch-decode unit 4222 dispatches micro-instructions to a single execution engine that replaces both integer execution engine 4224 and floating point execution engine 4226.

In at least one embodiment, each core 4220(*i*), where i is an integer representing a particular instance of core 4220, may access L2 cache 4228(*i*) included in core 4220(*i*). In at least one embodiment, each core 4220 included in core complex 4210(*j*), where j is an integer representing a particular instance of core complex 4210, is connected to other cores 4220 included in core complex 4210(*j*) via L3 cache 4230(*j*) included in core complex 4210(*j*). In at least one embodiment, cores 4220 included in core complex 4210(*j*), where j is an integer representing a particular instance of core complex 4210, can access all of L3 cache 4230(*j*) included in core complex 4210(*j*). In at least one embodiment, L3 cache 4230 may include, without limitation, any number of slices.

In at least one embodiment, graphics complex 4240 can be configured to perform compute operations in a highly-parallel fashion. In at least one embodiment, graphics complex 4240 is configured to execute graphics pipeline operations such as draw commands, pixel operations, geometric computations, and other operations associated with rendering an image to a display. In at least one embodiment, graphics complex 4240 is configured to execute operations unrelated to graphics. In at least one embodiment, graphics complex 4240 is configured to execute both operations related to graphics and operations unrelated to graphics.

In at least one embodiment, graphics complex 4240 includes, without limitation, any number of compute units 4250 and an L2 cache 4242. In at least one embodiment, compute units 4250 share L2 cache 4242. In at least one embodiment, L2 cache 4242 is partitioned. In at least one embodiment, graphics complex 4240 includes, without limitation, any number of compute units 4250 and any number (including zero) and type of caches. In at least one embodiment, graphics complex 4240 includes, without limitation, any amount of dedicated graphics hardware.

In at least one embodiment, each compute unit 4250 includes, without limitation, any number of SIMD units 4252 and a shared memory 4254. In at least one embodiment, each SIMD unit 4252 implements a SIMD architecture and is configured to perform operations in parallel. In at least one embodiment, each compute unit 4250 may execute any number of thread blocks, but each thread block executes on a single compute unit 4250. In at least one embodiment, a thread block includes, without limitation, any number of threads of execution. In at least one embodiment, a workgroup is a thread block. In at least one embodiment, each SIMD unit 4252 executes a different warp. In at least one embodiment, a warp is a group of threads (e.g., 16 threads), where each thread in a warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 4254.

In at least one embodiment, fabric 4260 is a system interconnect that facilitates data and control transmissions across core complex 4210, graphics complex 4240, I/O interfaces 4270, memory controllers 4280, display controller 4292, and multimedia engine 4294. In at least one embodiment, APU 4200 may include, without limitation, any amount and type of system interconnect in addition to or instead of fabric 4260 that facilitates data and control transmissions across any number and type of directly or indirectly linked components that may be internal or external to APU 4200. In at least one embodiment, I/O interfaces 4270 are representative of any number and type of I/O interfaces (e.g., PCI, PCI-Extended ("PCI-X"), PCIe, gigabit Ethernet ("GBE"), USB, etc.). In at least one embodiment, various types of peripheral devices are coupled to I/O interfaces 4270 In at least one embodiment, peripheral devices that are coupled to I/O interfaces 4270 may include, without limitation, keyboards, mice, printers, scanners, joysticks or other types of game controllers, media recording devices, external storage devices, network interface cards, and so forth.

In at least one embodiment, display controller AMD92 displays images on one or more display device(s), such as a liquid crystal display ("LCD") device. In at least one embodiment, multimedia engine 4294 includes, without limitation, any amount and type of circuitry that is related to multimedia, such as a video decoder, a video encoder, an image signal processor, etc. In at least one embodiment, memory controllers 4280 facilitate data transfers between APU 4200 and a unified system memory 4290. In at least one embodiment, core complex 4210 and graphics complex 4240 share unified system memory 4290.

In at least one embodiment, APU 4200 implements a memory subsystem that includes, without limitation, any amount and type of memory controllers 4280 and memory devices (e.g., shared memory 4254) that may be dedicated to one component or shared among multiple components. In at least one embodiment, APU 4200 implements a cache subsystem that includes, without limitation, one or more cache memories (e.g., L2 caches 4328, L3 cache 4230, and L2 cache 4242) that may each be private to or shared between any number of components (e.g., cores 4220, core complex 4210, SIMD units 4252, compute units 4250, and graphics complex 4240).

In at least one embodiment, the APU 4200 may be used to implement the system 100 (see FIG. 1). For example, the APU 4200 may be used to implement one or more of the server(s) 102 (see FIG. 1), the computing system 132 (see FIG. 1), at least one of the external computing device(s) 112, and/or one or more of the network interfaces 230 (see FIG. 2), 330, 930, 1030, 1130, and/or 1230. In at least one embodiment, the APU 4200 may be used to implement the CPU(s) 210, 310, 910, 1010, 1110, 1210, and/or the processor of the computing system 132. In at least one embodiment, the APU 4200 may be used to implement the GPUs 240, 340, 940, 1040, 1140, and/or 1240. In at least one embodiment, the unified system memory 4290 may be used to implement the memory 260 and/or the memory of the computing system 132. In at least one embodiment, at least a portion of the system(s) depicted in FIG. 42 is used to implement one or more systems, techniques, functions, and/or processes described in connection with FIGS. 1-16. For example, in at least one embodiment, at least one component shown or described with respect to FIG. 42 is used to create hardware component groups on which virtual machines may be executed and/or to which virtual machine states may be migrated in accordance with one or more techniques, functions, and/or processes described with respect to any of FIGS. 1-16.

FIG. 43 illustrates a CPU 4300, in accordance with at least one embodiment. In at least one embodiment, CPU 4300 is developed by AMD Corporation of Santa Clara, CA. In at least one embodiment, CPU 4300 can be configured to execute an application program. In at least one embodiment, CPU 4300 is configured to execute main control software, such as an operating system. In at least one embodiment, CPU 4300 issues commands that control an operation of an external GPU (not shown). In at least one embodiment, CPU 4300 can be configured to execute host executable code derived from CUDA source code, and an external GPU can be configured to execute device executable code derived from such CUDA source code. In at least one embodiment, CPU 4300 includes, without limitation, any number of core complexes 4310, fabric 4360, I/O interfaces 4370, and memory controllers 4380.

In at least one embodiment, core complex 4310 includes, without limitation, cores 4320(1)-4320(4) and an L3 cache 4330. In at least one embodiment, core complex 4310 may include, without limitation, any number of cores 4320 and any number and type of caches in any combination. In at least one embodiment, cores 4320 are configured to execute instructions of a particular ISA. In at least one embodiment, each core 4320 is a CPU core.

In at least one embodiment, each core 4320 includes, without limitation, a fetch/decode unit 4322, an integer execution engine 4324, a floating point execution engine 4326, and an L2 cache 4328. In at least one embodiment, fetch/decode unit 4322 fetches instructions, decodes such instructions, generates micro-operations, and dispatches separate micro-instructions to integer execution engine 4324 and floating point execution engine 4326. In at least one embodiment, fetch/decode unit 4322 can concurrently dispatch one micro-instruction to integer execution engine 4324 and another micro-instruction to floating point execution engine 4326. In at least one embodiment, integer execution engine 4324 executes, without limitation, integer and memory operations. In at least one embodiment, floating point engine 4326 executes, without limitation, floating point and vector operations. In at least one embodiment, fetch-decode unit 4322 dispatches micro-instructions to a single execution engine that replaces both integer execution engine 4324 and floating point execution engine 4326.

In at least one embodiment, each core 4320(i), where i is an integer representing a particular instance of core 4320, may access L2 cache 4328(i) included in core 4320(i). In at least one embodiment, each core 4320 included in core complex 4310(j), where j is an integer representing a particular instance of core complex 4310, is connected to other cores 4320 in core complex 4310(j) via L3 cache 4330(j) included in core complex 4310(j). In at least one embodiment, cores 4320 included in core complex 4310(j), where j is an integer representing a particular instance of core complex 4310, can access all of L3 cache 4330(j) included in core complex 4310(j). In at least one embodiment, L3 cache 4330 may include, without limitation, any number of slices.

In at least one embodiment, fabric 4360 is a system interconnect that facilitates data and control transmissions across core complexes 4310(1)-4310(N) (where N is an integer greater than zero), I/O interfaces 4370, and memory controllers 4380. In at least one embodiment, CPU 4300 may include, without limitation, any amount and type of system interconnect in addition to or instead of fabric 4360 that facilitates data and control transmissions across any number and type of directly or indirectly linked components that may be internal or external to CPU 4300. In at least one embodiment, I/O interfaces 4370 are representative of any number and type of I/O interfaces (e.g., PCI, PCI-X, PCIe, GBE, USB, etc.). In at least one embodiment, various types of peripheral devices are coupled to I/O interfaces 4370 In at least one embodiment, peripheral devices that are coupled to I/O interfaces 4370 may include, without limitation, displays, keyboards, mice, printers, scanners, joysticks or other types of game controllers, media recording devices, external storage devices, network interface cards, and so forth.

In at least one embodiment, memory controllers 4380 facilitate data transfers between CPU 4300 and a system memory 4390. In at least one embodiment, core complex 4310 and graphics complex 4340 share system memory 4390. In at least one embodiment, CPU 4300 implements a memory subsystem that includes, without limitation, any amount and type of memory controllers 4380 and memory devices that may be dedicated to one component or shared among multiple components. In at least one embodiment, CPU 4300 implements a cache subsystem that includes, without limitation, one or more cache memories (e.g., L2 caches 4328 and L3 caches 4330) that may each be private to or shared between any number of components (e.g., cores 4320 and core complexes 4310).

In at least one embodiment, the CPU 4300 may be used to implement the system 100 (see FIG. 1). For example, the CPU 4300 may be used to implement one or more of the server(s) 102 (see FIG. 1), the computing system 132 (see FIG. 1), at least one of the external computing device(s) 112, and/or one or more of the network interfaces 230 (see FIG. 2), 330, 930, 1030, 1130, and/or 1230. In at least one embodiment, the CPU 4300 may be used to implement the CPU(s) 210, 310, 910, 1010, 1110, 1210, and/or the processor of the computing system 132. In at least one embodiment, the CPU 4300 may be used to implement the GPUs 240, 340, 940, 1040, 1140, and/or 1240. In at least one embodiment, the system memory 4390 may be used to implement the memory 260 and/or the memory of the computing system 132. In at least one embodiment, at least a portion of the system(s) depicted in FIG. 43 is used to implement one or more systems, techniques, functions, and/or processes described in connection with FIGS. 1-16. For example, in at least one embodiment, at least one component shown or described with respect to FIG. 43 is used to create hardware component groups on which virtual machines may be executed and/or to which virtual machine states may be migrated in accordance with one or more techniques, functions, and/or processes described with respect to any of FIGS. 1-16.

FIG. 44 illustrates an exemplary accelerator integration slice 4490, in accordance with at least one embodiment. As used herein, a "slice" includes a specified portion of processing resources of an accelerator integration circuit. In at least one embodiment, an accelerator integration circuit provides cache management, memory access, context management, and interrupt management services on behalf of multiple graphics processing engines included in a graphics acceleration module. Graphics processing engines may each include a separate GPU. Alternatively, graphics processing engines may include different types of graphics processing engines within a GPU such as graphics execution units, media processing engines (e.g., video encoders/decoders), samplers, and blit engines. In at least one embodiment, a graphics acceleration module may be a GPU with multiple graphics processing engines. In at least one embodiment, graphics processing engines may be individual GPUs integrated on a common package, line card, or chip.

An application effective address space 4482 within system memory 4414 stores process elements 4483. In one embodiment, process elements 4483 are stored in response to GPU invocations 4481 from applications 4480 executed on processor 4407. A process element 4483 contains process state for corresponding application 4480. A work descriptor ("WD") 4484 contained in process element 4483 can be a single job requested by an application or may contain a pointer to a queue of jobs. In at least one embodiment, WD 4484 is a pointer to a job request queue in application effective address space 4482.

Graphics acceleration module 4446 and/or individual graphics processing engines can be shared by all or a subset of processes in a system. In at least one embodiment, an infrastructure for setting up process state and sending WD 4484 to graphics acceleration module 4446 to start a job in a virtualized environment may be included.

In at least one embodiment, a dedicated-process programming model is implementation-specific. In this model, a single process owns graphics acceleration module 4446 or an individual graphics processing engine. Because graphics acceleration module 4446 is owned by a single process, a hypervisor initializes an accelerator integration circuit for an owning partition and an operating system initializes accelerator integration circuit for an owning process when graphics acceleration module 4446 is assigned.

In operation, a WD fetch unit 4491 in accelerator integration slice 4490 fetches next WD 4484 which includes an indication of work to be done by one or more graphics processing engines of graphics acceleration module 4446. Data from WD 4484 may be stored in registers 4445 and used by a memory management unit ("MMU") 4439, interrupt management circuit 4447 and/or context management circuit 4448 as illustrated. For example, one embodiment of MMU 4439 includes segment/page walk circuitry for accessing segment/page tables 4486 within OS virtual address space 4485. Interrupt management circuit 4447 may process interrupt events ("INT") 4492 received from graphics acceleration module 4446. When performing graphics operations, an effective address 4493 generated by a graphics processing engine is translated to a real address by MMU 4439.

In one embodiment, a same set of registers 4445 are duplicated for each graphics processing engine and/or graphics acceleration module 4446 and may be initialized by a hypervisor or operating system. Each of these duplicated registers may be included in accelerator integration slice 4490. Exemplary registers that may be initialized by a hypervisor are shown in Table 1.

TABLE 1

Hypervisor Initialized Registers

| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

Operating System Initialized Registers

| 1 | Process and Thread Identification |
| 2 | Effective Address (EA) Context Save/Restore Pointer |

TABLE 2-continued

Operating System Initialized Registers

| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 4484 is specific to a particular graphics acceleration module 4446 and/or a particular graphics processing engine. It contains all information required by a graphics processing engine to do work or it can be a pointer to a memory location where an application has set up a command queue of work to be completed.

In at least one embodiment, the system of FIG. 44 may be used to implement the system 100 (see FIG. 1). For example, the system of FIG. 44 may be used to implement one or more of the server(s) 102 (see FIG. 1), the computing system 132 (see FIG. 1), at least one of the external computing device(s) 112, and/or one or more of the network interfaces 230 (see FIG. 2), 330, 930, 1030, 1130, and/or 1230. In at least one embodiment, the processor 4407, the graphics acceleration module 4446, and/or the accelerator integration slice 4490 may be used to implement the CPU(s) 210, 310, 910, 1010, 1110, 1210, and/or the processor of the computing system 132. In at least one embodiment, the processor 4407, the graphics acceleration module 4446, and/or the accelerator integration slice 4490 may be used to implement the GPUs 240, 340, 940, 1040, 1140, and/or 1240. In at least one embodiment, the system memory 4414 may be used to implement the memory 260 and/or the memory of the computing system 132. In at least one embodiment, at least a portion of the system(s) depicted in FIG. 44 is used to implement one or more systems, techniques, functions, and/or processes described in connection with FIGS. 1-16. For example, in at least one embodiment, at least one component shown or described with respect to FIG. 44 is used to create hardware component groups on which virtual machines may be executed and/or to which virtual machine states may be migrated in accordance with one or more techniques, functions, and/or processes described with respect to any of FIGS. 1-16.

FIGS. 45A-45B illustrate exemplary graphics processors, in accordance with at least one embodiment. In at least one embodiment, any of the exemplary graphics processors may be fabricated using one or more IP cores. In addition to what is illustrated, other logic and circuits may be included in at least one embodiment, including additional graphics processors/cores, peripheral interface controllers, or general-purpose processor cores. In at least one embodiment, the exemplary graphics processors are for use within an SoC.

FIG. 45A illustrates an exemplary graphics processor 4510 of an SoC integrated circuit that may be fabricated using one or more IP cores, in accordance with at least one embodiment. FIG. 45B illustrates an additional exemplary graphics processor 4540 of an SoC integrated circuit that may be fabricated using one or more IP cores, in accordance with at least one embodiment. In at least one embodiment, graphics processor 4510 of FIG. 45A is a low power graphics processor core. In at least one embodiment, graphics processor 4540 of FIG. 45B is a higher performance graphics processor core. In at least one embodiment, each of graphics processors 4510, 4540 can be variants of graphics processor 2110 of FIG. 21.

In at least one embodiment, graphics processor 4510 includes a vertex processor 4505 and one or more fragment processor(s) 4515A-4515N (e.g., 4515A, 4515B, 4515C, 4515D, through 4515N-1, and 4515N). In at least one embodiment, graphics processor 4510 can execute different shader programs via separate logic, such that vertex processor 4505 is optimized to execute operations for vertex shader programs, while one or more fragment processor(s) 4515A-4515N execute fragment (e.g., pixel) shading operations for fragment or pixel shader programs. In at least one embodiment, vertex processor 4505 performs a vertex processing stage of a 3D graphics pipeline and generates primitives and vertex data. In at least one embodiment, fragment processor(s) 4515A-4515N use primitive and vertex data generated by vertex processor 4505 to produce a framebuffer that is displayed on a display device. In at least one embodiment, fragment processor(s) 4515A-4515N are optimized to execute fragment shader programs as provided for in an OpenGL API, which may be used to perform similar operations as a pixel shader program as provided for in a Direct 3D API.

In at least one embodiment, graphics processor 4510 additionally includes one or more MMU(s) 4520A-4520B, cache(s) 4525A-4525B, and circuit interconnect(s) 4530A-4530B. In at least one embodiment, one or more MMU(s) 4520A-4520B provide for virtual to physical address mapping for graphics processor 4510, including for vertex processor 4505 and/or fragment processor(s) 4515A-4515N, which may reference vertex or image/texture data stored in memory, in addition to vertex or image/texture data stored in one or more cache(s) 4525A-4525B. In at least one embodiment, one or more MMU(s) 4520A-4520B may be synchronized with other MMUs within a system, including one or more MMUs associated with one or more application processor(s) 2105, image processors 2115, and/or video processors 2120 of FIG. 21, such that each processor 2105-2120 can participate in a shared or unified virtual memory system. In at least one embodiment, one or more circuit interconnect(s) 4530A-4530B enable graphics processor 4510 to interface with other IP cores within an SoC, either via an internal bus of an SoC or via a direct connection.

In at least one embodiment, graphics processor 4540 includes one or more MMU(s) 4520A-4520B, caches 4525A-4525B, and circuit interconnects 4530A-4530B of graphics processor 4510 of FIG. 45A. In at least one embodiment, graphics processor 4540 includes one or more shader core(s) 4555A-4555N (e.g., 4555A, 4555B, 4555C, 4555D, 4555E, 4555F, through 4555N-1, and 4555N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 4540 includes an inter-core task manager 4545, which acts as a thread dispatcher to dispatch execution threads to one or more shader cores 4555A-4555N and a tiling unit 4558 to accelerate tiling operations for tile-based rendering, in which rendering operations for a scene are subdivided in image space, for example to exploit local spatial coherence within a scene or to optimize use of internal caches.

In at least one embodiment, the graphics processor 4510 and/or the graphics processor 4540 may be used to implement the system 100 (see FIG. 1). For example, the graphics processor 4510 and/or the graphics processor 4540 may be used to implement one or more of the server(s) 102 (see FIG. 1), the computing system 132 (see FIG. 1), at least one of the external computing device(s) 112, and/or one or more of the network interfaces 230 (see FIG. 2), 330, 930, 1030, 1130, and/or 1230. In at least one embodiment, the graphics processor 4510 and/or the graphics processor 4540 may be used to implement the CPU(s) 210, 310, 910, 1010, 1110, 1210, and/or the processor of the computing system 132. In at least one embodiment the graphics processor 4510 and/or the graphics processor 4540 may be used to implement the GPUs 240, 340, 940, 1040, 1140, and/or 1240. In at least one embodiment, at least a portion of the system(s) depicted in FIGS. 45A and 45B is used to implement one or more systems, techniques, functions, and/or processes described in connection with FIGS. 1-16. For example, in at least one embodiment, at least one component shown or described with respect to FIGS. 45A and 45B is used to create hardware component groups on which virtual machines may be executed and/or to which virtual machine states may be migrated in accordance with one or more techniques, functions, and/or processes described with respect to any of FIGS. 1-16.

FIG. 46A illustrates a graphics core 4600, in accordance with at least one embodiment. In at least one embodiment, graphics core 4600 may be included within graphics processor 4010 of FIG. 40. In at least one embodiment, graphics core 4600 may be a unified shader core 4555A-4555N as in FIG. 45B. In at least one embodiment, graphics core 4600 includes a shared instruction cache 4602, a texture unit 4618, and a cache/shared memory 4620 that are common to execution resources within graphics core 4600. In at least one embodiment, graphics core 4600 can include multiple slices 4601A-4601N or partition for each core, and a graphics processor can include multiple instances of graphics core 4600. Slices 4601A-4601N can include support logic including a local instruction cache 4604A-4604N, a thread scheduler 4606A-4606N, a thread dispatcher 4608A-4608N, and a set of registers 4610A-4610N. In at least one embodiment, slices 4601A-4601N can include a set of additional function units ("AFUs") 4612A-4612N, floating-point units ("FPUs") 4614A-4614N, integer arithmetic logic units ("ALUs") 4616-4616N, address computational units ("ACUs") 4613A-4613N, double-precision floating-point units ("DPFPUs") 4615A-4615N, and matrix processing units ("MPUs") 4617A-4617N.

In at least one embodiment, FPUs 4614A-4614N can perform single-precision (32-bit) and half-precision (16-bit) floating point operations, while DPFPUs 4615A-4615N perform double precision (64-bit) floating point operations. In at least one embodiment, ALUs 4616A-4616N can perform variable precision integer operations at 8-bit, 16-bit, and 32-bit precision, and can be configured for mixed precision operations. In at least one embodiment, MPUs 4617A-4617N can also be configured for mixed precision matrix operations, including half-precision floating point and 8-bit integer operations. In at least one embodiment, MPUs 4617-4617N can perform a variety of matrix operations to accelerate CUDA programs, including enabling support for accelerated general matrix to matrix multiplication ("GEMM"). In at least one embodiment, AFUs 4612A-4612N can perform additional logic operations not supported by floating-point or integer units, including trigonometric operations (e.g., Sine, Cosine, etc.).

FIG. 46B illustrates a general-purpose graphics processing unit ("GPGPU") 4630, in accordance with at least one embodiment. In at least one embodiment, GPGPU 4630 is highly-parallel and suitable for deployment on a multi-chip module. In at least one embodiment, GPGPU 4630 can be configured to enable highly-parallel compute operations to be performed by an array of GPUs. In at least one embodiment, GPGPU 4630 can be linked directly to other instances of GPGPU 4630 to create a multi-GPU cluster to improve execution time for CUDA programs. In at least one embodiment, GPGPU 4630 includes a host interface 4632 to enable a connection with a host processor. In at least one embodiment, host interface 4632 is a PCIe interface. In at least one embodiment, host interface 4632 can be a vendor specific communications interface or communications fabric. In at least one embodiment, GPGPU 4630 receives commands from a host processor and uses a global scheduler 4634 to distribute execution threads associated with those commands to a set of compute clusters 4636A-4636H. In at least one embodiment, compute clusters 4636A-4636H share a cache memory 4638. In at least one embodiment, cache memory 4638 can serve as a higher-level cache for cache memories within compute clusters 4636A-4636H.

In at least one embodiment, GPGPU 4630 includes memory 4644A-4644B coupled with compute clusters 4636A-4636H via a set of memory controllers 4642A-4642B. In at least one embodiment, memory 4644A-4644B can include various types of memory devices including DRAM or graphics random access memory, such as synchronous graphics random access memory ("SGRAM"), including graphics double data rate ("GDDR") memory.

In at least one embodiment, compute clusters 4636A-4636H each include a set of graphics cores, such as graphics core 4600 of FIG. 46A, which can include multiple types of integer and floating point logic units that can perform computational operations at a range of precisions including suited for computations associated with CUDA programs. For example, in at least one embodiment, at least a subset of floating point units in each of compute clusters 4636A-4636H can be configured to perform 16-bit or 32-bit floating point operations, while a different subset of floating point units can be configured to perform 64-bit floating point operations.

In at least one embodiment, multiple instances of GPGPU 4630 can be configured to operate as a compute cluster. In at least one embodiment, compute clusters 4636A-4636H may implement any technically feasible communication techniques for synchronization and data exchange. In at least one embodiment, multiple instances of GPGPU 4630 communicate over host interface 4632. In at least one embodiment, GPGPU 4630 includes an I/O hub 4639 that couples GPGPU 4630 with a GPU link 4640 that enables a direct connection to other instances of GPGPU 4630. In at least one embodiment, GPU link 4640 is coupled to a dedicated GPU-to-GPU bridge that enables communication and synchronization between multiple instances of GPGPU 4630. In at least one embodiment GPU link 4640 couples with a high speed interconnect to transmit and receive data to other GPGPUs 4630 or parallel processors. In at least one embodiment, multiple instances of GPGPU 4630 are located in separate data processing systems and communicate via a network device that is accessible via host interface 4632. In at least one embodiment GPU link 4640 can be configured to enable a connection to a host processor in addition to or as an alternative to host interface 4632. In at least one embodiment, GPGPU 4630 can be configured to execute a CUDA program.

In at least one embodiment, the graphics core 4600 and/or the GPGPU 4630 may be used to implement the system 100 (see FIG. 1). For example, the graphics core 4600 and/or the GPGPU 4630 may be used to implement one or more of the server(s) 102 (see FIG. 1), the computing system 132 (see FIG. 1), at least one of the external computing device(s) 112, and/or one or more of the network interfaces 230 (see FIG. 2), 330, 930, 1030, 1130, and/or 1230. In at least one embodiment, the graphics core 4600 and/or the GPGPU 4630 may be used to implement the CPU(s) 210, 310, 910, 1010, 1110, 1210, and/or the processor of the computing system 132. In at least one embodiment, the graphics core 4600 and/or the GPGPU 4630 may be used to implement the GPUs 240, 340, 940, 1040, 1140, and/or 1240. In at least one embodiment, the at least one of the memory 4644A-4644B may be used to implement the memory 260 and/or the memory of the computing system 132. In at least one embodiment, at least a portion of the system(s) depicted in FIGS. 46A and 46B is used to implement one or more systems, techniques, functions, and/or processes described in connection with FIGS. 1-16. For example, in at least one embodiment, at least one component shown or described with respect to FIGS. 46A and 46B is used to create hardware component groups on which virtual machines may be executed and/or to which virtual machine states may be migrated in accordance with one or more techniques, functions, and/or processes described with respect to any of FIGS. 1-16.

FIG. 47A illustrates a parallel processor 4700, in accordance with at least one embodiment. In at least one embodiment, various components of parallel processor 4700 may be implemented using one or more integrated circuit devices, such as programmable processors, application specific integrated circuits ("ASICs"), or FPGAs.

In at least one embodiment, parallel processor 4700 includes a parallel processing unit 4702. In at least one embodiment, parallel processing unit 4702 includes an I/O unit 4704 that enables communication with other devices, including other instances of parallel processing unit 4702. In at least one embodiment, I/O unit 4704 may be directly connected to other devices. In at least one embodiment, I/O unit 4704 connects with other devices via use of a hub or switch interface, such as memory hub 2205. In at least one embodiment, connections between memory hub 2205 and I/O unit 4704 form a communication link. In at least one embodiment, I/O unit 4704 connects with a host interface 4706 and a memory crossbar 4716, where host interface 4706 receives commands directed to performing processing operations and memory crossbar 4716 receives commands directed to performing memory operations.

In at least one embodiment, when host interface 4706 receives a command buffer via I/O unit 4704, host interface 4706 can direct work operations to perform those commands to a front end 4708. In at least one embodiment, front end 4708 couples with a scheduler 4710, which is configured to distribute commands or other work items to a processing array 4712. In at least one embodiment, scheduler 4710 ensures that processing array 4712 is properly configured and in a valid state before tasks are distributed to processing array 4712. In at least one embodiment, scheduler 4710 is implemented via firmware logic executing on a microcontroller. In at least one embodiment, microcontroller implemented scheduler 4710 is configurable to perform complex scheduling and work distribution operations at coarse and fine granularity, enabling rapid preemption and context switching of threads executing on processing array 4712. In at least one embodiment, host software can prove workloads for scheduling on processing array 4712 via one of multiple graphics processing doorbells. In at least one embodiment, workloads can then be automatically distributed across processing array 4712 by scheduler 4710 logic within a microcontroller including scheduler 4710.

In at least one embodiment, processing array 4712 can include up to "N" clusters (e.g., cluster 4714A, cluster 4714B, through cluster 4714N). In at least one embodiment, each cluster 4714A-4714N of processing array 4712 can execute a large number of concurrent threads. In at least one embodiment, scheduler 4710 can allocate work to clusters 4714A-4714N of processing array 4712 using various scheduling and/or work distribution algorithms, which may vary depending on a workload arising for each type of program or computation. In at least one embodiment, scheduling can be handled dynamically by scheduler 4710, or can be assisted in part by compiler logic during compilation of program logic configured for execution by processing array 4712. In at least one embodiment, different clusters 4714A-4714N of processing array 4712 can be allocated for processing different types of programs or for performing different types of computations.

In at least one embodiment, processing array 4712 can be configured to perform various types of parallel processing operations. In at least one embodiment, processing array 4712 is configured to perform general-purpose parallel compute operations. For example, in at least one embodiment, processing array 4712 can include logic to execute processing tasks including filtering of video and/or audio data, performing modeling operations, including physics operations, and performing data transformations.

In at least one embodiment, processing array 4712 is configured to perform parallel graphics processing operations. In at least one embodiment, processing array 4712 can include additional logic to support execution of such graphics processing operations, including, but not limited to texture sampling logic to perform texture operations, as well as tessellation logic and other vertex processing logic. In at least one embodiment, processing array 4712 can be configured to execute graphics processing related shader programs such as, but not limited to vertex shaders, tessellation shaders, geometry shaders, and pixel shaders. In at least one embodiment, parallel processing unit 4702 can transfer data from system memory via I/O unit 4704 for processing. In at least one embodiment, during processing, transferred data can be stored to on-chip memory (e.g., a parallel processor memory 4722) during processing, then written back to system memory.

In at least one embodiment, when parallel processing unit 4702 is used to perform graphics processing, scheduler 4710 can be configured to divide a processing workload into approximately equal sized tasks, to better enable distribution of graphics processing operations to multiple clusters 4714A-4714N of processing array 4712. In at least one embodiment, portions of processing array 4712 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 4714A-4714N may be stored in buffers to allow intermediate data to be transmitted between clusters 4714A-4714N for further processing.

In at least one embodiment, processing array 4712 can receive processing tasks to be executed via scheduler 4710, which receives commands defining processing tasks from front end 4708. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 4710 may be configured to fetch indices corresponding to tasks or may receive indices from front end 4708. In at least one embodiment, front end 4708 can be configured to ensure processing array 4712 is configured to a valid state before a workload specified by incoming command buffers (e.g., batch-buffers, push buffers, etc.) is initiated.

In at least one embodiment, each of one or more instances of parallel processing unit 4702 can couple with parallel processor memory 4722. In at least one embodiment, parallel processor memory 4722 can be accessed via memory crossbar 4716, which can receive memory requests from processing array 4712 as well as I/O unit 4704. In at least one embodiment, memory crossbar 4716 can access parallel processor memory 4722 via a memory interface 4718. In at least one embodiment, memory interface 4718 can include multiple partition units (e.g., a partition unit 4720A, partition unit 4720B, through partition unit 4720N) that can each couple to a portion (e.g., memory unit) of parallel processor memory 4722. In at least one embodiment, a number of partition units 4720A-4720N is configured to be equal to a number of memory units, such that a first partition unit 4720A has a corresponding first memory unit 4724A, a second partition unit 4720B has a corresponding memory unit 4724B, and an Nth partition unit 4720N has a corresponding Nth memory unit 4724N. In at least one embodiment, a number of partition units 4720A-4720N may not be equal to a number of memory devices.

In at least one embodiment, memory units 4724A-4724N can include various types of memory devices, including DRAM or graphics random access memory, such as SGRAM, including GDDR memory. In at least one embodiment, memory units 4724A-4724N may also include 3D stacked memory, including but not limited to high bandwidth memory ("HBM"). In at least one embodiment, render targets, such as frame buffers or texture maps may be stored across memory units 4724A-4724N, allowing partition units 4720A-4720N to write portions of each render target in parallel to efficiently use available bandwidth of parallel processor memory 4722. In at least one embodiment, a local instance of parallel processor memory 4722 may be excluded in favor of a unified memory design that utilizes system memory in conjunction with local cache memory.

In at least one embodiment, any one of clusters 4714A-4714N of processing array 4712 can process data that will be written to any of memory units 4724A-4724N within parallel processor memory 4722. In at least one embodiment, memory crossbar 4716 can be configured to transfer an output of each cluster 4714A-4714N to any partition unit 4720A-4720N or to another cluster 4714A-4714N, which can perform additional processing operations on an output. In at least one embodiment, each cluster 4714A-4714N can communicate with memory interface 4718 through memory crossbar 4716 to read from or write to various external memory devices. In at least one embodiment, memory crossbar 4716 has a connection to memory interface 4718 to communicate with I/O unit 4704, as well as a connection to a local instance of parallel processor memory 4722, enabling processing units within different clusters 4714A-4714N to communicate with system memory or other memory that is not local to parallel processing unit 4702. In at least one embodiment, memory crossbar 4716 can use virtual channels to separate traffic streams between clusters 4714A-4714N and partition units 4720A-4720N.

In at least one embodiment, multiple instances of parallel processing unit 4702 can be provided on a single add-in card, or multiple add-in cards can be interconnected. In at least one embodiment, different instances of parallel processing unit 4702 can be configured to interoperate even if different instances have different numbers of processing cores, different amounts of local parallel processor memory, and/or other configuration differences. For example, in at least one embodiment, some instances of parallel processing unit 4702 can include higher precision floating point units relative to other instances. In at least one embodiment, systems incorporating one or more instances of parallel processing unit 4702 or parallel processor 4700 can be implemented in a variety of configurations and form factors, including but not limited to desktop, laptop, or handheld personal computers, servers, workstations, game consoles, and/or embedded systems.

FIG. 47B illustrates a processing cluster 4794, in accordance with at least one embodiment. In at least one embodiment, processing cluster 4794 is included within a parallel processing unit. In at least one embodiment, processing cluster 4794 is one of processing clusters 4714A-4714N of FIG. 47. In at least one embodiment, processing cluster 4794 can be configured to execute many threads in parallel, where the term "thread" refers to an instance of a particular program executing on a particular set of input data. In at least one embodiment, single instruction, multiple data ("SIMD") instruction issue techniques are used to support parallel execution of a large number of threads without providing multiple independent instruction units. In at least one embodiment, single instruction, multiple thread ("SIMT") techniques are used to support parallel execution of a large number of generally synchronized threads, using a common instruction unit configured to issue instructions to a set of processing engines within each processing cluster 4794.

In at least one embodiment, operation of processing cluster 4794 can be controlled via a pipeline manager 4732 that distributes processing tasks to SIMT parallel processors. In at least one embodiment, pipeline manager 4732 receives instructions from scheduler 4710 of FIG. 47 and manages execution of those instructions via a graphics multiprocessor 4734 and/or a texture unit 4736. In at least one embodiment, graphics multiprocessor 4734 is an exemplary instance of a SIMT parallel processor. However, in at least one embodiment, various types of SIMT parallel processors of differing architectures may be included within processing cluster 4794. In at least one embodiment, one or more instances of graphics multiprocessor 4734 can be included within processing cluster 4794. In at least one embodiment, graphics multiprocessor 4734 can process data and a data crossbar 4740 can be used to distribute processed data to one of multiple possible destinations, including other shader units. In at least one embodiment, pipeline manager 4732 can facilitate distribution of processed data by specifying destinations for processed data to be distributed via data crossbar 4740.

In at least one embodiment, each graphics multiprocessor 4734 within processing cluster 4794 can include an identical set of functional execution logic (e.g., arithmetic logic units, load/store units ("LSUs"), etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 4794 constitute a thread. In at least one embodiment, a set of threads executing across a set of parallel processing engines is a thread group. In at least one embodiment, a thread group executes a program on different input data. In at least one embodiment, each thread within a thread group can be assigned to a different processing engine within graphics multiprocessor 4734. In at least one embodiment, a thread group may include fewer threads than a number of processing engines within graphics multiprocessor 4734. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 4734. In at least one embodiment, when a thread group includes more threads than a number of processing engines within graphics multiprocessor 4734, processing can be performed over consecutive clock cycles. In at least one embodiment, multiple thread groups can be executed concurrently on graphics multiprocessor 4734.

In at least one embodiment, graphics multiprocessor 4734 includes an internal cache memory to perform load and store operations. In at least one embodiment, graphics multiprocessor 4734 can forego an internal cache and use a cache memory (e.g., L1 cache 4748) within processing cluster 4794. In at least one embodiment, each graphics multiprocessor 4734 also has access to Level 2 ("L2") caches within partition units (e.g., partition units 4720A-4720N of FIG. 47A) that are shared among all processing clusters 4794 and may be used to transfer data between threads. In at least one embodiment, graphics multiprocessor 4734 may also access off-chip global memory, which can include one or more of local parallel processor memory and/or system memory. In at least one embodiment, any memory external to parallel processing unit 4702 may be used as global memory. In at least one embodiment, processing cluster 4794 includes multiple instances of graphics multiprocessor 4734 that can share common instructions and data, which may be stored in L1 cache 4748.

In at least one embodiment, each processing cluster 4794 may include an MMU 4745 that is configured to map virtual addresses into physical addresses. In at least one embodiment, one or more instances of MMU 4745 may reside within memory interface 4718 of FIG. 47. In at least one embodiment, MMU 4745 includes a set of page table entries ("PTEs") used to map a virtual address to a physical address of a tile and optionally a cache line index. In at least one embodiment, MMU 4745 may include address translation lookaside buffers ("TLBs") or caches that may reside within graphics multiprocessor 4734 or L1 cache 4748 or processing cluster 4794. In at least one embodiment, a physical address is processed to distribute surface data access locality to allow efficient request interleaving among partition units. In at least one embodiment, a cache line index may be used to determine whether a request for a cache line is a hit or miss.

In at least one embodiment, processing cluster 4794 may be configured such that each graphics multiprocessor 4734 is coupled to a texture unit 4736 for performing texture mapping operations, e.g., determining texture sample positions, reading texture data, and filtering texture data. In at least one embodiment, texture data is read from an internal texture L1 cache (not shown) or from an L1 cache within graphics multiprocessor 4734 and is fetched from an L2 cache, local parallel processor memory, or system memory, as needed. In at least one embodiment, each graphics multiprocessor 4734 outputs a processed task to data crossbar 4740 to provide a processed task to another processing cluster 4794 for further processing or to store a processed task in an L2 cache, a local parallel processor memory, or a system memory via memory crossbar 4716. In at least one embodiment, a pre-raster operations unit ("preROP") 4742 is configured to receive data from graphics multiprocessor 4734, direct data to ROP units, which may be located with partition units as described herein (e.g., partition units 4720A-4720N of FIG. 47). In at least one embodiment, PreROP 4742 can perform optimizations for color blending, organize pixel color data, and perform address translations.

FIG. 47C illustrates a graphics multiprocessor 4796, in accordance with at least one embodiment. In at least one embodiment, graphics multiprocessor 4796 is graphics multiprocessor 4734 of FIG. 47B. In at least one embodiment, graphics multiprocessor 4796 couples with pipeline manager 4732 of processing cluster 4794. In at least one embodiment, graphics multiprocessor 4796 has an execution pipeline including but not limited to an instruction cache 4752, an instruction unit 4754, an address mapping unit 4756, a register file 4758, one or more GPGPU cores 4762, and one or more LSUs 4766. GPGPU cores 4762 and LSUs 4766 are coupled with cache memory 4772 and shared memory 4770 via a memory and cache interconnect 4768.

In at least one embodiment, instruction cache 4752 receives a stream of instructions to execute from pipeline manager 4732. In at least one embodiment, instructions are cached in instruction cache 4752 and dispatched for execution by instruction unit 4754. In at least one embodiment, instruction unit 4754 can dispatch instructions as thread groups (e.g., warps), with each thread of a thread group assigned to a different execution unit within GPGPU core 4762. In at least one embodiment, an instruction can access any of a local, shared, or global address space by specifying an address within a unified address space. In at least one embodiment, address mapping unit 4756 can be used to translate addresses in a unified address space into a distinct memory address that can be accessed by LSUs 4766.

In at least one embodiment, register file 4758 provides a set of registers for functional units of graphics multiprocessor 4796. In at least one embodiment, register file 4758 provides temporary storage for operands connected to data paths of functional units (e.g., GPGPU cores 4762, LSUs 4766) of graphics multiprocessor 4796. In at least one embodiment, register file 4758 is divided between each of functional units such that each functional unit is allocated a dedicated portion of register file 4758. In at least one embodiment, register file 4758 is divided between different thread groups being executed by graphics multiprocessor 4796.

In at least one embodiment, GPGPU cores 4762 can each include FPUs and/or integer ALUs that are used to execute instructions of graphics multiprocessor 4796. GPGPU cores 4762 can be similar in architecture or can differ in architecture. In at least one embodiment, a first portion of GPGPU cores 4762 include a single precision FPU and an integer ALU while a second portion of GPGPU cores 4762 include a double precision FPU. In at least one embodiment, FPUs can implement IEEE 754-2008 standard for floating point arithmetic or enable variable precision floating point arithmetic. In at least one embodiment, graphics multiprocessor 4796 can additionally include one or more fixed function or special function units to perform specific functions such as copy rectangle or pixel blending operations. In at least one embodiment one or more of GPGPU cores 4762 can also include fixed or special function logic.

In at least one embodiment, GPGPU cores 4762 include SIMD logic capable of performing a single instruction on multiple sets of data. In at least one embodiment GPGPU cores 4762 can physically execute SIMD4, SIMD8, and SIMD16 instructions and logically execute SIMD1, SIMD2, and SIMD32 instructions. In at least one embodiment, SIMD instructions for GPGPU cores 4762 can be generated at compile time by a shader compiler or automatically generated when executing programs written and compiled for single program multiple data ("SPMD") or SIMT architectures. In at least one embodiment, multiple threads of a program configured for an SIMT execution model can executed via a single SIMD instruction. For example, in at least one embodiment, eight SIMT threads that perform the same or similar operations can be executed in parallel via a single SIMD8 logic unit.

In at least one embodiment, memory and cache interconnect 4768 is an interconnect network that connects each functional unit of graphics multiprocessor 4796 to register file 4758 and to shared memory 4770. In at least one embodiment, memory and cache interconnect 4768 is a crossbar interconnect that allows LSU 4766 to implement load and store operations between shared memory 4770 and register file 4758. In at least one embodiment, register file 4758 can operate at a same frequency as GPGPU cores 4762, thus data transfer between GPGPU cores 4762 and register file 4758 is very low latency. In at least one embodiment, shared memory 4770 can be used to enable communication between threads that execute on functional units within graphics multiprocessor 4796. In at least one embodiment, cache memory 4772 can be used as a data cache for example, to cache texture data communicated between functional units and texture unit 4736. In at least one embodiment, shared memory 4770 can also be used as a program managed cached. In at least one embodiment, threads executing on GPGPU cores 4762 can programmatically store data within shared memory in addition to automatically cached data that is stored within cache memory 4772.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high speed interconnect such as PCIe or NVLink). In at least one embodiment, a GPU may be integrated on a same package or chip as cores and communicatively coupled to cores over a processor bus/interconnect that is internal to a package or a chip. In at least one embodiment, regardless of a manner in which a GPU is connected, processor cores may allocate work to a GPU in a form of sequences of commands/instructions contained in a WD. In at least one embodiment, a GPU then uses dedicated circuitry/logic for efficiently processing these commands/instructions.

In at least one embodiment, the parallel processor 4700 may be used to implement the system 100 (see FIG. 1). For example, the parallel processor 4700 may be used to implement one or more of the server(s) 102 (see FIG. 1), the computing system 132 (see FIG. 1), at least one of the external computing device(s) 112, and/or one or more of the network interfaces 230 (see FIG. 2), 330, 930, 1030, 1130, and/or 1230. In at least one embodiment, the parallel processor 4700 may be used to implement the CPU(s) 210, 310, 910, 1010, 1110, 1210, and/or the processor of the computing system 132. In at least one embodiment, the parallel processor 4700 may be used to implement the GPUs 240, 340, 940, 1040, 1140, and/or 1240. In at least one embodiment, the parallel processor memory 4722 may be used to implement the memory 260 and/or the memory of the computing system 132. In at least one embodiment, at least a portion of the system(s) depicted in FIGS. 47A and 47B is used to implement one or more systems, techniques, functions, and/or processes described in connection with FIGS. 1-16. For example, in at least one embodiment, at least one component shown or described with respect to FIGS. 47A and 47B is used to create hardware component groups on which virtual machines may be executed and/or to which virtual machine states may be migrated in accordance with one or more techniques, functions, and/or processes described with respect to any of FIGS. 1-16.

General Computing

The following figures set forth, without limitation, exemplary software constructs within general computing that can be used to implement at least one embodiment.

FIG. 48 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, a software stack 4800 of a programming platform provides an execution environment for an application 4801. In at least one embodiment, application 4801 may include any computer software capable of being launched on software stack 4800. In at least one embodiment, application 4801 may include, but is not limited to, an artificial intelligence ("AI")/machine learning ("ML") application, a high performance computing ("HPC") application, a virtual desktop infrastructure ("VDI"), or a data center workload.

In at least one embodiment, application 4801 and software stack 4800 run on hardware 4807. Hardware 4807 may include one or more GPUs, CPUs, FPGAs, AI engines, and/or other types of compute devices that support a programming platform, in at least one embodiment. In at least one embodiment, such as with CUDA, software stack 4800 may be vendor specific and compatible with only devices from particular vendor(s). In at least one embodiment, such as in with OpenCL, software stack 4800 may be used with devices from different vendors. In at least one embodiment, hardware 4807 includes a host connected to one more devices that can be accessed to perform computational tasks via application programming interface ("API") calls. A device within hardware 4807 may include, but is not limited to, a GPU, FPGA, AI engine, or other compute device (but may also include a CPU) and its memory, as opposed to a host within hardware 4807 that may include, but is not limited to, a CPU (but may also include a compute device) and its memory, in at least one embodiment.

In at least one embodiment, software stack 4800 of a programming platform includes, without limitation, a number of libraries 4803, a runtime 4805, and a device kernel driver 4806. Each of libraries 4803 may include data and programming code that can be used by computer programs and leveraged during software development, in at least one embodiment. In at least one embodiment, libraries 4803 may include, but are not limited to, pre-written code and subroutines, classes, values, type specifications, configuration data, documentation, help data, and/or message templates. In at least one embodiment, libraries 4803 include functions that are optimized for execution on one or more types of devices. In at least one embodiment, libraries 4803 may include, but are not limited to, functions for performing mathematical, deep learning, and/or other types of operations on devices. In at least one embodiment, libraries 4903 are associated with corresponding APIs 4902, which may include one or more APIs, that expose functions implemented in libraries 4903.

In at least one embodiment, application 4801 is written as source code that is compiled into executable code, as discussed in greater detail below in conjunction with FIG. 53. Executable code of application 4801 may run, at least in part, on an execution environment provided by software stack 4800, in at least one embodiment. In at least one embodiment, during execution of application 4801, code may be reached that needs to run on a device, as opposed to a host. In such a case, runtime 4805 may be called to load and launch requisite code on a device, in at least one embodiment. In at least one embodiment, runtime 4805 may include any technically feasible runtime system that is able to support execution of application S01.

In at least one embodiment, runtime 4805 is implemented as one or more runtime libraries associated with corresponding APIs, which are shown as API(s) 4804. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 4804 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, device kernel driver 4806 is configured to facilitate communication with an underlying device. In at least one embodiment, device kernel driver 4806 may provide low-level functionalities upon which APIs, such as API(s) 4804, and/or other software relies. In at least one embodiment, device kernel driver 4806 may be configured to compile intermediate representation ("IR") code into binary code at runtime. For CUDA, device kernel driver 4806 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 4806 to compile IR code at runtime.

In at least one embodiment, the software stack 4800 may be used to implement the system 100 (see FIG. 1). For example, the software stack 4800 may be executed by one or more of the server(s) 102 (see FIG. 1), the computing system 132 (see FIG. 1), at least one of the external computing device(s) 112, and/or one or more of the network interfaces 230 (see FIG. 2), 330, 930, 1030, 1130, and/or 1230. In at least one embodiment, the software stack 4800 may include at least portions of the instructions 262 and/or the instructions implementing the virtualization management application 130 and/or the VM database 134. In at least one embodiment, the hardware 4807 may include the hardware components 200, the hardware components 300, the hardware components 1000, the hardware components 1100D, the hardware components 1100E, the hardware components 1200F, and/or the hardware components 1200G. In at least one embodiment, at least a portion of the system(s) depicted in FIG. 48 is used to implement one or more systems, techniques, functions, and/or processes described in connection with FIGS. 1-16. For example, in at least one embodiment, at least one component shown or described with respect to FIG. 48 is used to create hardware component groups on which virtual machines may be executed and/or to which virtual machine states may be migrated in accordance with one or more techniques, functions, and/or processes described with respect to any of FIGS. 1-16.

FIG. 49 illustrates a CUDA implementation of software stack 4800 of FIG. 48, in accordance with at least one embodiment. In at least one embodiment, a CUDA software stack 4900, on which an application 4901 may be launched, includes CUDA libraries 4903, a CUDA runtime 4905, a CUDA driver 4907, and a device kernel driver 4908. In at least one embodiment, CUDA software stack 4900 executes on hardware 4909, which may include a GPU that supports CUDA and is developed by NVIDIA Corporation of Santa Clara, CA.

In at least one embodiment, application 4901, CUDA runtime 4905, and device kernel driver 4908 may perform similar functionalities as application 4801, runtime 4805, and device kernel driver 4806, respectively, which are described above in conjunction with FIG. 48. In at least one embodiment, CUDA driver 4907 includes a library (libcuda.so) that implements a CUDA driver API 4906. Similar to a CUDA runtime API 4904 implemented by a CUDA runtime library (cudart), CUDA driver API 4906 may, without limitation, expose functions for memory management, execution control, device management, error handling, synchronization, and/or graphics interoperability, among other things, in at least one embodiment. In at least one embodiment, CUDA driver API 4906 differs from CUDA runtime API 4904 in that CUDA runtime API 4904 simplifies device code management by providing implicit initialization, context (analogous to a process) management, and module (analogous to dynamically loaded libraries) management. In contrast to high-level CUDA runtime API

4904, CUDA driver API 4906 is a low-level API providing more fine-grained control of a device, particularly with respect to contexts and module loading, in at least one embodiment. In at least one embodiment, CUDA driver API 4906 may expose functions for context management that are not exposed by CUDA runtime API 4904. In at least one embodiment, CUDA driver API 4906 is also language-independent and supports, e.g., OpenCL in addition to CUDA runtime API 4904. Further, in at least one embodiment, development libraries, including CUDA runtime 4905, may be considered as separate from driver components, including user-mode CUDA driver 4907 and kernel-mode device driver 4908 (also sometimes referred to as a "display" driver).

In at least one embodiment, CUDA libraries 4903 may include, but are not limited to, mathematical libraries, deep learning libraries, parallel algorithm libraries, and/or signal/image/video processing libraries, which parallel computing applications such as application 4901 may utilize. In at least one embodiment, CUDA libraries 4903 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 4903 may include deep learning libraries such as a cuDNN library of primitives for deep neural networks and a TensorRT platform for high-performance deep learning inference, among others.

In at least one embodiment, the CUDA software stack 4900 may be used to implement the system 100 (see FIG. 1). For example, the CUDA software stack 4900 may be executed by one or more of the server(s) 102 (see FIG. 1), the computing system 132 (see FIG. 1), at least one of the external computing device(s) 112, and/or one or more of the network interfaces 230 (see FIG. 2), 330, 930, 1030, 1130, and/or 1230. In at least one embodiment, the CUDA software stack 4900 may include at least portions of the instructions 262 and/or the instructions implementing the virtualization management application 130 and/or the VM database 134. In at least one embodiment, the hardware 4909 may include the hardware components 200, the hardware components 300, the hardware components 1000, the hardware components 1100D, the hardware components 1100E, the hardware components 1200F, and/or the hardware components 1200G. In at least one embodiment, at least a portion of the system(s) depicted in FIG. 49 is used to implement one or more systems, techniques, functions, and/or processes described in connection with FIGS. 1-16. For example, in at least one embodiment, at least one component shown or described with respect to FIG. 49 is used to create hardware component groups on which virtual machines may be executed and/or to which virtual machine states may be migrated in accordance with one or more techniques, functions, and/or processes described with respect to any of FIGS. 1-16.

FIG. 50 illustrates a ROCm implementation of software stack 4800 of FIG. 48, in accordance with at least one embodiment. In at least one embodiment, a ROCm software stack 5000, on which an application 5001 may be launched, includes a language runtime 5003, a system runtime 5005, a thunk 5007, a ROCm kernel driver 5008, and a device kernel driver 5009. In at least one embodiment, ROCm software stack 5000 executes on hardware 5010, which may include a GPU that supports ROCm and is developed by AMD Corporation of Santa Clara, CA.

In at least one embodiment, application 5001 may perform similar functionalities as application 4801 discussed above in conjunction with FIG. 48. In addition, language runtime 5003 and system runtime 5005 may perform similar functionalities as runtime 4805 discussed above in conjunction with FIG. 48, in at least one embodiment. In at least one embodiment, language runtime 5003 and system runtime 5005 differ in that system runtime 5005 is a language-independent runtime that implements a ROCr system runtime API 5004 and makes use of a Heterogeneous System Architecture ("HAS") Runtime API. HAS runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 5005, language runtime 5003 is an implementation of a language-specific runtime API 5002 layered on top of ROCr system runtime API 5004, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 4904 discussed above in conjunction with FIG. 49, such as functions for memory management, execution control, device management, error handling, and synchronization, among other things.

In at least one embodiment, thunk (ROCt) 5007 is an interface that can be used to interact with underlying ROCm driver 5008. In at least one embodiment, ROCm driver 5008 is a ROCk driver, which is a combination of an AMDGPU driver and a HAS kernel driver (amdkfd). In at least one embodiment, AMDGPU driver is a device kernel driver for GPUs developed by AMD that performs similar functionalities as device kernel driver 4806 discussed above in conjunction with FIG. 48. In at least one embodiment, HAS kernel driver is a driver permitting different types of processors to share system resources more effectively via hardware features.

In at least one embodiment, various libraries (not shown) may be included in ROCm software stack 5000 above language runtime 5003 and provide functionality similarity to CUDA libraries 4903, discussed above in conjunction with FIG. 49. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

In at least one embodiment, the ROCm software stack 5000 may be used to implement the system 100 (see FIG. 1). For example, the ROCm software stack 5000 may be executed by one or more of the server(s) 102 (see FIG. 1), the computing system 132 (see FIG. 1), at least one of the external computing device(s) 112, and/or one or more of the network interfaces 230 (see FIG. 2), 330, 930, 1030, 1130, and/or 1230. In at least one embodiment, the ROCm software stack 5000 may include at least portions of the instructions 262 and/or the instructions implementing the virtualization management application 130 and/or the VM database 134. In at least one embodiment, the hardware 5010 may include the hardware components 200, the hardware components 300, the hardware components 1000, the hardware components 1100D, the hardware components 1100E, the hardware components 1200F, and/or the hardware components 1200G. In at least one embodiment, at least a portion of the system(s) depicted in FIG. 50 is used to implement one or more systems, techniques, functions, and/or processes described in connection with FIGS. 1-16. For example, in at least one embodiment, at least one component shown or described with respect to FIG. 50 is used to create hardware component groups on which virtual machines may be executed and/or to which virtual machine states may be migrated in accordance with one or more techniques, functions, and/or processes described with respect to any of FIGS. 1-16.

FIG. 51 illustrates an OpenCL implementation of software stack 4800 of FIG. 48, in accordance with at least one embodiment. In at least one embodiment, an OpenCL software stack 5100, on which an application 5101 may be launched, includes an OpenCL framework 5105, an OpenCL runtime 5106, and a driver 5107. In at least one embodiment, OpenCL software stack 5100 executes on hardware 4909 that is not vendor-specific. As OpenCL is supported by devices developed by different vendors, specific OpenCL drivers may be required to interoperate with hardware from such vendors, in at least one embodiment.

In at least one embodiment, application 5101, OpenCL runtime 5106, device kernel driver 5107, and hardware 5108 may perform similar functionalities as application 4801, runtime 4805, device kernel driver 4806, and hardware 4807, respectively, that are discussed above in conjunction with FIG. 48. In at least one embodiment, application 5101 further includes an OpenCL kernel 5102 with code that is to be executed on a device.

In at least one embodiment, OpenCL defines a "platform" that allows a host to control devices connected to a host. In at least one embodiment, an OpenCL framework provides a platform layer API and a runtime API, shown as platform API 5103 and runtime API 5105. In at least one embodiment, runtime API 5105 uses contexts to manage execution of kernels on devices. In at least one embodiment, each identified device may be associated with a respective context, which runtime API 5105 may use to manage command queues, program objects, and kernel objects, share memory objects, among other things, for that device. In at least one embodiment, platform API 5103 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 5104 is also included in OpenCL framework 5105. Source code may be compiled offline prior to executing an application or online during execution of an application, in at least one embodiment. In contrast to CUDA and ROCm, OpenCL applications in at least one embodiment may be compiled online by compiler 5104, which is included to be representative of any number of compilers that may be used to compile source code and/or IR code, such as Standard Portable Intermediate Representation ("SPIR-V") code, into binary code. Alternatively, in at least one embodiment, OpenCL applications may be compiled offline, prior to execution of such applications.

In at least one embodiment, the OpenCL software stack 5100 may be used to implement the system 100 (see FIG. 1). For example, the OpenCL software stack 5100 may be executed by one or more of the server(s) 102 (see FIG. 1), the computing system 132 (see FIG. 1), at least one of the external computing device(s) 112, and/or one or more of the network interfaces 230 (see FIG. 2), 330, 930, 1030, 1130, and/or 1230. In at least one embodiment, the OpenCL software stack 5100 may include at least portions of the instructions 262 and/or the instructions implementing the virtualization management application 130 and/or the VM database 134. In at least one embodiment, the hardware 5108 may include the hardware components 200, the hardware components 300, the hardware components 1000, the hardware components 1100D, the hardware components 1100E, the hardware components 1200F, and/or the hardware components 1200G. In at least one embodiment, at least a portion of the system(s) depicted in FIG. 51 is used to implement one or more systems, techniques, functions, and/or processes described in connection with FIGS. 1-16. For example, in at least one embodiment, at least one component shown or described with respect to FIG. 51 is used to create hardware component groups on which virtual machines may be executed and/or to which virtual machine states may be migrated in accordance with one or more techniques, functions, and/or processes described with respect to any of FIGS. 1-16.

FIG. 52 illustrates software that is supported by a programming platform, in accordance with at least one embodiment. In at least one embodiment, a programming platform 5204 is configured to support various programming models 5203, middlewares and/or libraries 5202, and frameworks 5201 that an application 5200 may rely upon. In at least one embodiment, application 5200 may be an AI/ML application implemented using, for example, a deep learning framework such as MXNet, PyTorch, or TensorFlow, which may rely on libraries such as cuDNN, NVIDIA Collective Communications Library ("NCCL"), and/or NVIDA Developer Data Loading Library ("DALI") CUDA libraries to provide accelerated computing on underlying hardware.

In at least one embodiment, programming platform 5204 may be one of a CUDA, ROCm, or OpenCL platform described above in conjunction with FIG. 49, FIG. 50, and FIG. 51, respectively. In at least one embodiment, programming platform 5204 supports multiple programming models 5203, which are abstractions of an underlying computing system permitting expressions of algorithms and data structures. Programming models 5203 may expose features of underlying hardware in order to improve performance, in at least one embodiment. In at least one embodiment, programming models 5203 may include, but are not limited to, CUDA, HIP, OpenCL, C++ Accelerated Massive Parallelism ("C++ AMP"), Open Multi-Processing ("OpenMP"), Open Accelerators ("OpenACC"), and/or Vulcan Compute.

In at least one embodiment, libraries and/or middlewares 5202 provide implementations of abstractions of programming models 5204. In at least one embodiment, such libraries include data and programming code that may be used by computer programs and leveraged during software development. In at least one embodiment, such middlewares include software that provides services to applications beyond those available from programming platform 5204. In at least one embodiment, libraries and/or middlewares 5202 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 5202 may include NCCL and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

In at least one embodiment, application frameworks 5201 depend on libraries and/or middlewares 5202. In at least one embodiment, each of application frameworks 5201 is a software framework used to implement a standard structure of application software. An AI/ML application may be implemented using a framework such as Caffe, Caffe2, TensorFlow, Keras, PyTorch, or MxNet deep learning frameworks, in at least one embodiment.

In at least one embodiment, the system of FIG. 52 may be used to implement the system 100 (see FIG. 1). For example, the programming platform 5204, the programming models 5203, the frameworks 5201, and/or the middlewares and/or libraries 5202 may be used to implement the instructions 262 and/or the instructions implementing the virtualization management application 130 and/or the VM database 134. In at least one embodiment, at least a portion of the system(s) depicted in FIG. 52 is used to implement one or more systems, techniques, functions, and/or processes described in connection with FIGS. 1-16. For example, in at least one embodiment, at least one component shown or described with respect to FIG. 52 is used to create hardware component groups on which virtual machines may be executed and/or to which virtual machine states may be migrated in accordance with one or more techniques, functions, and/or processes described with respect to any of FIGS. 1-16.

FIG. 53 illustrates compiling code to execute on one of programming platforms of FIGS. 48-51, in accordance with at least one embodiment. In at least one embodiment, a compiler 5301 receives source code 5300 that includes both host code as well as device code. In at least one embodiment, complier 5301 is configured to convert source code 5300 into host executable code 5302 for execution on a host and device executable code 5303 for execution on a device. In at least one embodiment, source code 5300 may either be compiled offline prior to execution of an application, or online during execution of an application.

In at least one embodiment, source code 5300 may include code in any programming language supported by compiler 5301, such as C++, C, Fortran, etc. In at least one embodiment, source code 5300 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 5300 may include multiple source code files, rather than a single-source file, into which host code and device code are separated.

In at least one embodiment, compiler 5301 is configured to compile source code 5300 into host executable code 5302 for execution on a host and device executable code 5303 for execution on a device. In at least one embodiment, compiler 5301 performs operations including parsing source code 5300 into an abstract system tree (AST), performing optimizations, and generating executable code. In at least one embodiment in which source code 5300 includes a single-source file, compiler 5301 may separate device code from host code in such a single-source file, compile device code and host code into device executable code 5303 and host executable code 5302, respectively, and link device executable code 5303 and host executable code 5302 together in a single file, as discussed in greater detail below with respect to FIG. 42.

In at least one embodiment, host executable code 5302 and device executable code 5303 may be in any suitable format, such as binary code and/or IR code. In a case of CUDA, host executable code 5302 may include native object code and device executable code 5303 may include code in PTX intermediate representation, in at least one embodiment. In a case of ROCm, both host executable code 5302 and device executable code 5303 may include target binary code, in at least one embodiment.

At least one embodiment of the disclosure can be described in view of the following clauses:

1. A method comprising: determining expected path performances for one or more paths between hardware components of a computing system connected by one or more connections; selecting a selected group of the hardware components to perform a workload based at least in part on the expected path performances; and performing at least a portion of the workload using the selected group.

2. The method of clause 1, wherein the expected path performances are determined for a particular path of the one or more paths based at least on one or more expected connection performances for any of the one or more connections along the particular path.

3. The method of clause 1 or 2, wherein the expected path performances are determined for a particular path of the one or more paths based at least on one or more expected connection performances computed for any of the one or more connections along the particular path and one or more expected hardware performances for any of the hardware components along the particular path.

4. The method of any one of clauses 1-3, further comprising: assigning one or more path weights to the one or more paths, the one or more path weights being determined based at least on the expected path performances for the one or more paths, the selected group being selected based at least on the one or more path weights.

5. The method of clause 4, wherein assigning the one or more path weights to the one or more paths comprises: associating a connection weight with at least one connection along a particular one of the one or more paths; and determining a particular path weight for the particular path based at least on the connection weight associated with the at least one connection.

6. The method of clause 4 or 5, wherein assigning the one or more path weights to the one or more paths comprises: assigning a first weight value to at least one connection along a particular one of the one or more paths; assigning a second weight value to at least one hardware component along the particular path; and determining a particular path weight for the particular path based at least on the first weight value assigned to the at least one connection along the particular path and the second weight value assigned to the at least one hardware component along the particular path.

7. The method of any one of clauses 1-6, further comprising: constructing at least one data structure representing the hardware components as nodes of the at least one data structure and the one or more connections as edges of the at least one data structure; assigning one or more weights to at least one of the nodes or the edges; and using the at least one data structure to obtain one or more least weighted paths between one or more pairs of the nodes, the one or more least weighted paths being associated with one or more weight values, determining the expected path performances for the one or more paths comprising using the one or more weight values as the expected path performances.

8. The method of clause 7, further comprising: using anticipated usage of the computing system to identify a plurality of groups of the hardware components; and determining a group weight for at least one group of the plurality of groups by summing any of the weight values associated with at least one pair of the hardware components included in the at least one group, wherein the selected group is selected based at least on the group weight determined for the at least one group.

9. The method of any one of clauses 1-8, further comprising: creating a first virtual machine using the selected group; using the first virtual machine to perform the portion of the workload; suspending performance of the workload before the workload is finished; preserving state information for the workload; creating a second virtual machine using the state information; and resuming the performance of the workload using the second virtual machine.

10. A system comprising: hardware components connected by one or more connections; and one or more circuits to identify one or more groups of the hardware components based at least on weights associated with paths between at least a portion of the hardware components along at least a portion of the one or more connections, and to cause a selected one of the one or more groups to perform at least a portion of a workload.

11. The system of clause 10, further comprising: a computing system to select the selected group and instruct the one or more circuits to use the selected group to perform the portion of the workload, the one or more circuits to send identifiers of the groups to the computing system.

12. The system of clause 10 or 11, wherein the one or more circuits are to identify the one or more groups during startup and to communicate one or more identifiers of the one or more groups to at least one virtualization management application.

13. The system of any one of clauses 10-12, wherein the one or more circuits are to create a first virtual machine using the selected group, use the first virtual machine to begin performing the portion of the workload, suspend performance of the workload before the workload is finished, preserve state information for the workload, create a second virtual machine using another one of the groups and the state information, and resume the performance of the workload using the second virtual machine.

14. The system of any one of clauses 10-13, further comprising: a first computing system comprising the hardware components, the one or more circuits to create a first virtual machine using the selected group, use the first virtual machine to begin performing the portion of the workload, suspend performance of the workload before the workload is finished, and preserve state information for the workload; and a second computing system to receive the state information, create a second virtual machine using the state information, and resume the performance of the workload using the second virtual machine.

15. The system of clause 14, further comprising: a third computing system to instruct the first computing system to suspend the performance of the portion of the workload, select a group of hardware components on the second computing system, and instruct the second computing system to create the second virtual machine using the group of hardware components and resume the performance of the workload using the second virtual machine.

16. The system of any one of clauses 10-15, further comprising: a management computing system; and a plurality of computing systems connected to the management computing system and comprising respective hardware components corresponding to the hardware components, the plurality of computing systems to identify a plurality of groups to the management computing system, the plurality of groups comprising at least one group of the respective hardware components identified by each of at least a portion of the plurality of computing systems, the management computing system to assign a plurality of workloads to ones of the plurality of groups.

17. The system of any one of clauses 10-16, wherein the system is comprised in at least one of: a control system for an autonomous or semi-autonomous machine; a perception system for an autonomous or semi-autonomous machine; a first system for performing simulation operations; a second system for performing deep learning operations; a third system implemented using an edge device; a fourth system implemented using a robot; a fifth system incorporating one or more virtual machines (VMs); a sixth system implemented at least partially in a data center; a seventh system for performing digital twin operations; an eighth system for performing light transport simulation; a ninth system for performing collaborative content creation for 3D assets; a tenth system for performing conversational Artificial Intelligence operations; an eleventh system for generating synthetic data; a twelfth system for implementing a web-hosted service for detecting program workload inefficiencies; an application as an application programming interface ("API"); a thirteenth system implemented at least partially using cloud computing resources; or a fourteenth system for presenting one or more of virtual reality content, augmented reality content, or mixed reality content.

18. A processor comprising one or more circuits to: determine one or more metrics for paths connecting hardware components; select a plurality of groups of the hardware components based at least in part on the metrics; and perform at least a portion of a workload using a selected group of the plurality of groups.

19. The processor of clause 18, wherein the one or more circuits are to assign one or more first weight values to one or more connections along the paths, and to determine the one or more metrics based at least on the one or more first weight values.

20. The processor of clause 19, wherein the one or more circuits are to assign one or more second weight values to at least some of the hardware components, and determine the one or more metrics based at least on the one or more second weight values.

21. The processor of any one of clauses 18-20, wherein at least one metric of the one or more metrics is based at least on at least one of an expected performance of at least one of the hardware components or an expected performance of at least one connection between the hardware components.

22. The processor of any one of clauses 18-21, wherein the paths are minimum cost paths, and at least one metric of the one or more metrics corresponds to costs associated with the minimum cost paths.

23. The processor of any one of clauses 18-22, wherein the plurality of groups are selected based at least on a set of predetermined hardware components.

24. The processor of any one of clauses 18-23, wherein the one or more circuits are to perform the portion of the workload using the selected group by: creating a first virtual machine using the selected group; using the first virtual machine to perform the portion of the workload; suspending performance of the workload before the workload is finished; preserving state information for the workload; creating a second virtual machine using the state information; and resuming the performance of the workload using the second virtual machine.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, a number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium. In at least one embodiment, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— in at least one embodiment, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed.

No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, in at least one embodiment, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or inter-process communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
   determining expected path performances for one or more paths between hardware components of a computing system connected by one or more connections;
   selecting a first group of at least two of the hardware components to perform a workload based at least in part on the expected path performances;
   executing a first virtual machine using the first group;
   mapping the at least two hardware components of the first group to the first virtual machine in a first order that represents relationships between the at least two hardware components of the first group;
   performing at least a portion of the workload using the first virtual machine;
   suspending performance of the workload before the workload is finished;
   preserving state information for the workload;

selecting a different second group of at least two of the hardware components based at least in part on the different second group being compatible with the first group;
   executing a second virtual machine using the different second group;
   mapping the at least two hardware components of the different second group to the second virtual machine in a second order that represents relationships between the at least two hardware components of the different second group, wherein the second order is compatible with the first order;
   loading the state information into the second virtual machine; and
   resuming the performance of the workload using the second virtual machine.

2. The method of claim 1, wherein the expected path performances are determined for a particular path of the one or more paths based at least on one or more expected connection performances for any of the one or more connections along the particular path.

3. The method of claim 1, wherein the expected path performances are determined for a particular path of the one or more paths based at least on one or more expected connection performances computed for any of the one or more connections along the particular path and one or more expected hardware performances for any of the hardware components along the particular path.

4. The method of claim 1, further comprising:
   assigning one or more path weights to the one or more paths, the one or more path weights being determined based at least on the expected path performances for the one or more paths, the first group being selected based at least on the one or more path weights.

5. The method of claim 4, wherein assigning the one or more path weights to the one or more paths comprises:
   associating a connection weight with at least one connection along a particular one of the one or more paths; and
   determining a particular path weight for the particular path based at least on the connection weight associated with the at least one connection.

6. The method of claim 4, wherein assigning the one or more path weights to the one or more paths comprises:
   assigning a first weight value to at least one connection along a particular one of the one or more paths;
   assigning a second weight value to at least one hardware component along the particular path; and
   determining a particular path weight for the particular path based at least on the first weight value assigned to the at least one connection along the particular path and the second weight value assigned to the at least one hardware component along the particular path.

7. The method of claim 1, further comprising:
   constructing at least one data structure representing the hardware components as nodes of the at least one data structure and the one or more connections as edges of the at least one data structure;
   assigning one or more weights to at least one of the nodes or the edges; and
   using the at least one data structure to obtain one or more least weighted paths between one or more pairs of the nodes, the one or more least weighted paths being associated with one or more weight values, determining the expected path performances for the one or more paths comprising using the one or more weight values as the expected path performances.

8. The method of claim 7, further comprising:

using anticipated usage of the computing system to identify a plurality of groups of the hardware components; and determining a group weight for at least one group of the plurality of groups by summing any of the weight values associated with at least one pair of the hardware components included in the at least one group, wherein at least one of the first group or the different second group is selected based at least on the group weight determined for the at least one group.

9. The method of claim 1, further comprising:

generating a first ordered device list that indicates the first order, the first ordered device list to be used to map the at least two hardware components of the first group to the first virtual machine in the first order; and generating a second ordered device list that indicates the second order, the second ordered device list to be used to map the at least two hardware components of the different second group to the second virtual machine in the second order.

10. A system comprising:

one or more computing systems comprising hardware components connected by one or more connections; and one or more circuits to:

identify a plurality of groups comprising at least two of the hardware components based at least on weights associated with paths between at least a portion of the hardware components along at least a portion of the one or more connections;

select a first group of the plurality of groups to perform a workload;

execute a first virtual machine using the first group;

map the at least two hardware components of the first group to the first virtual machine in a first order that represents relationships between the at least two hardware components of the first group;

perform at least a portion of the workload using the first virtual machine;

suspend performance of the workload before the workload is finished;

preserve state information for the workload;

select a different second group of the plurality of groups based at least in part on the different second group being compatible with the first group;

execute a second virtual machine using the different second group;

map the at least two hardware components of the different second group to the second virtual machine in a second order that represents relationships between the at least two hardware components of the different second group, wherein the second order is compatible with the first order;

load the state information into the second virtual machine; and resume the performance of the workload using the second virtual machine.

11. The system of claim 10, wherein a first computing system of the one or more computing systems is to select the first group and instruct a second computing system of the one or more computing systems to use the first group to perform the portion of the workload, the second computing system to send identifiers of the plurality of groups to the first computing system.

12. The system of claim 10, wherein the one or more circuits are to identify the plurality of groups during startup and to communicate one or more identifiers of the plurality of groups to at least one virtualization management application.

13. The system of claim 10, wherein the one or more circuits are to:

generate a first ordered device list that indicates the first order, the first ordered device list to be used to map the at least two hardware components of the first group to the first virtual machine in the first order; and generate a second ordered device list that indicates the second order, the second ordered device list to be used to map the at least two hardware components of the different second group to the second virtual machine in the second order.

14. The system of claim 10, wherein a first computing system of the one or more computing systems executes the first virtual machine using the first group, uses the first virtual machine to perform the portion of the workload, suspends performance of the workload before the workload is finished, and preserves the state information for the workload; and a second computing system of the one or more computing systems receives the state information, executes the second virtual machine using the different second group, loads the state information into the second virtual machine, and resumes the performance of the workload using the second virtual machine.

15. The system of claim 14, further comprising:

a third computing system to instruct the first computing system to suspend the performance of the workload, select the different second group, and instruct the second computing system to execute the second virtual machine using the different second group and resume the performance of the workload using the second virtual machine, wherein the at least two hardware components of the first group are components of the first computing system, and the at least two hardware components of the different second group are components of the second computing system.

16. The system of claim 10, further comprising:

a management computing system; and a plurality of computing systems connected to the management computing system and comprising respective hardware components corresponding to the hardware components, the plurality of computing systems to identify multiple groups to the management computing system, the multiple groups comprising at least one group of the respective hardware components identified by each of at least a portion of the plurality of computing systems, the management computing system to assign a plurality of workloads to ones of the multiple groups.

17. The system of claim 10, wherein the system is comprised in at least one of:

a control system for an autonomous or semi-autonomous machine;

a perception system for an autonomous or semi-autonomous machine;

a first system for performing simulation operations;

a second system for performing deep learning operations;

a third system implemented using an edge device;

a fourth system implemented using a robot;

a fifth system incorporating one or more virtual machines (VMs);

a sixth system implemented at least partially in a data center;

a seventh system for performing digital twin operations;

an eighth system for performing light transport simulation;

a nineth system for performing collaborative content creation for 3D assets;

a tenth system for performing conversational Artificial Intelligence operations;

an eleventh system for generating synthetic data;

a twelfth system for implementing a web-hosted service for detecting program workload inefficiencies;

an application as an application programming interface ("API");

a thirteenth system implemented at least partially using cloud computing resources; or a fourteenth system for presenting one or more of virtual reality content, augmented reality content, or mixed reality content.

18. A processor comprising one or more circuits to:

determine one or more metrics for paths connecting hardware components;

select a plurality of groups of at least two of the hardware components based at least in part on the metrics;

select a first group of the plurality of groups;

execute a first virtual machine using the first group;

map the at least two hardware components of the first group to the first virtual machine in a first order that represents relationships between the at least two hardware components of the first group;

perform at least a portion of a workload using the first virtual machine;

suspend performance of the workload before the workload is finished;

preserve state information for the workload;

select a different second group of the plurality of groups based at least in part on the different second group being compatible with the first group;

execute a second virtual machine using the different second group;

map the at least two hardware components of the different second group to the second virtual machine in a second order that represents relationships between the at least two hardware components of the different second group, wherein the second order is compatible with the first order;

load the state information into the second virtual machine; and resume the performance of the workload using the second virtual machine.

19. The processor of claim 18, wherein the one or more circuits are to assign one or more first weight values to one or more connections along the paths, and to determine the one or more metrics based at least on the one or more first weight values.

20. The processor of claim 19, wherein the one or more circuits are to assign one or more second weight values to at least some of the hardware components, and determine the one or more metrics based at least on the one or more second weight values.

21. The processor of claim 18, wherein at least one metric of the one or more metrics is based at least on at least one of an expected performance of at least one of the hardware components or an expected performance of at least one connection between the hardware components.

22. The processor of claim 18, wherein the paths are minimum cost paths, and at least one metric of the one or more metrics corresponds to costs associated with the minimum cost paths.

23. The processor of claim 18, wherein the plurality of groups are selected based at least on a set of predetermined hardware components.

24. The processor of claim 18, wherein the one or more circuits are to:

generate a first ordered device list that indicates the first order, and use the first ordered device list to map the at least two hardware components of the first group to the first virtual machine in the first order; and generate a second ordered device list that indicates the second order, and use the second ordered device list to map the at least two hardware components of the different second group to the second virtual machine in the second order.

\* \* \* \* \*